(12) United States Patent
McLachlan et al.

(10) Patent No.: US 11,681,537 B2
(45) Date of Patent: Jun. 20, 2023

(54) ACCOUNT MANAGEMENT USER INTERFACES

(71) Applicant: Apple Inc., Cupertino, CA (US)

(72) Inventors: Mischa McLachlan, San Francisco, CA (US); Aaron Melim, San Francisco, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/495,346

(22) Filed: Oct. 6, 2021

(65) Prior Publication Data

US 2022/0027176 A1 Jan. 27, 2022

Related U.S. Application Data

(63) Continuation of application No. 16/786,694, filed on Feb. 10, 2020, now Pat. No. 11,169,830.

(60) Provisional application No. 62/907,697, filed on Sep. 29, 2019.

(51) Int. Cl.
  *G06Q 40/02* (2023.01)
  *G06F 9/451* (2018.01)
  *G06F 16/16* (2019.01)

(52) U.S. Cl.
  CPC ............ *G06F 9/451* (2018.02); *G06F 16/168* (2019.01); *G06Q 40/02* (2013.01)

(58) Field of Classification Search
  CPC ........ G06F 9/451; G06F 16/168; G06Q 40/02
  See application file for complete search history.

(56) References Cited

U.S. PATENT DOCUMENTS

| | | |
|---|---|---|
| 5,237,159 A | 8/1993 | Stephens et al. |
| 5,265,007 A | 11/1993 | Barnhard, Jr. et al. |
| 5,484,988 A | 1/1996 | Hills et al. |
| 5,691,524 A | 11/1997 | Josephson |
| 5,717,868 A | 2/1998 | James |
| 5,783,808 A | 7/1998 | Josephson |
| 5,910,989 A | 6/1999 | Naccache |
| 5,917,913 A | 6/1999 | Wang |
| 5,983,197 A | 11/1999 | Enta |
| 6,016,484 A | 1/2000 | Williams et al. |

(Continued)

FOREIGN PATENT DOCUMENTS

| | | |
|---|---|---|
| AU | 2017101425 A4 | 11/2017 |
| CN | 101171604 A | 4/2008 |

(Continued)

OTHER PUBLICATIONS

International Preliminary Report on Patentability received for PCT Patent Application No. PCT/US2020/048799, dated Apr. 7, 2022, 14 pages.

(Continued)

*Primary Examiner* — Beau D Spratt
(74) *Attorney, Agent, or Firm* — DLA Piper LLP (US)

(57) ABSTRACT

The present disclosure generally relates to managing a user account. In some embodiments, managing a user account includes managing remote data storage associated with a user account. In some embodiments, managing a user account includes managing deletion of data from remote data storage associated with a user account. In some embodiments, managing a user account includes managing a balance transfer of a user account.

36 Claims, 79 Drawing Sheets

(56) References Cited

U.S. PATENT DOCUMENTS

| | | |
|---|---|---|
| 6,164,528 A | 12/2000 | Hills et al. |
| 6,189,785 B1 | 2/2001 | Lowery |
| 6,193,152 B1 | 2/2001 | Fernando et al. |
| 6,230,148 B1 | 5/2001 | Pare, Jr. et al. |
| 6,260,027 B1 | 7/2001 | Takahashi et al. |
| 6,282,656 B1 | 8/2001 | Wang |
| 6,328,207 B1 | 12/2001 | Gregoire et al. |
| 6,398,646 B1 | 6/2002 | Wei et al. |
| 6,581,042 B2 | 6/2003 | Pare, Jr. et al. |
| 6,644,546 B2 | 11/2003 | George et al. |
| 6,662,166 B2 | 12/2003 | Pare, Jr. et al. |
| 6,822,769 B1 | 11/2004 | Drinkwater et al. |
| 6,950,810 B2 | 9/2005 | Lapsley et al. |
| 6,970,855 B2 | 11/2005 | Das et al. |
| 7,099,845 B2 | 8/2006 | Higgins et al. |
| 7,099,850 B1 | 8/2006 | Mann, II et al. |
| 7,155,411 B1 | 12/2006 | Blinn et al. |
| 7,356,516 B2 | 4/2008 | Richey et al. |
| 7,359,880 B2 | 4/2008 | Abel et al. |
| 7,430,537 B2 | 9/2008 | Templeton et al. |
| 7,496,527 B2 | 2/2009 | Silverstein et al. |
| 7,529,563 B1 | 5/2009 | Pitroda |
| 7,535,344 B2 | 5/2009 | Obradovich |
| 7,644,019 B2 | 1/2010 | Woda et al. |
| 7,657,441 B2 | 2/2010 | Richey et al. |
| 7,689,508 B2 | 3/2010 | Davis et al. |
| 7,818,399 B1 | 10/2010 | Ross, Jr. et al. |
| 8,050,997 B1 | 11/2011 | Nosek et al. |
| 8,157,164 B1 | 4/2012 | Billman |
| 8,195,507 B2 | 6/2012 | Postrel |
| 8,392,259 B2 | 3/2013 | Macgillivray et al. |
| 8,452,654 B1 | 5/2013 | Wooters et al. |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,762,272 B1 | 6/2014 | Cozens et al. |
| 8,763,896 B2 | 7/2014 | Kushevsky et al. |
| 8,827,153 B1 | 9/2014 | Rhoades et al. |
| 8,831,677 B2 | 9/2014 | Villa-Real |
| 8,892,474 B1 | 11/2014 | Inskeep et al. |
| 8,924,259 B2 | 12/2014 | Neighman et al. |
| 8,924,292 B1 | 12/2014 | Ellis et al. |
| 9,305,310 B2 | 4/2016 | Radhakrishnan et al. |
| 9,324,067 B2 | 4/2016 | Van Os et al. |
| 9,483,763 B2 | 11/2016 | Van Os et al. |
| 9,519,901 B1 | 12/2016 | Dorogusker |
| 9,558,636 B1 | 1/2017 | Burdick |
| 9,584,463 B2 | 2/2017 | Ji et al. |
| 9,779,585 B2 | 10/2017 | Dupuis et al. |
| 9,842,330 B1 | 12/2017 | Van Os et al. |
| 9,851,214 B1 | 12/2017 | Chintakindi |
| 9,880,717 B1 | 1/2018 | Persson et al. |
| 9,922,327 B2 | 3/2018 | Johnson et al. |
| 9,965,808 B1 | 5/2018 | Kunz et al. |
| 10,019,904 B1 | 7/2018 | Chan et al. |
| 10,032,100 B2 | 7/2018 | Mullen et al. |
| 10,223,631 B2 | 3/2019 | Mullen et al. |
| 10,255,545 B2 | 4/2019 | Mullen et al. |
| 10,319,203 B1 | 6/2019 | Testanero et al. |
| 10,482,461 B2 | 11/2019 | Van Os et al. |
| 10,580,059 B2 | 3/2020 | Nair et al. |
| 10,783,576 B1 | 9/2020 | Van Os et al. |
| 11,354,442 B2 * | 6/2022 | Haldenby ............ G06F 16/2462 |
| 2002/0004760 A1 | 1/2002 | Yoshida et al. |
| 2002/0023215 A1 | 2/2002 | Wang et al. |
| 2002/0046064 A1 | 4/2002 | Maury et al. |
| 2002/0065774 A1 | 5/2002 | Young et al. |
| 2003/0006280 A1 | 1/2003 | Seita et al. |
| 2003/0061157 A1 | 3/2003 | Hirka et al. |
| 2003/0200184 A1 | 10/2003 | Dominguez et al. |
| 2003/0236746 A1 | 12/2003 | Turner et al. |
| 2004/0122685 A1 | 6/2004 | Bunce |
| 2004/0143553 A1 | 7/2004 | Torget et al. |
| 2004/0215572 A1 | 10/2004 | Uehara et al. |
| 2004/0254891 A1 | 12/2004 | Blinn et al. |
| 2005/0187873 A1 | 8/2005 | Labrou et al. |
| 2005/0219223 A1 | 10/2005 | Kotzin et al. |
| 2005/0250538 A1 | 11/2005 | Narasimhan et al. |
| 2006/0000900 A1 | 1/2006 | Fernandes et al. |
| 2006/0064372 A1 | 3/2006 | Gupta |
| 2006/0165060 A1 | 7/2006 | Dua et al. |
| 2006/0208065 A1 | 9/2006 | Mendelovich et al. |
| 2006/0294007 A1 | 12/2006 | Barthelemy |
| 2006/0294025 A1 | 12/2006 | Mengerink |
| 2007/0192168 A1 | 8/2007 | Van |
| 2007/0194113 A1 | 8/2007 | Esplin et al. |
| 2007/0219901 A1 | 9/2007 | Garbow et al. |
| 2007/0254712 A1 | 11/2007 | Chitti |
| 2007/0255564 A1 | 11/2007 | Yee et al. |
| 2008/0041936 A1 | 2/2008 | Vawter |
| 2008/0054081 A1 | 3/2008 | Mullen |
| 2008/0059351 A1 | 3/2008 | Richey et al. |
| 2008/0078831 A1 | 4/2008 | Johnson et al. |
| 2008/0208681 A1 | 8/2008 | Hammad et al. |
| 2008/0275779 A1 | 11/2008 | Lakshminarayanan |
| 2008/0319875 A1 | 12/2008 | Levchin et al. |
| 2009/0030793 A1 | 1/2009 | Fordyce, III |
| 2009/0036165 A1 | 2/2009 | Brede |
| 2009/0048959 A1 | 2/2009 | Omura et al. |
| 2009/0094134 A1 | 4/2009 | Toomer et al. |
| 2009/0159696 A1 | 6/2009 | Mullen |
| 2009/0182674 A1 | 7/2009 | Patel et al. |
| 2009/0195469 A1 | 8/2009 | Lim et al. |
| 2009/0210308 A1 | 8/2009 | Toomer et al. |
| 2009/0222842 A1 | 9/2009 | Narayanan et al. |
| 2009/0234876 A1 | 9/2009 | Schigel et al. |
| 2010/0042517 A1 | 2/2010 | Paintin et al. |
| 2010/0058333 A1 | 3/2010 | Peterson |
| 2010/0082445 A1 | 4/2010 | Hodge et al. |
| 2010/0082462 A1 | 4/2010 | Yuan et al. |
| 2010/0082481 A1 | 4/2010 | Lin et al. |
| 2010/0114731 A1 | 5/2010 | Kingston et al. |
| 2010/0131303 A1 | 5/2010 | Collopy et al. |
| 2010/0153265 A1 | 6/2010 | Hershfield et al. |
| 2010/0161434 A1 | 6/2010 | Herwig et al. |
| 2010/0191570 A1 | 7/2010 | Michaud et al. |
| 2010/0205091 A1 | 8/2010 | Graziano et al. |
| 2010/0216425 A1 | 8/2010 | Smith |
| 2010/0223145 A1 | 9/2010 | Dragt |
| 2010/0243741 A1 | 9/2010 | Eng |
| 2010/0251243 A1 | 9/2010 | Gill et al. |
| 2010/0267362 A1 | 10/2010 | Smith et al. |
| 2010/0311397 A1 | 12/2010 | Li |
| 2011/0055763 A1 | 3/2011 | Utsuki et al. |
| 2011/0099079 A1 | 4/2011 | White et al. |
| 2011/0145049 A1 | 6/2011 | Hertel et al. |
| 2011/0161116 A1 | 6/2011 | Peak et al. |
| 2011/0166992 A1 | 7/2011 | Dessert et al. |
| 2011/0184820 A1 | 7/2011 | Mon et al. |
| 2011/0201306 A1 | 8/2011 | Ali Al-Harbi |
| 2011/0202417 A1 | 8/2011 | Dewakar et al. |
| 2011/0218849 A1 | 9/2011 | Rutigliano et al. |
| 2011/0244796 A1 | 10/2011 | Khan et al. |
| 2011/0251892 A1 | 10/2011 | Laracey |
| 2012/0023185 A1 | 1/2012 | Holden et al. |
| 2012/0078751 A1 | 3/2012 | Macphail et al. |
| 2012/0089507 A1 | 4/2012 | Zhang et al. |
| 2012/0101881 A1 | 4/2012 | Taylor et al. |
| 2012/0101887 A1 | 4/2012 | Harvey et al. |
| 2012/0109764 A1 | 5/2012 | Martin et al. |
| 2012/0123806 A1 | 5/2012 | Schumann et al. |
| 2012/0123937 A1 | 5/2012 | Spodak et al. |
| 2012/0136781 A1 | 5/2012 | Fridman et al. |
| 2012/0191603 A1 | 7/2012 | Nuzzi |
| 2012/0197740 A1 | 8/2012 | Grigg et al. |
| 2012/0203605 A1 | 8/2012 | Morgan et al. |
| 2012/0209748 A1 | 8/2012 | Small |
| 2012/0215553 A1 | 8/2012 | Leston |
| 2012/0215647 A1 | 8/2012 | Powell et al. |
| 2012/0221464 A1 | 8/2012 | Pasquero et al. |
| 2012/0232968 A1 | 9/2012 | Calman et al. |
| 2012/0245985 A1 | 9/2012 | Cho et al. |
| 2012/0245986 A1 | 9/2012 | Regan et al. |
| 2012/0267432 A1 | 10/2012 | Kuttuva |

(56) References Cited

U.S. PATENT DOCUMENTS

| | | |
|---|---|---|
| 2012/0271712 A1 | 10/2012 | Katzin et al. |
| 2012/0290449 A1 | 11/2012 | Mullen et al. |
| 2012/0290472 A1 | 11/2012 | Mullen et al. |
| 2012/0310760 A1 | 12/2012 | Phillips et al. |
| 2012/0316933 A1 | 12/2012 | Pentland et al. |
| 2012/0317023 A1 | 12/2012 | Moon et al. |
| 2012/0322370 A1 | 12/2012 | Lee |
| 2012/0322371 A1 | 12/2012 | Lee |
| 2012/0330830 A1 | 12/2012 | Mason et al. |
| 2013/0006746 A1 | 1/2013 | Moore et al. |
| 2013/0013499 A1 | 1/2013 | Kalgi |
| 2013/0019204 A1 | 1/2013 | Kotler et al. |
| 2013/0030934 A1 | 1/2013 | Bakshi et al. |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0073321 A1 | 3/2013 | Hofmann et al. |
| 2013/0080272 A1 | 3/2013 | Ronca et al. |
| 2013/0080275 A1 | 3/2013 | Ronca et al. |
| 2013/0085931 A1 | 4/2013 | Runyan |
| 2013/0085936 A1 | 4/2013 | Law et al. |
| 2013/0103519 A1 | 4/2013 | Kountotsis et al. |
| 2013/0110719 A1 | 5/2013 | Carter et al. |
| 2013/0124319 A1 | 5/2013 | Hodge et al. |
| 2013/0124423 A1 | 5/2013 | Fisher |
| 2013/0144706 A1 | 6/2013 | Qawami et al. |
| 2013/0151360 A1 | 6/2013 | Scipioni et al. |
| 2013/0151414 A1 | 6/2013 | Zhu et al. |
| 2013/0159178 A1 | 6/2013 | Colon et al. |
| 2013/0166325 A1 | 6/2013 | Ganapathy et al. |
| 2013/0179304 A1 | 7/2013 | Swist et al. |
| 2013/0200146 A1 | 8/2013 | Moghadam et al. |
| 2013/0218721 A1 | 8/2013 | Borhan et al. |
| 2013/0226792 A1 | 8/2013 | Kushevsky et al. |
| 2013/0238455 A1 | 9/2013 | Laracey |
| 2013/0275300 A1 | 10/2013 | Killian et al. |
| 2013/0282533 A1 | 10/2013 | Foran-Owens et al. |
| 2013/0282577 A1 | 10/2013 | Milne |
| 2013/0290187 A1 | 10/2013 | Itwaru |
| 2013/0304514 A1 | 11/2013 | Hyde et al. |
| 2013/0304651 A1 | 11/2013 | Smith et al. |
| 2013/0332358 A1 | 12/2013 | Zhao |
| 2013/0332364 A1 | 12/2013 | Templeton et al. |
| 2013/0346273 A1 | 12/2013 | Stockton et al. |
| 2013/0346302 A1 | 12/2013 | Purves et al. |
| 2014/0006285 A1 | 1/2014 | Chi et al. |
| 2014/0019352 A1 | 1/2014 | Shrivastava |
| 2014/0025513 A1 | 1/2014 | Cooke et al. |
| 2014/0058935 A1 | 2/2014 | Mijares |
| 2014/0058939 A1 | 2/2014 | Savla |
| 2014/0067654 A1 | 3/2014 | Hanson et al. |
| 2014/0074569 A1 | 3/2014 | Francis et al. |
| 2014/0074635 A1 | 3/2014 | Reese et al. |
| 2014/0074716 A1 | 3/2014 | Ni |
| 2014/0094143 A1 | 4/2014 | Ayotte |
| 2014/0095225 A1 | 4/2014 | Williams et al. |
| 2014/0101056 A1 | 4/2014 | Wendling |
| 2014/0108263 A1 | 4/2014 | Ortiz et al. |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0130035 A1 | 5/2014 | Desai et al. |
| 2014/0138435 A1 | 5/2014 | Khalid |
| 2014/0143145 A1 | 5/2014 | Kortina et al. |
| 2014/0149198 A1 | 5/2014 | Kim et al. |
| 2014/0164082 A1 | 6/2014 | Sun et al. |
| 2014/0172533 A1 | 6/2014 | Andrews et al. |
| 2014/0181747 A1 | 6/2014 | Son |
| 2014/0187163 A1 | 7/2014 | Fujita |
| 2014/0188673 A1 | 7/2014 | Graham et al. |
| 2014/0207659 A1 | 7/2014 | Erez et al. |
| 2014/0207680 A1 | 7/2014 | Rephlo |
| 2014/0214644 A1 | 7/2014 | Rephlo et al. |
| 2014/0222664 A1 | 8/2014 | Milne |
| 2014/0236840 A1 | 8/2014 | Islam |
| 2014/0244365 A1 | 8/2014 | Price et al. |
| 2014/0244493 A1 | 8/2014 | Kenyon et al. |
| 2014/0244495 A1 | 8/2014 | Davis et al. |
| 2014/0257871 A1 | 9/2014 | Christensen et al. |
| 2014/0279442 A1 | 9/2014 | Luoma et al. |
| 2014/0279474 A1 | 9/2014 | Evans et al. |
| 2014/0279497 A1 | 9/2014 | Qaim-Maqami et al. |
| 2014/0279556 A1 | 9/2014 | Priebatsch et al. |
| 2014/0282068 A1* | 9/2014 | Levkovitz ............. G06F 3/0482 715/748 |
| 2014/0297385 A1 | 10/2014 | Ryan |
| 2015/0006207 A1 | 1/2015 | Jarvis et al. |
| 2015/0012425 A1 | 1/2015 | Mathew |
| 2015/0044965 A1 | 2/2015 | Kurimoto et al. |
| 2015/0051846 A1 | 2/2015 | Masuya |
| 2015/0058146 A1 | 2/2015 | Aissi et al. |
| 2015/0061997 A1* | 3/2015 | Chi ........................ G06F 1/163 345/156 |
| 2015/0098309 A1 | 4/2015 | Adams et al. |
| 2015/0115028 A1 | 4/2015 | Montealegre |
| 2015/0127539 A1 | 5/2015 | Ye et al. |
| 2015/0127550 A1 | 5/2015 | Khan |
| 2015/0135278 A1 | 5/2015 | Corda et al. |
| 2015/0178878 A1 | 6/2015 | Huang |
| 2015/0186871 A1 | 7/2015 | Laracey |
| 2015/0187019 A1 | 7/2015 | Fernandes et al. |
| 2015/0213560 A1 | 7/2015 | Aabye et al. |
| 2015/0220924 A1 | 8/2015 | Bakker |
| 2015/0227922 A1 | 8/2015 | Filler |
| 2015/0257004 A1 | 9/2015 | Shanmugam et al. |
| 2015/0302493 A1 | 10/2015 | Batstone et al. |
| 2015/0302510 A1 | 10/2015 | Godsey et al. |
| 2015/0339652 A1 | 11/2015 | Park et al. |
| 2015/0348001 A1 | 12/2015 | Van Os et al. |
| 2015/0348002 A1 | 12/2015 | Van Os et al. |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2016/0005028 A1 | 1/2016 | Mayblum et al. |
| 2016/0019536 A1 | 1/2016 | Ortiz et al. |
| 2016/0034887 A1* | 2/2016 | Lee ........................ G09G 5/12 705/39 |
| 2016/0047666 A1 | 2/2016 | Fuchs |
| 2016/0104228 A1 | 4/2016 | Sundaresan |
| 2016/0127358 A1 | 5/2016 | Engelking |
| 2016/0155102 A1* | 6/2016 | Serrano ................ G06Q 20/322 705/39 |
| 2016/0203483 A1 | 7/2016 | Bridgewater et al. |
| 2016/0210623 A1 | 7/2016 | Voege |
| 2016/0232513 A1 | 8/2016 | Purves et al. |
| 2016/0232516 A1 | 8/2016 | Dayan et al. |
| 2016/0239886 A1 | 8/2016 | Susilo et al. |
| 2016/0253665 A1 | 9/2016 | Van Os et al. |
| 2016/0358167 A1 | 12/2016 | Van Os et al. |
| 2016/0358168 A1 | 12/2016 | Van Os et al. |
| 2016/0358180 A1 | 12/2016 | Van Os et al. |
| 2016/0358199 A1 | 12/2016 | Van Os et al. |
| 2017/0017958 A1 | 1/2017 | Scott et al. |
| 2017/0032375 A1 | 2/2017 | Van Os et al. |
| 2017/0039544 A1* | 2/2017 | Park .................... G06Q 20/3221 |
| 2017/0039548 A1 | 2/2017 | Rhee et al. |
| 2017/0300897 A1 | 10/2017 | Ferenczi et al. |
| 2017/0357972 A1 | 12/2017 | Van Os et al. |
| 2018/0032259 A1* | 2/2018 | Yook ..................... G06F 3/048 |
| 2018/0053157 A1 | 2/2018 | Roffey |
| 2018/0068313 A1 | 3/2018 | Van Os et al. |
| 2018/0082282 A1 | 3/2018 | Van Os et al. |
| 2018/0096321 A1 | 4/2018 | Haldenby et al. |
| 2018/0107372 A1 | 4/2018 | Van Damme et al. |
| 2018/0117944 A1 | 5/2018 | Lee |
| 2018/0157395 A1 | 6/2018 | Mhun et al. |
| 2018/0158066 A1 | 6/2018 | Van Os et al. |
| 2018/0276673 A1 | 9/2018 | Van Os et al. |
| 2018/0300101 A1 | 10/2018 | Liu et al. |
| 2019/0018974 A1* | 1/2019 | Chae ..................... G06F 21/44 |
| 2019/0050867 A1 | 2/2019 | Van Os et al. |
| 2019/0095883 A1 | 3/2019 | Robinson et al. |
| 2019/0141021 A1 | 5/2019 | Isaacson et al. |

(56) References Cited

U.S. PATENT DOCUMENTS

| | | |
|---|---|---|
| 2019/0173814 A1 | 6/2019 | Mcneill |
| 2020/0065821 A1 | 2/2020 | Van Os et al. |
| 2020/0184472 A1 | 6/2020 | Van Os et al. |
| 2020/0211047 A1 | 7/2020 | Van Os et al. |
| 2020/0302517 A1 | 9/2020 | Van Os et al. |
| 2020/0302519 A1 | 9/2020 | Van Os et al. |
| 2020/0372514 A1 | 11/2020 | Van Os et al. |
| 2021/0004897 A1 | 1/2021 | Van Os et al. |
| 2021/0073823 A1 | 3/2021 | Van Os |
| 2021/0096886 A1 | 4/2021 | Mclachlan et al. |
| 2021/0192530 A1 | 6/2021 | Van Os et al. |
| 2021/0201288 A1 | 7/2021 | Van Os et al. |

FOREIGN PATENT DOCUMENTS

| | | |
|---|---|---|
| CN | 101730907 A | 6/2010 |
| CN | 102282578 A | 12/2011 |
| CN | 102362284 A | 2/2012 |
| CN | 102394838 A | 3/2012 |
| CN | 102982144 A | 3/2013 |
| CN | 103001856 A | 3/2013 |
| CN | 103067248 A | 4/2013 |
| CN | 103188280 A | 7/2013 |
| CN | 103413218 A | 11/2013 |
| CN | 103488416 A | 1/2014 |
| CN | 103701605 A | 4/2014 |
| CN | 103778533 A | 5/2014 |
| CN | 104252675 A | 12/2014 |
| CN | 104813354 A | 7/2015 |
| CN | 105320864 A | 2/2016 |
| CN | 105787718 A | 7/2016 |
| CN | 105844468 A | 8/2016 |
| CN | 106453814 A | 2/2017 |
| EP | 2568693 A2 | 3/2013 |
| EP | 2674889 A2 | 12/2013 |
| EP | 2701107 A1 | 2/2014 |
| EP | 2725537 A1 | 4/2014 |
| GB | 2528948 A | 2/2016 |
| JP | 6-284182 A | 10/1994 |
| JP | 11-39385 A | 2/1999 |
| JP | 11-73530 A | 3/1999 |
| JP | 2002-99854 A | 4/2002 |
| JP | 2003-16398 A | 1/2003 |
| JP | 2003-178244 A | 6/2003 |
| JP | 2003-346059 A | 12/2003 |
| JP | 2004-252736 A | 9/2004 |
| JP | 2005-521961 A | 7/2005 |
| JP | 2005-523505 A | 8/2005 |
| JP | 2006-31182 A | 2/2006 |
| JP | 2006-93912 A | 4/2006 |
| JP | 2006-114018 A | 4/2006 |
| JP | 2006-163960 A | 6/2006 |
| JP | 2006-197071 A | 7/2006 |
| JP | 2006-221468 A | 8/2006 |
| JP | 2006-259854 A | 9/2006 |
| JP | 2006-277670 A | 10/2006 |
| JP | 2007-34637 A | 2/2007 |
| JP | 2007-507011 A | 3/2007 |
| JP | 2007-226794 A | 9/2007 |
| JP | 2007-334637 A | 12/2007 |
| JP | 2009-49878 A | 3/2009 |
| JP | 2009-99076 A | 5/2009 |
| JP | 2009-134521 A | 6/2009 |
| JP | 2010-517390 A | 5/2010 |
| JP | 2010-524051 A | 7/2010 |
| JP | 2011-519439 A | 7/2011 |
| JP | 2012-504273 A | 2/2012 |
| JP | 2012-508930 A | 4/2012 |
| JP | 2012-99025 A | 5/2012 |
| JP | 2012-114676 A | 6/2012 |
| JP | 2012-198625 A | 10/2012 |
| JP | 2012-215981 A | 11/2012 |
| JP | 2012-529699 A | 11/2012 |
| JP | 2013-20496 A | 1/2013 |
| JP | 2013-34322 A | 2/2013 |
| JP | 2013-530445 A | 7/2013 |
| JP | 2013-533532 A | 8/2013 |
| JP | 5267966 B2 | 8/2013 |
| JP | 2013-218663 A | 10/2013 |
| JP | 2014-41616 A | 3/2014 |
| JP | 2014-44719 A | 3/2014 |
| JP | 2014-44724 A | 3/2014 |
| JP | 2014-75155 A | 4/2014 |
| JP | 2014-528601 A | 10/2014 |
| JP | 2015-506040 A | 2/2015 |
| JP | 2016-53766 A | 4/2016 |
| JP | 2016-71655 A | 5/2016 |
| KR | 10-2004-0049502 A | 6/2004 |
| KR | 10-2006-0098024 A | 9/2006 |
| KR | 10-2008-0064395 A | 7/2008 |
| KR | 10-2010-0045059 A | 5/2010 |
| KR | 10-2011-0056561 A | 5/2011 |
| KR | 10-2012-0040693 A | 4/2012 |
| KR | 10-1184865 B1 | 9/2012 |
| KR | 10-2013-0027326 A | 3/2013 |
| KR | 10-2013-0112339 A | 10/2013 |
| KR | 10-2013-0116905 A | 10/2013 |
| KR | 10-1330962 B1 | 11/2013 |
| KR | 10-2014-0001515 A | 1/2014 |
| KR | 10-2014-0018019 A | 2/2014 |
| KR | 10-2014-0026263 A | 3/2014 |
| KR | 10-2014-0027029 A | 3/2014 |
| KR | 10-2014-0055429 A | 5/2014 |
| KR | 10-2016-0099397 A | 8/2016 |
| WO | 03/038698 A1 | 5/2003 |
| WO | 2003/083793 A2 | 10/2003 |
| WO | 2007/116521 A1 | 10/2007 |
| WO | 2008/147457 A1 | 12/2008 |
| WO | 2010/039337 A2 | 4/2010 |
| WO | 2010/056484 A2 | 5/2010 |
| WO | 2010/077960 A2 | 7/2010 |
| WO | 2012/083113 A2 | 6/2012 |
| WO | 2013/023224 A2 | 2/2013 |
| WO | 2013/066659 A1 | 5/2013 |
| WO | 2013/090624 A1 | 6/2013 |
| WO | 2013/177548 A1 | 11/2013 |
| WO | 2014/033939 A1 | 3/2014 |
| WO | 2015/009581 A1 | 1/2015 |
| WO | 2015/009765 A1 | 1/2015 |
| WO | 2015/013522 A1 | 1/2015 |
| WO | 2015/030912 A1 | 3/2015 |
| WO | 2015/051361 A1 | 4/2015 |
| WO | 2015/065561 A1 | 5/2015 |
| WO | 2015/187608 A1 | 12/2015 |
| WO | 2016/126775 A1 | 8/2016 |
| WO | 2016/129938 A1 | 8/2016 |
| WO | 2017/022954 A2 | 2/2017 |

OTHER PUBLICATIONS

Office Action received for Australian Patent Application No. 2021103164, dated Dec. 2, 2021, 3 pages.
Office Action received for Australian Patent Application No. 2021103164, dated Mar. 15, 2022, 3 pages.
Office Action received for Korean Patent Application No. 10-2022-7005219, dated Mar. 23, 2022, 5 pages (2 pages of English Translation and 3 pages of Official Copy).
Adractas et al., "The road to mobile payments services", McKinsey on Payments, Online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Advisory Action received for U.S. Appl. No. 14/503,296, dated Oct. 2, 2015, 3 pages.
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 15/137,944, dated May 11, 2017, 6 pages.
Advisory Action received for U.S. Appl. No. 15/274,910, dated Aug. 12, 2019, 3 pages.

(56) References Cited

OTHER PUBLICATIONS

Advisory Action received for U.S. Appl. No. 16/164,561, dated Nov. 14, 2019, 2 pages.
Advisory Action received for U.S. Appl. No. 16/581,614, dated Sep. 11, 2020, 8 pages.
Applicant Initiated Interview Summary received for U.S. Appl. No. 15/351,230, dated Nov. 22, 2019, 5 pages.
Applicant Initiated Interview Summary received for U.S. Appl. No. 15/823,269, dated Sep. 17, 2020, 3 pages.
Applicant Initiated Interview Summary received for U.S. Appl. No. 16/581,614, dated Apr. 30, 2020, 4 pages.
Applicant Initiated Interview Summary received for U.S. Appl. No. 16/581,614, dated Aug. 26, 2020, 3 pages.
Applicant-Initiated interview Summary received for U.S. Appl. No. 15/274,910, dated Jul. 9, 2020, 3 pages.
Applicant-Initiated Interview Summary received for U.S. Appl. No. 16/549,862, dated May 21, 2021, 2 pages.
Applicant-Initiated Interview Summary received for U.S. Appl. No. 16/581,569, dated May 1, 2020, 3 pages.
Applicant-Initiated Interview Summary received for U.S. Appl. No. 16/581,614, dated May 18, 2021, 2 pages.
Applicant-Initiated interview Summary received for U.S. Appl. No. 16/667,271, dated Apr. 8, 2020, 3 pages.
Applicant-Initiated Interview Summary received for U.S. Appl. No. 16/786,694, dated Dec. 17, 2020, 6 pages.
Applicant-Initiated Interview Summary received for U.S. Appl. No. 16/814,226, dated Aug. 30, 2021, 3 pages.
Bank of Queensland, "Logging on to BOQ Internet Banking", Available Online at: https.//www.youtube.com/watch?v=afK0EiQq-4Q, May 29, 2013, 3 pages.
Bank of Queensland, "Online Banking Video Tutorials", Available Online at https://www.boq.com.au/help-and-support/online-banking/ob-video-tutorials, 2020, 1 page.
Bank of Queensland, "Paying a Bill via BPAY with BOQ Internet Banking", Available Online at: https://www.youtube.com/watch?v=f8-5Z00o2to, May 29, 2013, 3 pages.
Bank of Queensland, "Transferring Funds to a 3rd Party (Pay Anyone) with BOQ Internet Banking", Available Online at: https://www.youtube.com/watch?v=-_7FeV8mm-o, May 29, 2013, 3 pages.
Bao et al., "Location-based and Preference-Aware Recommendation Using Sparse Geo-Social Networking Data", ACM SIGSPATIAL GIS '12, Redondo Beach, CA, USA, Online available at: https://www.microsoft.com/en-us/research/wp-content/uploads/2016/02/LocationRecommendation.pdf, Nov. 6-9, 2012, 10 pages.
Brief Communication Regarding Oral Proceedings received for European Patent Application No. 15727291.5, dated Jun. 9, 2020, 12 pages.
Brief Communication Regarding Oral Proceedings received for European Patent Application No. 16201159.7, dated Jun. 29, 2021, 13 pages.
Brief Communication regarding Oral Proceedings received for European Patent Application No. 16201205.8, dated May 29, 2020, 29 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/294,439, dated Mar. 13, 2019, 4 pages.
Corrected Notice of Allowance received for U.S. Appl. No. 15/866,341, dated Aug. 21, 2019, 3 pages.
Corrected Notice of Allowance received for U.S. Appl. No. 15/866,341, dated Aug. 26, 2019, 3 pages.
Decision on Appeal received for Korean Patent Application No. 10-2016-0152210, dated Jun. 23, 2020, 20 pages.
Decision to Refuse Application received for the European Patent Application No. 16803996.4, dated Apr. 3, 2020, 25 pages.
Decision to Refuse received for European Patent Application No. 15727291.5, dated Jun. 30, 2020, 21 pages.
Decision to Refuse received for European Patent Application No. 15728352.4, dated May 28, 2020, 25 pages.
Decision to Refuse received for European Patent Application No. 16201195.1, dated Mar. 4, 2019, 23 pages.
Decision to Refuse received for European Patent Application No. 16201205.8, dated Jun. 30, 2020, 29 pages.
Decision to Refuse received for European Patent Application No. 18154163.2, dated May 17, 2019, 22 pages.
Decision to Refuse received for the European Patent Application No. 16803996.4, dated Apr. 14, 2020, 28 pages.
European Search Report received for European Patent Application No. 20180033.1, dated Jul. 6, 2020, 4 pages.
Extended European Search Report received for European Patent Application No. 16201159.7, dated Mar. 27, 2017, 12 pages.
Extended European Search Report Received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 16803996.4, dated Feb. 7, 2018, 8 pages.
Extended European Search Report received for European Patent Application No. 17810682.9, dated Mar. 26, 2019, 7 pages.
Extended European Search Report received for European Patent Application No. 17835789.3, dated Jun. 23, 2020, 12 pages.
Extended European Search Report received for European Patent Application No. 18154163.2, dated Mar. 2, 2018, 4 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Apr. 24, 2019, 5 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.
Final Office Action Received for U.S. Appl. No. 14/871,635, dated Jan. 18, 2018, 33 pages.
Final Office Action Received for U.S. Appl. No. 14/871,635, dated May 3, 2019, 32 pages.
Final Office Action Received for U.S. Appl. No. 14/871,654, dated Nov. 16, 2017, 32 pages.
Final Office Action received for U.S. Appl. No. 15/137,944, dated Feb. 27, 2017, 10 pages.
Final Office Action received for U.S. Appl. No. 15/274,910, dated May 31, 2019, 31 pages.
Final Office Action received for U.S. Appl. No. 15/274,910, dated Oct. 16, 2020, 34 pages.
Final Office Action received for U.S. Appl. No. 15/351,230, dated Nov. 4, 2019, 6 pages.
Final Office Action received for U.S. Appl. No. 15/866,341, dated May 14, 2019, 10 pages.
Final Office Action received for U.S. Appl. No. 16/164,561, dated Sep. 5, 2019, 12 pages.
Final Office Action received for U.S. Appl. No. 16/581,614, dated Aug. 27, 2021, 18 pages.
Final Office Action received for U.S. Appl. No. 16/581,614, dated Jul. 10, 2020, 21 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2016/033751, dated Dec. 14, 2017, 11 pages.

(56) References Cited

OTHER PUBLICATIONS

International Preliminary Report on Patentability received for PCT Patent Application No. PCT/US2017/031748, dated Dec. 20, 2018, 10 pages.
International Preliminary Report on Patentability received for PCT Patent Application No. PCT/US2017/49500, dated Mar. 21, 2019, 14 pages.
International Search Report and Written Opinion received for PCT Application No. PCT/US2015/033326, dated Aug. 10, 2015, 13 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/49500, dated Jan. 18, 2018, 18 pages.
International Search Report and Written Opinion received for PCT Patent Application No. PCT/US2020/020414, dated Jul. 27, 2020, 27 pages.
International Search Report and Written Opinion received for PCT Patent Application No. PCT/US2020/048799, dated Jan. 19, 2021, 19 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fees received for PCT Patent Application No. PCT/US2016/033751, dated Jul. 22, 2016, 2 pages.
Invitation to Pay Additional Fees received for PCT Patent Application No. PCT/US2020/020414, dated Jun. 4, 2020, 24 pages.
Invitation to Pay Additional Fees received for PCT Patent Application No. PCT/US2020/048799, dated Nov. 20, 2020, 13 pages.
Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-3.
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Minutes of the Oral Proceedings received for European Patent Application No. 15727291.5, dated Jun. 29, 2020, 8 pages.
Minutes of the Oral Proceedings received for European Patent Application No. 15728352.4, dated May 27, 2020, 3 pages.
Minutes of the Oral Proceedings received for European Patent Application No. 16201205.8, dated Jun. 29, 2020, 6 pages.
Minutes of the Oral Proceedings received for European Patent Application No. 18154163.2, dated May 17, 2019, 7 pages.
Naver Blog, "How to Use Smart Wallet and Registered Card", Online Available at <http://feena74.blog.me/140185758401>, Mar. 29, 2013, 20 pages.
Nomad Studio, "Hajimete-no-smartphone-no-komatta-wo-sakutto-kaiketsu (Easy solution to troubles at your first smartphone)", Kazukuni Saito of Shuwa System Co. Ltd., 1st Ed, Jul. 1, 2016, 20 pages.
Non-Final Office Action received for U. S. U.S. Appl. No. 14/869,715, dated Jan. 29, 2016, 62 pages.
Non-Final Office Action received for U.S. Appl. No. 14/503,072, dated Jan. 26, 2015, 12 pages.
Non-Final Office Action received for U.S. Appl. No. 14/503,296, dated Jan. 30, 2015, 16 pages.
Non-Final Office Action received for U.S. Appl. No. 15/274,910, dated Oct. 18, 2018, 26 pages.
Non-Final Office Action received for U.S. Appl. No. 14/503,364, dated Feb. 3, 2016, 16 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Oct. 5, 2016, 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/869,715, dated Oct. 11, 2016, 37 pages.
Non-Final Office Action Received for U.S. Appl. No. 14/871,635, dated May 5, 2017, 23 pages.
Non-Final Office Action Received for U.S. Appl. No. 14/871,635, dated Nov. 16, 2018, 36 pages.
Non-Final Office Action Received for U.S. Appl. No. 14/871,654, dated May 4, 2017, 23 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/274,086, dated Jan. 11, 2017, 21 pages.
Non-Final Office Action received for U.S. Appl. No. 15/274,910, dated Apr. 6, 2020, 33 pages.
Non-Final Office Action received for U.S. Appl. No. 15/294,439, dated Jan. 26, 2018, 18 pages.
Non-Final Office Action received for U.S. Appl. No. 15/351,230, dated Apr. 18, 2019, 16 pages.
Non-Final Office Action received for U.S. Appl. No. 15/823,269, dated Jun. 23, 2020, 14 pages.
Non-Final Office Action received for U.S. Appl. No. 15/866,341, dated Nov. 13, 2018, 11 pages.
Non-Final Office Action received for U.S. Appl. No. 15/992,722, dated Aug. 6, 2020, 7 pages.
Non-Final Office Action received for U.S. Appl. No. 16/164,561, dated Jan. 4, 2019, 14 pages.
Non-Final Office Action received for U.S. Appl. No. 16/549,862, dated Mar. 8, 2021, 23 pages.
Non-Final Office Action received for U.S. Appl. No. 16/581,569, dated Feb. 13, 2020, 32 pages.
Non-Final Office Action received for U.S. Appl. No. 16/581,614, dated Feb. 4, 2021, 18 pages.
Non-Final Office Action received for U.S. Appl. No. 16/581,614, dated Jan. 29, 2020, 13 pages.
Non-Final Office Action received for U.S. Appl. No. 16/667,271, dated Dec. 13, 2019, 8 pages.
Non-Final Office Action received for U.S. Appl. No. 16/786,694, dated Oct. 5, 2020, 23 pages.
Non-Final Office Action received for U.S. Appl. No. 16/789,132, dated Aug. 5, 2021, 25 pages.
Non-Final Office Action received for U.S. Appl. No. 16/814,226, dated Jul. 13, 2021, 17 pages.
Non-Final Office Action received for U.S. Appl. No. 16/990,974, dated Oct. 15, 2020, 6 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2017201064, dated Feb. 20, 2018, 3 pages.
Notice of Acceptance received for Australian Patent Application No. 2018202559, dated Oct. 21, 2019, 3 pages.
Notice of Acceptance received for Australian Patent Application No. 2020200685, dated Oct. 29, 2020, 3 pages.
Notice of Allowance received for Chinese Patent Application No. 201520357381.9, dated Jul. 29, 2015, 4 pages.
Notice of Allowance received for Chinese Patent Application No. 201520358683.8, dated Mar. 10, 2016, 5 pages.

(56) References Cited

OTHER PUBLICATIONS

Notice of Allowance received for Chinese Patent Application No. 201610371856.9, dated May 11, 2020, 2 pages.
Notice of Allowance received for Chinese Patent Application No. 201620480708.6, dated Apr. 20, 2017, 3 pages.
Notice of Allowance received for Chinese Patent Application No. 201620480846.4, dated Apr. 20, 2017, 3 pages.
Notice of Allowance received for Chinese Patent Application No. 201710093861.2, dated Sep. 24, 2019, 4 pages.
Notice of Allowance received for Japanese Patent Application No. 2016-224506, dated Jan. 24, 2020, 4 pages.
Notice of Allowance received for Japanese Patent Application No. 2016-224507, dated Mar. 26, 2019, 3 pages.
Notice of Allowance received for Japanese Patent Application No. 2016-224508, dated Jun. 20, 2017, 3 pages.
Notice of Allowance received for Japanese Patent Application No. 2016-558332, dated Jan. 11, 2019, 4 pages.
Notice of Allowance received for Japanese Patent Application No. 2016-569665, dated Feb. 22, 2019, 4 pages.
Notice of Allowance received for Japanese Patent Application No. 2017-562050, dated Jun. 1, 2020, 4 pages.
Notice of Allowance received for Japanese Patent Application No. 2018-008937, dated Jul. 2, 2018, 4 pages.
Notice of Allowance received for Japanese Patent Application No. 2018-158482, dated Sep. 7, 2020, 4 pages.
Notice of Allowance received for Japanese Patent Application No. 2018-504997, dated Aug. 3, 2018, 4 pages.
Notice of Allowance received for Korean Patent Application No. 10-2017-0022365, dated Mar. 27, 2018, 4 pages.
Notice of Allowance received for Korean Patent Application No. 10-2017-0022546, dated Feb. 27, 2018, 4 pages.
Notice of Allowance received for Korean Patent Application No. 10-2017-0022582, dated Feb. 27, 2020, 5 pages.
Notice of Allowance received for Korean Patent Application No. 10-2017-7034677, dated May 27, 2019, 5 pages.
Notice of Allowance received for Korean Patent Application No. 10-2018-7001854, dated Aug. 21, 2018, 4 pages.
Notice of Allowance received for Korean Patent Application No. 10-2019-7025322, dated Nov. 20, 2019, 5 pages.
Notice of Allowance received for Korean Patent Application No. 10-2020-0048600, dated Apr. 30, 2020, 5 pages.
Notice of Allowance received for Korean Patent Application No. 10-2020-0097418, dated Apr. 27, 2021, 5 pages.
Notice of Allowance received for Korean Patent Application No. 10-2020-7004737, dated Mar. 31, 2020, 4 pages.
Notice of Allowance received for Taiwanese Patent Application No. 104117508, dated Sep. 18, 2019, 5 pages.
Notice of Allowance received for the U.S. Appl. No. 14/503,381, dated Dec. 16, 2015, 8 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,296, dated Aug. 28, 2019, 12 pages.
Notice of Allowance received for U.S. Appl. No. 14/503,364, dated Jun. 16, 2016, 11 pages.
Notice of Allowance received for U.S. Appl. No. 14/869,715, dated Dec. 19, 2017, 32 pages.
Notice of Allowance received for U.S. Appl. No. 14/871,635, dated Feb. 3, 2020, 3 pages.
Notice of Allowance received for U.S. Appl. No. 14/871,635, dated Jan. 15, 2020, 3 pages.
Notice of Allowance Received for U.S. Appl. No. 14/871,635, dated Nov. 14, 2019, 14 pages.
Notice of Allowance received for U.S. Appl. No. 14/871,654, dated May 22, 2018, 22 pages.
Notice of Allowance received for U.S. Appl. No. 15/137,944, dated Dec. 21, 2017, 8 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Notice of Allowance received for U.S. Appl. No. 15/294,439, dated Jan. 8, 2019, 8 pages.
Notice of Allowance received for U.S. Appl. No. 15/294,439, dated Sep. 10, 2018, 9 pages.
Notice of Allowance received for U.S. Appl. No. 15/351,230, dated Dec. 11, 2019, 11 pages.
Notice of Allowance received for U.S. Appl. No. 15/823,269, dated Dec. 10, 2020, 10 pages.
Notice of Allowance received for U.S. Appl. No. 15/823,269, dated Feb. 22, 2021, 7 pages.
Notice of Allowance received for U.S. Appl. No. 15/823,269, dated Jun. 3, 2021, 6 pages.
Notice of Allowance received for U.S. Appl. No. 15/823,269, dated Mar. 10, 2021, 6 pages.
Notice of Allowance received for U.S. Appl. No. 15/823,269, dated Mar. 31, 2021, 9 pages.
Notice of Allowance received for U.S. Appl. No. 15/866,341, dated Jul. 26, 2019, 8 pages.
Notice of Allowance received for U.S. Appl. No. 15/992,722, dated Oct. 19, 2020, 5 pages.
Notice of Allowance received for U.S. Appl. No. 16/164,561, dated Apr. 8, 2020, 5 pages.
Notice of Allowance received for U.S. Appl. No. 16/549,862, dated Aug. 13, 2021, 7 pages.
Notice of Allowance received for U.S. Appl. No. 16/549,862, dated Aug. 26, 2021, 2 pages.
Notice of Allowance received for U.S. Appl. No. 16/581,569, dated May 27, 2020, 43 pages.
Notice of Allowance received for U.S. Appl. No. 16/667,271, dated May 12, 2020, 11 pages.
Notice of Allowance received for U.S. Appl. No. 16/786,694, dated Mar. 26, 2021, 11 pages.
Notice of Allowance received for U.S. Appl. No. 16/786,694, dated Sep. 14, 2021, 10 pages.
Notice of Allowance received for U.S. Appl. No. 16/990,974, dated Apr. 28, 2021, 5 pages.
Notice of Allowance received for U.S. Appl. No. 16/990,974, dated Jan. 22, 2021, 7 pages.
Office Action received for Australian Patent Application No. 2017100558, dated Feb. 27, 2018, 3 pages.
Office Action received for European Patent Application No. 15728352.4, dated Jan. 25, 2018, 10 pages.
Office Action received for Japanese Patent Application No. 2016-224507, dated Dec. 1, 2017, 14 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016270775, dated May 29, 2019, 3 pages.

(56) References Cited

OTHER PUBLICATIONS

Office Action received for Australian Patent Application No. 2016270775, dated Nov. 26, 2018, 5 pages.
Office Action received for Australian Patent Application No. 2016270775, dated Nov. 26, 2019, 3 pages.
Office Action received for Australian Patent Application No. 2017100070, dated Mar. 16, 2017, 6 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2017100558, dated Sep. 1, 2017, 5 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2017324176, dated Apr. 21, 2020, 3 pages.
Office Action received for Australian Patent Application No. 2017324176, dated Aug. 17, 2020, 5 pages.
Office Action received for Australian Patent Application No. 2017324176, dated Feb. 25, 2021, 6 pages.
Office Action received for Australian Patent Application No. 2017324176, dated Feb. 27, 2020, 3 pages.
Office Action received for Australian Patent Application No. 2017324176, dated Jan. 14, 2021, 6 pages.
Office Action received for Australian Patent Application No. 2018200485, dated Feb. 20, 2019, 6 pages.
Office Action received for Australian Patent Application No. 2018200485, dated Mar. 15, 2018, 3 pages.
Office Action received for Australian Patent Application No. 2018200485, dated Mar. 15, 2019, 4 pages.
Office Action received for Australian Patent Application No. 2018202559, dated Apr. 8, 2019, 4 pages.
Office Action Received for Australian Patent Application No. 2018202559, dated Jan. 16, 2019, 6 pages.
Office Action received for Australian Patent Application No. 2018202559, dated Jul. 19, 2019, 5 pages.
Office Action received for Australian Patent Application No. 2019271927, dated Feb. 10, 2021, 5 pages.
Office Action received for Australian Patent Application No. 2020102130, dated Dec. 7, 2020, 7 pages.
Office Action received for Australian Patent Application No. 2020102130, dated Jun. 7, 2021, 3 pages.
Office Action received for Australian Patent Application No. 2020102130, dated Mar. 29, 2021, 4 pages.
Office Action received for Australian Patent Application No. 2020200685, dated Apr. 20, 2020, 3 pages.
Office Action received for Australian Patent Application No. 2020200685, dated Aug. 12, 2020, 3 pages.
Office Action received for Australian Patent Application No. 2020200685, dated Feb. 10, 2020, 4 pages.
Office Action received for Australian Patent Application No. 2020289822, dated Aug. 24, 2021, 7 pages.
Office Action received for Australian Patent Application No. 2021103164, dated Sep. 16, 2021, 5 pages.
Office Action received for Chinese Patent Application No. 201510284715.9, dated Apr. 14, 2020, 19 pages.
Office Action received for Chinese Patent Application No. 201510284715.9, dated Dec. 18, 2019, 24 pages.
Office Action received for Chinese Patent Application No. 201510284715.9, dated Dec. 21, 2018, 22 pages.
Office Action received for Chinese Patent Application No. 201510284715.9, dated Jun. 19, 2019, 26 pages.
Office Action received for Chinese Patent Application No. 201510284896.5, dated Jun. 28, 2018, 15 pages.
Office Action received for Chinese Patent Application No. 201510284896.5, dated Mar. 6, 2019, 13 pages.
Office Action received for Chinese Patent Application No. 201510284896.5, dated Sep. 3, 2019, 9 pages.
Office Action received for Chinese Patent Application No. 201520358683.8, dated Sep. 2, 2015, 4 pages.
Office Action received for Chinese Patent Application No. 201610371856.9, dated Dec. 18, 2019, 6 pages.
Office Action received for Chinese Patent Application No. 201610371856.9, dated Dec. 19, 2018, 12 pages.
Office Action received for Chinese Patent Application No. 201610371856.9, dated Jul. 10, 2019, 6 pages.
Office Action received for Chinese Patent Application No. 201620480708.6, dated Jan. 9, 2017, 3 pages.
Office Action received for Chinese Patent Application No. 201620480708.6, dated Sep. 14, 2016, 3 pages.
Office Action received for Chinese Patent Application No. 201620480846.4, dated Jan. 9, 2017, 3 pages.
Office Action received for Chinese Patent Application No. 201620480846.4, dated Sep. 14, 2016, 3 pages.
Office Action received for Chinese Patent Application No. 201620509362.8, dated Feb. 10, 2017, 2 pages.
Office Action received for Chinese Patent Application No. 201620509362.8, dated Oct. 21, 2016, 3 pages.
Office Action received for Chinese Patent Application No. 201710093861.2, dated Mar. 5, 2019, 6 pages.
Office Action received for Chinese Patent Application No. 201710093861.2, dated Sep. 14, 2018, 15 pages.
Office Action received for Chinese Patent Application No. 201710094150.7, dated Dec. 19, 2018, 12 pages.
Office Action received for Chinese Patent Application No. 201710094150.7, dated Jul. 31, 2019, 6 pages.
Office Action received for Chinese Patent Application No. 201780002648.4, dated Dec. 5, 2018, 13 pages.
Office Action received for Chinese Patent Application No. 201780002648.4, dated Jun. 12, 2019, 11 pages.
Office Action received for Chinese Patent Application No. 201780002648.4, dated Nov. 26, 2019, 10 pages.
Office Action received for Chinese Patent Application No. 201810094316.X, dated Apr. 28, 2019, 9 pages.
Office Action received for Chinese Patent Application No. 201810094316.X, dated Aug. 5, 2019, 9 pages.
Office Action received for Chinese Patent Application No. 201810094316.X, dated Oct. 29, 2018, 12 pages.
Office Action Received for Danish Patent Application No. PA 201670709, dated Jul. 21, 2017, 4 pages.
Office Action Received for Danish Patent Application No. PA 201670709, dated Nov. 30, 2016, 10 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for European Patent Application No. 15727291.5, dated Jan. 15, 2018, 8 pages.
Office Action received for European Patent Application No. 16201159.7, dated Jun. 12, 2019, 10 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16803996.4, dated Nov. 29, 2018, 12 pages.
Office Action received for European Patent Application No. 17810682.9, dated Mar. 26, 2021, 8 pages.
Office Action received for European Patent Application No. 17835789.3, dated Jan. 20, 2021, 14 pages.

(56) References Cited

OTHER PUBLICATIONS

Office Action received for European Patent Application No. 18154163.2, dated Apr. 11, 2018, 6 pages.
Office Action received for European Patent Application No. 20180033.1, dated Jul. 17, 2020, 7 pages.
Office Action received for German Patent Application No. 202015004267.8, dated Nov. 4, 2015, 4 pages.
Office Action received for Indian Patent Application No. 201617039493, dated Oct. 21, 2019, 6 pages.
Office Action received for Japanese Patent Application No. 2016-224506, dated May 14, 2019, 22 pages.
Office Action received for Japanese Patent Application No. 2016-224507, dated Jun. 16, 2017, 16 pages.
Office Action received for Japanese Patent Application No. 2016-558332, dated Dec. 8, 2017, 12 pages.
Office Action received for Japanese Patent Application No. 2016-558332, dated Jul. 27, 2018, 9 pages.
Office Action received for Japanese Patent Application No. 2016-569665, dated Aug. 20, 2018, 9 pages.
Office Action received for Japanese Patent Application No. 2016-569665, dated Jan. 19, 2018, 10 pages.
Office Action received for Japanese Patent Application No. 2017-562050, dated Feb. 1, 2019, 15 pages.
Office Action received for Japanese Patent Application No. 2017-562050, dated Sep. 30, 2019, 5 pages.
Office Action received for Japanese Patent Application No. 2018-158482, dated Jan. 10, 2020, 9 pages.
Office Action received for Japanese Patent Application No. 2020-010992, dated May 24, 2021, 9 pages.
Office Action received for Japanese Patent Application No. 2020-028315, dated Jul. 6, 2020, 18 pages.
Office Action received for Japanese Patent Application No. 2020-028315, dated Nov. 9, 2020, 11 pages.
Office Action received for Korean Patent Application No. 10-2016-0152210, dated Jan. 29, 2019, 7 pages.
Office Action received for Korean Patent Application No. 10-2016-0152210, dated May 14, 2018, 13 pages.
Office Action received for Korean Patent Application No. 10-2016-0152210, dated May 30, 2019, 8 pages.
Office Action received for Korean Patent Application No. 10-2017-0022365, dated Jun. 26, 2017, 10 pages.
Office Action received for Korean Patent Application No. 10-2017-0022546, dated Jun. 21, 2017, 12 pages.
Office Action received for Korean Patent Application No. 10-2017-0022582, dated Jul. 31, 2019, 5 pages.
Office Action received for Korean Patent Application No. 10-2017-0022582, dated Sep. 19, 2018, 6 pages.
Office Action received for Korean Patent Application No. 10-2017-7034677, dated Nov. 1, 2018, 5 pages.
Office Action received for Korean Patent Application No. 10-2018-7001854, dated Apr. 2, 2018, 13 pages.
Office Action received for Korean Patent Application No. 10-2019-7006639, dated Dec. 21, 2020, 20 pages.
Office Action received for Korean Patent Application No. 10-2019-7006639, dated Jun. 15, 2021, 8 pages.
Office Action received for Korean Patent Application No. 10-2020-0097418, dated Aug. 28, 2020, 6 pages.
Office Action received for Taiwanese Patent Application No. 104117508, dated Jul. 14, 2017, 9 pages.
Office Action received for Taiwanese Patent Application No. 104117508, dated Jul. 20, 2016, 19 pages.
Office Action received for Taiwanese Patent Application No. 104117508, dated Mar. 20, 2017, 22 pages.
Office Action received for Taiwanese Patent Application No. 104117508, dated Jan. 25, 2019, 24 pages.
Office Action received for Taiwanese Patent Application No. 104117508, dated May 22, 2019, 7 pages.
Preliminary Opinion before oral proceedings received for European Patent Application No. 18154163.2, dated Apr. 16, 2019, 12 pages.
"Real Solution of two-step-authentication Password Management for Authentication Enhancement", Fukuda Takao, Nikkei PC, JPN, Nikkei Business Publications, Inc., No. 694, Mar. 24, 2014, 11 pages.
Result of Consultation received for European Patent Application No. 16803996.4, dated Feb. 17, 2020, 14 pages.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.
Summons to Attend Oral Proceedings received for European Patent Application No. 15727291.5, dated Jan. 28, 2020, 13 pages.
Summons to Attend Oral Proceedings received for European Patent Application No. 15728352.4, dated May 12, 2020, 25 pages.
Summons to Attend Oral Proceedings received for European Patent Application No. 15728352.4, dated Nov. 18, 2019, 15 pages.
Summons to Attend Oral Proceedings received for European Patent Application No. 16201159.7, dated Feb. 4, 2021, 12 pages.
Summons to Attend Oral Proceedings received for European Patent Application No. 16201195.1, dated Sep. 4, 2018, 21 pages.
Summons to Attend Oral Proceedings received for European Patent Application No. 16201205.8, dated Jan. 28, 2020, 18 pages.
Summons to Attend Oral Proceedings received for European Patent Application No. 16803996.4, dated Oct. 2, 2019, 16 pages.
Summons to Attend Oral Proceedings received for European Patent Application No. 18154163.2, dated Nov. 29, 2018, 9 pages.
Supplemental Notice of Allowance received for U.S. Appl. No. 16/786,694, dated Apr. 28, 2021, 2 pages.
Supplemental Notice of Allowance received for U.S. Appl. No. 16/786,694, dated Oct. 18, 2021, 2 pages.
Supplemental Notice of Allowance received for U.S. Appl. No. 16/786,694, dated Sep. 20, 2021, 3 pages.
Teather et al., "Assessing the Effects of Orientation and Device on (Constrained) 3D Movement Techniques", IEEE Symposium on 3D User Interfaces. Reno, Nevada, USA., Mar. 8-9, 2008, 8 pages.
Techboomers, "How to Use Skype Course", Available Online at: https://techboomers.eom/p/skype, Apr. 25, 2017, 17 pages.
"Use NFC with Screen Off or in Lock Screen on Galaxy Nexus", Available online at: https://www.xda-developers.com/use-nfc-with-screen-off-or-in-lock-screen-on-galaxy-nexus/, Jun. 14, 2012, 4 pages.
Whatsupcoders, "Flutter Tutorial—Upload Images using Firebase Storage", Online available at: https://www.youtube.com/watch?v=7uqmY6le4xk, Apr. 19, 2019, 4 pages.
Notice of Allowance received for Japanese Patent Application No. 2022-508935, dated Jul. 19, 2022, 4 pages (1 page of English Translation and 3 pages of Official Copy).
Notice of Allowance received for Korean Patent Application No. 10-2022-7005219, dated Jul. 6, 2022, 5 pages (2 pages of English Translation and 3 pages of Official Copy).
Advisory Action received for U.S. Appl. No. 16/581,614, dated Nov. 4, 2021, 4 pages.
Board Opinion received for Chinese Patent Application No. 201810094316.X, dated Sep. 30, 2021, 11 pages (3 pages of English Translation and 8 pages of Official Copy).
Decision to Refuse received for European Patent Application No. 16201159.7, dated Sep. 27, 2021, 22 pages.
Final Office Action received for U.S. Appl. No. 16/814,226, dated Oct. 28, 2021, 19 pages.
International Preliminary Report on Patentability received for PCT Patent Application No. PCT/US2020/020414, dated Oct. 7, 2021, 18 pages.
Minutes of the Oral Proceedings received for European Patent Application No. 16201159.7, dated Sep. 23, 2021, 6 pages.
Notice of Allowance received for U.S. Appl. No. 16/549,862, dated Oct. 20, 2021, 7 pages.
Office Action received for Australian Patent Application No. 2019271927, dated Sep. 8, 2021, 4 pages.
Office Action received for Chinese Patent Application No. 201780033622.6, dated Sep. 3, 2021, 11 pages (5 pages of English Translation and 6 pages of Official Copy).
Office Action received for Korean Patent Application No. 10-2019-7006639, dated Sep. 16, 2021, 20 pages (10 pages of English Translation and 10 pages of Official Copy).

(56) References Cited

OTHER PUBLICATIONS

Summons to Attend Oral Proceedings received for European Patent Application No. 20180033.1, dated Oct. 4, 2021, 9 pages.
Office Action received for Chinese Patent Application No. 202080060828.X, dated Oct. 10, 2022, 18 pages (9 pages of English Translation and 9 pages of Official Copy).
Office Action received for Australian Patent Application No. 2020356269, dated Jan. 13, 2023, 3 pages.
Rejection Decision Action received for Chinese Patent Application No. 202080060828.X, dated Jan. 10, 2023, 12 pages (7 pages of English Translation and 5 pages of Official Copy).
Notice of Acceptance received for Australian Patent Application No. 2020356269, dated Mar. 28, 2023, 3 pages.
Office Action received for European Patent Application No. 20771723.2, dated Mar. 24, 2023, 6 pages.

\* cited by examiner

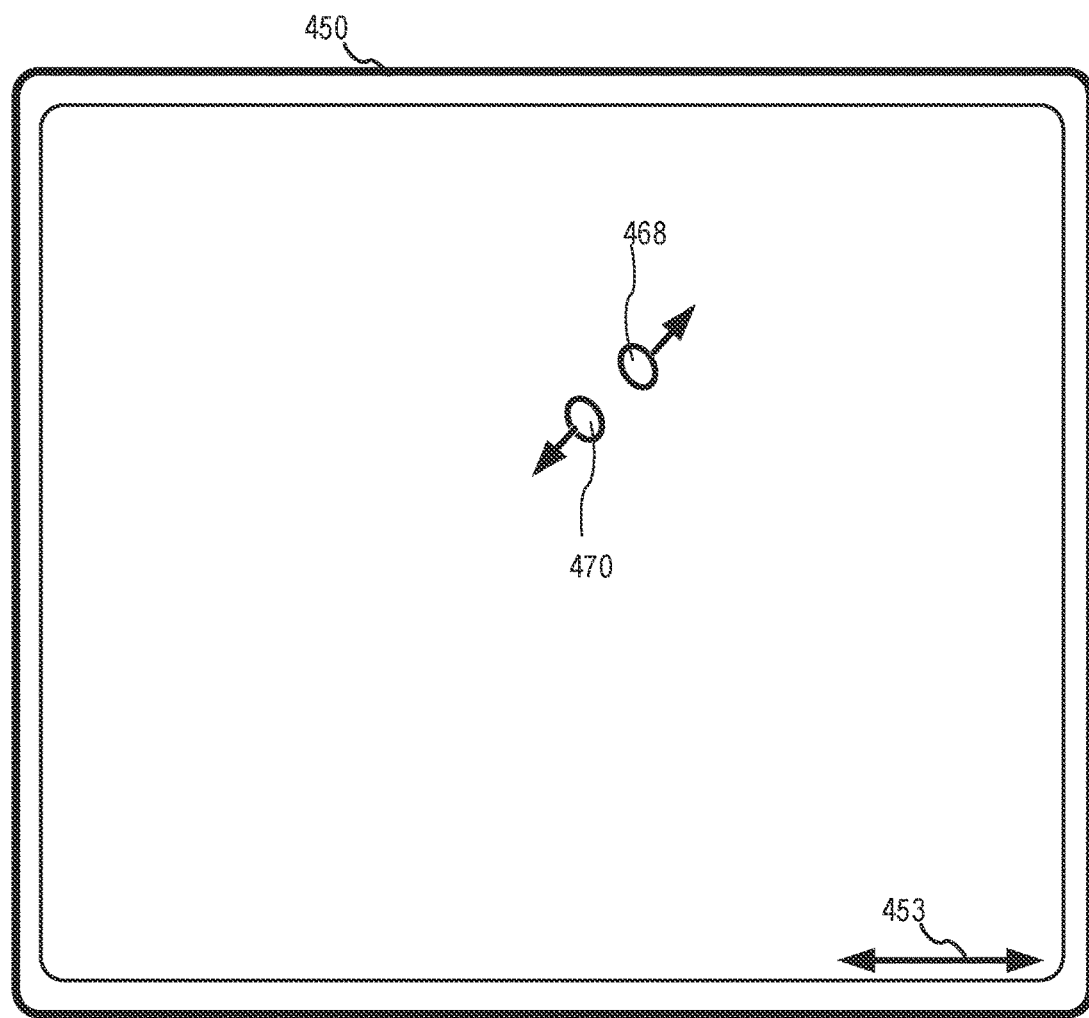
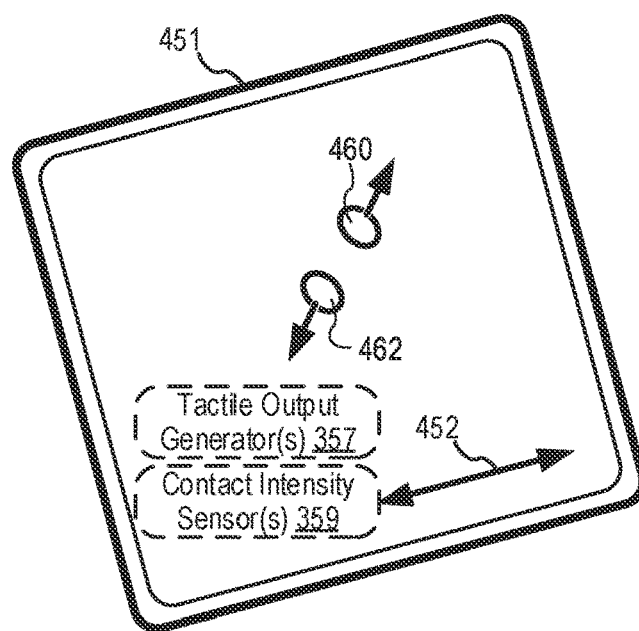
FIG. 4B

900

902
Display a first user interface corresponding to a user account, the user interface including a first user interface element that corresponds to a first task performed using the user account, and a second user interface element that corresponds to a second task performed using the user account.

904
While displaying the first user interface, detect a first user input.

906
In response to detecting the first user input:

908
In accordance with a determination that the first user input corresponds to a selection of the first user interface element, display a second user interface having a first image corresponding to one or more items associated with the first task performed using the user account without displaying a second image corresponding to one or more items associated with the second task performed using the user account.

910
In accordance with a determination that the first user input corresponds to a selection of the second user interface element, display the second user interface having the second image corresponding to one or more items associated with the second task performed using the user account without displaying the first image corresponding to one or more items associated with the first task performed using the user account.

*FIG. 9*

ACCOUNT MANAGEMENT USER INTERFACES

CROSS-REFERENCE TO RELATED APPLICATIONS

This application is a continuation of U.S. patent application Ser. No. 16/786,694, entitled "Account Management User Interfaces," filed Feb. 10, 2020, which claims the benefit of U.S. Provisional Application No. 62/907,697, entitled "Account Management User Interfaces," filed Sep. 29, 2019, the contents of which are hereby incorporated by reference in their entireties.

FIELD

The present disclosure relates generally to computer user interfaces, and more specifically to user interfaces for managing an account.

BACKGROUND

Electronic devices can be used to manage an account provisioned on the electronic device. Various features of an account can be controlled, performed, or managed using an electronic device.

BRIEF SUMMARY

Some techniques for managing an account using electronic devices, however, are generally cumbersome and inefficient. For example, some existing techniques require the use of certain applications that may not be commonly used by a user of a device, which may unnecessarily cause the user to open a seldom-used application or navigate a seldom-used interface. For another example, some existing techniques provide limited options to easily and conveniently manage disk space associated with an account. For another example, some existing techniques provide limited options to easily and conveniently manage installment plans associated with a transfer account. For another example, some existing techniques use a complex and time-consuming user interface, which may include multiple key presses or keystrokes. As such, existing techniques require more time than necessary, wasting user time and device energy. This latter consideration is particularly important in battery-operated devices.

Accordingly, the present technique provides electronic devices with faster, more efficient methods and interfaces for managing an account. Such methods and interfaces optionally complement or replace other methods for managing an account. Such methods and interfaces reduce the cognitive burden on a user and produce a more efficient human-machine interface. For battery-operated computing devices, such methods and interfaces conserve power and increase the time between battery charges. Such methods and interfaces also reduce the number of unnecessary, extraneous, or repetitive inputs required at computing devices, such as smartphones and smartwatches.

In accordance with some embodiments, a method performed at an electronic device with a display and one or more input devices is described. The method comprises: displaying, on the display device, a first user interface corresponding to a user account, wherein the first user interface includes: a first user interface element that corresponds to a first task performed using the user account; and a second user interface element that corresponds to a second task performed using the user account; while displaying the first user interface, detecting a first user input; and in response to detecting the first user input: in accordance with a determination that the first user input corresponds to a selection of the first user interface element, displaying a second user interface having a first image corresponding to one or more items associated with the first task performed using the user account without displaying a second image corresponding to one or more items associated with the second task performed using the user account; and in accordance with a determination that the first user input corresponds to a selection of the second user interface element, displaying the second user interface having the second image corresponding to one or more items associated with the second task performed using the user account without displaying the first image corresponding to one or more items associated with the first task performed using the user account.

In accordance with some embodiments, a non-transitory computer-readable storage medium storing one or more programs configured to be executed by one or more processors of an electronic device with a display device and one or more input devices is described. The one or more programs include instructions for: displaying, on the display device, a first user interface corresponding to a user account, wherein the first user interface includes: a first user interface element that corresponds to a first task performed using the user account; and a second user interface element that corresponds to a second task performed using the user account; while displaying the first user interface, detecting a first user input; and in response to detecting the first user input: in accordance with a determination that the first user input corresponds to a selection of the first user interface element, displaying a second user interface having a first image corresponding to one or more items associated with the first task performed using the user account without displaying a second image corresponding to one or more items associated with the second task performed using the user account; and in accordance with a determination that the first user input corresponds to a selection of the second user interface element, displaying the second user interface having the second image corresponding to one or more items associated with the second task performed using the user account without displaying the first image corresponding to one or more items associated with the first task performed using the user account.

In accordance with some embodiments, a transitory computer-readable storage medium storing one or more programs configured to be executed by one or more processors of an electronic device with a display device and one or more input devices is described. The one or more programs include instructions for: displaying, on the display device, a first user interface corresponding to a user account, wherein the first user interface includes: a first user interface element that corresponds to a first task performed using the user account; and a second user interface element that corresponds to a second task performed using the user account; while displaying the first user interface, detecting a first user input; and in response to detecting the first user input: in accordance with a determination that the first user input corresponds to a selection of the first user interface element, displaying a second user interface having a first image corresponding to one or more items associated with the first task performed using the user account without displaying a second image corresponding to one or more items associated with the second task performed using the user account; and in accordance with a determination that the first user input corresponds to a selection of the second user interface element, displaying the second user interface having the second image corresponding to one or more items associated with the second task performed using the user account without displaying the first image corresponding to one or more items associated with the first task performed using the user account.

In accordance with some embodiments, an electronic device comprising a display device, one or more input devices, one or more processors, and memory storing one or more programs configured to be executed by the one or more processors is described. The one or more programs include instructions for: displaying, on the display device, a first user interface corresponding to a user account, wherein the first user interface includes: a first user interface element that corresponds to a first task performed using the user account; and a second user interface element that corresponds to a second task performed using the user account; while displaying the first user interface, detecting a first user input; and in response to detecting the first user input: in accordance with a determination that the first user input corresponds to a selection of the first user interface element, displaying a second user interface having a first image corresponding to one or more items associated with the first task performed using the user account without displaying a second image corresponding to one or more items associated with the second task performed using the user account; and in accordance with a determination that the first user input corresponds to a selection of the second user interface element, displaying the second user interface having the second image corresponding to one or more items associated with the second task performed using the user account without displaying the first image corresponding to one or more items associated with the first task performed using the user account.

In accordance with some embodiments, an electronic device is described. The electronics device comprises a display device; one or more input devices; means for displaying, on the display device, a first user interface corresponding to a user account, wherein the first user interface includes: a first user interface element that corresponds to a first task performed using the user account; and a second user interface element that corresponds to a second task performed using the user account; means for, while displaying the first user interface, detecting a first user input; and means for, in response to detecting the first user input: in accordance with a determination that the first user input corresponds to a selection of the first user interface element, displaying a second user interface having a first image corresponding to one or more items associated with the first task performed using the user account without displaying a second image corresponding to one or more items associated with the second task performed using the user account; and in accordance with a determination that the first user input corresponds to a selection of the second user interface element, displaying the second user interface having the second image corresponding to one or more items associated with the second task performed using the user account without displaying the first image corresponding to one or more items associated with the first task performed using the user account.

In accordance with some embodiments, a method performed at an electronic device with a display and one or more input devices is described. The method comprises: receiving a request to display a numerical selection user interface; and in response to receiving the request to display the numerical selection user interface, displaying a numerical selection user interface for selecting a value for a respective parameter, wherein the numerical selection user interface includes: a predefined path with a respective size and shape, a value selector, and a selectable user interface object for initiating a process for performing a predefined operation using a value associated with the value selector; wherein displaying the numerical selection user interface includes: in accordance with a determination that the request to display the numerical selection user interface meets first criteria, the first criteria including a criterion that is met when the request to display the numerical selection user interface occurs while displaying a first user interface associated with the respective parameter, displaying the predefined path with the respective size and shape, wherein a first point on the predefined path corresponds to a first numerical value and a second point on the predefined path corresponds to a second numerical value; and in accordance with a determination that the request to display the numerical selection user interface meets second criteria, the second criteria including a criterion that is met when the request to display the numerical selection user interface occurs while displaying a second user interface associated with the respective parameter that is different from the first user interface, displaying the predefined path with the respective size and shape, wherein the first point on the predefined path corresponds to a third numerical value that is different from the first numerical value and the second point on the predefined path corresponds to a fourth numerical value that is different from the second numerical value; while displaying the numerical selection user interface, detecting an input corresponding to activation of the selectable user interface object; and in response to detecting the input corresponding to activation of the selectable user interface object: in accordance with a determination that the value selector is at the first point on the predefined path and the request to display the numerical selection user interface met the first criteria, initiating a process for performing the predefined operation using the first numerical value; in accordance with a determination that the value selector is at the second point on the predefined path and the request to display the numerical selection user interface met the first criteria, initiating a process for performing the predefined operation using the second numerical value; in accordance with a determination that the value selector is at the first point on the predefined path and the request to display the numerical selection user interface met the second criteria, initiating a process for performing the predefined operation using the third numerical value; and in accordance with a determination that the value selector is at the second point on the predefined path and the request to display the numerical selection user interface met the second criteria, initiating a process for performing the predefined operation using the fourth numerical value.

In accordance with some embodiments, a non-transitory computer-readable storage medium storing one or more programs configured to be executed by one or more processors of an electronic device with a display device and one or more input devices is described. The one or more programs include instructions for: receiving a request to display a numerical selection user interface; and in response to receiving the request to display the numerical selection user interface, displaying a numerical selection user interface for selecting a value for a respective parameter, wherein the numerical selection user interface includes: a predefined path with a respective size and shape, a value selector, and a selectable user interface object for initiating a process for performing a predefined operation using a value associated with the value selector; wherein displaying the numerical selection user interface includes: in accordance with a determination that the request to display the numerical selection user interface meets first criteria, the first criteria including a criterion that is met when the request to display the numerical selection user interface occurs while displaying a first user interface associated with the respective parameter, displaying the predefined path with the respective size and shape, wherein a first point on the predefined path corresponds to a first numerical value and a second point on the predefined path corresponds to a second numerical value; and in accordance with a determination that the request to display the numerical selection user interface meets second criteria, the second criteria including a criterion that is met when the request to display the numerical selection user interface occurs while displaying a second user interface associated with the respective parameter that is different from the first user interface, displaying the predefined path with the respective size and shape, wherein the first point on the predefined path corresponds to a third numerical value that is different from the first numerical value and the second point on the predefined path corresponds to a fourth numerical value that is different from the second numerical value; while displaying the numerical selection user interface, detecting an input corresponding to activation of the selectable user interface object; and in response to detecting the input corresponding to activation of the selectable user interface object: in accordance with a determination that the value selector is at the first point on the predefined path and the request to display the numerical selection user interface met the first criteria, initiating a process for performing the predefined operation using the first numerical value; in accordance with a determination that the value selector is at the second point on the predefined path and the request to display the numerical selection user interface met the first criteria, initiating a process for performing the predefined operation using the second numerical value; in accordance with a determination that the value selector is at the first point on the predefined path and the request to display the numerical selection user interface met the second criteria, initiating a process for performing the predefined operation using the third numerical value; and in accordance with a determination that the value selector is at the second point on the predefined path and the request to display the numerical selection user interface met the second criteria, initiating a process for performing the predefined operation using the fourth numerical value.

In accordance with some embodiments, a transitory computer-readable storage medium storing one or more programs configured to be executed by one or more processors of an electronic device with a display device and one or more input devices is described. The one or more programs include instructions for: receiving a request to display a numerical selection user interface; and in response to receiving the request to display the numerical selection user interface, displaying a numerical selection user interface for selecting a value for a respective parameter, wherein the numerical selection user interface includes: a predefined path with a respective size and shape, a value selector, and a selectable user interface object for initiating a process for performing a predefined operation using a value associated with the value selector; wherein displaying the numerical selection user interface includes: in accordance with a determination that the request to display the numerical selection user interface meets first criteria, the first criteria including a criterion that is met when the request to display the numerical selection user interface occurs while displaying a first user interface associated with the respective parameter, displaying the predefined path with the respective size and shape, wherein a first point on the predefined path corresponds to a first numerical value and a second point on the predefined path corresponds to a second numerical value; and in accordance with a determination that the request to display the numerical selection user interface meets second criteria, the second criteria including a criterion that is met when the request to display the numerical selection user interface occurs while displaying a second user interface associated with the respective parameter that is different from the first user interface, displaying the predefined path with the respective size and shape, wherein the first point on the predefined path corresponds to a third numerical value that is different from the first numerical value and the second point on the predefined path corresponds to a fourth numerical value that is different from the second numerical value; while displaying the numerical selection user interface, detecting an input corresponding to activation of the selectable user interface object; and in response to detecting the input corresponding to activation of the selectable user interface object: in accordance with a determination that the value selector is at the first point on the predefined path and the request to display the numerical selection user interface met the first criteria, initiating a process for performing the predefined operation using the first numerical value; in accordance with a determination that the value selector is at the second point on the predefined path and the request to display the numerical selection user interface met the first criteria, initiating a process for performing the predefined operation using the second numerical value; in accordance with a determination that the value selector is at the first point on the predefined path and the request to display the numerical selection user interface met the second criteria, initiating a process for performing the predefined operation using the third numerical value; and in accordance with a determination that the value selector is at the second point on the predefined path and the request to display the numerical selection user interface met the second criteria, initiating a process for performing the predefined operation using the fourth numerical value.

In accordance with some embodiments, an electronic device comprising a display device, one or more input devices, one or more processors, and memory storing one or more programs configured to be executed by the one or more processors is described. The one or more programs include instructions for: receiving a request to display a numerical selection user interface; and in response to receiving the request to display the numerical selection user interface, displaying a numerical selection user interface for selecting a value for a respective parameter, wherein the numerical selection user interface includes: a predefined path with a respective size and shape, a value selector, and a selectable user interface object for initiating a process for performing a predefined operation using a value associated with the value selector; wherein displaying the numerical selection user interface includes: in accordance with a determination that the request to display the numerical selection user interface meets first criteria, the first criteria including a criterion that is met when the request to display the numerical selection user interface occurs while displaying a first user interface associated with the respective parameter, displaying the predefined path with the respective size and shape, wherein a first point on the predefined path corresponds to a first numerical value and a second point on the predefined path corresponds to a second numerical value; and in accordance with a determination that the request to display the numerical selection user interface meets second criteria, the second criteria including a criterion that is met when the request to display the numerical selection user interface occurs while displaying a second user interface associated with the respective parameter that is different from the first user interface, displaying the predefined path with the respective size and shape, wherein the first point on the predefined path corresponds to a third numerical value that is different from the first numerical value and the second point on the predefined path corresponds to a fourth numerical value that is different from the second numerical value; while displaying the numerical selection user interface, detecting an input corresponding to activation of the selectable user interface object; and in response to detecting the input corresponding to activation of the selectable user interface object: in accordance with a determination that the value selector is at the first point on the predefined path and the request to display the numerical selection user interface met the first criteria, initiating a process for performing the predefined operation using the first numerical value; in accordance with a determination that the value selector is at the second point on the predefined path and the request to display the numerical selection user interface met the first criteria, initiating a process for performing the predefined operation using the second numerical value; in accordance with a determination that the value selector is at the first point on the predefined path and the request to display the numerical selection user interface met the second criteria, initiating a process for performing the predefined operation using the third numerical value; and in accordance with a determination that the value selector is at the second point on the predefined path and the request to display the numerical selection user interface met the second criteria, initiating a process for performing the predefined operation using the fourth numerical value.

In accordance with some embodiments, an electronic device is described. The electronics device comprises a display device; one or more input devices; means for receiving a request to display a numerical selection user interface; and means for in response to receiving the request to display the numerical selection user interface, displaying a numerical selection user interface for selecting a value for a respective parameter, wherein the numerical selection user interface includes: a predefined path with a respective size and shape, a value selector, and a selectable user interface object for initiating a process for performing a predefined operation using a value associated with the value selector; wherein displaying the numerical selection user interface includes: in accordance with a determination that the request to display the numerical selection user interface meets first criteria, the first criteria including a criterion that is met when the request to display the numerical selection user interface occurs while displaying a first user interface associated with the respective parameter, displaying the predefined path with the respective size and shape, wherein a first point on the predefined path corresponds to a first numerical value and a second point on the predefined path corresponds to a second numerical value; and in accordance with a determination that the request to display the numerical selection user interface meets second criteria, the second criteria including a criterion that is met when the request to display the numerical selection user interface occurs while displaying a second user interface associated with the respective parameter that is different from the first user interface, displaying the predefined path with the respective size and shape, wherein the first point on the predefined path corresponds to a third numerical value that is different from the first numerical value and the second point on the predefined path corresponds to a fourth numerical value that is different from the second numerical value; while displaying the numerical selection user interface, detecting an input corresponding to activation of the selectable user interface object; and in response to detecting the input corresponding to activation of the selectable user interface object: in accordance with a determination that the value selector is at the first point on the predefined path and the request to display the numerical selection user interface met the first criteria, initiating a process for performing the predefined operation using the first numerical value; in accordance with a determination that the value selector is at the second point on the predefined path and the request to display the numerical selection user interface met the first criteria, initiating a process for performing the predefined operation using the second numerical value; in accordance with a determination that the value selector is at the first point on the predefined path and the request to display the numerical selection user interface met the second criteria, initiating a process for performing the predefined operation using the third numerical value; and in accordance with a determination that the value selector is at the second point on the predefined path and the request to display the numerical selection user interface met the second criteria, initiating a process for performing the predefined operation using the fourth numerical value.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing an account, thereby increasing the effectiveness, efficiency, and user satisfaction with such devices. Such methods and interfaces may complement or replace other methods for managing an account.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 9 is a flow diagram illustrating a method for managing a user account, in accordance with some embodiments.

DESCRIPTION OF EMBODIMENTS

Figure 1A:
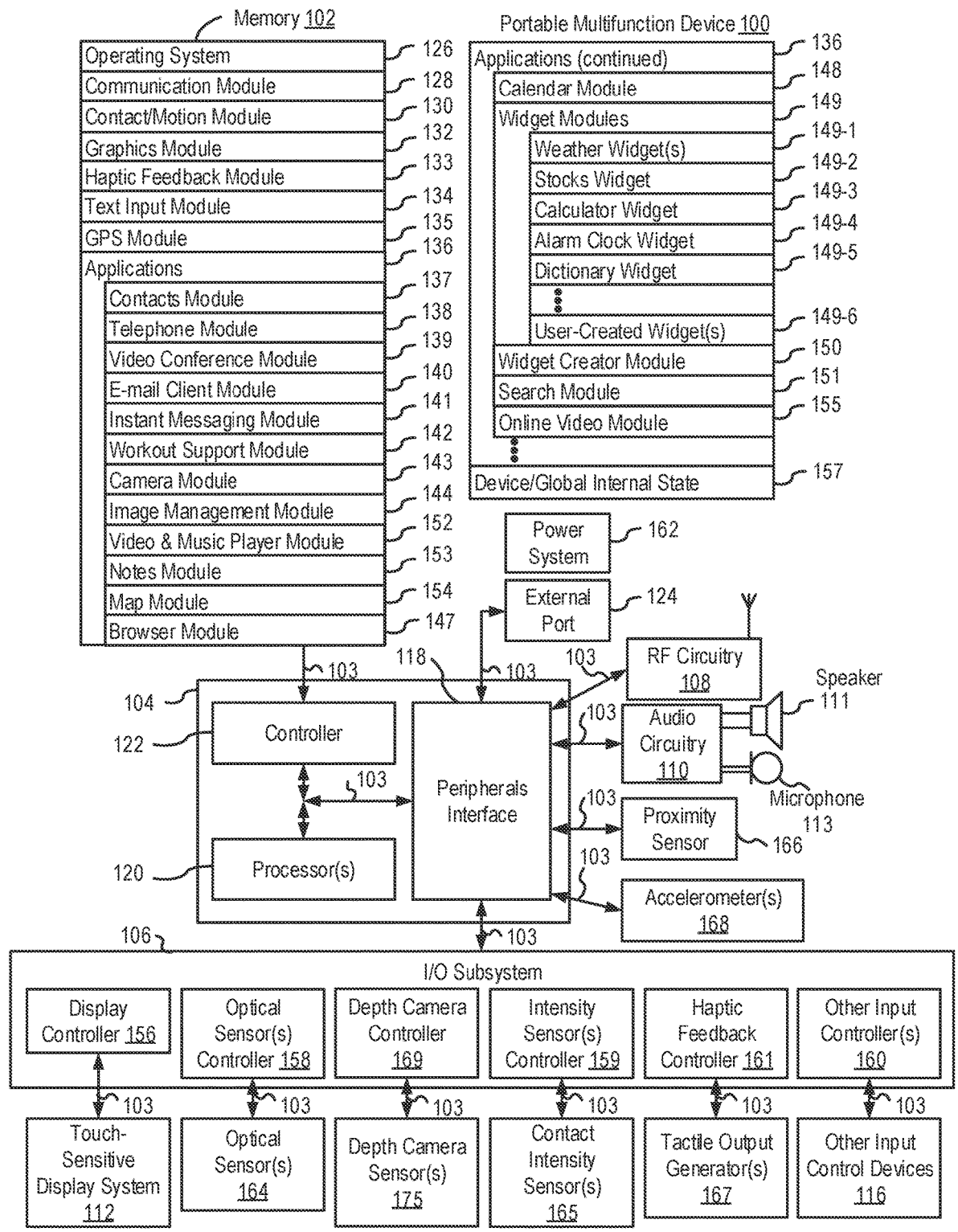
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing an account. For example, there is a need for electronic devices that provide a convenient and efficient method for managing remote data storage associated with a user account. For another example, there is a need for electronic devices that provide easier techniques for managing deletion of data from remote data storage associated with a user account. As another example, there is a need for electronic devices that provide a convenient and efficient method for managing a balance transfer of a user account. Such techniques can reduce the cognitive burden on a user who manages and uses a user account using the electronic device, thereby enhancing productivity. Further, such techniques can reduce processor and battery power otherwise wasted on redundant user inputs.

Below, FIGS. 1A-1B, 2, 3, 4A-4B, 5A-5B, and 6 provide a description of exemplary devices for performing techniques for managing an account. FIGS. 7A-7D illustrate exemplary user interfaces for managing remote data storage associated with a user account. FIGS. 8A-8AK illustrate exemplary user interfaces for managing a user account. FIG. 9 is a flow diagram illustrating methods of managing a user account in accordance with some embodiments. The user interfaces in FIGS. 7A-7D and FIGS. 8A-8AK are used to illustrate the processes described below, including the processes in FIG. 9. FIGS. 10A-10H illustrate exemplary user interfaces for managing deletion of data from remote data storage associated with a user account. FIGS. 11A-11R illustrate exemplary user interfaces for managing a balance transfer of a user account. FIG. 12 is a flow diagram illustrating methods of managing a user account in accordance with some embodiments. The user interfaces in FIGS. 10A-10H and FIGS. 11A-11R are used to illustrate the processes described below, including the processes in FIG. 12.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
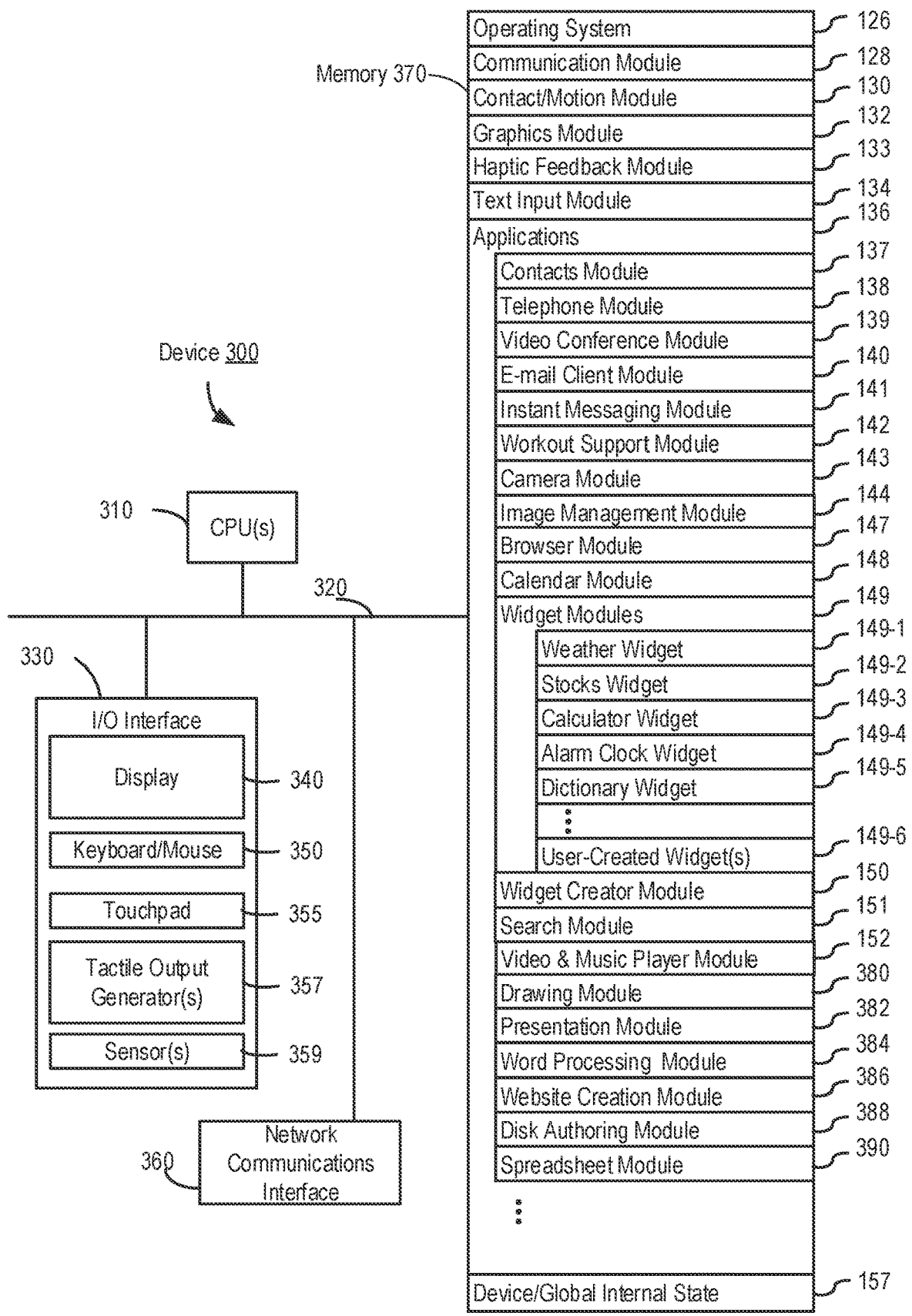
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
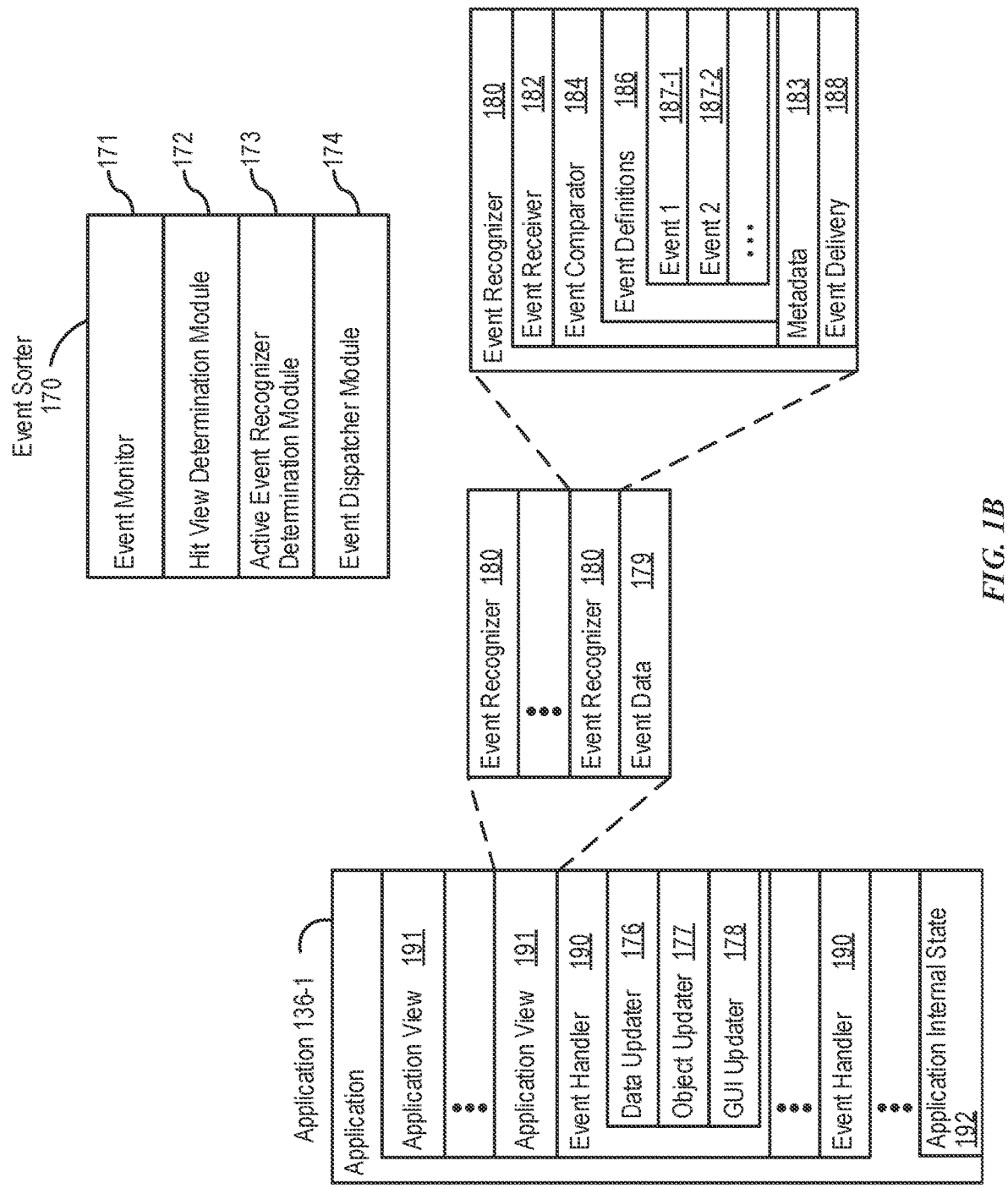
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
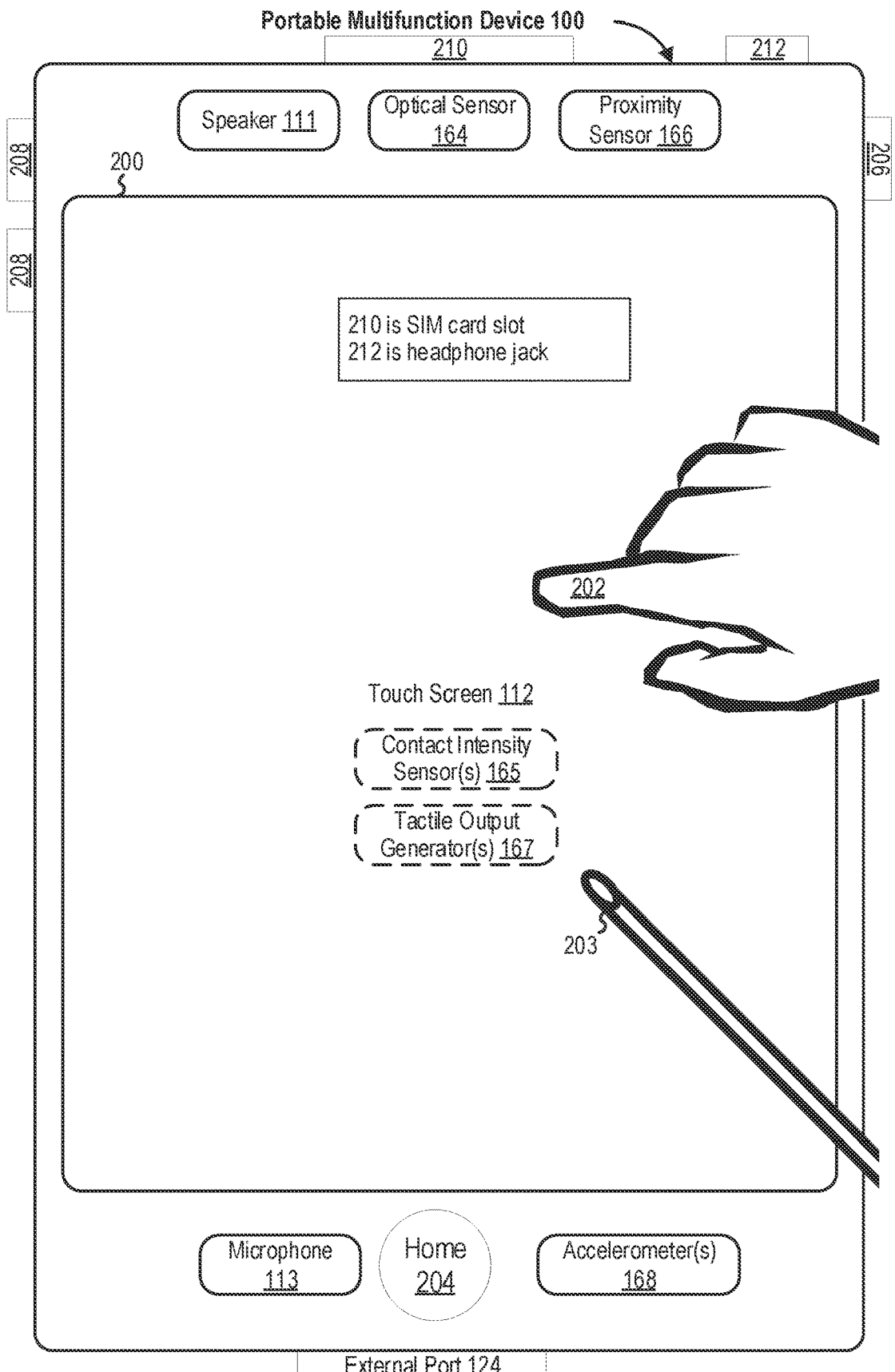
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
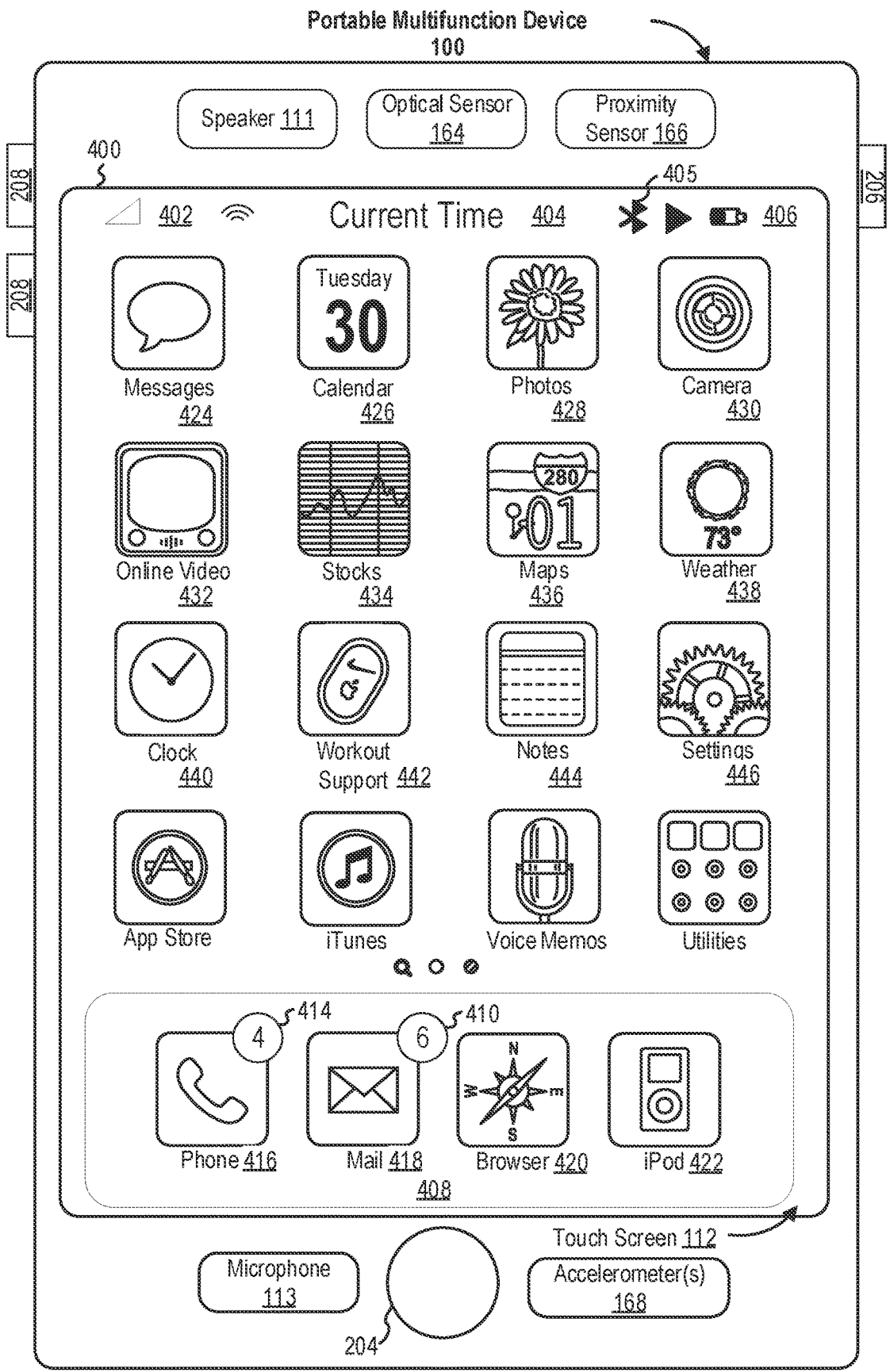
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
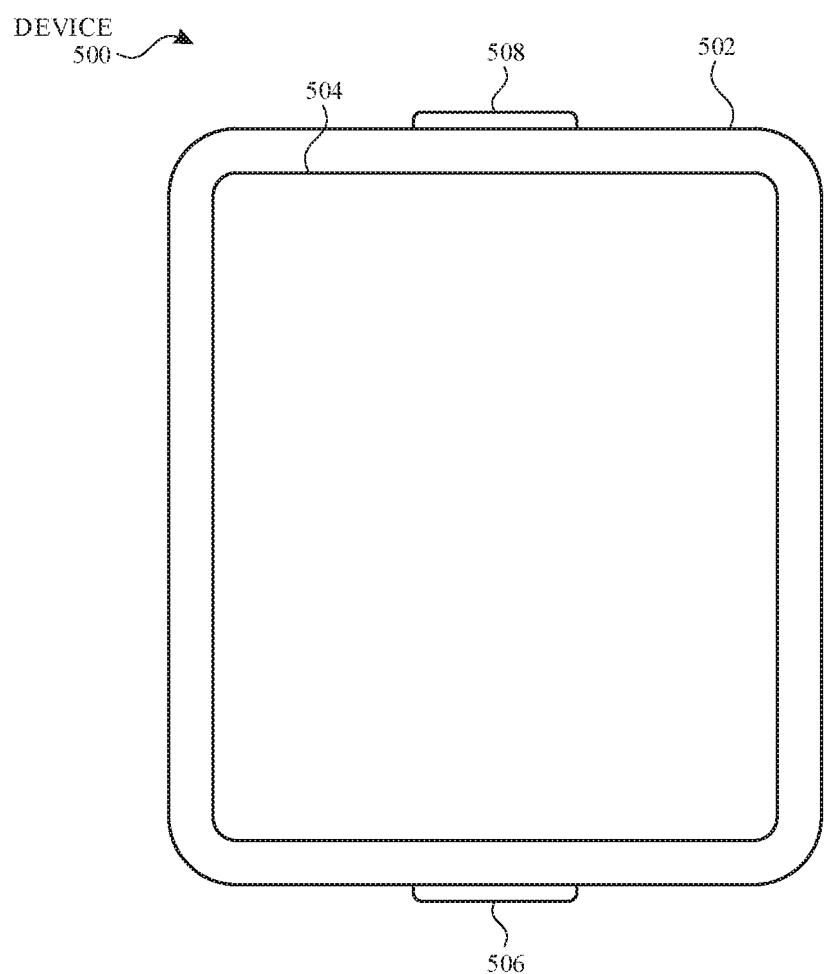
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/ 040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
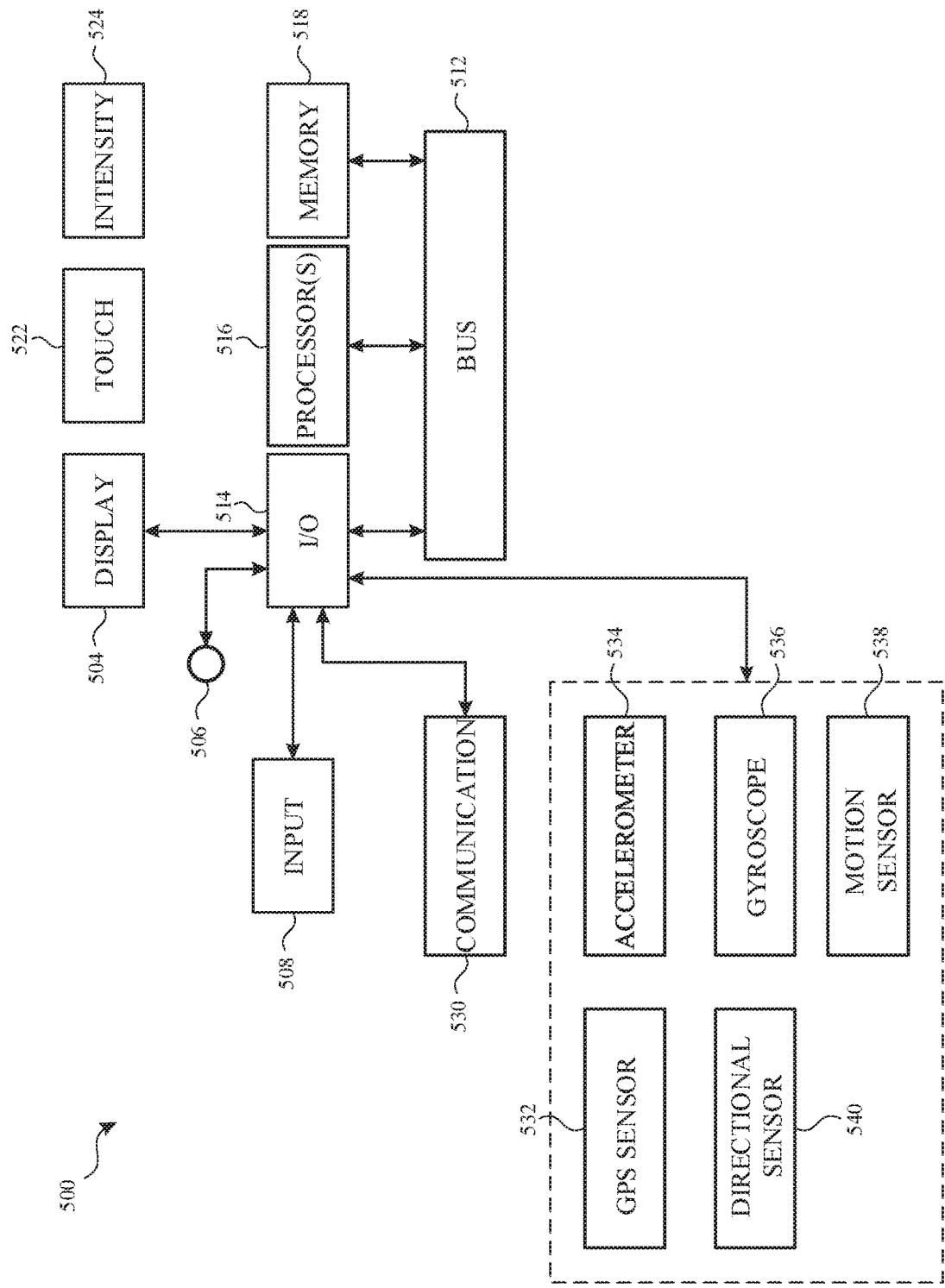
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 12A:
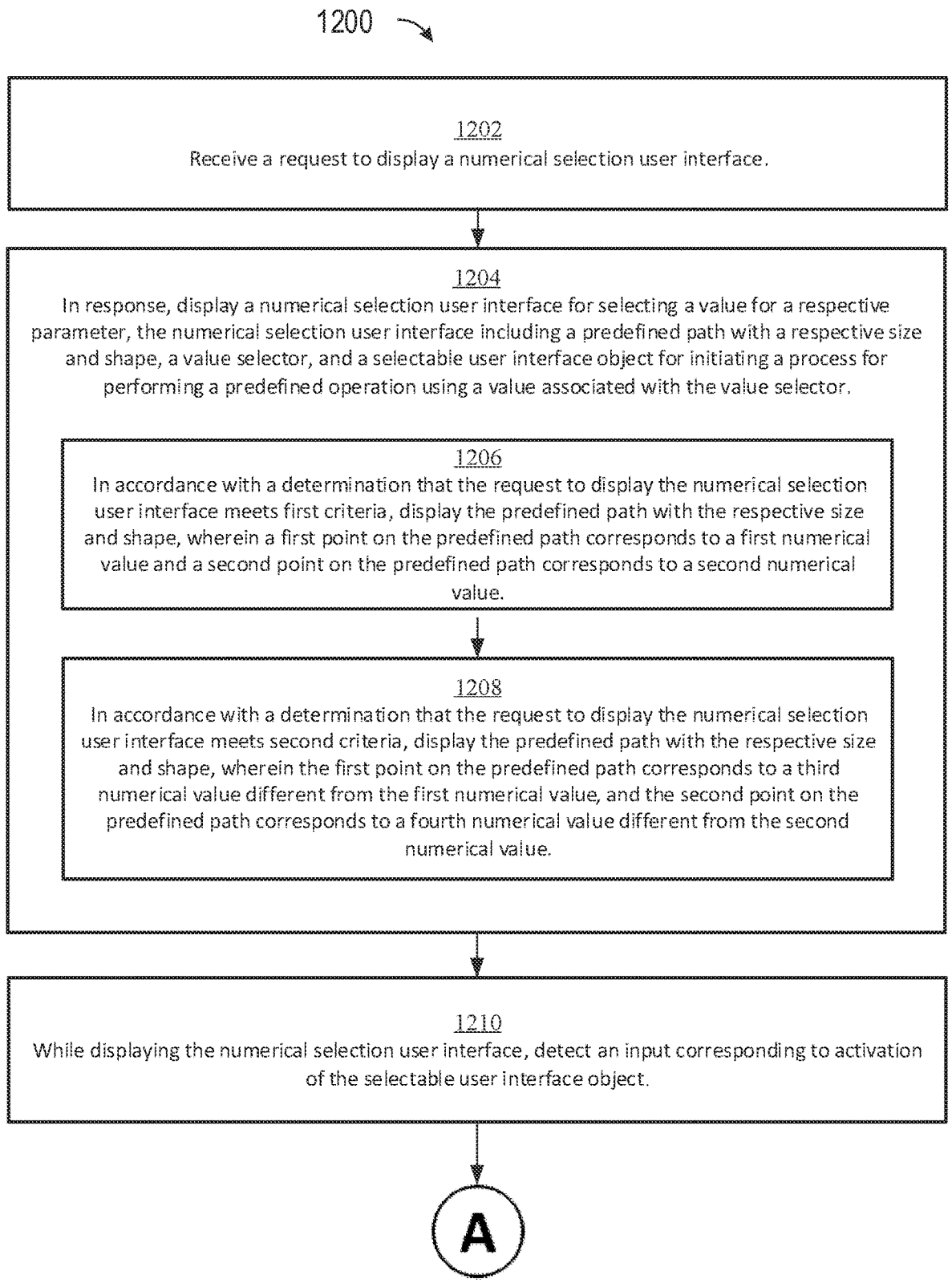
FIGS. 12A-12B are a flow diagram illustrating a method for managing a user account, in accordance with some embodiments.
Figure 12B:
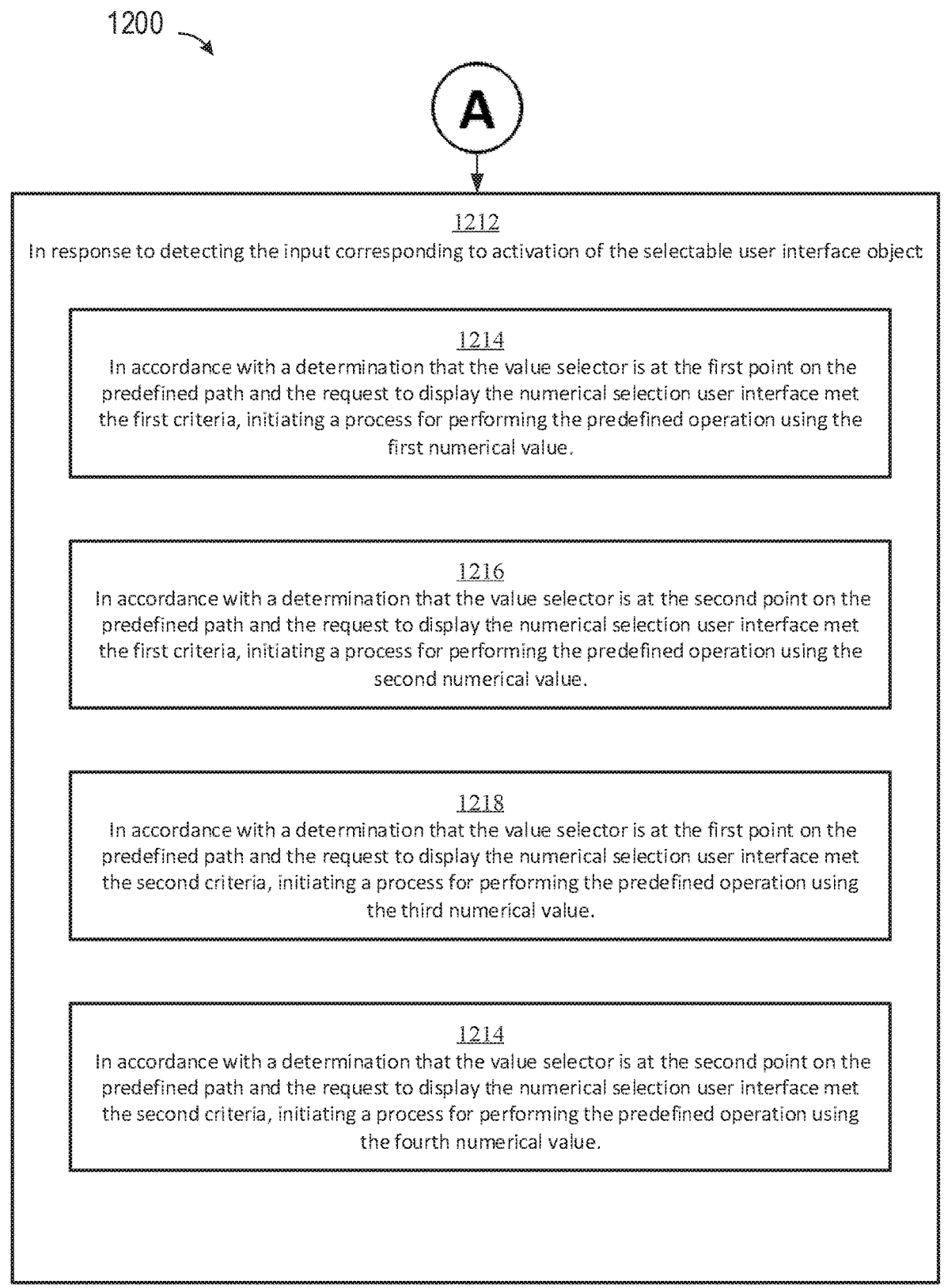

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 900 and 1200 (FIGS. 9 and 12A-12B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6:
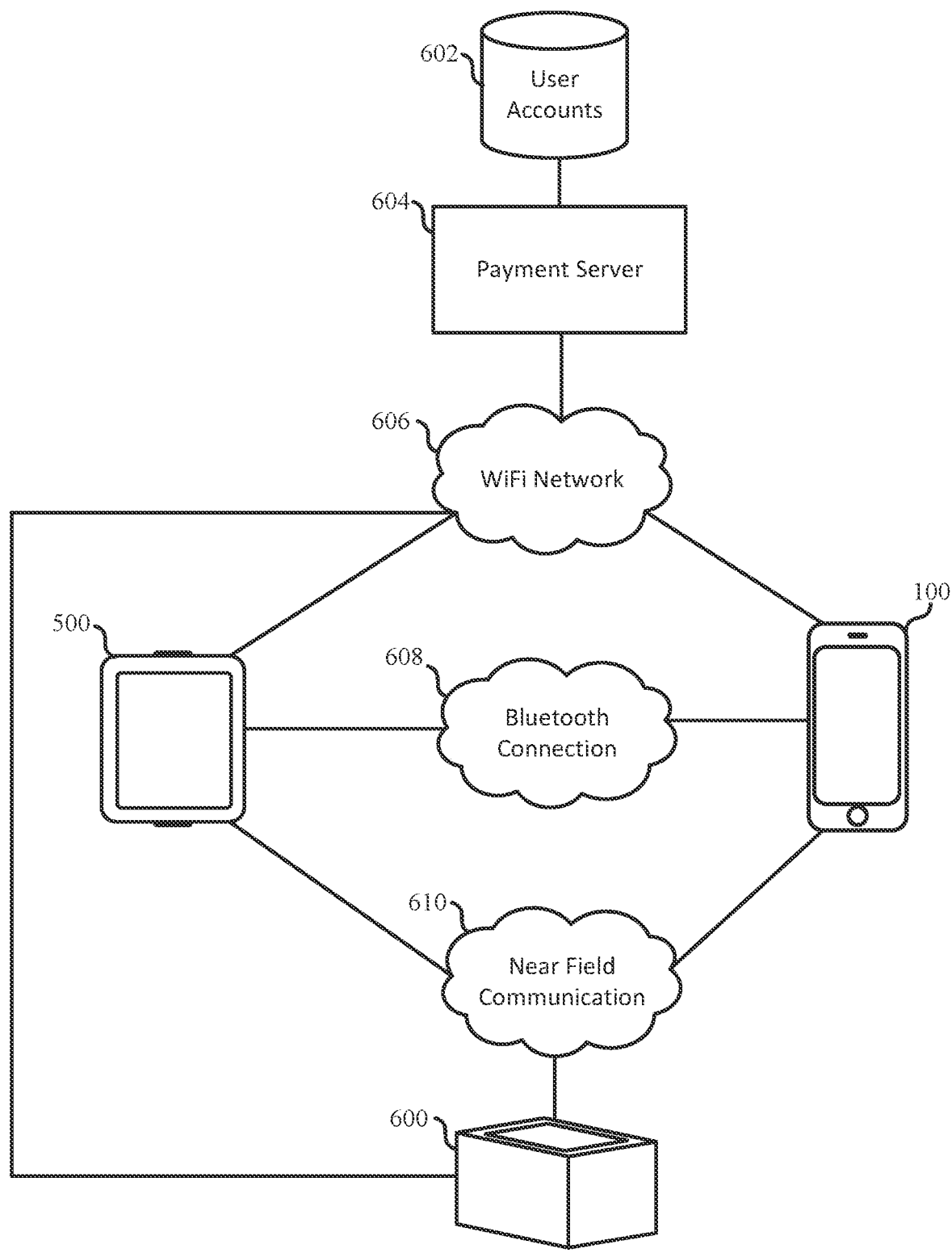
FIG. 6 illustrates exemplary devices connected via one or more communication channels, in accordance with some embodiments.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some embodiments, electronic device (e.g., 100, 300, 500) communicates with payment terminal 600 using an NFC channel 610. In some embodiments, payment terminal 600 communicates with an electronic device (e.g., 100, 300, 500) using a peer-to-peer NFC mode. Electronic device (e.g., 100, 300, 500) is optionally configured to transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfiguring to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and/or detection of a gesture or movement (e.g., rotation or acceleration). In some embodiments, if a communication channel (e.g., an NFC communication channel) with another device (e.g., payment terminal 600) is established within a defined time period from detection of the input, the secure element releases payment information to be transmitted to the other device (e.g., payment terminal 600). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some embodiments, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some embodiments, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations, and/or amounts; account status (e.g., active or frozen); and/or authorization instructions. In some embodiments, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some embodiments, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some embodiments, a secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed towards embodiments of user interfaces ("UI") and associated processes that are implemented on an electronic device, such as portable multifunction device 100, device 300, or device 500.

FIGS. 7A-7D illustrate exemplary user interfaces for managing remote data storage associated with a user account (e.g., a computer storage management account), in accordance with some embodiments. The user interfaces in these figures are used to illustrate the processes described below, including the processes in FIG. 9. In some instances, the computer storage management account may be referred to herein as a computer storage account, a data storage management account, a data storage account, or the like.

As shown in FIGS. 7A-7D, the exemplary user interfaces for managing remote data storage associated with the user account are representative of a view of the respective user interfaces on an example date (e.g., Jan. 15, 2020). In the various figures disclosed herein, a representative date is used to indicate an example date upon which the respective user interfaces are viewed, for example, as illustrated in FIGS. 7A-7D, FIGS. 8A-8AK, 10A-10H, and 11A-11R. It should be appreciated that the date is indicated as a non-limiting example to assist with understanding a sequence of events associated with the respective user interfaces and the corresponding disclosure represented using the figures.

Figure 7A:
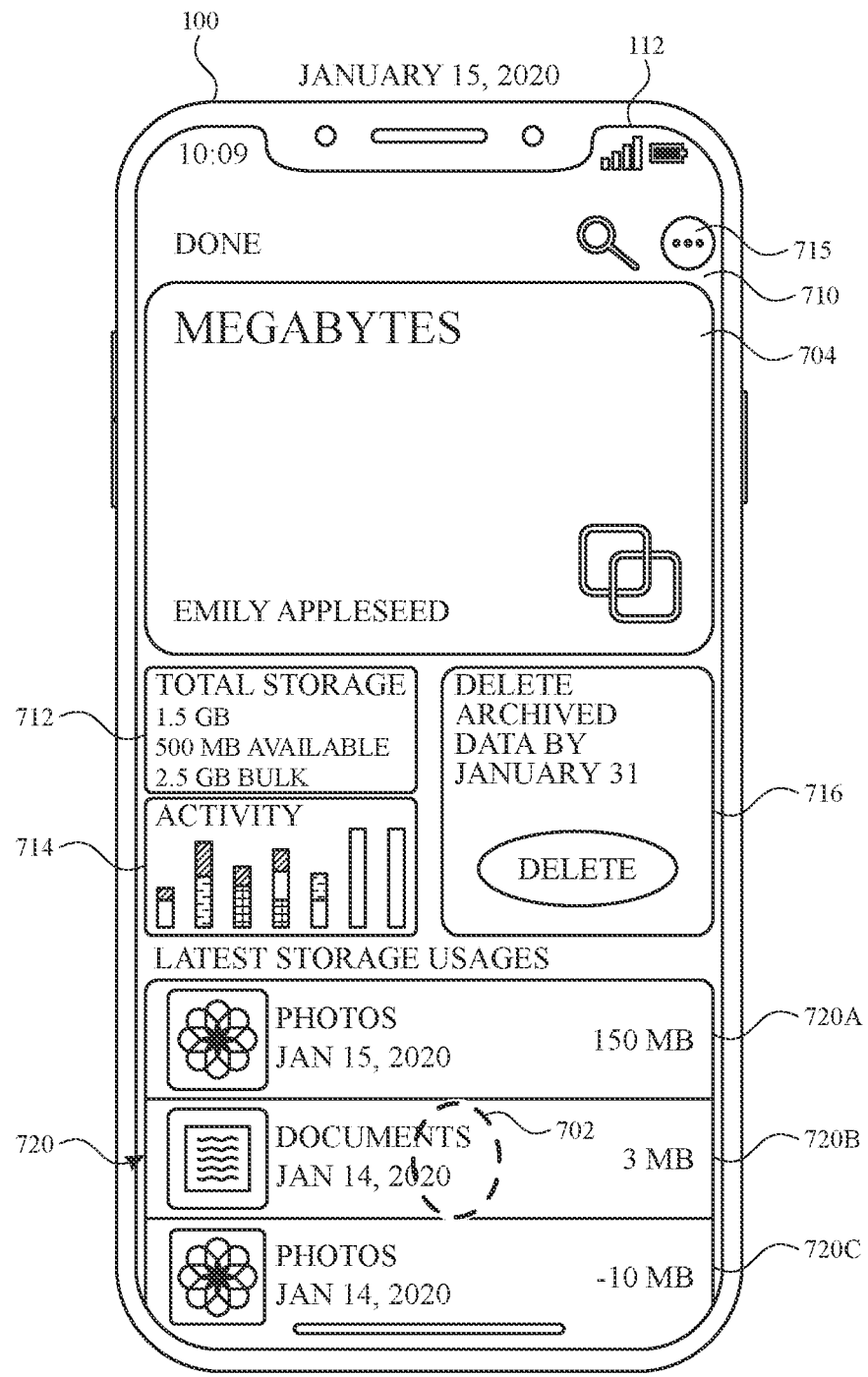
FIGS. 7A-7D illustrate exemplary user interfaces for managing remote data storage associated with a user account, in accordance with some embodiments.
Figure 8A:
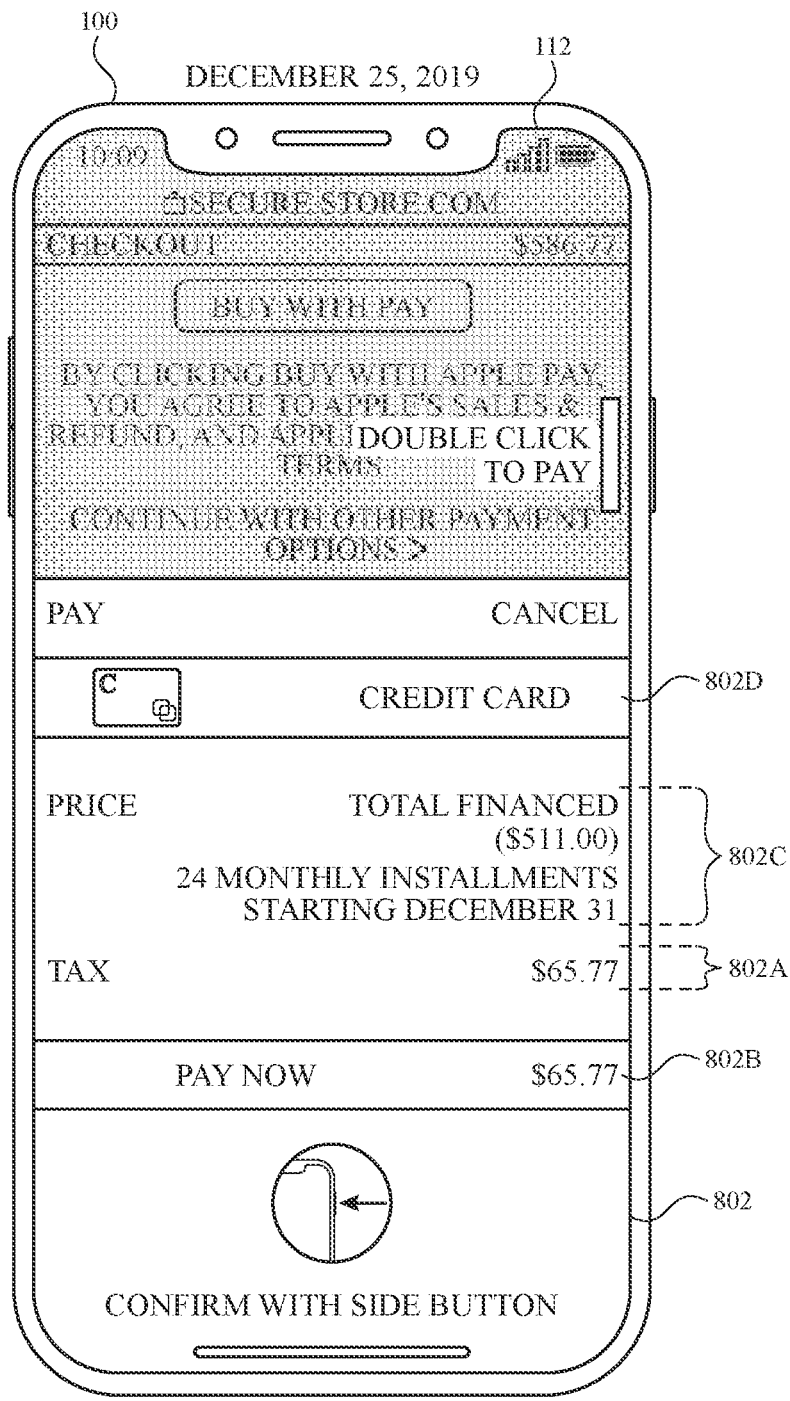
FIGS. 8A-8AK illustrate exemplary user interfaces for managing a user account, in accordance with some embodiments.

FIG. 7A illustrates an electronic device 100 with a display (e.g., touch screen 112). In FIG. 7A, electronic device 100 is displaying, on display 112, summary user interface 710. In some embodiments, summary user interface 710 includes representation 704 of the user account (e.g., a computer storage account), usage indicator user interface element 712, past usage user interface element 714, account details user interface element 715, deletion user interface element 716, and stored data list 720. In some embodiments, the term "user interface element" refers to an "affordance."

In some embodiments, the user account is a computer storage account that provides access to a predetermined amount of (e.g., cloud-based) computer storage resources. In some embodiments, the user account is used to store and/or archive data to, and delete data from, computer storage resources (e.g., remote, cloud-based computer storage resources that are not local to electronic device 100) that can be accessed via the user account. In some embodiments, the data can be different types of data, such as, for example, data corresponding to photo files, data corresponding to document files, data corresponding to music files, data corresponding to video files, and data corresponding to application files.

In some embodiments, the user account is associated with different data retention policies for managing data stored to the computer storage resources. For example, in some embodiments, a first type of data (referred to herein as "standard data") is associated with a data retention policy in which a user-selectable amount of the standard data is due for deletion on a recurring (e.g., monthly) basis. For example, the user is presented with an option to select the amount of standard data to be deleted each month, but is required to delete at least a minimum amount of the standard data (e.g., 5% of the balance of stored standard data). Standard data can include, for example, data corresponding to photo files, data corresponding to document files, data corresponding to music files, data corresponding to video files, and data corresponding to application files. In some embodiments, a second type of data (referred to herein as "bulk data") is associated with a data retention policy in which the bulk data is scheduled to be deleted in-part on a recurring basis (e.g., monthly) until the bulk data is deleted in-full. As the bulk data becomes due for deletion, the portion of bulk data for deletion is converted to standard data (e.g., added to the balance of standard data), where it is available for deletion in accordance with the data retention policy for standard data. Bulk data can include, for example, a large amount of related data such as a large photo album. In some embodiments, the data retention policies for standard data and bulk data allow for different data use quotas such as, for example, 2 GB of storage for standard data and 5 GB for bulk data.

In some embodiments, usage indicator user interface element 712 (e.g., similar to balance indicator user interface element 812 described below with reference to FIG. 8D) includes a current indication of the amount of computer storage resources (e.g., measured in megabytes (MB) or gigabytes (GB)) associated with the user account (e.g., a computer storage account) that is currently being used to store archived data, and an indication of an available amount of computer resources that are available for use, which can also represent a use quota—a predetermined limit on the amount of computer storage resources that can be used via the user account (e.g., a computer storage account)—of the user account. In FIG. 7A, a portion of the use quota of the user account (e.g., a computer storage account)—that is, a portion of the computer storage resources associated with the user account—is storing data. In the embodiment illustrated in FIG. 7A, usage indicator user interface element 712 distinguishes between data usage for standard data and bulk data by denoting "Bulk" next to the bulk data amounts. In this example, 1.5 GB of a 2.0 GB use quota is used for standard data, as indicated by usage indicator user interface element 712. Specifically, usage indicator user interface element 712 indicates (e.g., by showing "1.5 GB") that 1.5 GB of computer storage resources associated with the user account is being used for standard data, and (e.g., by showing "500 MB available") that 500 MB of computer storage resources associated with the user account remain available for use for standard data. By indicating that 1.5 GB are used and 500 MB are available, usage indicator user interface element 712 indicates that the use quota is 2 GB (the sum of 1.5 GB and 500 MB) for standard data. Usage indicator 712 also indicates (e.g., by showing "2.5 GB Bulk") that 2.5 GB of computer storage resources associated with the user account is being used for bulk data. In some embodiments, an indication of the available bulk data is optionally displayed. For example, if the use quota for bulk data is 5 GB, usage indicator 712 can optionally display "2.5 GB Bulk Available" to indicate the available balance of bulk data.

In some embodiments, past usage user interface element 714 includes a bar graph depicting the types of stored and/or archived data (e.g., data corresponding to photo files, data corresponding to document files, data corresponding to music files, data corresponding to video files, data corresponding to application files) associated with the user account (e.g., a computer storage account) that have been stored on the available computer storage resources associated with the user account during a predetermined time period (e.g., the past week), with each bar corresponding to uses of the computer storage resources associated with the user account during a respective day of the predetermined time period.

In some embodiments, account details user interface element 715 (e.g., similar to account details user interface element 815 described below with reference to FIG. 8D) can be selected to display additional details regarding the user account (e.g., a computer storage account).

In some embodiments, deletion user interface element 716 (e.g., similar to balance transfer user interface element 816 described below with reference to FIG. 8D) includes an indication of a date by which an amount of archived data of the user account (e.g., a computer storage account) should be deleted from the user account in order to avoid storage penalties (e.g., a reduction in the use quota of the user account) being levied on the user account. Features concerning deletion user interface element 716 are described in greater detail below with reference to FIGS. 10A-10H.

In some embodiments, stored data list 720 (e.g., similar to transfer items list 820 described below with reference to FIG. 8D) shows a plurality of recent user account activity corresponding to requests to store (or delete) data on the computer storage resources associated with the user account (e.g., a computer storage account). In this example, stored data list 720 includes a first past stored data item 720A corresponding to a first amount (e.g., 150 MB) of a first type of data (e.g., data corresponding to photo files) being stored on the computer storage resources associated with the user account (e.g., a computer storage account). In this example, stored data list 720 also includes a second past stored data item 720B corresponding to a second amount (e.g., 3 MB) of a second type of data (e.g., data corresponding to document files) being stored on the computer storage resources associated with the user account (e.g., a computer storage account).

As shown in FIG. 7A, each of the requests to store the data items includes a date indicating, for example, a date upon which the request was made to store or delete (or when the respective storage or deletion operation was completed) the respective data item to the computer storage resources associated with the user account.

In some embodiments, items in the stored data list 720 can represent a past stored data item that was deleted (or requested for deletion) from the computer storage resources associated with the user account. For example, stored data list 720 includes third past stored data item 720C corresponding to a third amount (e.g., 10 MB) of the first type of data (e.g., data corresponding to photo files) that was requested for deletion from the computer storage resources associated with the user account.

As shown in FIG. 7A, device 100 detects input 702 (e.g., a tap gesture) at a location corresponding to second past stored data item 720B. In response, device 100 displays, in FIG. 7B, data type summary user interface 725 (e.g., similar to merchant user interface 836 described below with reference to FIG. 8K). In this example, data type summary user interface 725 corresponds to a data type summary user interface for data corresponding to document files (e.g., data of the second type), which is the data type of second past stored data item 720B selected in FIG. 7A.

Figure 7B:
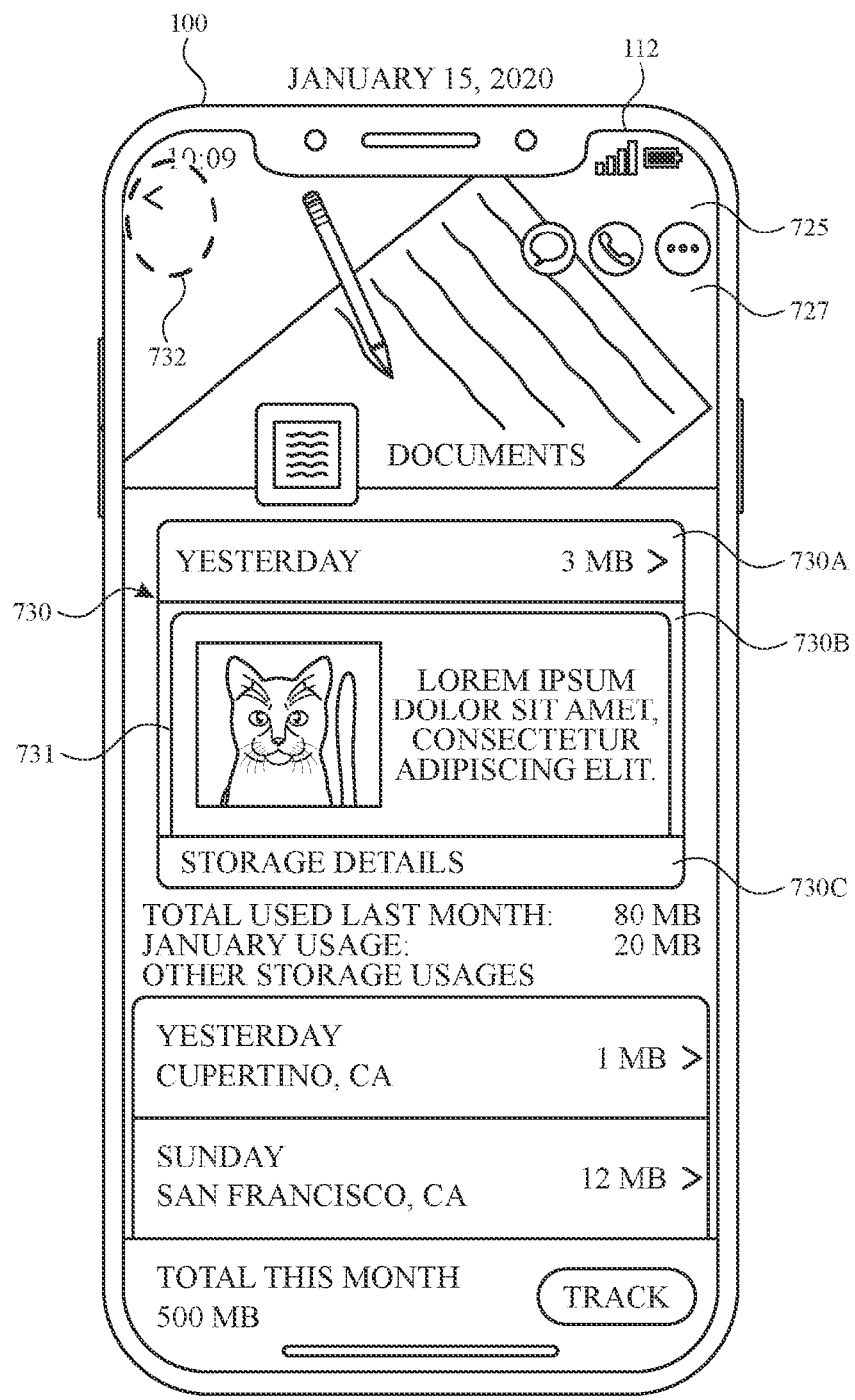

As shown in FIG. 7B, data type summary user interface 725 includes representation 727 of a document file data type, which optionally corresponds to an app for viewing/editing/creating data of the document file data type (e.g., word processing documents, PDF documents, etc.).

In some embodiments, data type summary user interface 725 also includes data item details user interface element 730, which provides details relating to second past stored data item 720B selected in FIG. 7A. As shown in FIG. 7B, item details user interface element 730 includes a first portion 730A that shows details for the second past stored data item 720B such as, for example, an indication of the data size (e.g., 3 MB) of the second past stored data item 720B and when (e.g., "yesterday") the second past stored data item 720B was stored to (or deleted from) the computer storage resources associated with the user account. In some embodiments, first portion 730A can be selected to view additional details relating to the request to store (or delete) second past stored data item 720B.

Item details user interface element 730 also includes second portion 730B that shows image 731 of the document (e.g., second past stored data item 720B) that was stored to (or deleted from) the computer storage resources associated with the user account. In some embodiments, image 731 is an accurate (e.g., exact or substantially similar) visual representation of the stored document, including text, images, or any other content that is visible in the stored document. In other words, image 731 is a visual representation of the document that illustrates what a user would see if the user were to open and view the document that is requested for being stored (or deleted) at the computer storage resources associated with the user account.

In some embodiments, item details user interface element 730 also includes third portion 730C that provides an option for viewing additional details relating to the request to store (or delete) second past stored data item 720B at the computer storage resources associated with the user account.

Figure 7C:
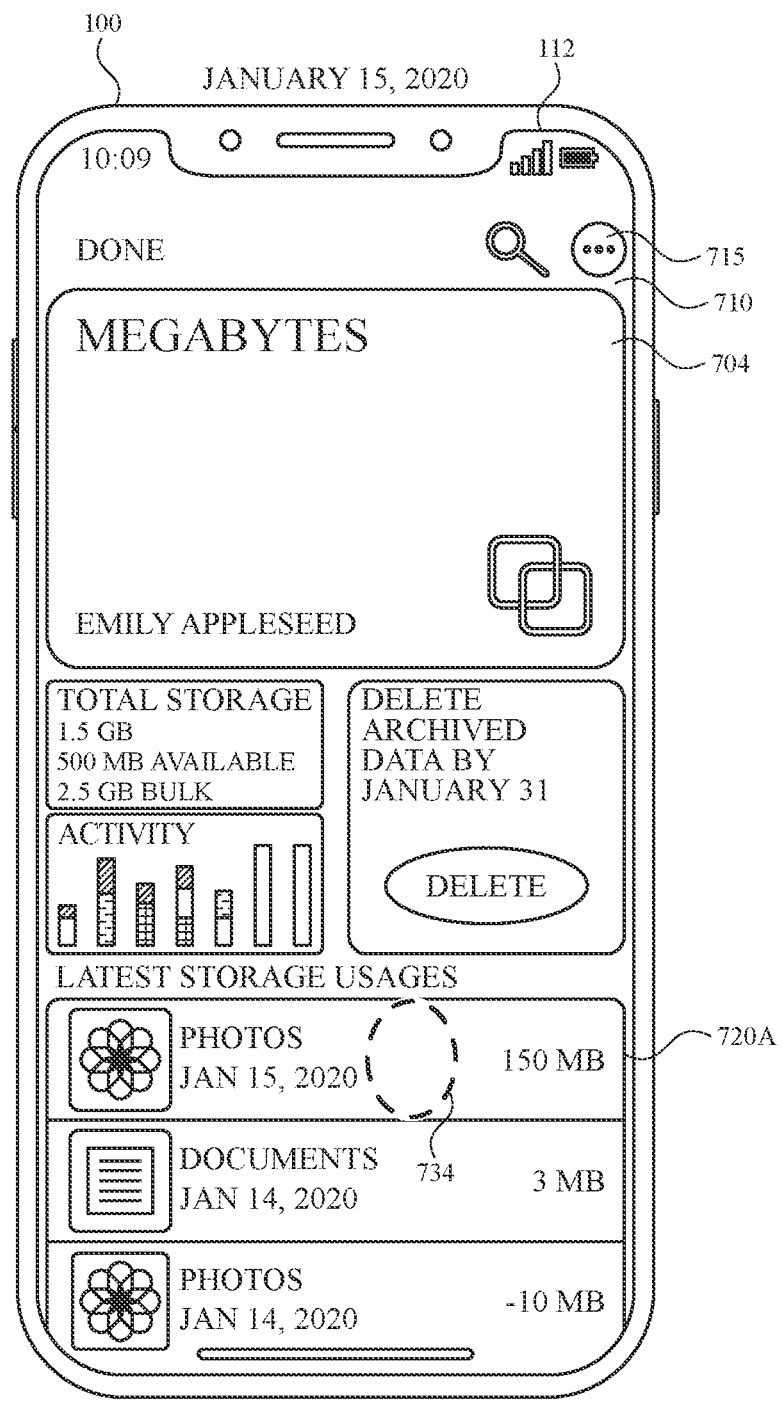

As shown in FIG. 7B, device 100 detects input 732 and, in response, returns to summary user interface 710, as shown in FIG. 7C.

In FIG. 7C, device 100 detects input 734 on first past stored data item 720A. In response, device 100 displays, in FIG. 7D, data type summary user interface 725. In this example, data type summary user interface 725 corresponds to a data type summary user interface for data corresponding to photo files (e.g., data of the first type), which is the data type of first past stored data item 720A selected in FIG. 7C.

Figure 7D:
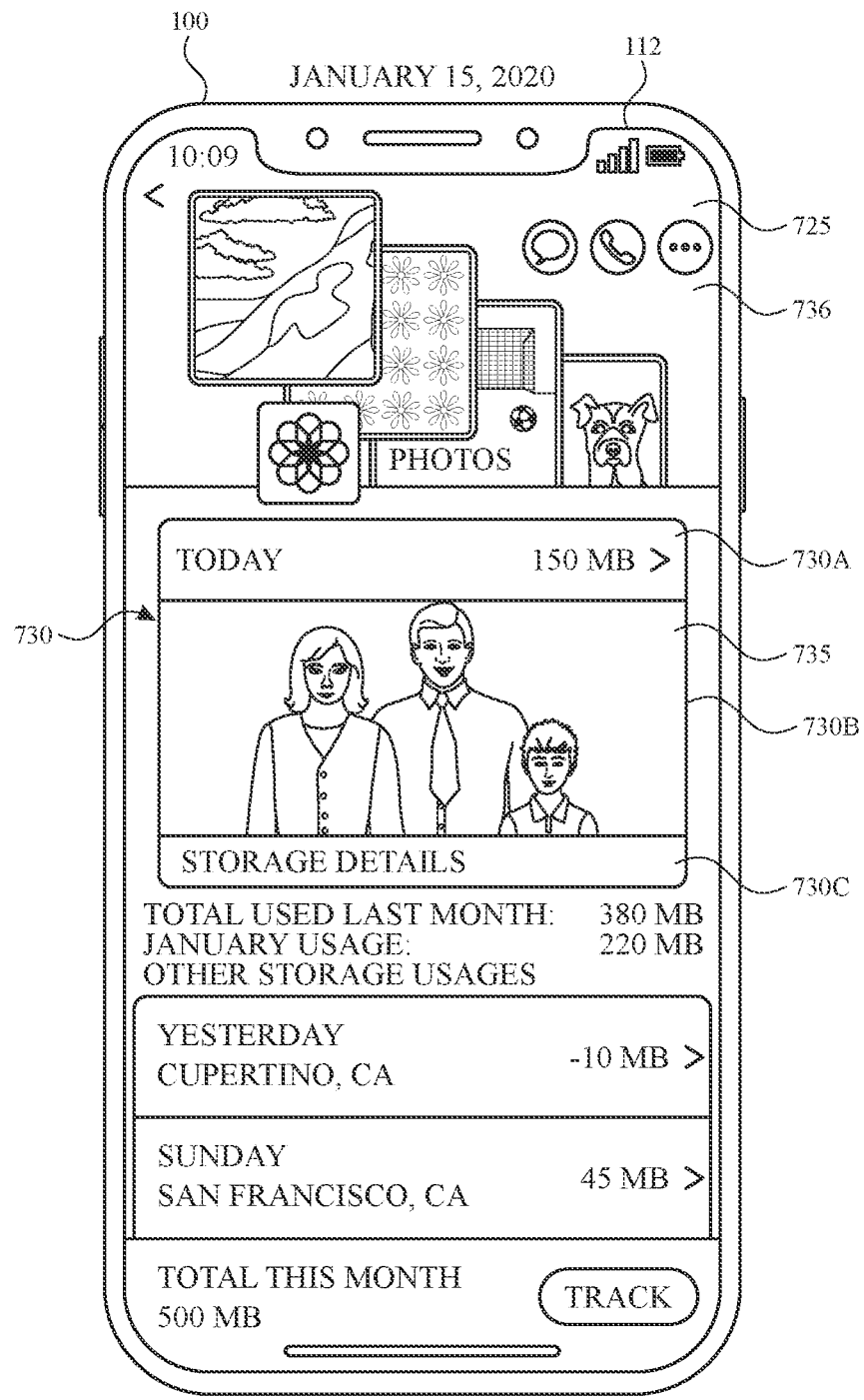

In FIG. 7D, data type summary user interface 725 includes representation 736 of a photo file data type, which optionally corresponds to an app for viewing/editing/creating data of the photo file data type (e.g., images, photographs).

In FIG. 7D, data type summary user interface 725 includes data item details user interface element 730, which is shown updated to provide details relating to first past stored data item 720A selected in FIG. 7C. As shown in FIG. 7D, first portion 730A shows details for first past stored data item 720A such as, for example, an indication of the data size (e.g., 150 MB) of first past stored data item 720A and when (e.g., "today") first past stored data item 720A was stored to (or deleted from) the computer storage resources associated with the user account. In some embodiments, first portion 730A can be selected to view additional details relating to the request to store (or delete) first past stored data item 720A.

Item details user interface element 730 also includes second portion 730B that shows image 735 of the photo (e.g., first past stored data item 720A) that was stored to (or deleted from) the computer storage resources associated with the user account. In some embodiments, image 735 is an accurate (e.g., exact or substantially similar) visual representation of the stored photo, including content that is visible in the stored photo. In other words, image 735 is a visual representation of the photo that illustrates what a user would see if the user were to open and view the photo that is requested for being stored at the computer storage resources associated with the user account.

In some embodiments, item details user interface element 730 also includes third portion 730C that provides an option for viewing additional details relating to the request to store (or delete) first past stored data item 720C at the computer storage resources associated with the user account.

FIGS. 8A-8AK illustrate exemplary user interfaces for managing a user account (e.g., a transfer account), in accordance with some embodiments. The user interfaces in these figures are used to illustrate the processes described below, including the processes in FIG. 9.

In some embodiments, the user account is a transfer account. In some embodiments, the transfer account is a first-party credit account (e.g., a revolving credit account that is issued or branded by, for example, the manufacturer of the electronic device), and provides rewards (e.g., cash back rewards, bonus points rewards) based on the amount of transfers (e.g., payment transactions, points transfers) made using the transfer account (e.g., cash back rewards that are based on a certain percentage of the value of each transaction). In some embodiments, the transfer account is a points account (e.g., for meal points, for printer credits, for membership points) that provides rewards (e.g., points rewards) based on the amount of points used using the transfer account.

FIG. 8A illustrates device 100 with a display (e.g., touch screen 112). In FIG. 8A, device 100 is displaying, on display 112, purchase confirmation user interface 802, which is displayed to provide a user interface to allow a user to initiate a transfer to acquire (e.g., purchase) an item. In the example illustrated in FIG. 8A, the purchase (e.g., transfer) is broken into two payment transactions (e.g., transfers). The first payment transaction is a standard payment transaction in which a first portion of the purchase is satisfied by immediate (or nearly immediate) payment (e.g., via transfer of credit) via the transfer account (e.g., the first portion is charged/billed/etc. to the transfer account). In the example shown in FIG. 8A, tax portion 802A (e.g., $65.77) of the purchase is due for immediate payment, as indicated by pay now portion 802B. The second payment transaction is an installment plan in which the installed portion of the purchase (e.g., a financed amount) is satisfied by an accumulation of equal portions of the installed (e.g., financed) amount of the purchase that are satisfied on a repeating (e.g., monthly) basis until the installed balance is satisfied in-full. In the embodiments discussed herein, each portion of the installed amount is referred to as an installment, and a transfer for satisfying an installment is referred to herein as an installment transfer or installment transaction. The installment plan can be said to be satisfied in-part with each paid installment. When all installments are satisfied, the installment plan is satisfied (e.g., paid) in-full. In the embodiment illustrated in FIG. 8A, terms of the installment plan are indicated at installment portion 802C, which shows that the financed amount is $511 broken into twenty-four monthly installments (e.g., of approximately $21.30 each) that commence on December 31. In other words, the first installment (an equal portion of $511) is billed to the transfer account on December 31. Payment source portion 802D indicates that the purchase (e.g., $65.77 due now and the installment plan) are charged to "Credit Card," which is associated with the transfer account. In other words, purchases charged to "credit card" are satisfied by a transfer of credit from the transfer account. In some embodiments, installment transfers charged to the transfer account do not accrue interest, and non-installment transfers are subject to interest.

Figure 8B:
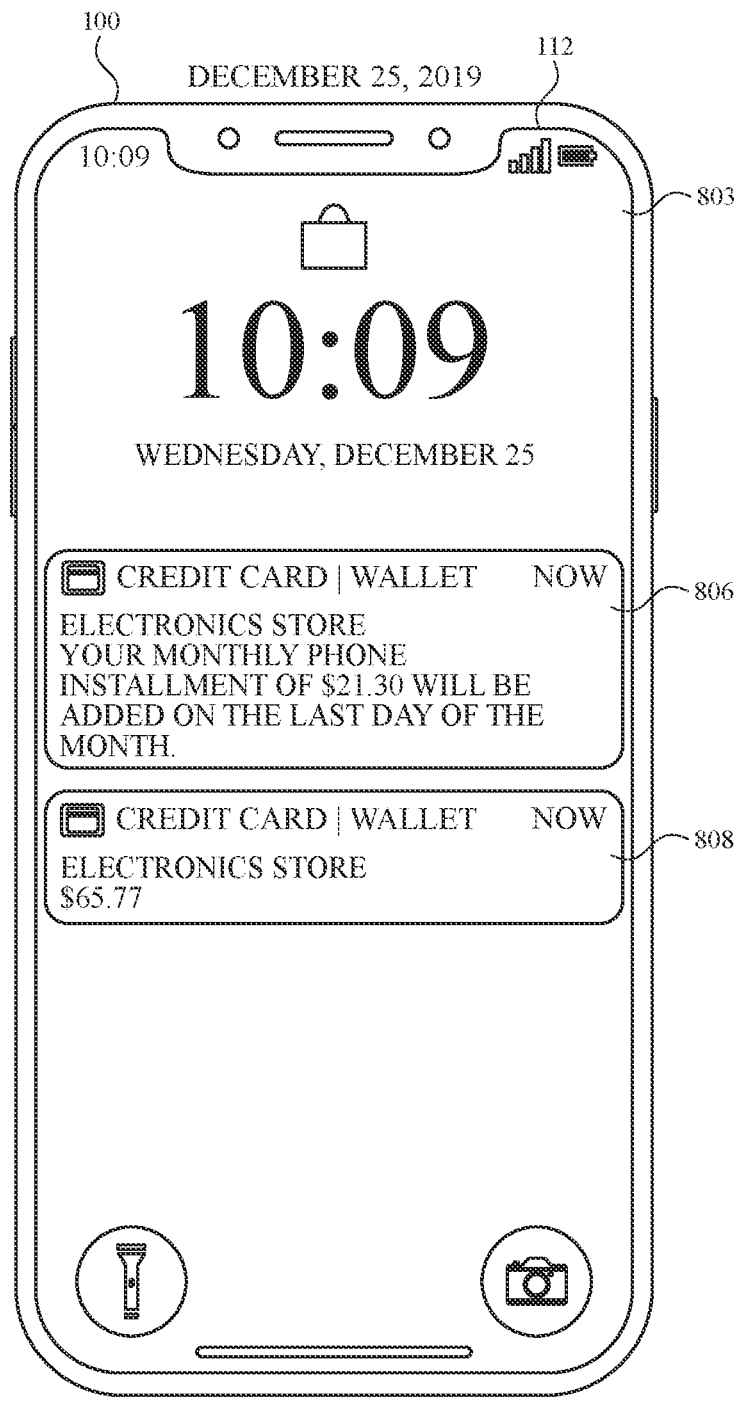

Referring now to FIG. 8B, home screen user interface 803 is displayed showing notification 806 and notification 808. In some embodiments, notification 806 and notification 808 are generated for display after initiating the purchase shown in FIG. 8A (e.g., by double-pressing a button on the side of device 100 while displaying purchase confirmation user interface 802).

Notification 806 provides information regarding the installment plan associated with the phone purchase in FIG. 8A. For example, as shown in FIG. 8B, notification 806 indicates the name of the merchant (e.g., Electronics Store), the purchased product (e.g., phone), the account to which the purchase was charged (e.g., Credit Card (the transfer account)), and terms of the installment plan including the installment amount (e.g., $21.30), frequency (e.g., monthly), and date upon which the first or next installment will be charged to the transfer account (e.g., at the end of the month).

Notification 808 provides information regarding the non-installed portion of the phone purchase in FIG. 8A. Specifically, notification 808 indicates the name of the merchant (e.g., Electronics Store), the account to which the purchase was charged (e.g., Credit Card (the transfer account)), and the amount charged to the account (e.g., $65.77). Because the transaction is not an installment transaction, the $65.77 is charged to the transfer account without substantial delay.

Figure 8C:
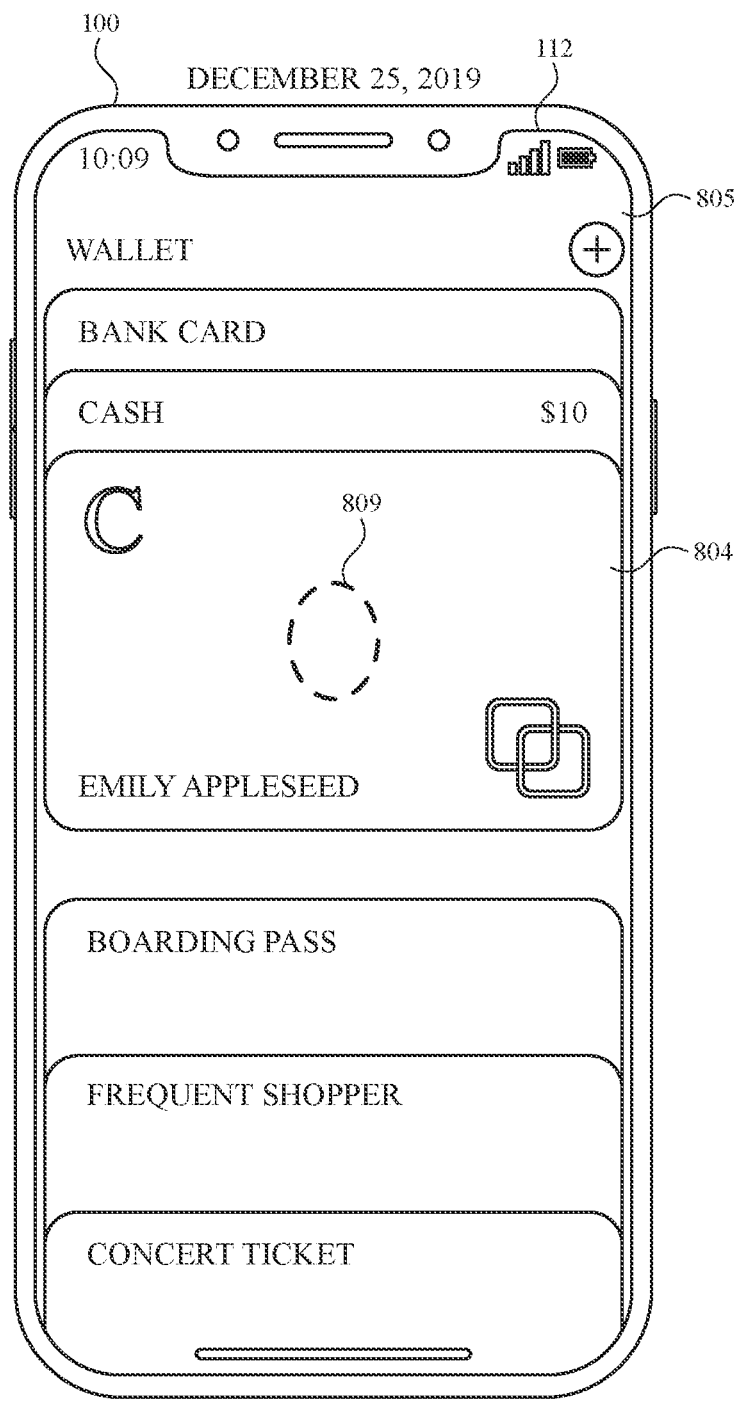

In some embodiments, notification 806 or notification 808 can be selected to display a user interface associated with the transaction that prompted the notification such as, for example a merchant user interface (e.g., merchant user interface 836 illustrated in FIG. 8K), an account summary user interface (e.g., summary user interface 810 illustrated in FIG. 8D), or a virtual wallet user interface (e.g., virtual wallet user interface 805 illustrated in FIG. 8C).

In FIG. 8C, device 100 is displaying, on display 112, virtual wallet user interface 805, which is a user interface of a transfer application (e.g., an electronic or virtual wallet application). In some embodiments, virtual wallet user interface 805 is displayed in response to detecting an input on a notification such as, for example, notification 806 or notification 808. In some embodiments, virtual wallet user interface 805 includes representation 804 of the transfer account. In some embodiments, virtual wallet user interface 805 includes representations of different accounts provisioned on the electronic device, including: different transfer accounts (e.g., payment accounts, such as a third-party credit card account, a debit card account, and/or a stored-value account; points accounts; rewards accounts), first-party manufacturer-issued (or branded) stored-value accounts, and other accounts (e.g., other transfer accounts, points cards, rewards cards), ID cards (e.g., student ID, government-issued ID), and/or tickets (e.g., event ticket, boarding pass ticket) provisioned on or linked to electronic device 100.

Figure 8D:
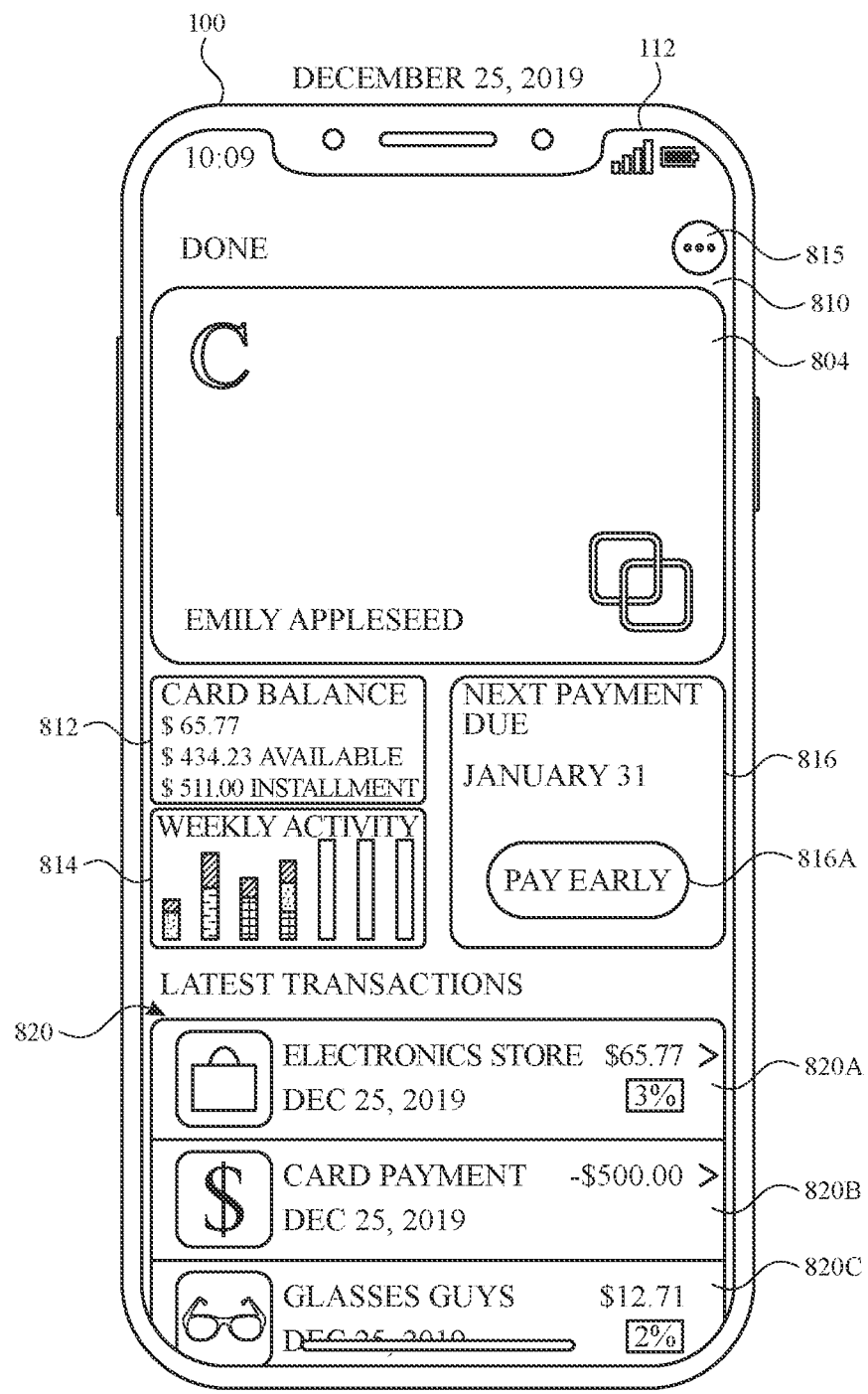

In FIG. 8C, device 100 detects input 809 on representation 804 of the transfer account and, in response, displays summary user interface 810 (e.g., a dashboard user interface) for the transfer account in FIG. 8D.

In the embodiment shown in FIG. 8D, summary user interface 810 includes representation 804 of the user account (e.g., transfer account), balance summary user interface element 812 (e.g., a balance module), recent transaction activity user interface element 814 (e.g., an activity module), account details user interface element 815, balance transfer user interface element 816 (e.g., a balance payment module), and transfer items list 820 (e.g., transaction history). In some embodiments, summary user interface 810 also includes a notification user interface element (e.g., notification user interface element 818 in FIG. 8G).

Balance summary user interface element 812 provides a current indication of a current balance of the transfer account including, in some embodiments, an indication of an installment balance for an installment plan associated with the transfer account. In FIG. 8D, balance summary user interface element 812 indicates that the current balance of the transfer account (e.g., the card balance) is $65.77, an available balance (e.g., available credit) amount for the account is $434.23, and an installment balance of $511 is currently outstanding. In FIG. 8D, the card balance of $65.77 corresponds to the tax portion of the purchase in FIG. 8A, and the transfer account has a credit limit of $500 (calculated as the sum of the current balance of $65.77 and the available balance of $434.23). The installment balance of $511 corresponds to the balance of the installment plan upon purchase of the item in FIG. 8A. The user interface in FIG. 8D is shown on Dec. 25, 2019. Thus, FIG. 8D shows the card balance and installment balance before the first installment for the installment plan is charged to the transfer account, which is scheduled to occur on December 31, as indicated in FIGS. 8A and 8B.

In some embodiments, activity user interface element 814 (e.g., the activity module) includes a bar graph depicting transfer activity (e.g., payment activity) of the transfer account (e.g., the first-party credit account; the points account) during a predetermined time period (e.g., the past week), with each bar corresponding to transfers (e.g., payment transactions, points transfers) made during a respective day of the predetermined time period, and different colors used to represent different types of transfers based on a category of each transfer.

In some embodiments, balance transfer user interface element 816 (e.g., the balance payment module) includes an indication (e.g., text) of when a next balance transfer (e.g., a balance payment) is due (e.g., the next statement due date) for the transfer account (e.g., the first-party credit account; the points account). In some embodiments, if a balance transfer is past due (e.g., at least a portion of a previous statement balance was not paid by the due date), balance transfer user interface element 816 includes an indication that a balance transfer is past due. In some embodiments, if a portion (but not all of) the next balance transfer has been made (e.g., a portion of, but not all of, the statement balance has been paid), balance transfer user interface element 816 includes an indication of an amount of the portion of the balance transfer that was made. In some embodiments, balance transfer user interface element 816 includes an indicator 816A indicating (e.g., with text such as "pay," "pay early," "pay more," and/or symbols such as a checkmark or an exclamation mark) a status of a balance transfer (e.g., whether a balance payment is currently due, whether a balance payment is urgently due, whether a balance payment has been made). In FIG. 8D, indicator 816A displays "pay early," indicating that a balance transfer (e.g., payment towards the account balance) can be applied to the transfer account balance, but that a balance transfer is not currently due. Features concerning balance transfer user interface element 816 are described in greater detail below with reference to FIGS. 11A-11R.

In some embodiments, electronic device 100 also displays, in summary user interface 810, a notification user interface element (e.g., a notification module) that displays notifications or promotions concerning the transfer account (e.g., the first-party credit account; the points account) and, optionally, an affordance (e.g., stating "Get Help") for seeking assistance (e.g., contacting customer service) with use of the transfer account. An example of a notification user interface element is illustrated in FIG. 8G, and described in greater detail below.

In the embodiment shown in FIG. 8D, a plurality of transfers (e.g., payment transactions, points transfers) have been previously performed using the transfer account (e.g., the first-party credit account; the points account). Thus, electronic device 100 displays, in summary user interface 810, transfer items list 820 (also referred to as a transactions items list) of single transfer items (e.g., single transaction items) and/or group transfer items (e.g., group transaction items), where a single transfer item corresponds to a single past transfer (e.g., a single past payment transaction, a single past points transfer) made using the transfer account, and a group transfer item corresponds to a plurality of past transfers (e.g., a plurality of past payment transactions, a plurality of past points transfers) of a shared category (e.g., shopping, groceries, dining, travel, education, entertainment) made using the transfer account. In some embodiments, items in transfer items list 820 are arranged in chronological order such that the item corresponding to the most recent transfer (e.g., the most recent payment transaction, the most recent points transfer) is displayed at the top of the list. For example, in FIG. 8D, transfer items list 820 shows first transfer item 820A (e.g., corresponding to the tax payment transaction made at Electronics Store when purchasing the phone in FIG. 8A), second transfer item 820B (e.g., corresponding to a balance transfer (e.g., credit) applied to the balance of the transfer account), and third transfer item 820C (e.g., corresponding to a payment transaction made at Glasses Guys), where first transfer item 820A corresponds to the most recent transfer (e.g., the most recent payment transaction, the most recent points transfer) made using the transfer account (e.g., the first-party credit account; the points account), and third transfer item 820C corresponds to the oldest transfer made using the transfer account.

Figure 8E:
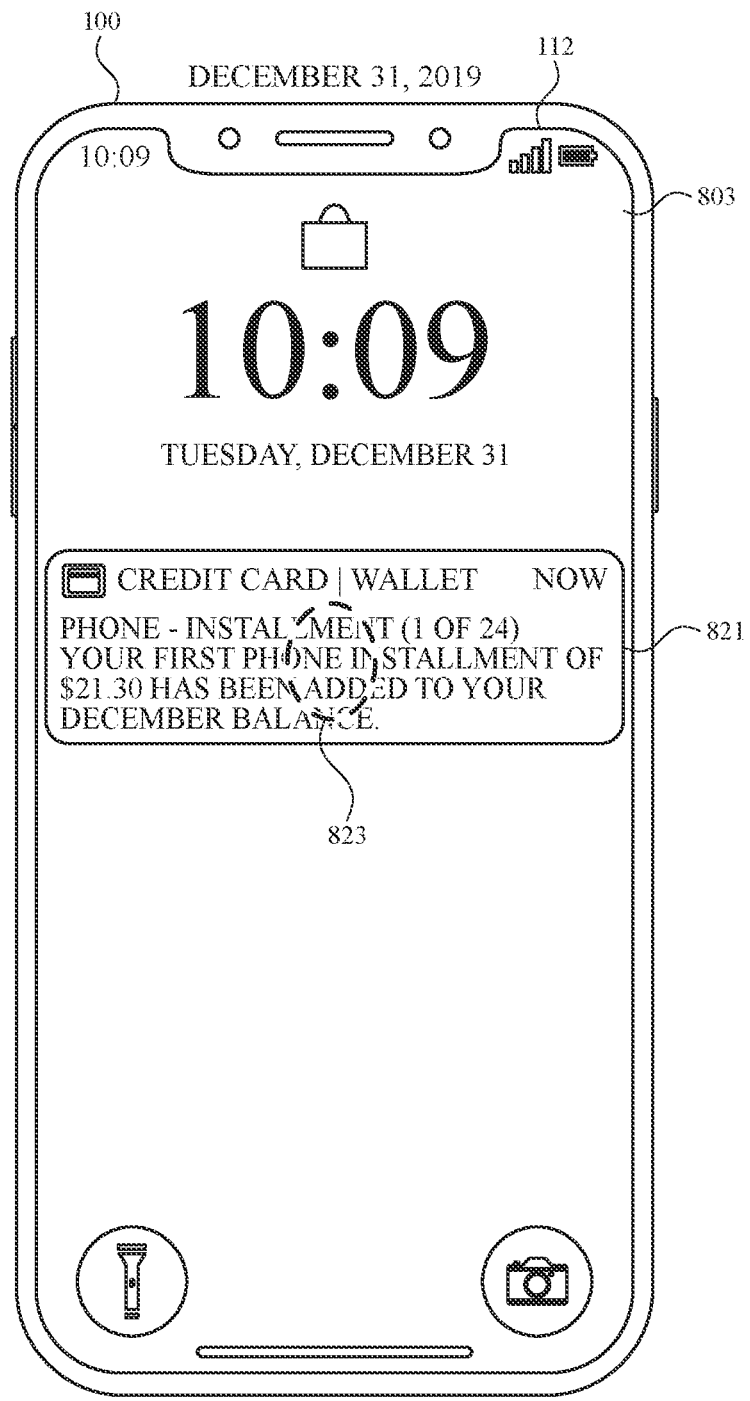

Referring now to FIG. 8E, device 100 displays home screen UI 803. Home screen UI 803 is displayed on Dec. 31, 2019, and first installment notification 821 is displayed indicating the first installment of the installment plan has been added (e.g., charged) to the December balance for the transfer account. Specifically, first installment notification 821 indicates the purchased product (e.g., phone), the account to which the installment was added (e.g., Credit Card (the transfer account)), and details of the installment transaction including the installment amount (e.g., $21.30), the month balance affected by the addition of the installment (e.g., December balance), date upon which the installment was charged to the transfer account (e.g., now), and the sequence of the installment in the installment plan (e.g., 1 of 24).

Figure 8F:
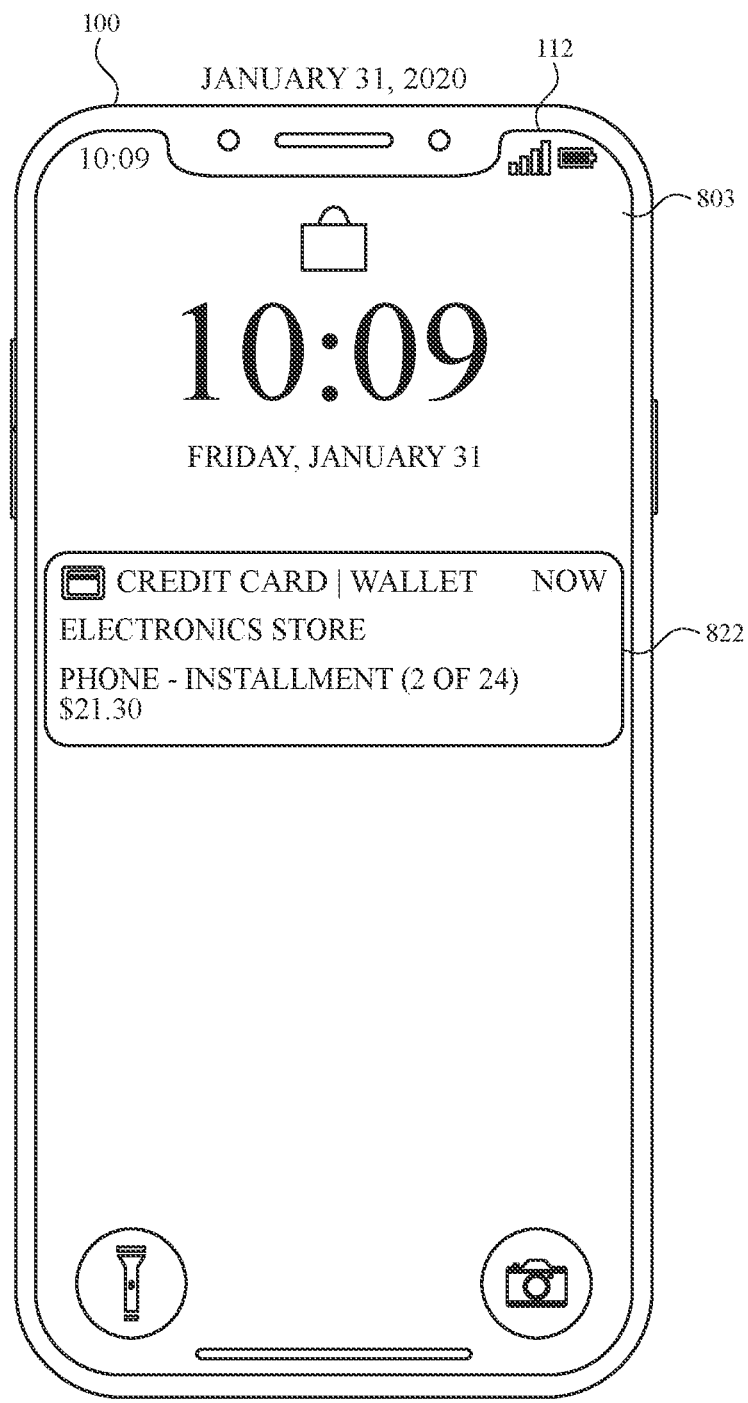
Figure 8G:
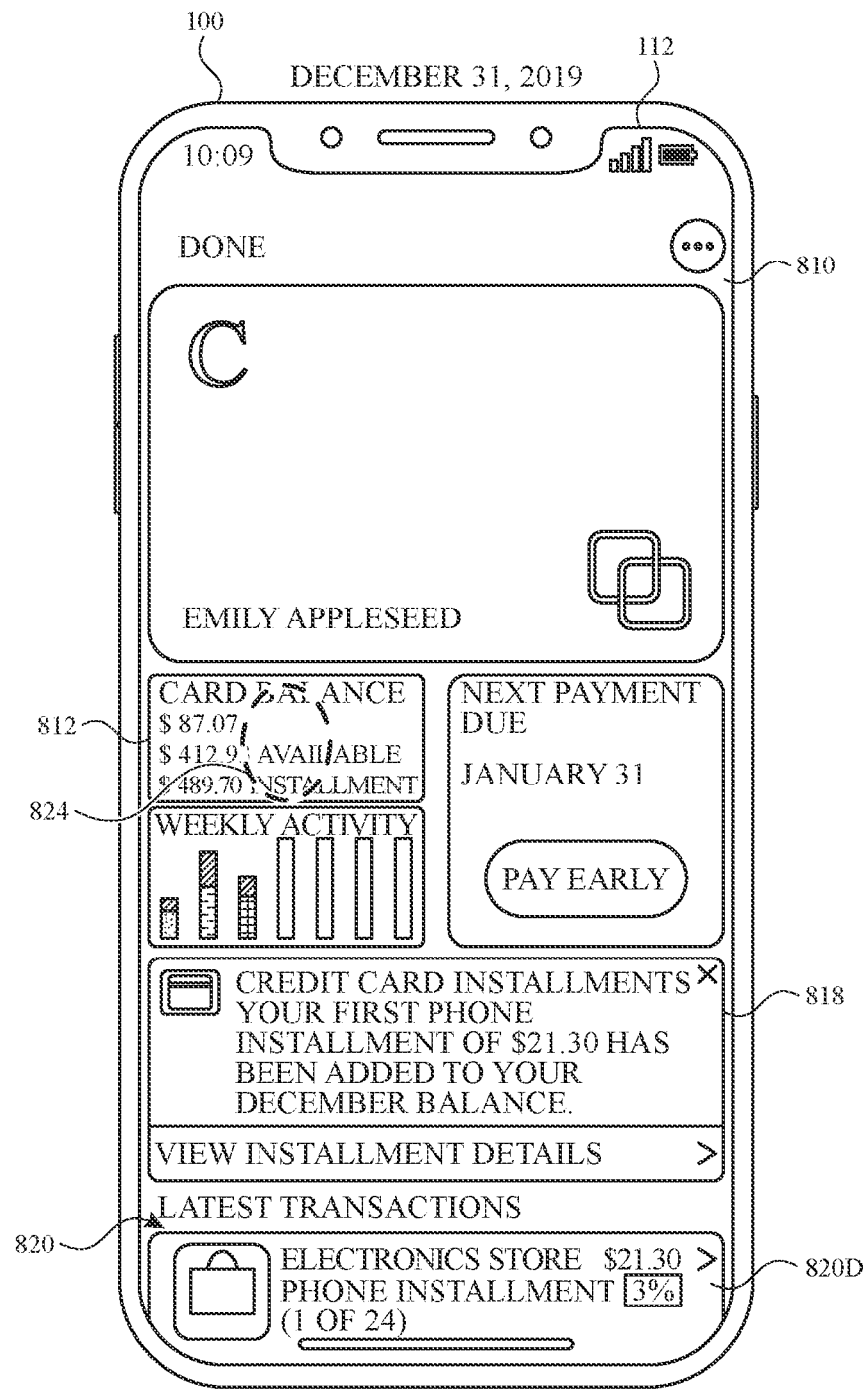

In some embodiments, a similar notification is generated each time the installment is added to the transfer account (e.g., monthly until the installment plan is paid off). In some embodiments, subsequent notifications for the installment can include different details than shown in first installment notification 821. For example, in FIG. 8F, second installment notification 822 is generated on Jan. 31, 2020, when the second installment is added to the transfer account. Second installment notification 822 indicates the purchased product (e.g., phone), the merchant (e.g., Electronics Store), the account to which the installment was added (e.g., Credit Card (the transfer account)), the installment amount (e.g., $21.30), the date upon which the installment was charged to the transfer account (e.g., now), and the sequence of the installment in the installment plan (e.g., 2 of 24). In comparison to first installment notification 821, second installment notification 822 adds the merchant, but omits the month balance affected by the addition of the installment.

Referring again to FIG. 8E, device 100 detects input 823 on first installment notification 821 and, in response, displays summary user interface 810 in FIG. 8G.

In FIG. 8G, balance summary user interface element 812 is updated to show a balance of $87.07, which is the sum of the prior balance (e.g., $65.77) plus the new installment transaction ($21.30). Consequently, installment balance is reduced by the amount of the installment transaction, showing an installment balance of $489.70. Additionally, notification user interface element 818 is displayed indicating the first installment of $21.30 was added to the current month's balance for the transfer account, and transfer items list 820 is updated to include fourth transfer item 820D corresponding to the installment transaction of $21.30. In some embodiments, notification user interface element 818 includes an option to view details of the installment. As shown in FIG. 8G, fourth transfer item 820D shows details of the transfer, including an indication of the merchant (Electronics Store), an identification of the installment plan (phone installment), the amount of the installment transfer, the sequence of the installment (1 of 24), and, optionally, an indication of a reward (e.g., 3% of the transfer amount) associated with the transfer.

Figure 8H:
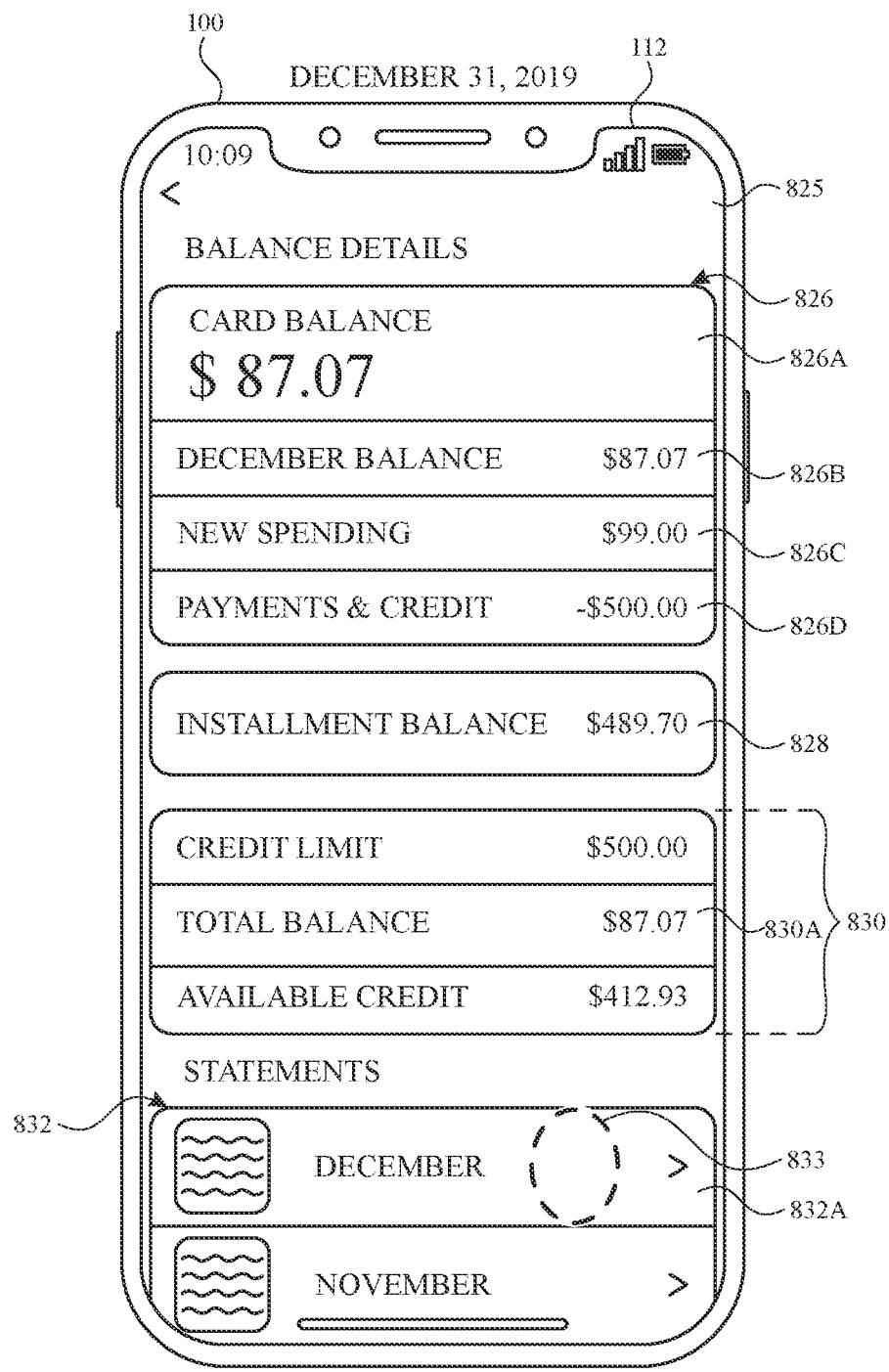

In FIG. 8G, device 100 detects input 824 on balance summary user interface element 812 and, in response, displays balance details user interface 825 in FIG. 8H.

As shown in FIG. 8H, balance details user interface 825 includes card balance details 826, which provides details for the current balance of the transfer account. For example, in FIG. 8H, card balance details 826 includes current card balance 826A, month balance 826B, new spending 826C, and credit 826D. In some embodiments, card balance 826A is the total outstanding balance of transfers charged to the transfer account (offset by credit 826D), month balance 826B is the statement balance for the current month (e.g., the amount due for this month's balance transfer), new spending 826C is the total amount of transfers charged to the transfer account for the current month, and credit 826D is any balance transfers (e.g., payoff, credit) applied to the transfer account during the current month.

Balance details user interface 825 further includes installment balance 828 and credit data 830, which indicates the credit limit for the transfer account, the balance 830A on the transfer account, and the amount of credit available for the transfer account. In some embodiments, balance 830A represents the card balance (e.g., card balance 826A). In some embodiments, balance 830A represents the sum of the card balance (e.g., card balance 826A) and the outstanding installment balance 828.

Figure 8I:
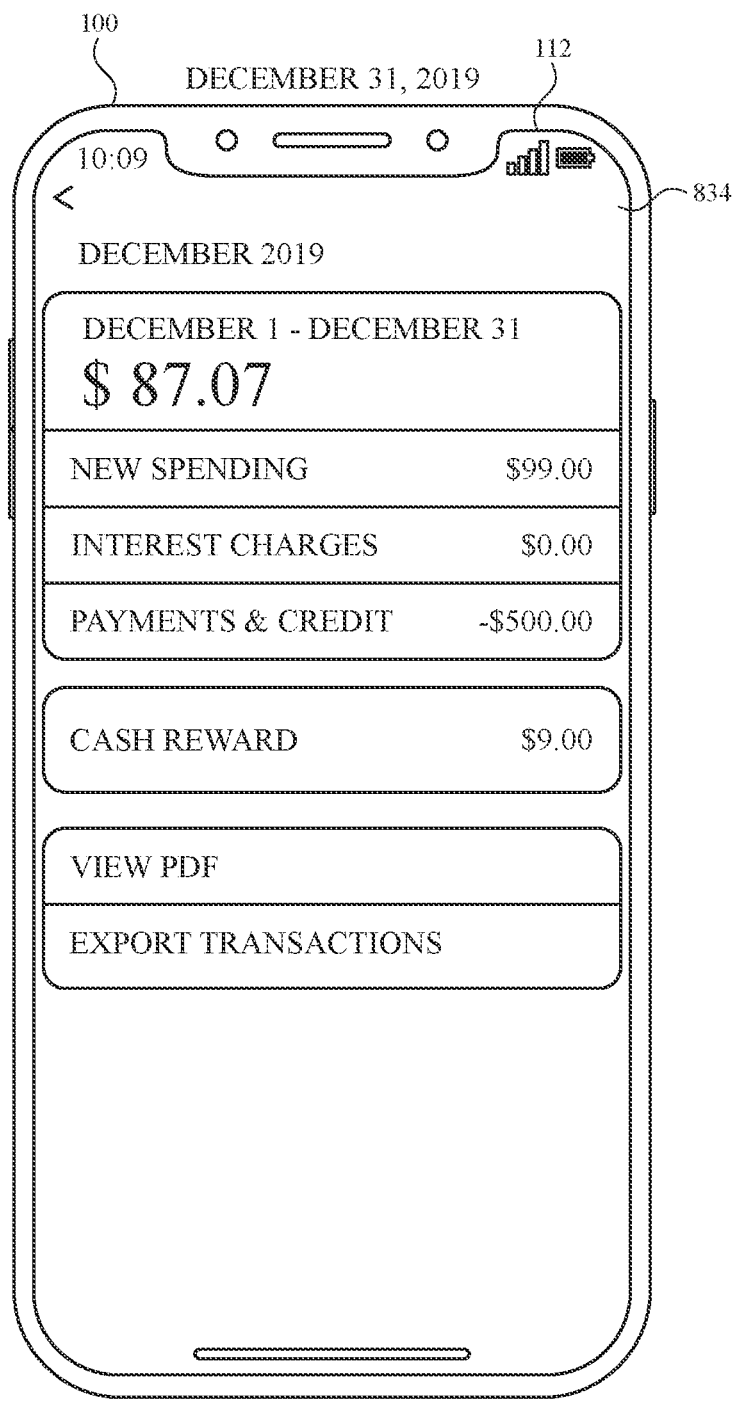

Balance details user interface 825 further includes statements 832. In FIG. 8H, device 100 detects input 833 on December statement 832A, which is the current statement for the month, and, in response, displays statement user interface 834 in FIG. 8I. In some embodiments, statement user interface 834 illustrates details for the current month's statement including, for example, the statement balance, the date range, new spending for the month, interest charged to the transfer account for the month, payment and credit applied to the transfer account for the month, and rewards (e.g., cash rewards) earned for the month.

Figure 8J:
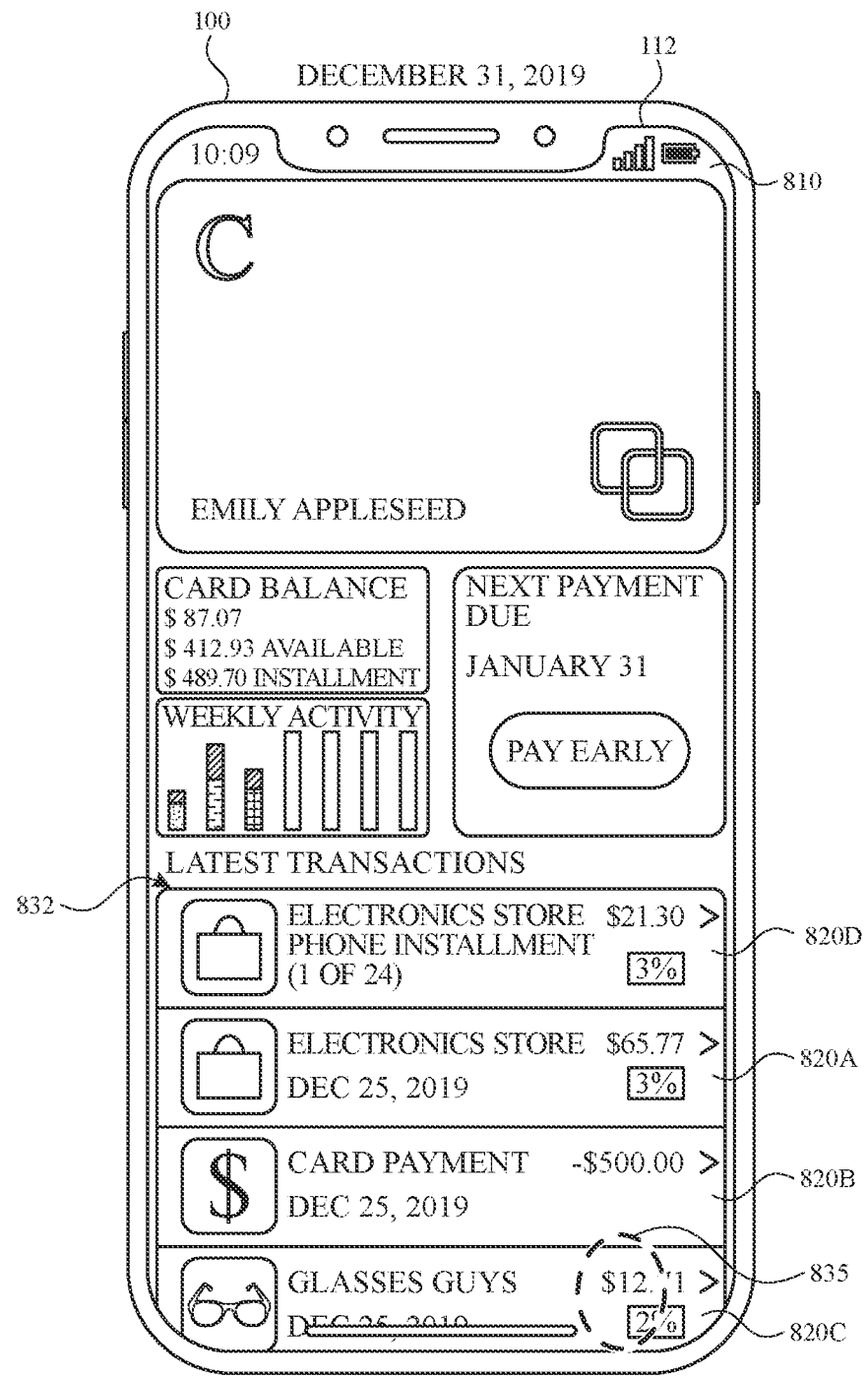

Referring now to FIG. 8J, device 100 displays summary user interface 810 similar to that shown in FIG. 8G, but without notification user interface element 818, and with transfer items list 820 expanded to show transfer items 820A-820D. As shown in FIG. 8J, device 100 detects input 835 on third transfer item 820C and, in response, displays merchant user interface 836 in FIG. 8K.

Figure 8K:
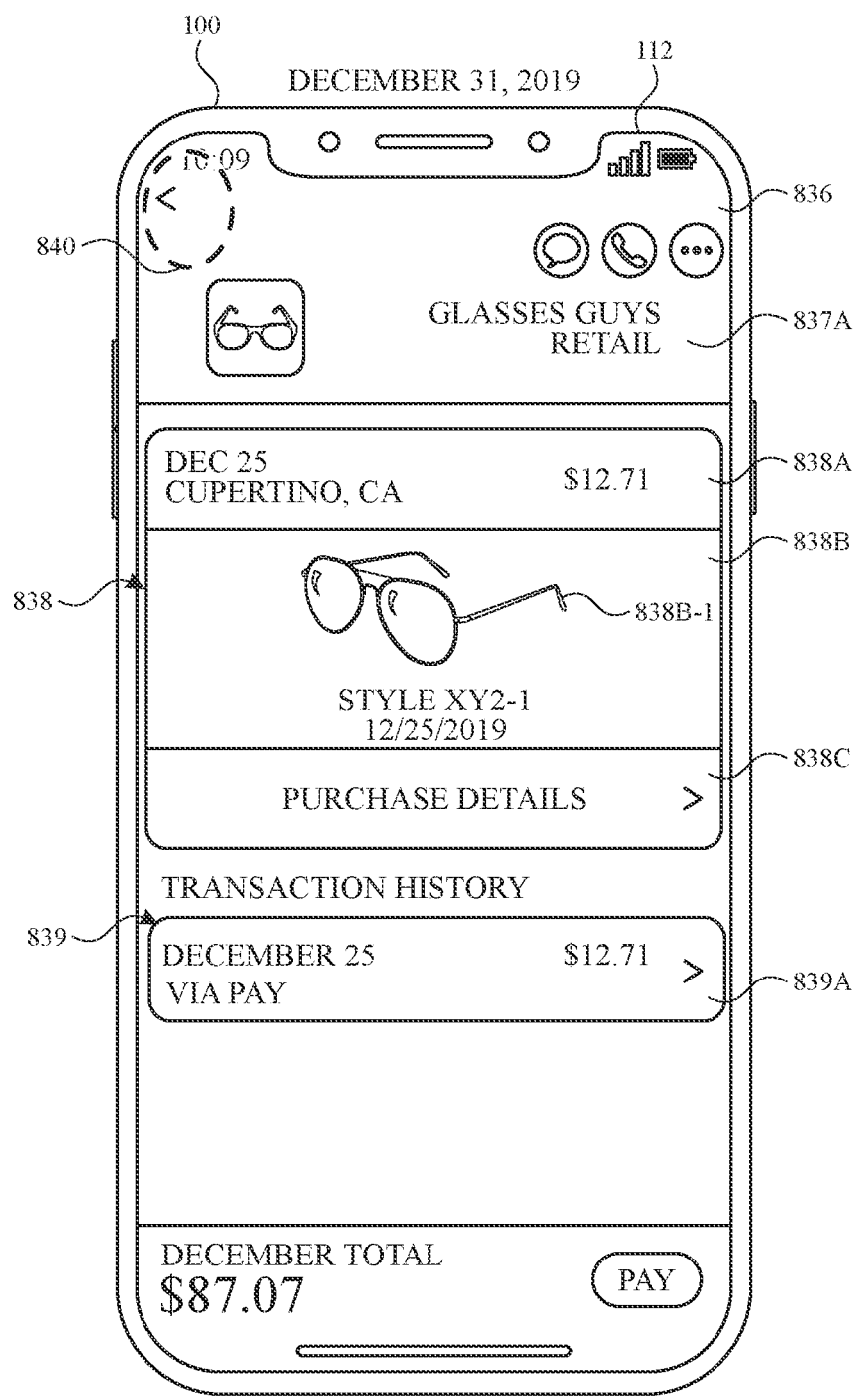

As shown in FIG. 8K, merchant user interface 836 includes a representation 837 of the merchant associated with the selected transfer item. In the embodiment illustrated in FIG. 8K, third transfer item 820C corresponds to a purchase of sunglasses from Glasses Guys, which is a retail store in Cupertino, Calif., for example. Therefore, merchant user interface 836 shows representation 837A of Glasses Guys.

Merchant user interface 836 also includes purchase user interface element 838, which includes first portion 838A including details of the transaction such as, for example, the location of the purchase, date of the purchase, and purchase amount. In some embodiments, first portion 838A is selectable to view additional details regarding the transaction (e.g., see FIG. 8Z and related disclosure), such as a digital receipt for the transaction.

Purchase user interface element 838 also includes second portion 838B, which shows details of the purchased item. For example, second portion 838B shows image 838B-1 of the sunglasses that were purchased with third transfer item 820C. In some embodiments, the image of the sunglasses appears substantially identical to the actual purchased item, showing the sunglasses with the purchased style, color, size, or any other visible attribute of the item. Second portion 838B also includes text describing some of the attributes of the purchased item such as the style (e.g., style XY2.1) and the purchase date (Dec. 25, 2019). In some embodiments, second portion 838B can include a representation of the merchant or a representation of a map showing the approximate location at which the item (e.g., sunglasses) was purchased. The map or representation of the merchant can be displayed in lieu of image 838B-1 if, for example, details of the purchased item are not available.

In some embodiments, purchase user interface element 838 further includes third portion 838C, which is a selectable option to view additional details regarding the purchase. Merchant user interface 836 also includes listing 839 of prior transfers associated with Glasses Guys, including first listing 839A corresponding to third transfer item 820C. In some embodiments, the listings (e.g., listing 839A) are selectable to view additional details regarding the transaction (e.g., see FIGS. 8AA-8AD and related disclosure), such as a digital receipt for the transaction.

Figure 8L:
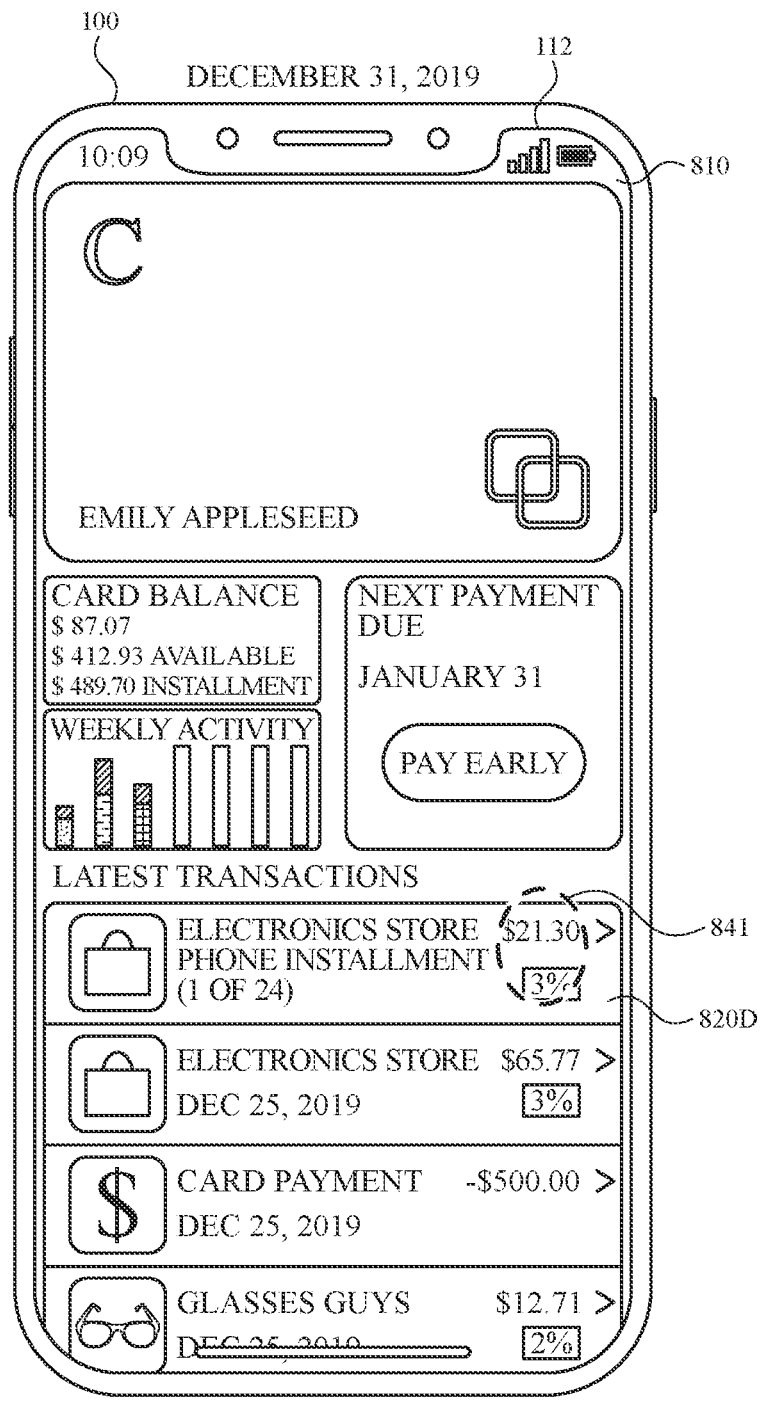

As shown in FIG. 8K, device 100 detects input 840 and, in response, displays summary user interface 810 in FIG. 8L, which is similar to summary user interface 810 shown in FIG. 8J.

As shown in FIG. 8L, device 100 detects input 841 on fourth transfer item 820D, which, as previously discussed, corresponds to the installment transfer added to the December balance of the transfer account. In response to detecting input 841, device 100 displays, in FIG. 8M, merchant user interface 836, which is similar to that shown in FIG. 8K, but updated to reflect details associated with fourth transfer item 820D, rather than those associated with third transfer item 820C. For example, merchant user interface 836 displays representation 837B of Electronics Store, which is the retailer (merchant) from which the phone purchase was made. Additionally, merchant user interface 836 includes installment purchase user interface element 842, which is similar to purchase user interface element 838, but updated to include details pertaining to the installment transfer.

For example, purchase user interface element 842 includes first portion 842A, which provides transaction details for the installment transfer such as, for example, a representation of when the transfer occurred (e.g., when the installment was added to the card balance of the transfer account), the sequence of the installment (e.g., 1 of 24), and the amount of the installment transfer (e.g., $21.30). In some embodiments, first portion 842A is selectable to view additional details regarding the transaction (e.g., see FIG. 8Z and related disclosure), such as a digital receipt for the transaction.

Purchase user interface element 842 also includes second portion 842B, which illustrates details of the item associated with the installment purchase. For example, second portion 842B shows image 842B-1 of the phone that was purchased with the installment plan associated with fourth transfer item 820D (the installment transfer). In some embodiments, the image of the phone appears substantially identical to the actual purchased phone, showing the phone with the purchased style, color, size, or any other visible attribute of the item. Second portion 842B also includes text describing some of the attributes of the purchased item such as a device name (e.g., Emily's Phone), a model number (e.g., Model 1), storage capacity (e.g., 128 GB), color (e.g., blue), and the purchase date (Dec. 25, 2019). Accordingly, image 842B-1 shows the purchased phone that is Model 1 with storage capacity of 128 GB and the color blue. In some embodiments, second portion 842B can include a representation of the merchant or a representation of a map showing the approximate location at which the item (e.g., phone) was purchased. The map or representation of the merchant can be displayed in lieu of image 842B-1 if, for example, details of the purchased item are not available. In some embodiments, second portion 842B shows images of multiple items that were included in the transaction (e.g., see FIGS. 8AI-8AJ and related disclosure).

Figure 8M:
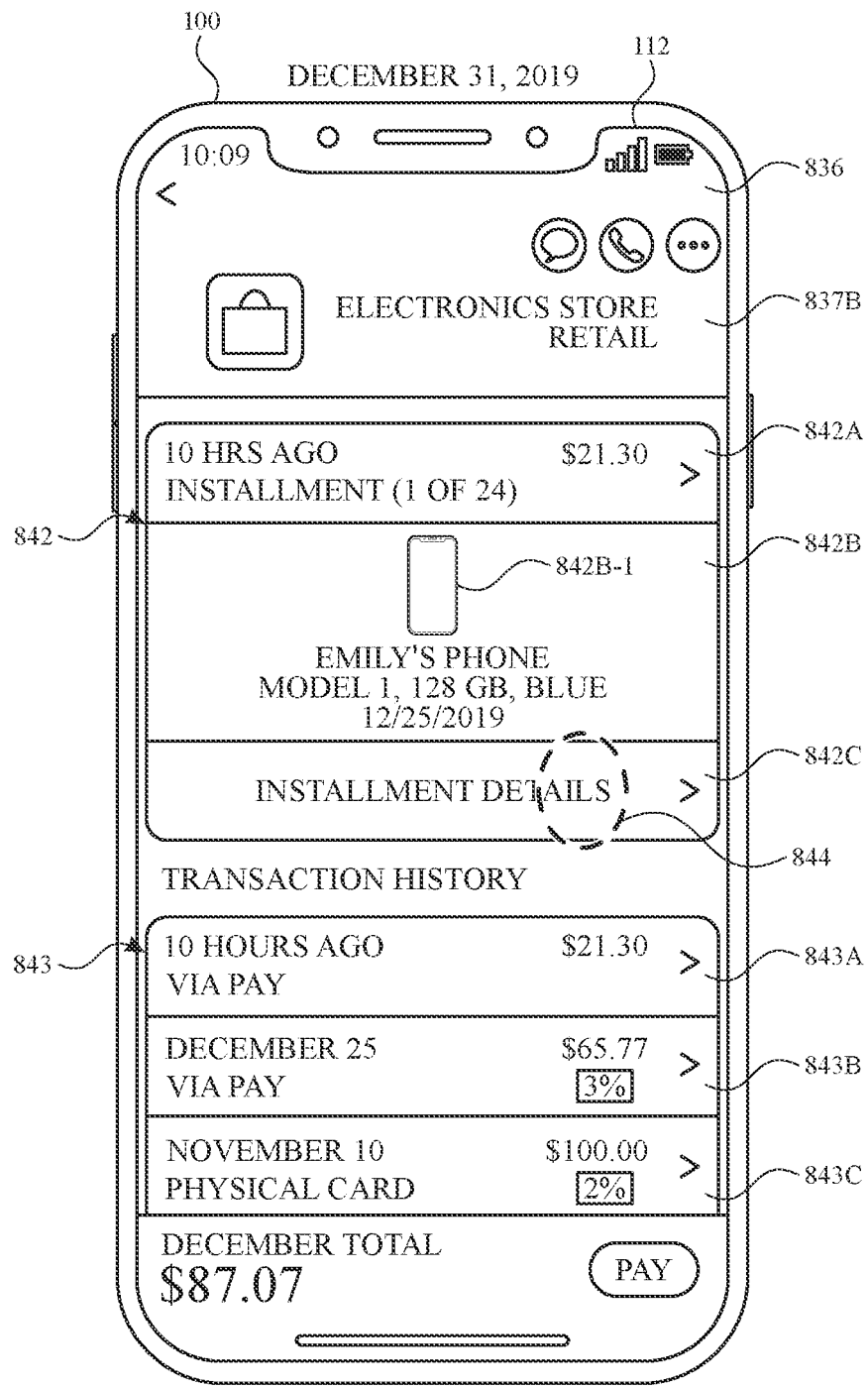

As shown in FIG. 8M, installment purchase user interface element 842 further includes third portion 842C, which is a selectable option to view additional details regarding the installment purchase.

Merchant user interface 836 also includes listing 843 of prior transfers associated with Electronics Store, including first listing 843A corresponding to the installment transfer (e.g., fourth transfer item 820D), and prior listings 843B and 843C corresponding to prior transfers associated with Electronics Store (prior listing 843B corresponds to the initial tax purchase associated with the installment purchase). In some embodiments, the listings (e.g., listing 843A) are selectable to view additional details regarding the transaction (e.g., see FIGS. 8AA-8AD and related disclosure), such as a digital receipt for the transaction.

Figure 8N:
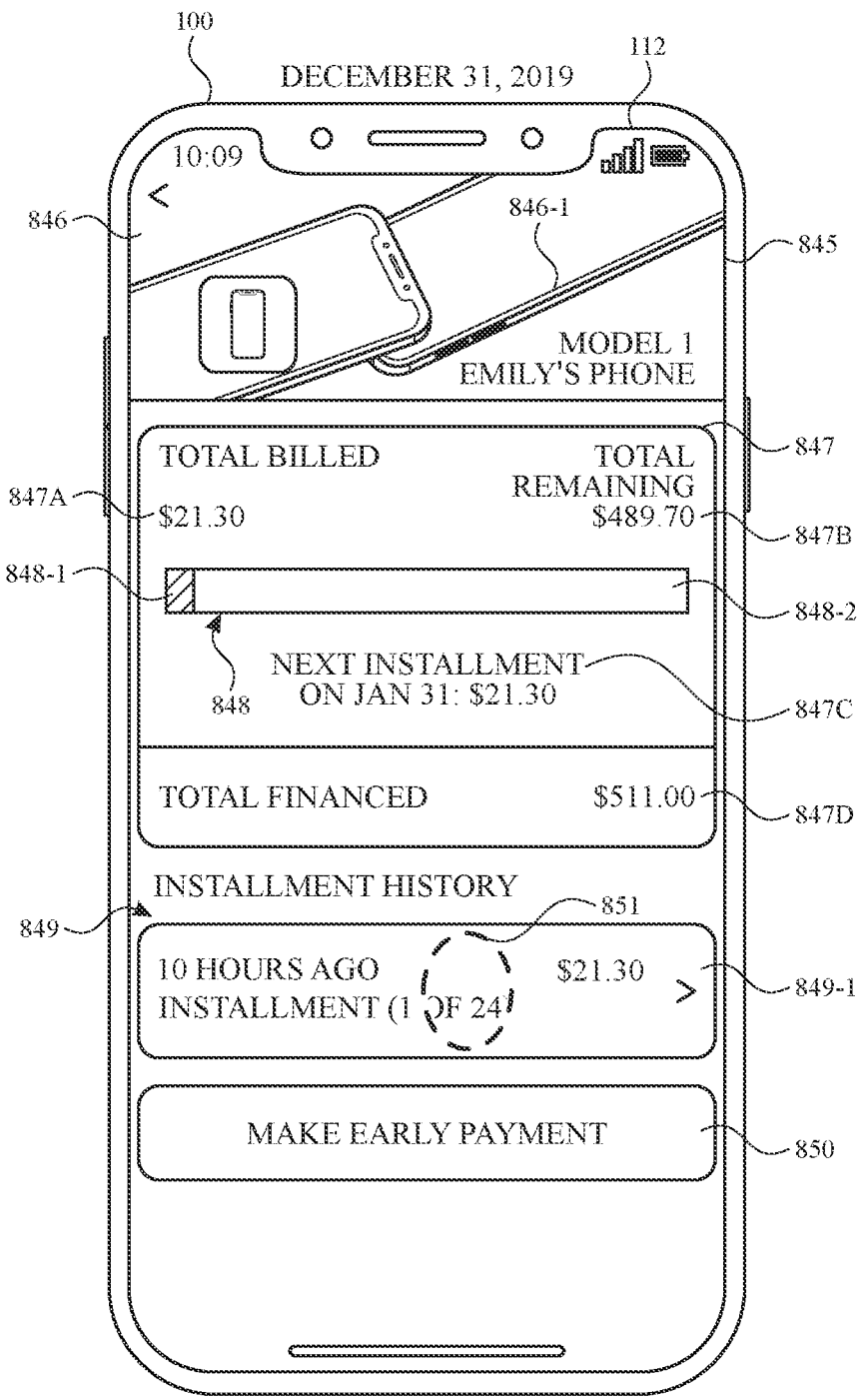
Figure 80:
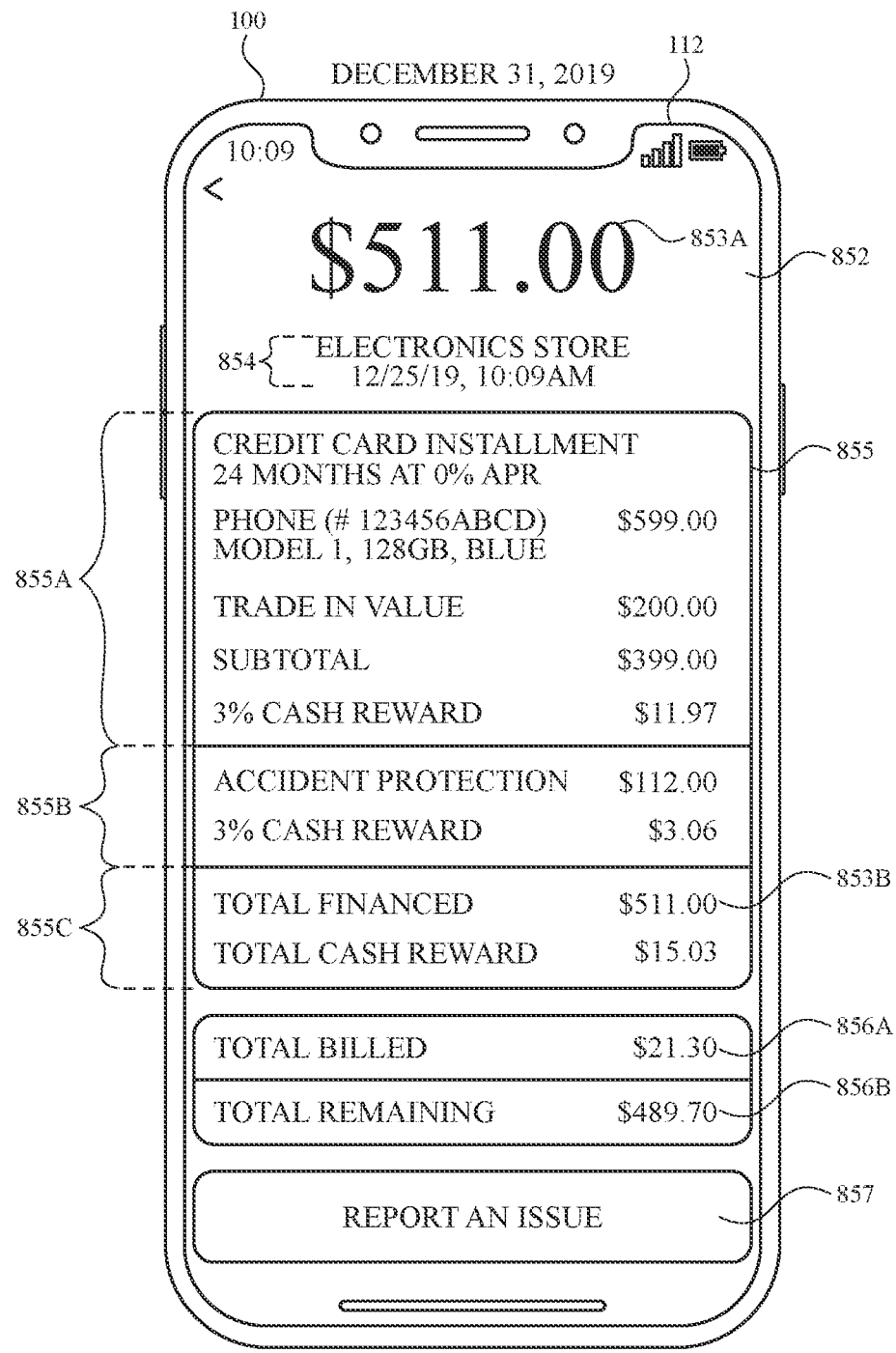

In FIG. 8M, device 100 detects input 844 on third portion 842C of installment purchase UI element and, in response, displays installment details user interface 845 in FIG. 8N.

As shown in FIG. 8N, installment details user interface 845 includes a representation of the item purchased with the installment plan, which, in the embodiment illustrated in FIG. 8N, is representation 846 of the phone. In some embodiments, representation 846 includes representative image 846-1 of the phone and text describing attributes of the phone. Representative image 846-1 is similar to image 842B-1, but shown from different perspectives. Accordingly, like image 842B-1, respective image 846-1 shows an image of the phone that was purchased with the installment plan, appearing substantially identical to the actual purchased phone (e.g., having the purchased style, color, size, or any other visible attribute of the phone). In some embodiments, the text describing attributes of the phone can include a device name (e.g., Emily's Phone), a model number (e.g., Model 1), storage capacity (e.g., 128 GB), and color (e.g., blue).

Installment details user interface 845 also includes installment progress user interface element 847, which indicates progress of the installment plan. Installment progress user interface element 847 is updated in real time when changes are made to the balance of the installment plan. Installment progress user interface element 847 includes cumulative billed installment balance 847A, remaining installment balance 847B, next installment details 847C, financed amount 847D, and installment progress bar 848. Cumulative billed installment balance 847A represents the total amount of the installment plan that has been billed to the transfer account, including the current installment. As shown in FIG. 8N, only the first installment has been billed, so cumulative billed installment balance 847A is the amount of the first installment, $21.30. Remaining installment balance 847B is the remaining installment balance, which is calculated by subtracting the cumulative billed installment balance 847A ($21.30) from financed amount 847D (511). In the embodiment illustrated in FIG. 8N, remaining installment balance 847B is $489.70. Financed amount 847D is the full amount of the installment plan, which is also the sum of cumulative billed installment balance 847A and remaining installment balance 847B. Next installment details 847C provide details of the next installment such as, for example, the amount of the next installment (e.g., $21.30) and the date the next installment will be billed to the transfer account (e.g., January 31).

Installment details user interface 845 also includes installment progress bar 848, which provides a visual representation of the progress towards completion (e.g., satisfaction) of the installment plan. Installment progress bar 848 includes shaded region 848-1 representing cumulative billed installment balance 847A, and unshaded region 848-2 representing remaining installment balance 847B. Installment progress bar 848 is updated in real time to reflect changes to cumulative billed installment balance 847A and remaining installment balance 847B.

Installment details user interface 845 also includes installment history 849, which provides a listing of prior installment transactions for the installment plan. In FIG. 8N, installment history 849 includes first installment transfer 849-1, which shows details of the first installment transfer such as the amount of the first installment transfer ($21.30), when the transfer occurred (e.g., 10 hours ago), and the sequence of the installment (e.g., "1 of 24," meaning the first installment in a series of twenty-four installments).

Installment details user interface 845 also includes installment payment user interface element, which is a selectable option to initiate a process for making additional payments towards the installment plan. Additional details of this process are discussed in greater detail below.

In FIG. 8N, device 100 detects input 851 on first installment transfer 849-1 and, in response, displays installment receipt user interface 852 in FIG. 8O.

In FIG. 8O, installment receipt user interface 852 provides, in essence, an electronic receipt for the installment purchase that shows the financed amount 853A and 853B, and details 854 such as the merchant, date of the installment purchase, and time of the installment purchase (in some embodiments, the date and time shown indicate the date and time the selected installment transfer (e.g., first installment transfer 849-1) occurred). Installment receipt user interface 852 also includes purchase details user interface element 855, which provides an itemized listing of purchased items and additional details relating to the installment purchase.

As shown in FIG. 8O, purchase details user interface element 855 includes first portion 855A, second portion 855B, and third portion 855C. First portion 855A includes installment information such as an indication that the receipt is for an installment plan, the length of the installment plan (24 months), and any interest rate applied to the installment plan (0% APR). First portion 855A also includes details for the purchased item such as an indication of the item (e.g., phone), the purchase price of the item (e.g., $599.00), and other identifying information such as a serial number of the device (e.g., #123456ABCD), model number (e.g., Model 1), storage capacity (e.g., 128 GB), and color (e.g., blue). First portion 855A also indicates any credit applied to the purchase such as, for example, trade-in credit for trading in another item (e.g., another phone) to offset a portion of the purchase of the phone associated with the installment plan. In the embodiment illustrated in FIG. 8O, first portion 855A indicates trade-in value of $200 is applied to the purchase, which offsets the amount of the installment plan by $200. Accordingly, first portion 855A indicates the subtotal of the installment plan is $399, which is calculated by subtracting the $200 credit from the $599 purchase price of the phone. First portion 855A also indicates any rewards (e.g., cash rewards, points rewards) earned with the purchase such as, for example, a 3% cash-back reward of $11.97.

Second portion 855B shows any additional purchases associated with the installment plan and any rewards earned with the additional purchases. For example, in FIG. 8O, second portion 855B shows that accident protection (e.g., insurance on the device) was purchased at a price of $112, and that a reward of $3.06 was earned on the purchase of the accident protection.

Third portion 855C indicates a total of the amount financed and a total of the rewards earned. Total financed 853B is calculated as the sum of the subtotal ($399) in first portion 855A and the additional purchase ($112) in second portion 855B. Similarly, the total rewards earned is calculated as the sum of the rewards in first portion 855A and the rewards in second portion 855B.

Purchase details user interface element 855 also includes installment balances total billed 856A and total remaining 856B, which correspond to the cumulative balance of billed installments and the outstanding installment balance (the remaining balance of the installment plan), respectively.

Purchase details user interface element 855 also includes selectable option 857 for reporting an issue with the installment plan or otherwise requesting assistance to, for example, make changes to the installment plan.

In some embodiments, one or more elements of installment receipt user interface 852 are static and do not change because they represent a snapshot of the respective installment details at the time of the installment transaction. For example, total billed 856A and total remaining 856B can represent the status of the installment plan at the time of the installment transaction associated with the installment receipt. For example, total billed 856A and total remaining 856B represent, in FIG. 8O, the status of the installment plan as of Dec. 31, 2019, which is when first installment transfer 849-1 occurred. If, however, installment receipt user interface 852 was showing a receipt corresponding to an installment transfer that occurred, for example, on Oct. 28, 2019, total billed 856A and total remaining 856B would show balances that are accurate as of Oct. 28, 2019. It should be appreciated that total billed 856A and total remaining 856B are used here as an example and that, in some embodiments, these balances can be updated to reflect current total billed and total remaining balances that are accurate to-date.

Figure 8P:
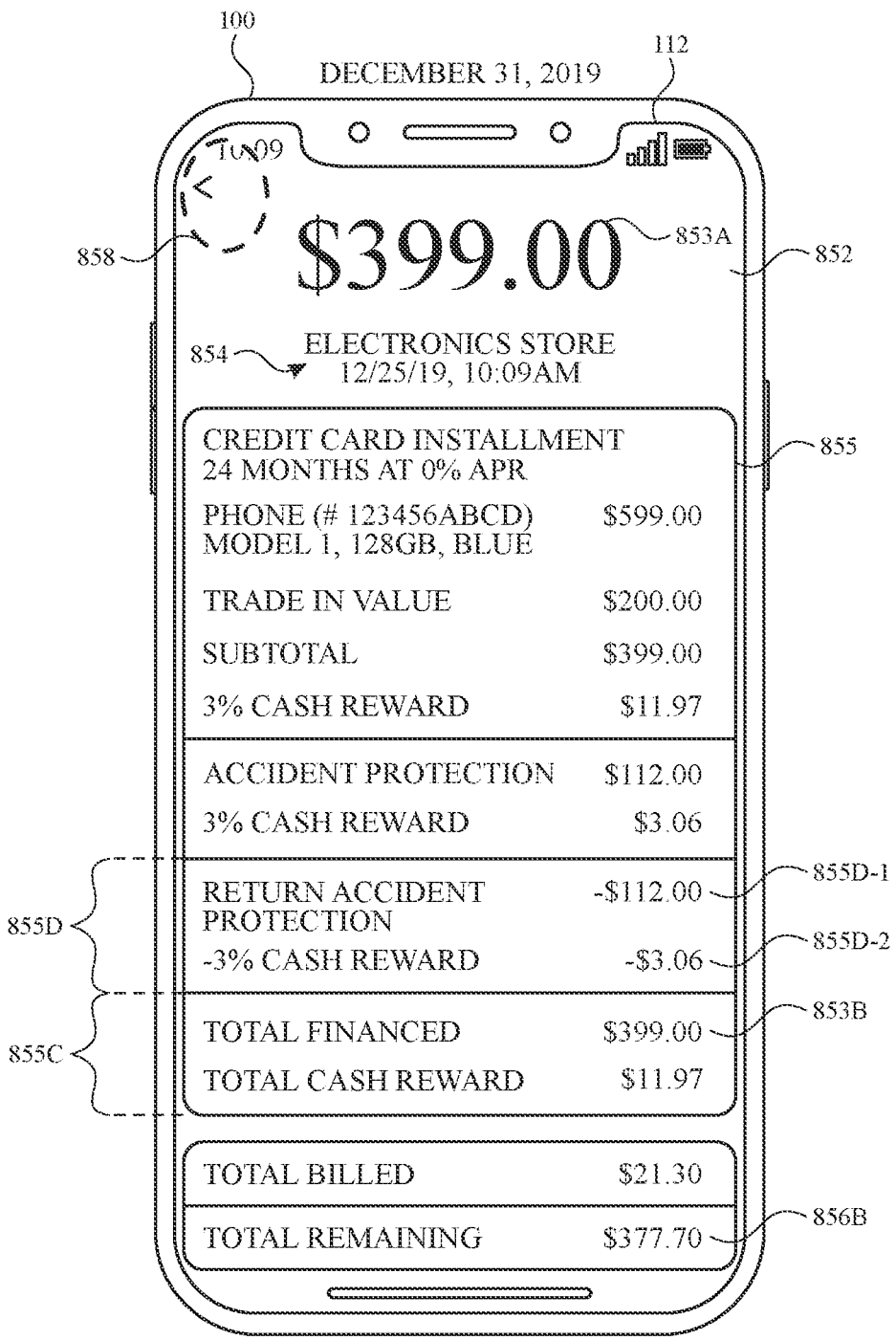

In some embodiments, one or more elements of installment receipt user interface 852 are dynamic and update in real time as changes are made to the installment plan. For example, FIG. 8P shows installment receipt user interface 852 updated after a change is made to the installment plan (e.g., for example, by selecting option 857 and initiating changes to the plan). The updated installment receipt user interface 852 can be displayed automatically after initiating the change to the installment plan, or after subsequent selection of first installment transfer 849-1, for example. Specifically, FIG. 8P shows an embodiment in which the installment plan is updated, after the initial purchase and implementation of the installment plan, by cancellation of the accident protection. Accordingly, purchase details user interface element 855 is updated to include fourth portion 855D indicating credit 855D-1 of $112 and rewards offset 855D-2 of $3.06 to account for the loss of rewards that were initially earned with the purchase of the accident protection. The $3.06 rewards offset 855D-2 affects the total rewards balance in third portion 855C. Therefore, the total rewards balance in third portion 855C is updated to $11.97. Similarly, because the accident protection was included as a portion of the installment plan, the return/cancellation of the accident protection affects the financed balance and, as a result, the remaining balance of the installment plan. Accordingly, financed amount 853A and 853B, and total remaining 856B, are updated to reflect the removal of the $112 accident protection from the financed amount, which results in a new financed amount of $399 and a new remaining installment plan balance of $377.70.

Figure 8Q:
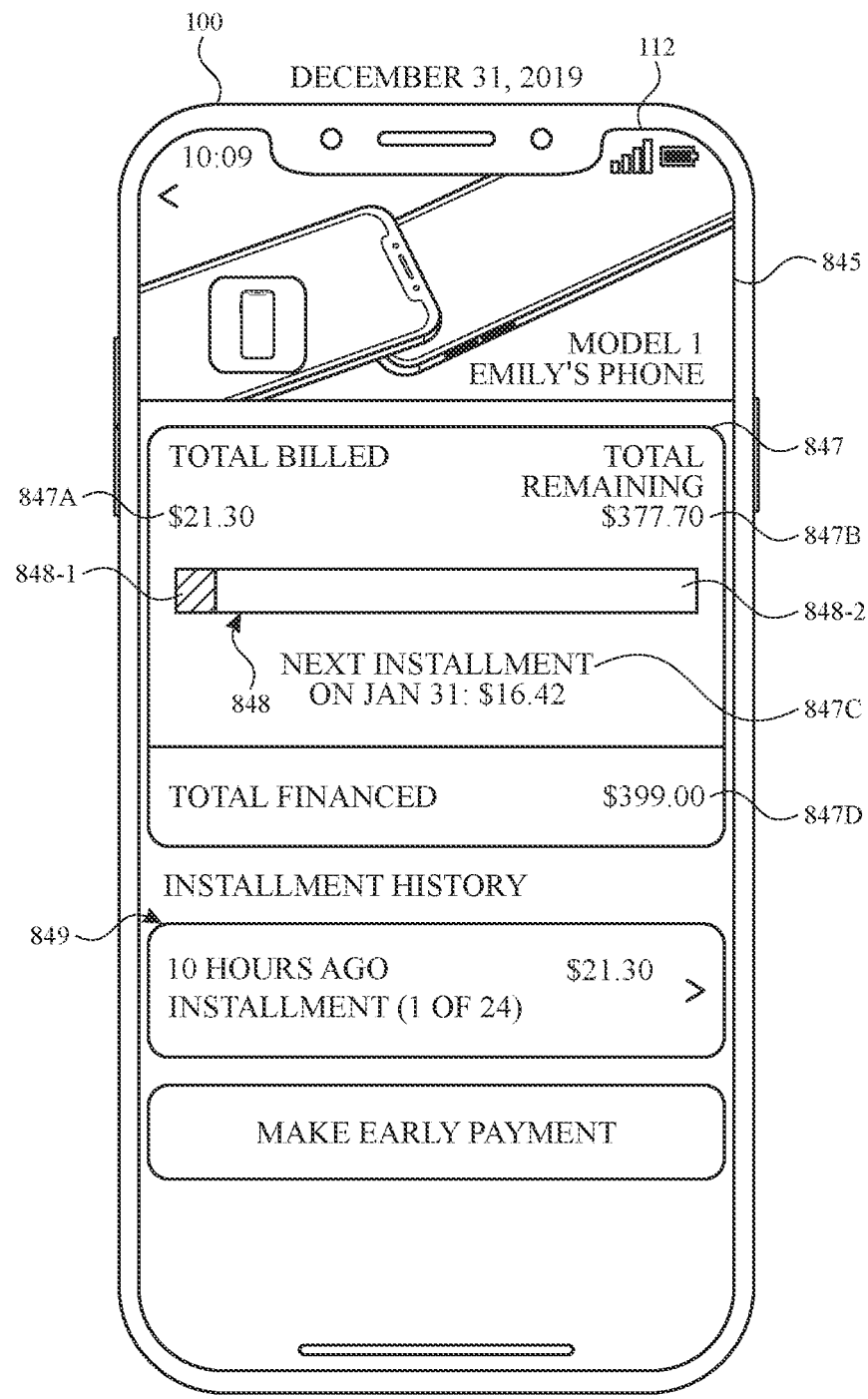

In FIG. 8P, device 100 detects input 858 and, in response, displays installment details user interface 845 in FIG. 8Q.

As shown in FIG. 8Q, installment details user interface 845 is updated to reflect the changes to the installment plan discussed above. Specifically, remaining installment balance 847B is reduced to $377.70, and installment progress bar 848 is updated to reflect the correct proportion of the billed installment balance 847A with respect to remaining installment balance 847B. Accordingly, shaded region 848-1 of the progress bar is proportionally increased, and unshaded region 848-2 is proportionally decreased. Additionally, next installment details 847C is updated to show a revised amount for the next installment transaction, which is now $16.42 (calculated as the new remaining installment balance 847B divided by the number of remaining installment transactions in the installment plan (23)), and financed amount 847D is changed to $399. Notably, there are no changes to other details such as cumulative billed installment balance 847A or installment history 849.

Figure 8R:
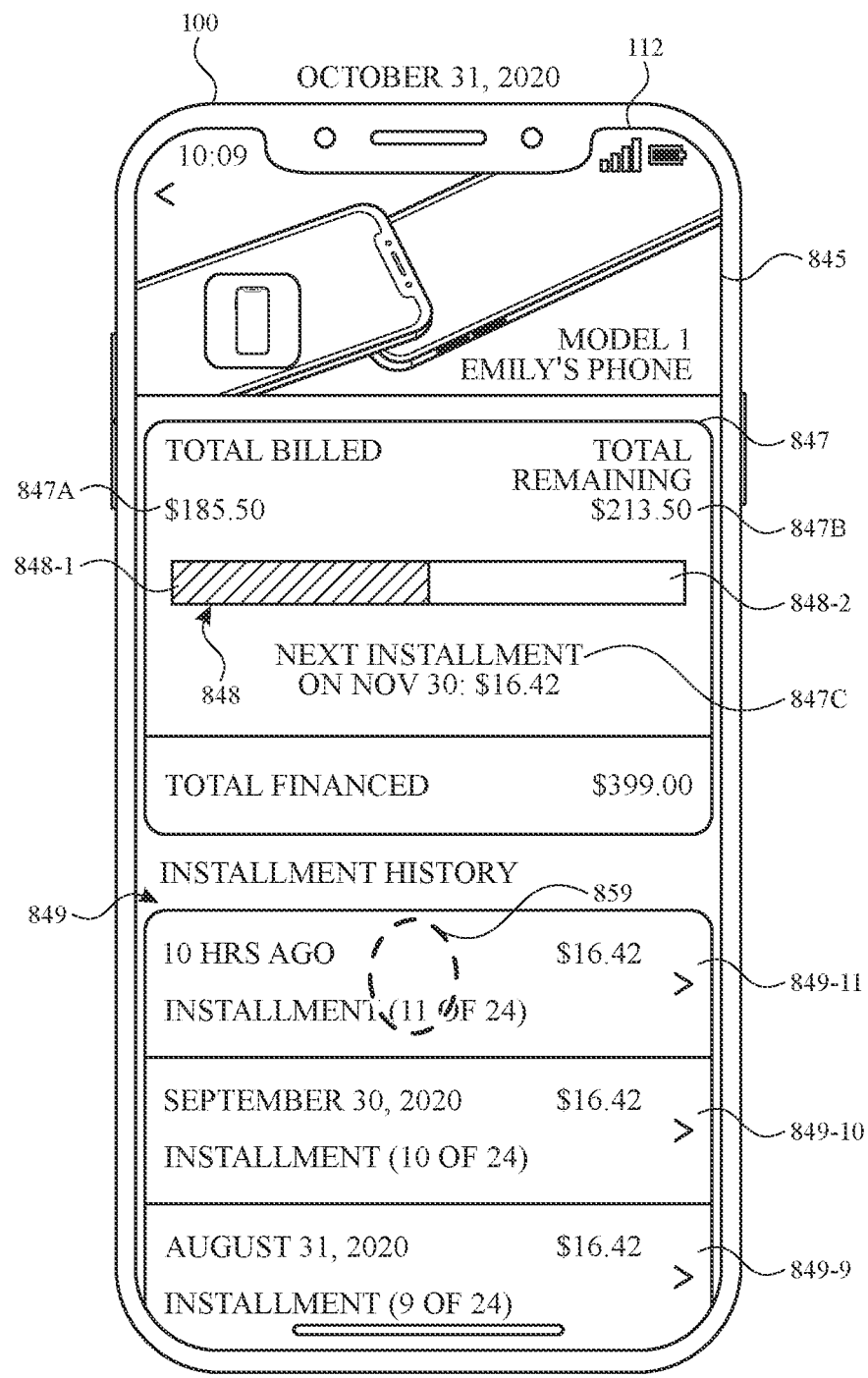

Referring now to FIG. 8R, device 100 shows, on display 112, an embodiment in which installment details user interface 845 is displayed on Oct. 31, 2020, which is after eleven installment transfers have been added to the transfer account (e.g., eleven installment transfers have been satisfied (e.g., paid) for the installment plan). As shown in FIG. 8R, cumulative billed installment balance 847A is updated to $185.50, which is the sum of all eleven installment transfers as of Oct. 31, 2020 (e.g., the first installment of $21.30, plus ten subsequent installments of $16.42 each), remaining installment balance 847B is correspondingly reduced to $213.50, and installment progress bar 848 is updated to reflect the current ratio of billed installment balance 847A to remaining installment balance 847B. Next installment details 847C is updated to show the next installment will be added to the transfer account on November 30. Finally, installment history 849 has been updated to show previous installment transfers 849-9, 849-10, and 849-11, corresponding to the ninth, tenth, and eleventh installment transfers, respectively.

Figure 8S:
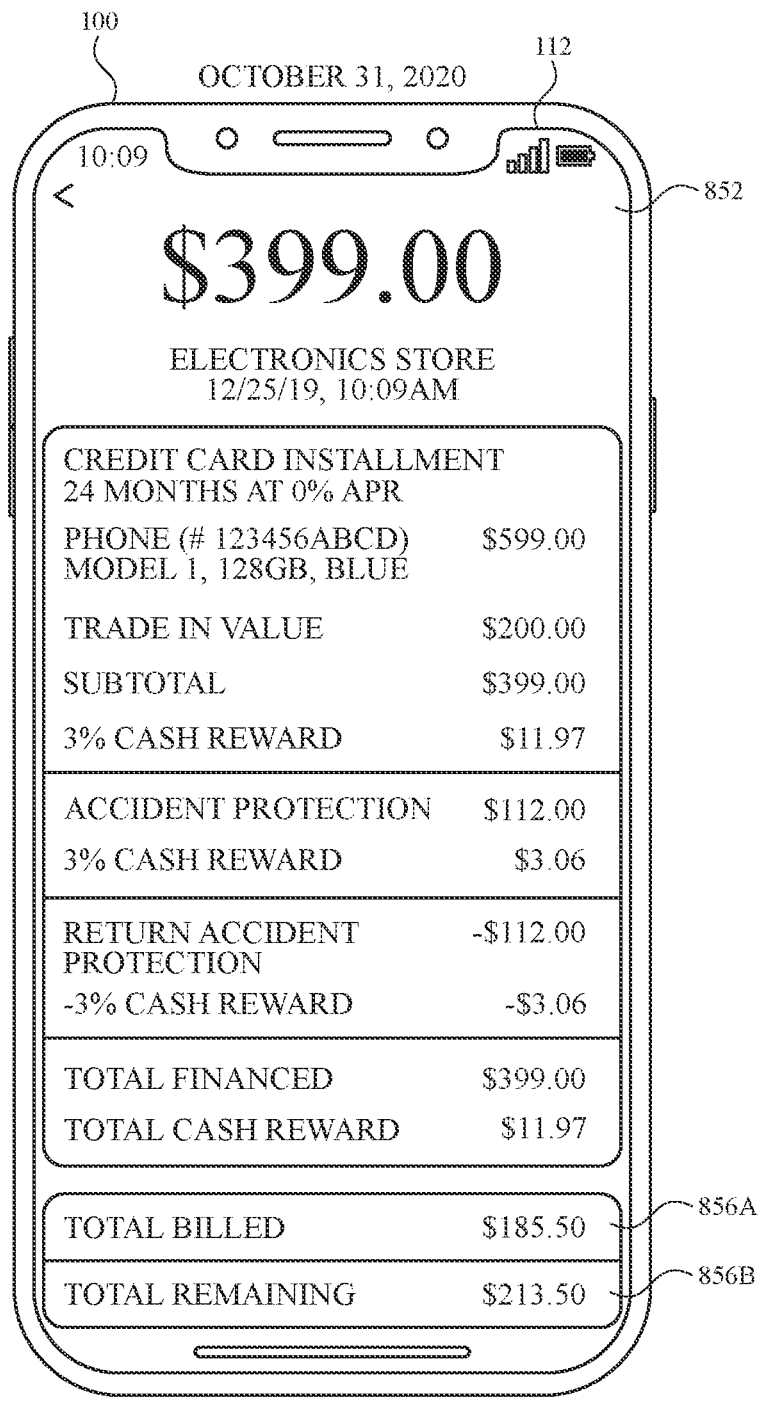

In FIG. 8R, device 100 detects input 859 on eleventh installment transfer 849-11 and, in response, displays installment receipt user interface 852 in FIG. 8S.

In the embodiment shown in FIG. 8S, installment receipt user interface 852 is similar to that shown in FIG. 8P, but having updated balances for total billed 856A and total remaining 856B, which are updated to show the current balances of $185.50 and $213.50, respectively.

Figure 8T:
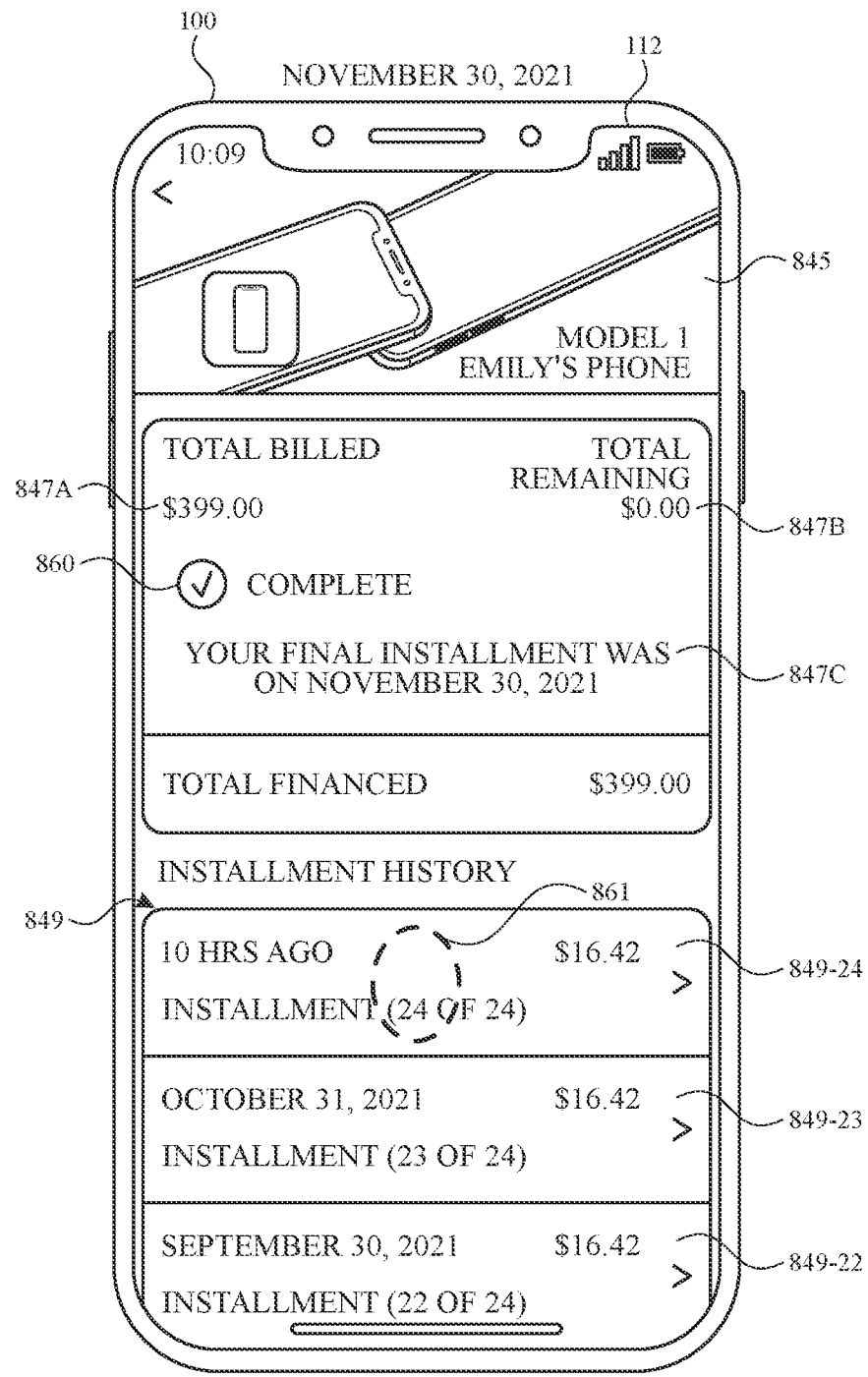

Referring now to FIG. 8T, device 100 shows, on display 112, an embodiment in which installment details user interface 845 is displayed after the installment plan has been satisfied (e.g., paid) in-full. As shown in FIG. 8T, cumulative billed installment balance 847A is updated to $399, which is the sum of all twenty-four installment transfers, remaining installment balance 847B is correspondingly reduced to $0.00, and the installment progress bar is replaced with indicia 860 (e.g., a check mark and text saying "complete") showing the installment plan is complete. Next installment details 847C is updated to show the date the final installment occurred (e.g., Nov. 30, 2021). Finally, installment history 849 has been updated to show previous installment transfers 849-22, 849-23, and 849-24, corresponding to the last three installment transfers of the installment plan.

Figure 8U:
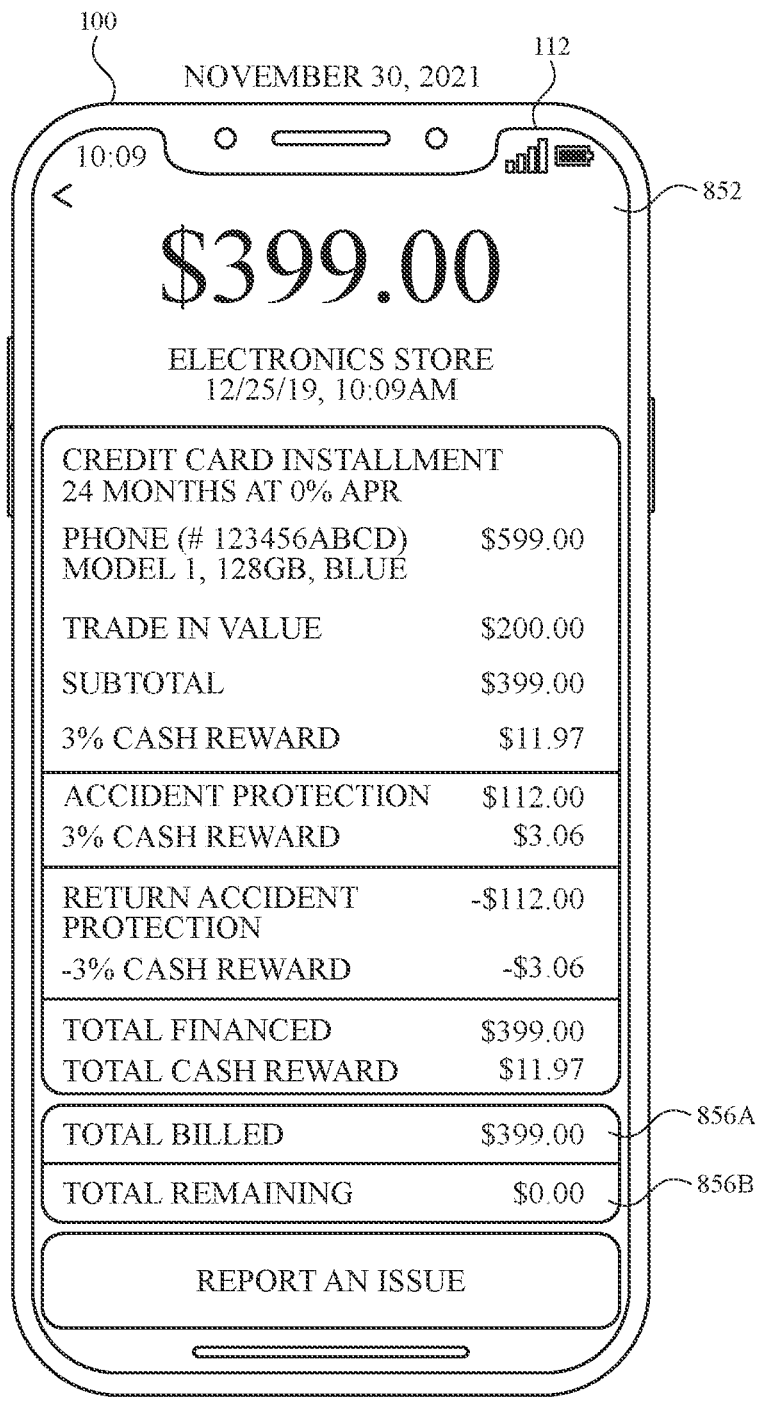

In FIG. 8T, device 100 detects input 861 on twenty-fourth installment transfer 849-24 and, in response, displays installment receipt user interface 852 in FIG. 8U.

In the embodiment shown in FIG. 8U, installment receipt user interface 852 is similar to that shown in FIGS. 8P and 8S, but having updated balances for total billed 856A and total remaining 856B, which are updated to show the current balances of $399 and $0.00, respectively.

Figure 8V:
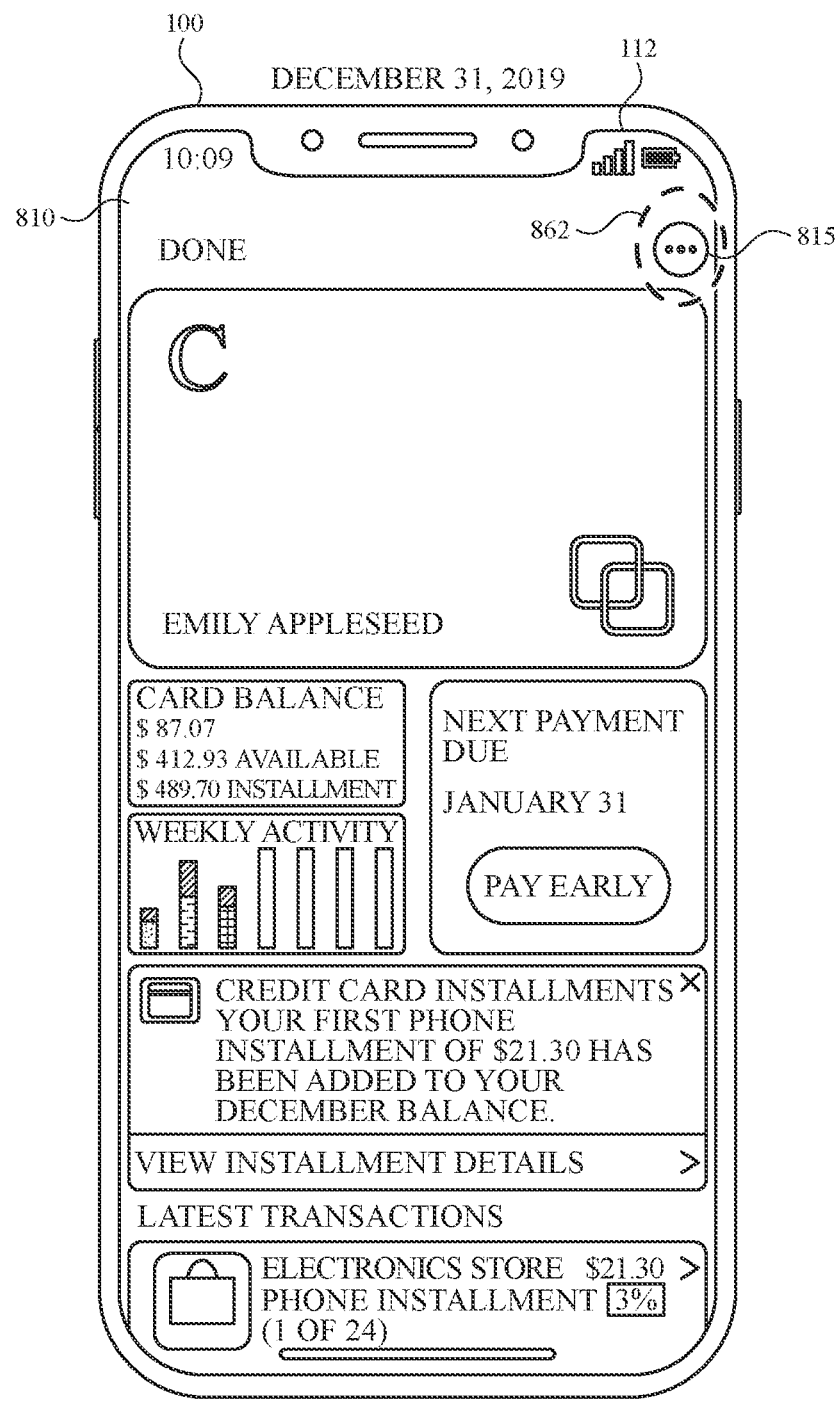

Referring now to FIG. 8V, device 100 displays, on display 112, summary user interface 810 as shown on Dec. 31, 2019. Device 100 detects input 862 on account details user interface element 815 and, in response, displays account details user interface 863 in FIG. 8W.

Figure 8W:
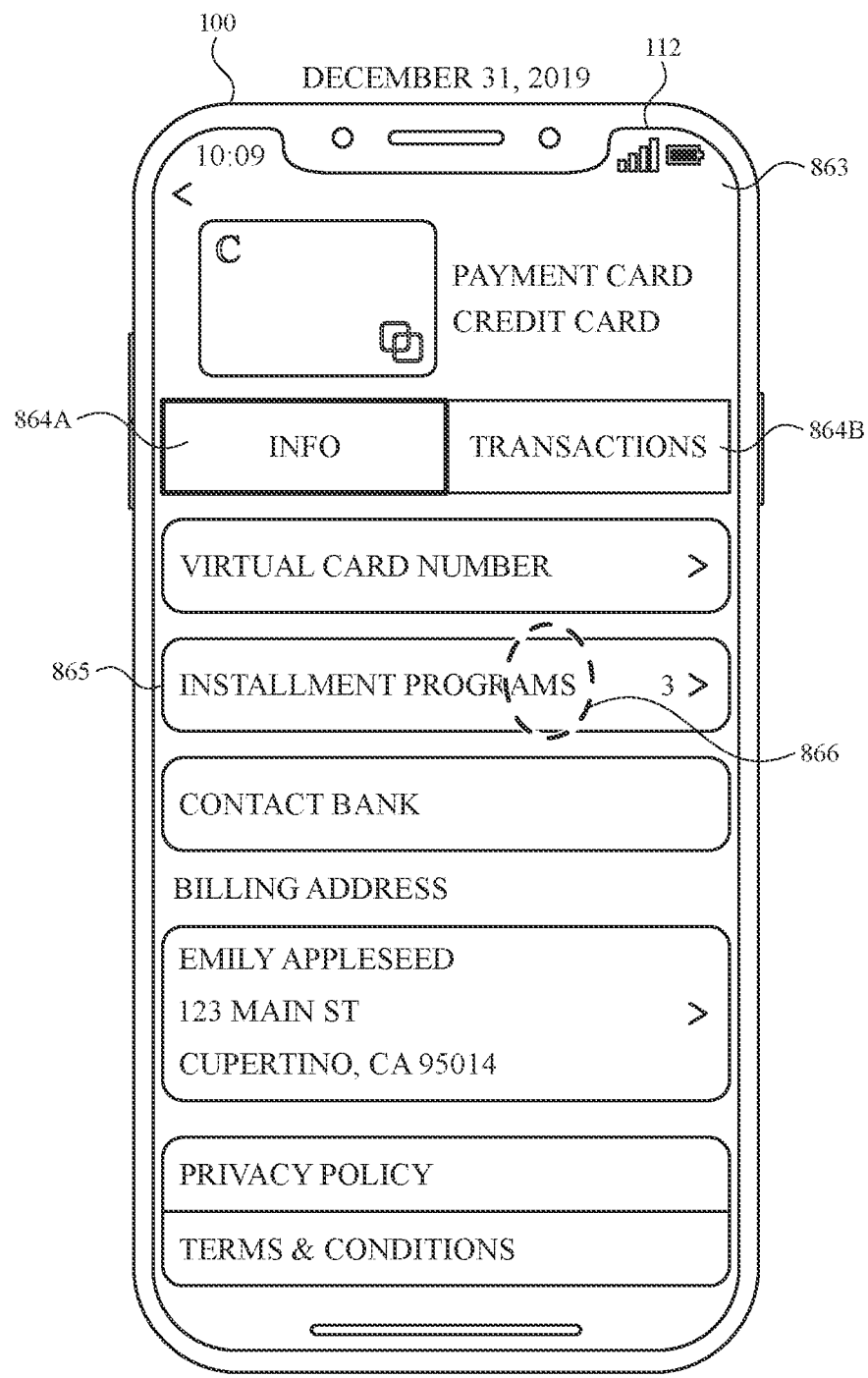

As shown in FIG. 8W, account details user interface 863 displays details regarding the transfer account such as, for example, an option for viewing a virtual card number associated with the transfer account, billing address information, an option for contacting a bank associated with the transfer account, and option 865 for viewing installment plans associated with the transfer account. In some embodiments, option 865 includes an indication of the number of installment plans associated with the transfer account. In the embodiment illustrated in FIG. 8W, the transfer account is associated with three installment plans. Details user interface 863 also includes selectable options 864A and 864B (option 864A is shown selected) for switching between a view of the account details (as shown in FIG. 8W) or a view of transactions associated with the transfer account (e.g., similar to transfers shown in transfer items list 820, for example).

Figure 8X:
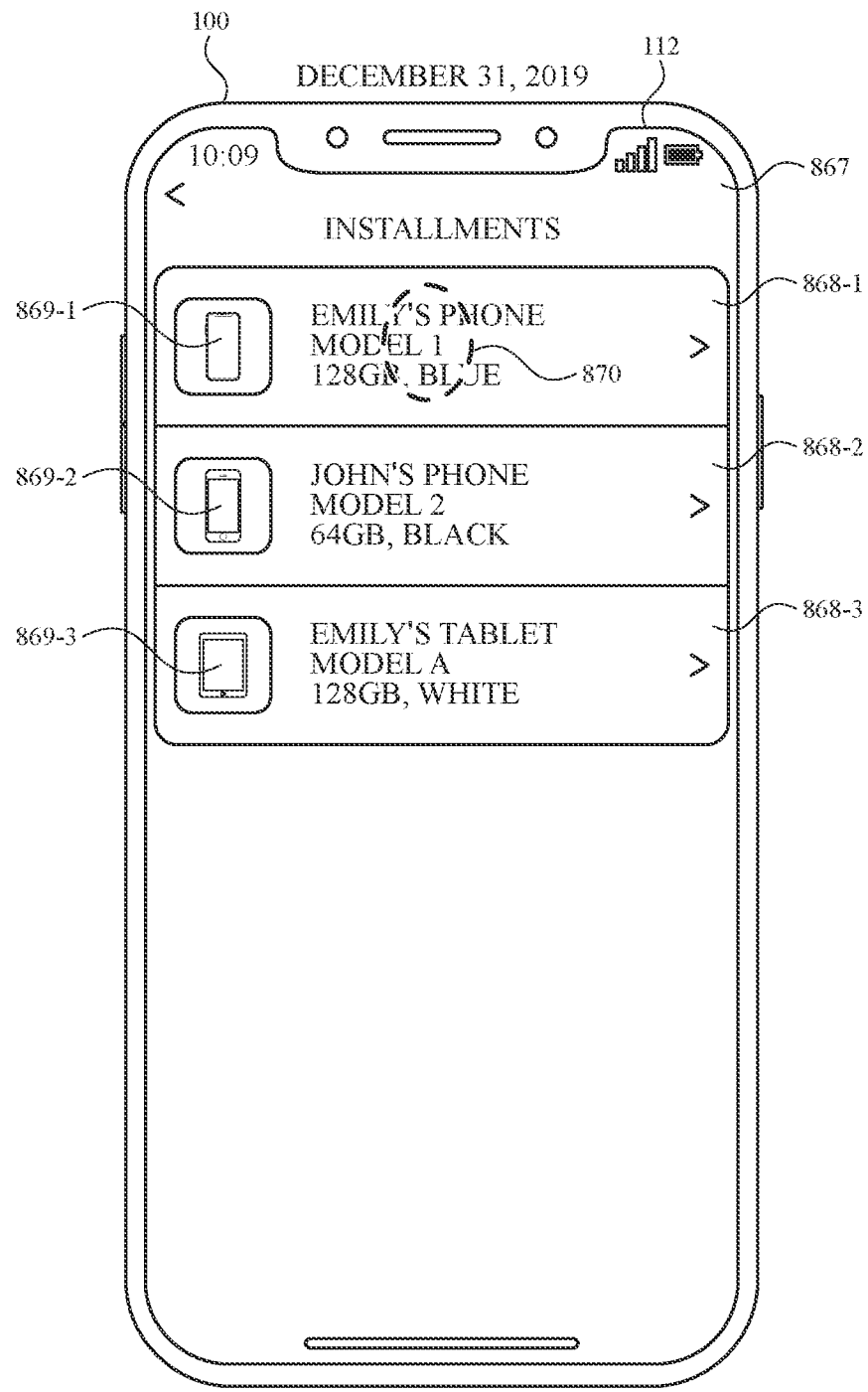

In FIG. 8W, device 100 detects input 866 on option 865 and, in response, displays installment plans user interface 867 in FIG. 8X.

In FIG. 8X, installment plans user interface 867 shows three different installment plans associated with the transfer account. First installment plan option 868-1 corresponds to an installment plan for a phone. Option 868-1 includes a representation of some details of the phone such as the device name ("Emily's Phone"), a model number (Model 1), storage capacity (128 GB), and color (blue). In some embodiments, option 868-1 also includes a representative image 869-1 of the phone that, in some embodiments, has the same physical appearance as the phone associated with the first installment plan. Second installment plan option 868-2 corresponds to an installment plan for a different phone. Option 868-2 includes a representation of some details of the phone such as the device name ("John's Phone"), a model number (Model 2), storage capacity (64 GB), and color (black). In some embodiments, option 868-2 also includes a representative image 869-2 of the phone that, in some embodiments, has the same physical appearance as the phone associated with the second installment plan. Third installment plan option 868-3 corresponds to an installment plan for a tablet. Option 868-3 includes a representation of some details of the tablet such as the device name ("Emily's Tablet"), a model number (Model A), storage capacity (128 GB), and color (white). In some embodiments, option 868-3 also includes a representative image 869-3 of the tablet that, in some embodiments, has the same physical appearance as the tablet associated with the third installment plan. In some embodiments, each of the installment plan options (e.g., 868-1 through 868-3) are selectable to view an installment plan details user interface (e.g., similar to installment details user interface 845 in FIG. 8N) corresponding to the selected installment plan option. In some embodiments, each of the installment plan options (e.g., 868-1 through 868-3) are selectable to view a merchant user interface corresponding to the selected installment plan option, as discussed below.

Figure 8Y:
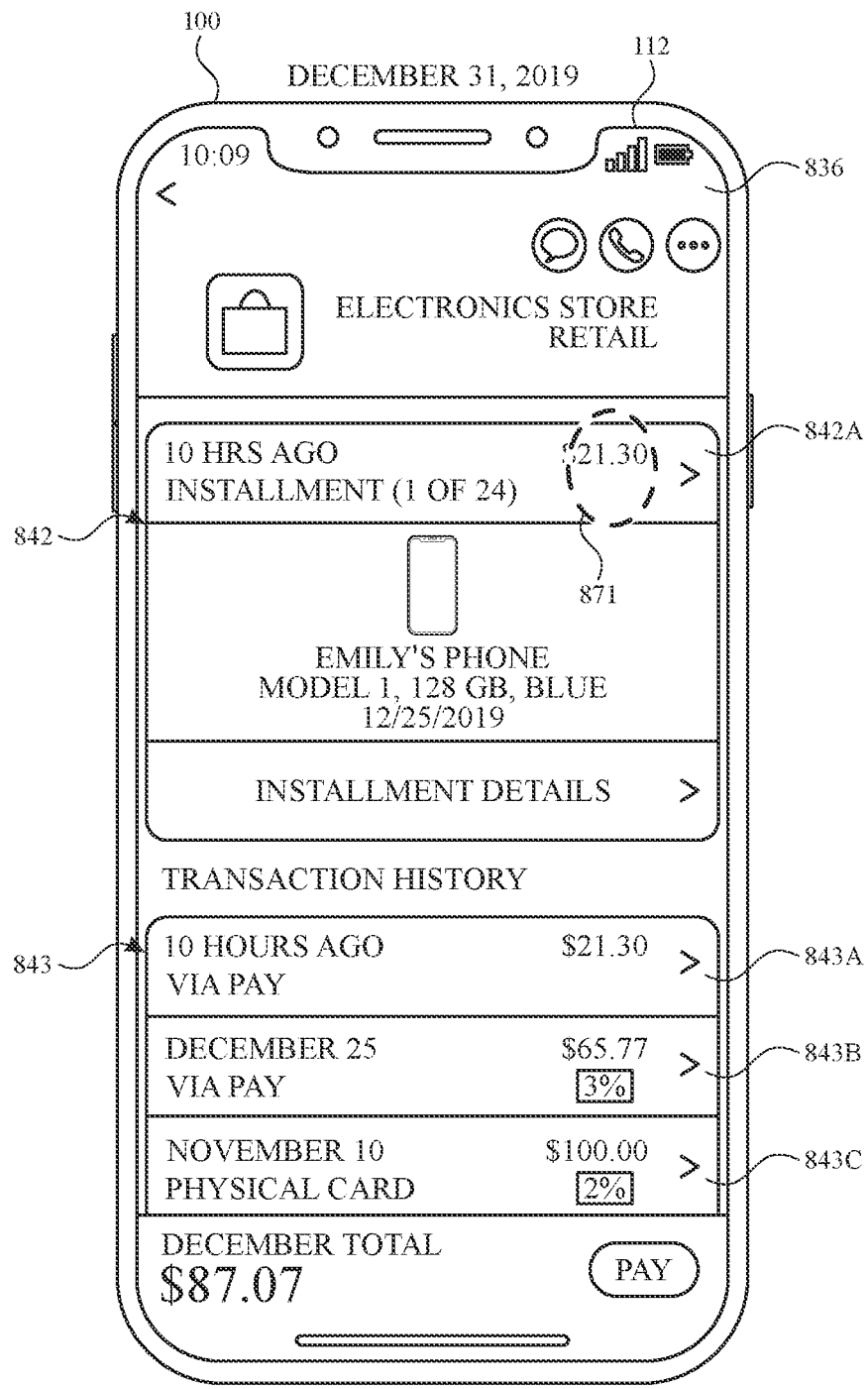

In FIG. 8X, device 100 detects input 870 on first installment plan option 868-1 and, in response, displays, in FIG. 8Y, merchant user interface 836, similar to the merchant user interface 836 shown in FIG. 8M and discussed above.

Figure 8Z:
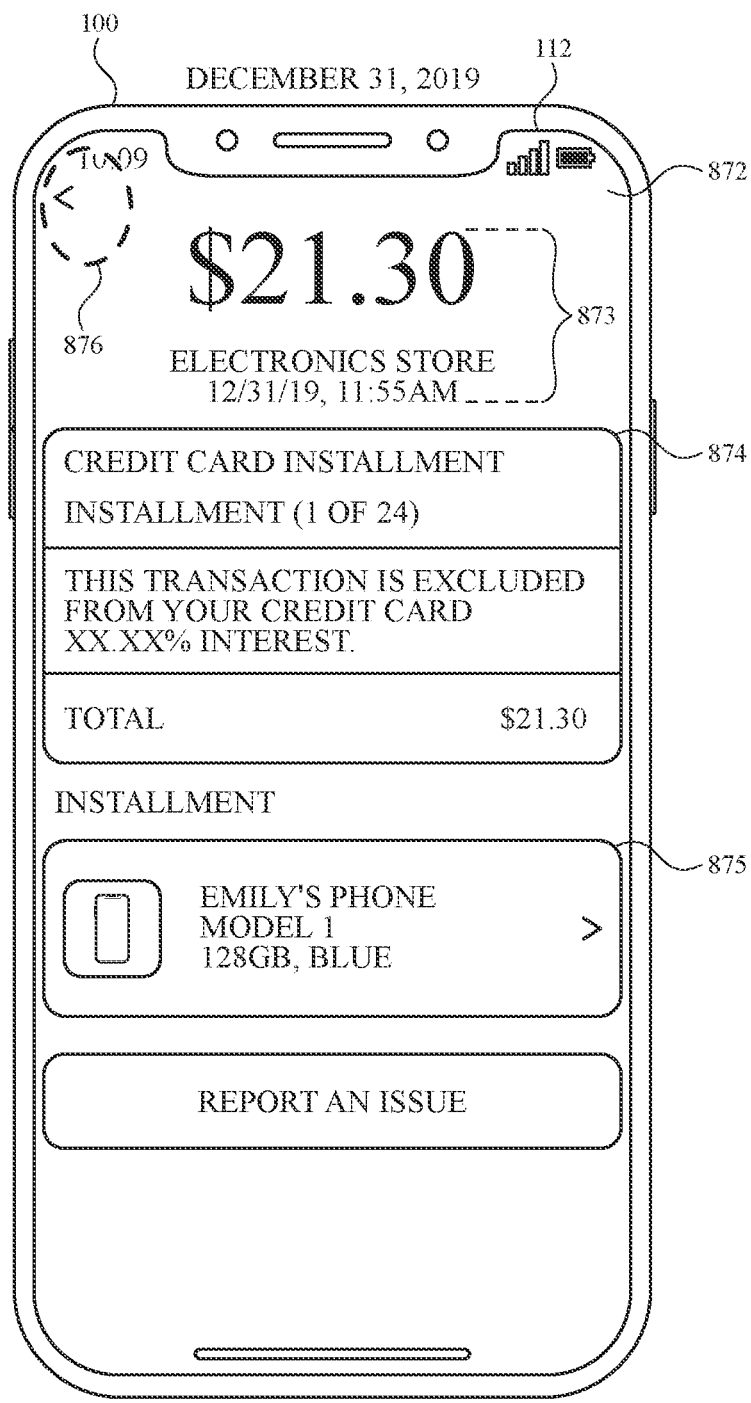
Figure 8A:
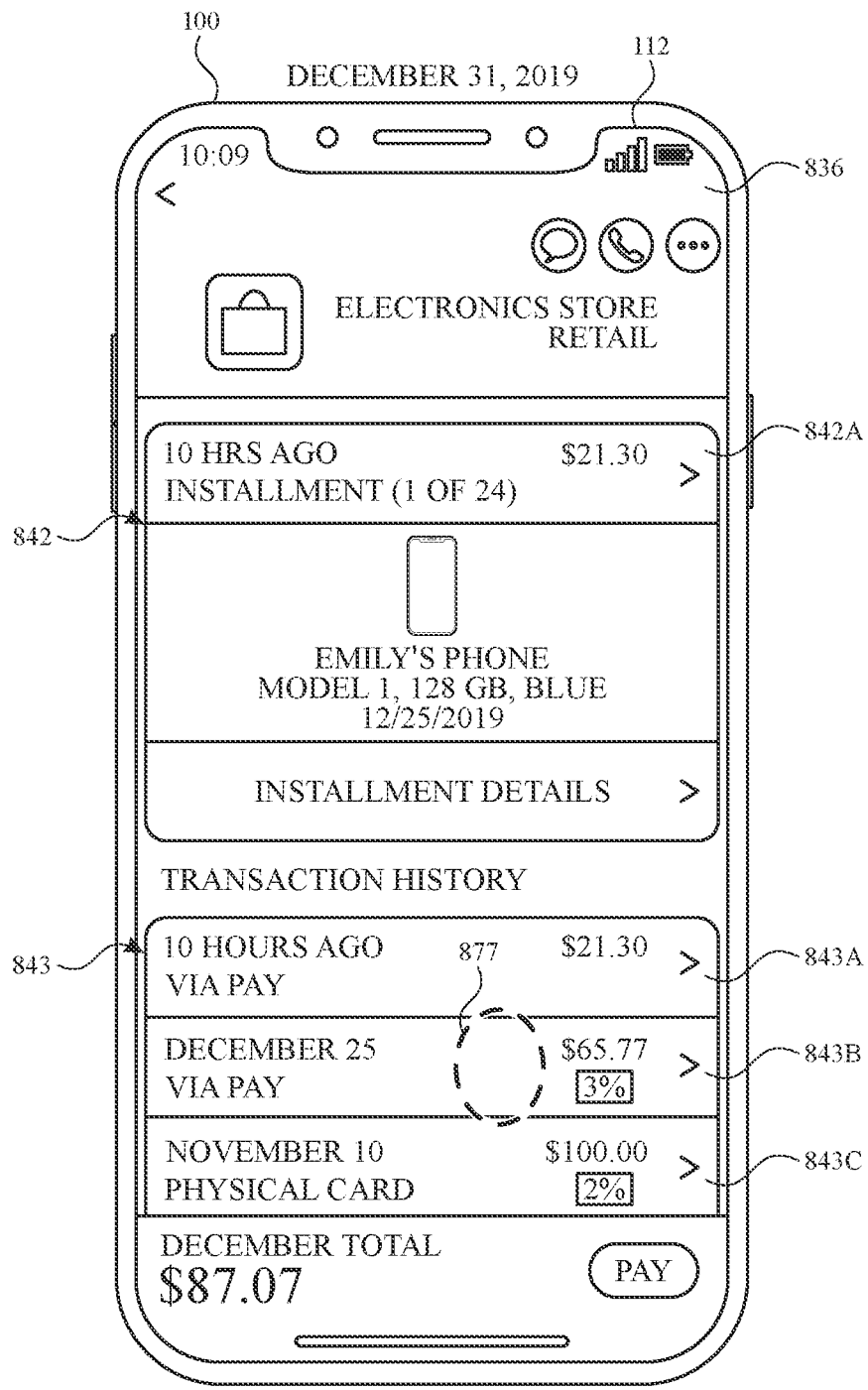
Figure 8A:
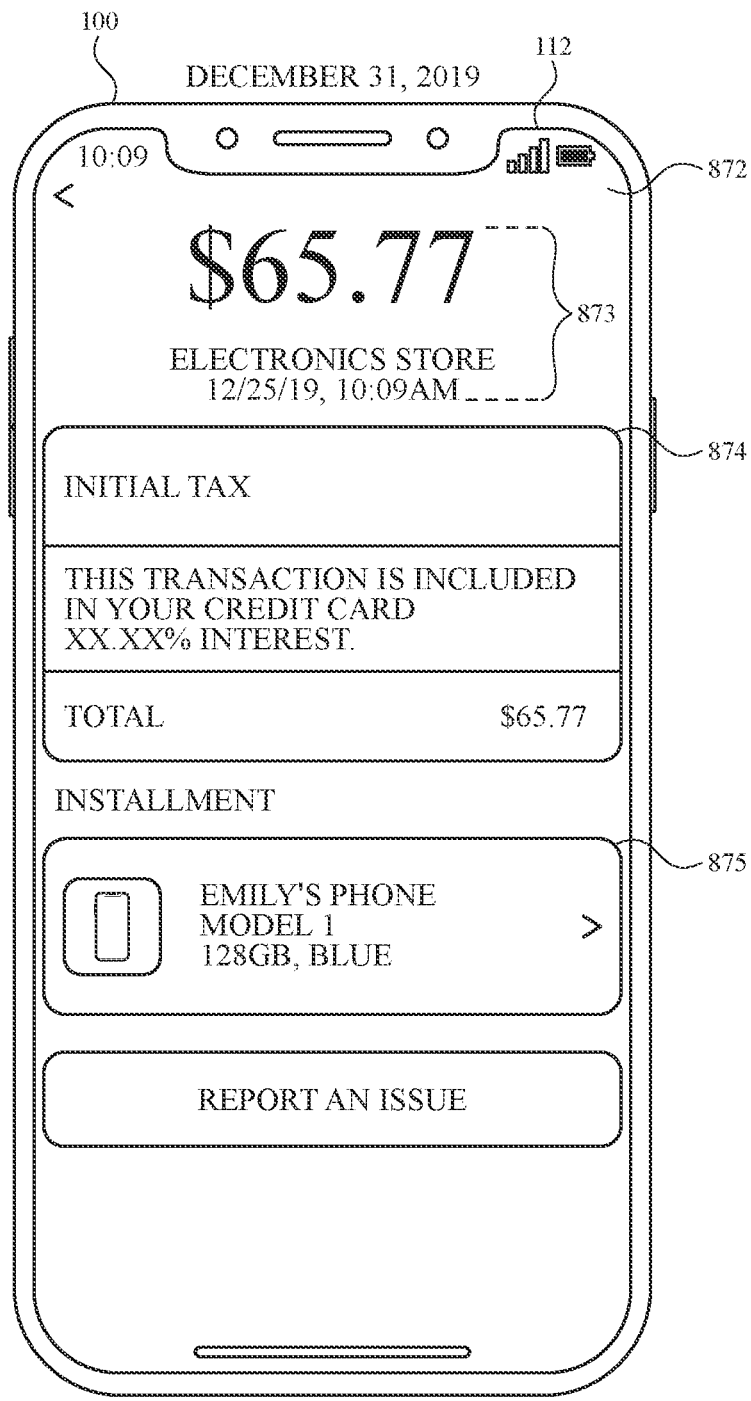
Figure 8A:
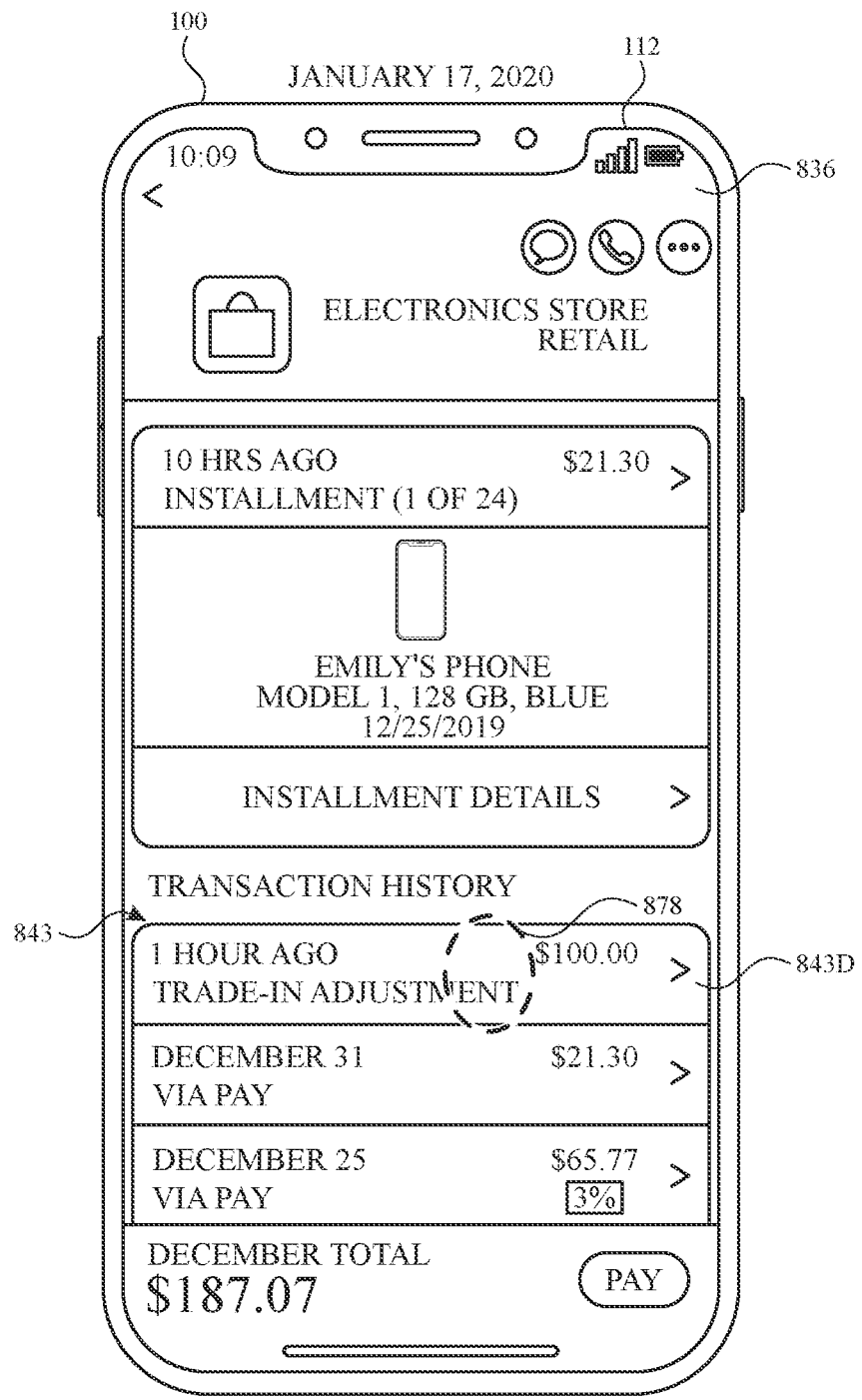
Figure 8A:
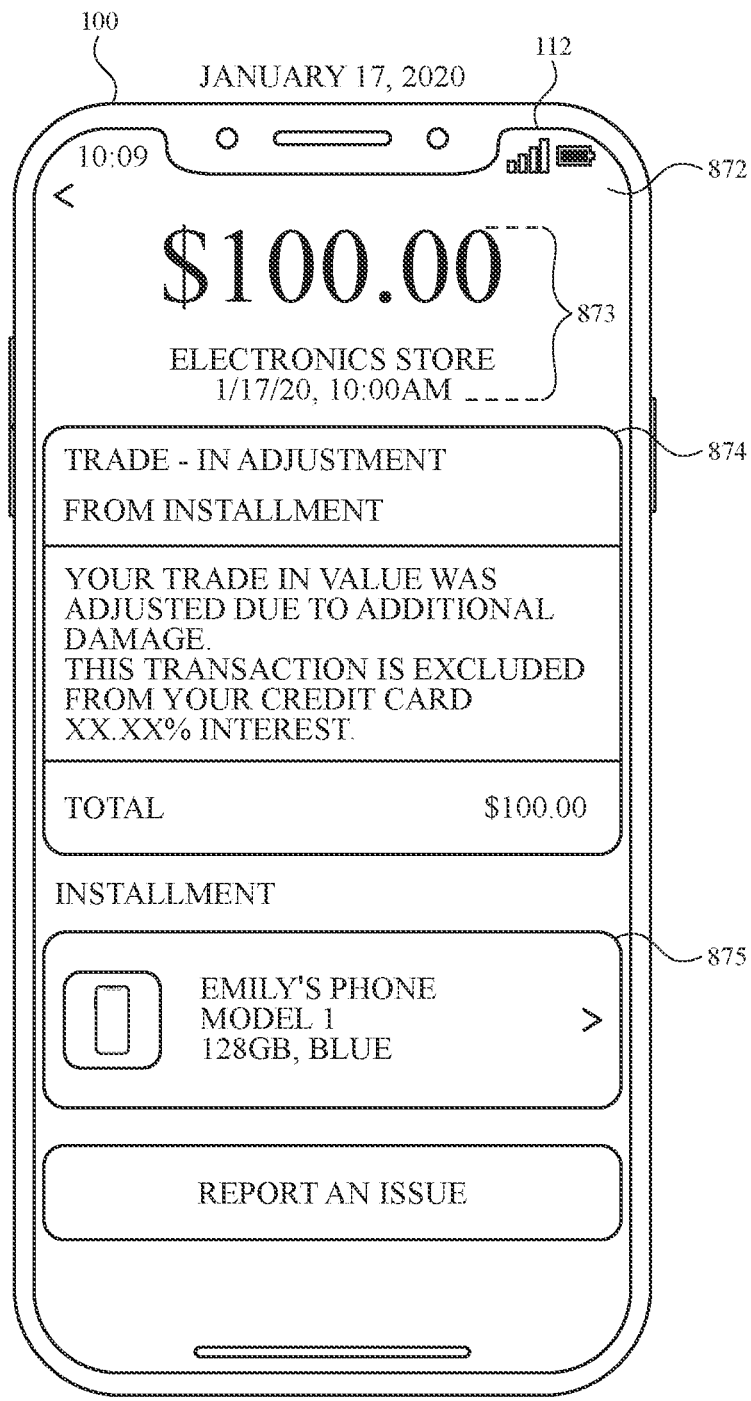
Figure 8A:
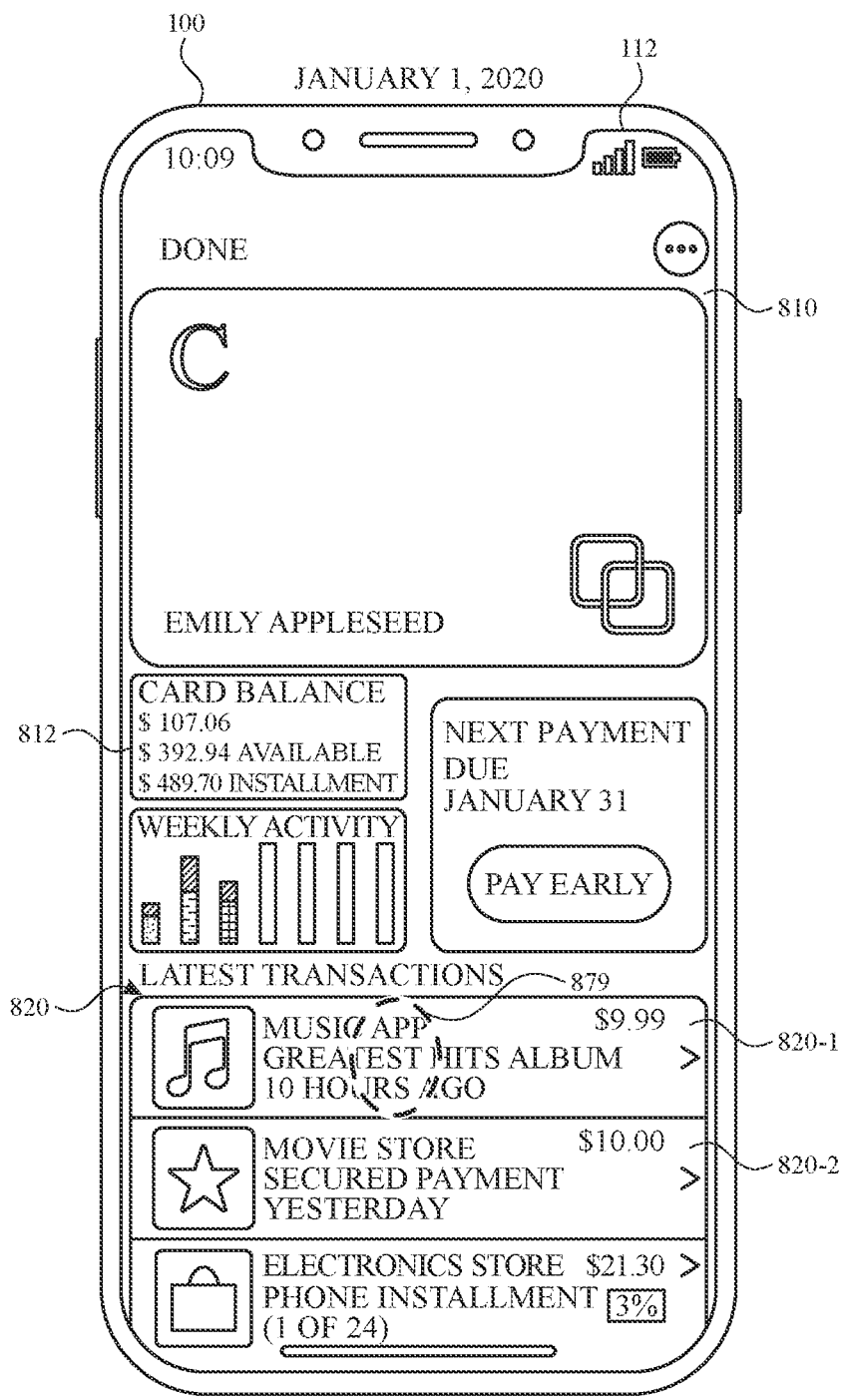
Figure 8A:
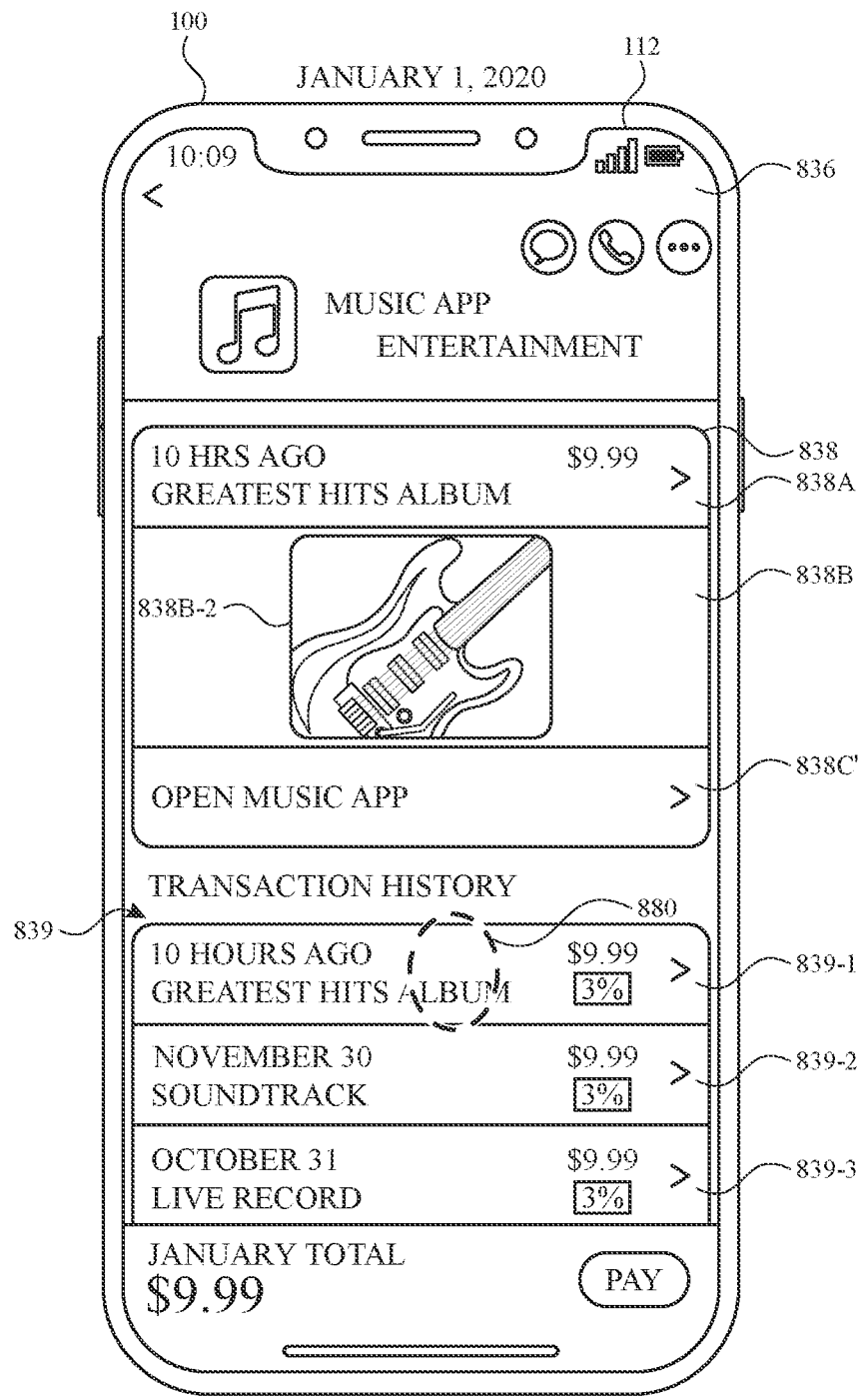
Figure 8A:
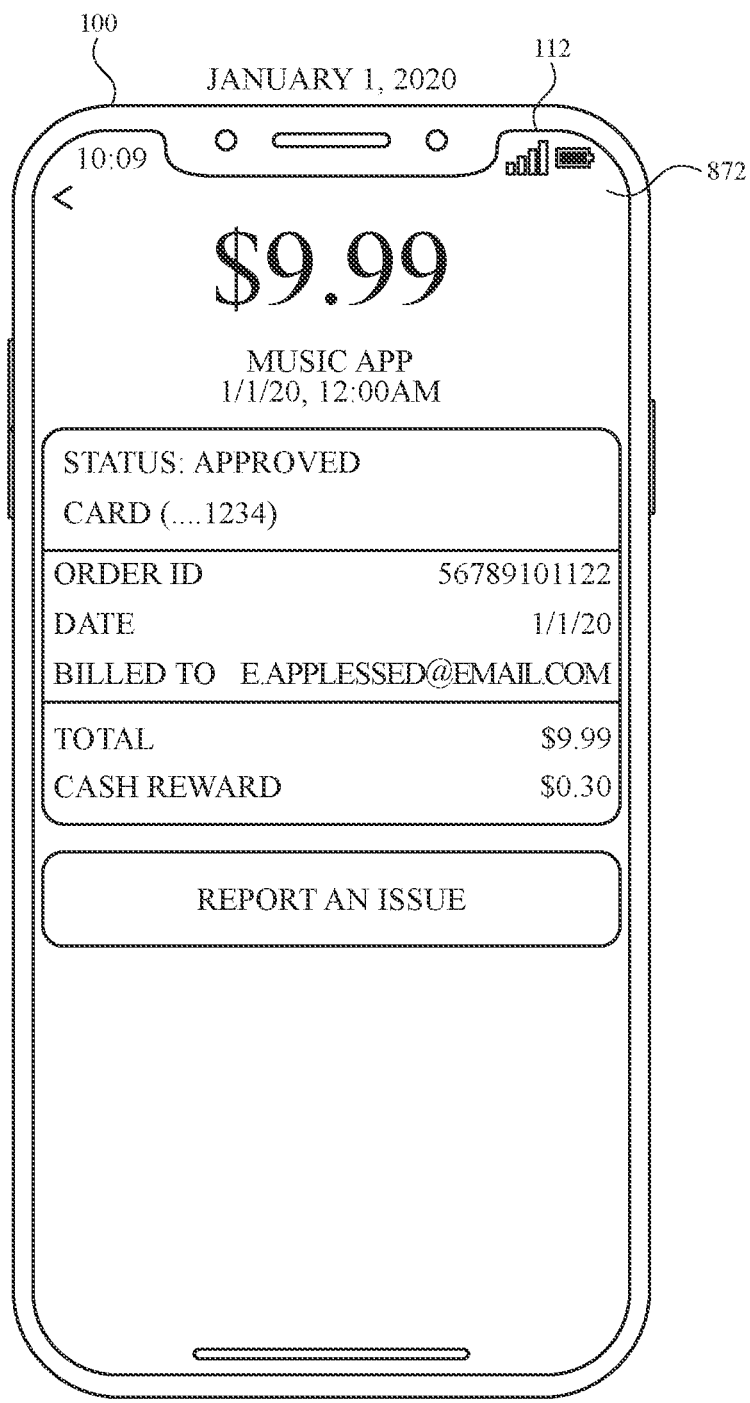
Figure 8A:
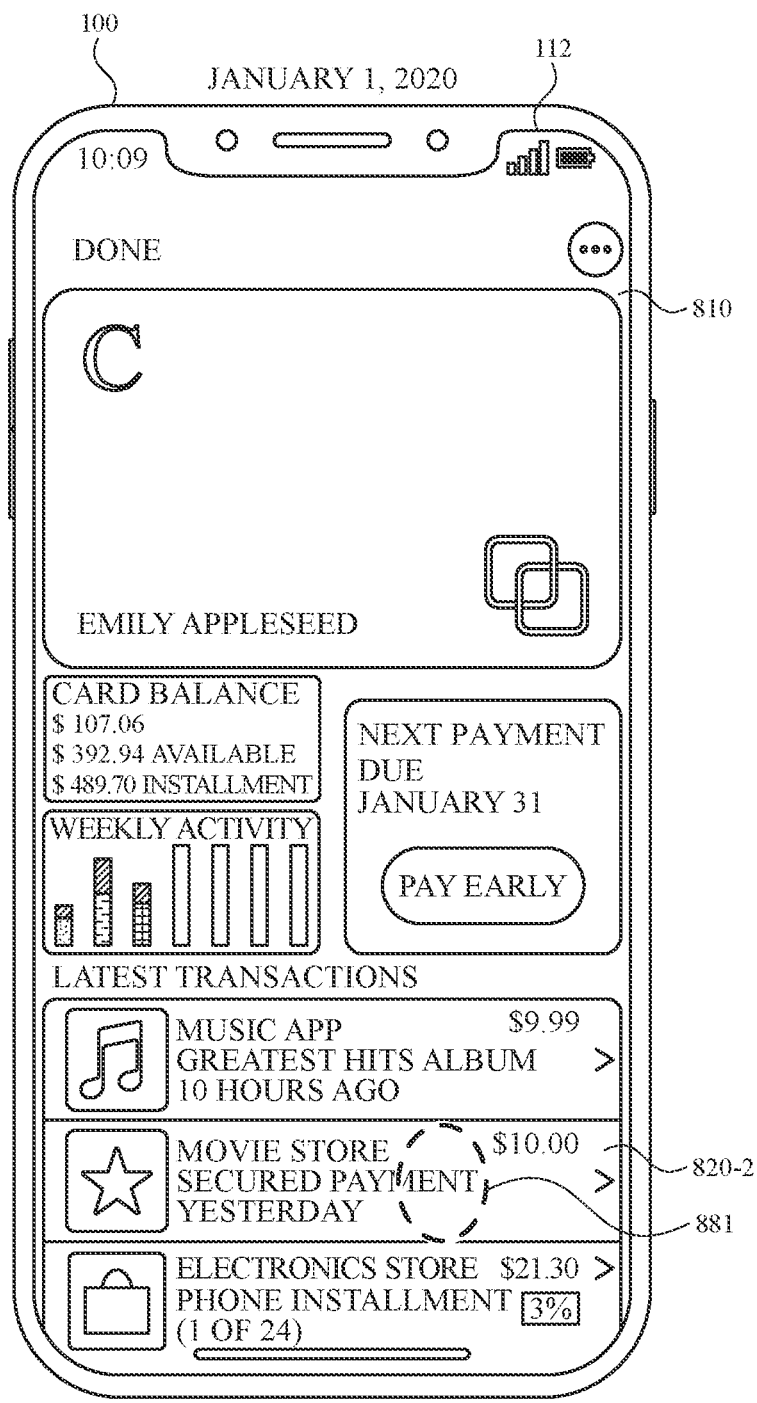
Figure 8A:
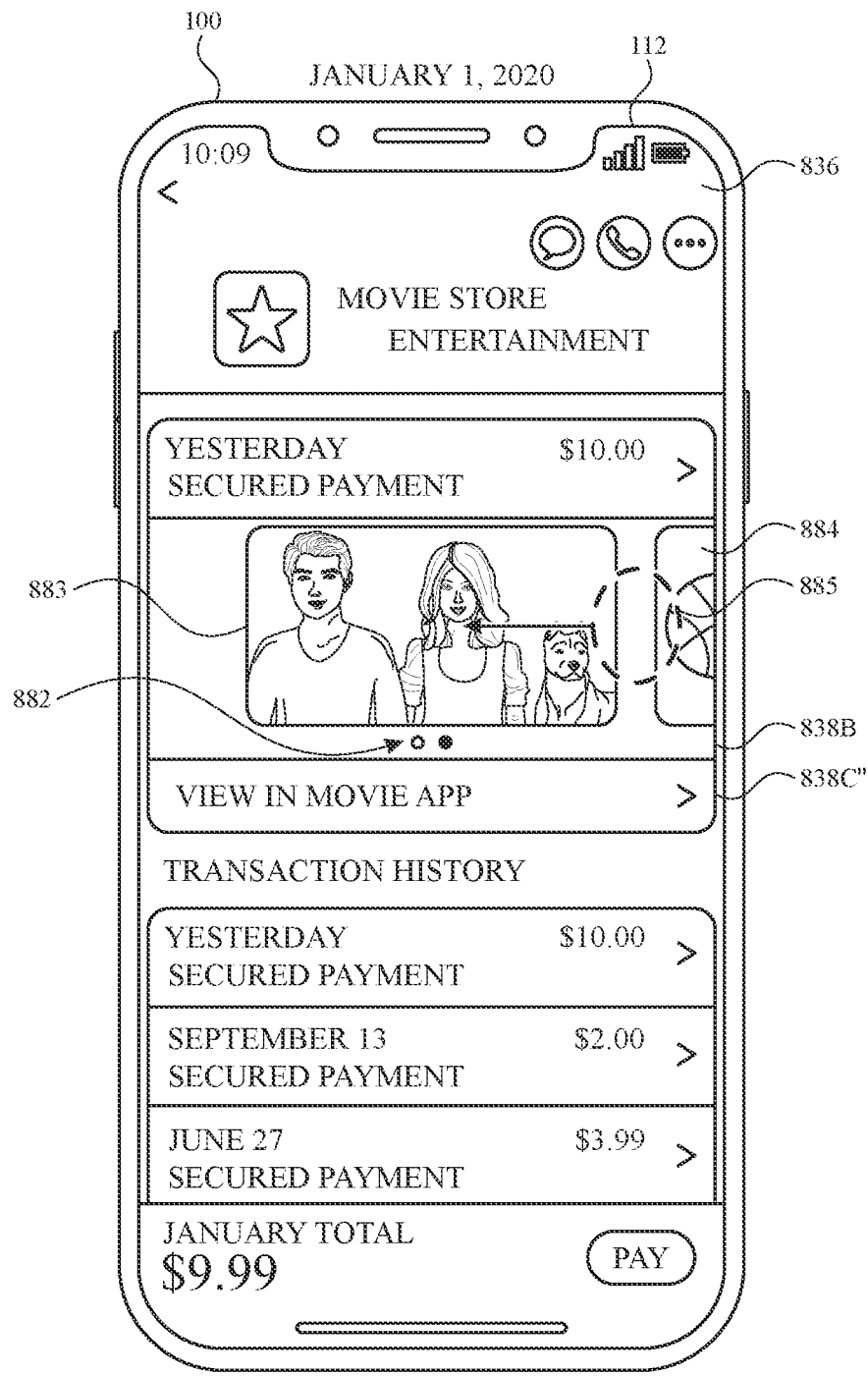
Figure 8A:
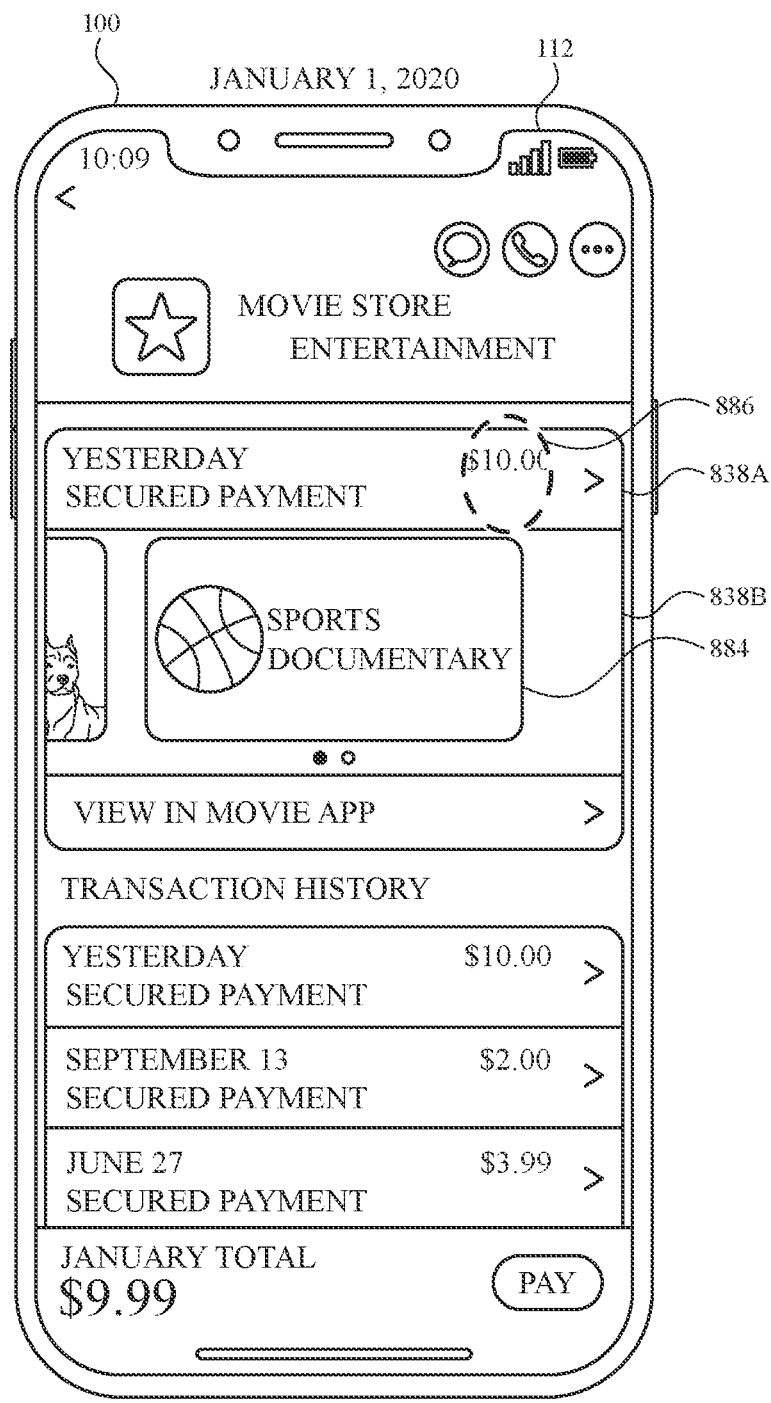
Figure 8A:
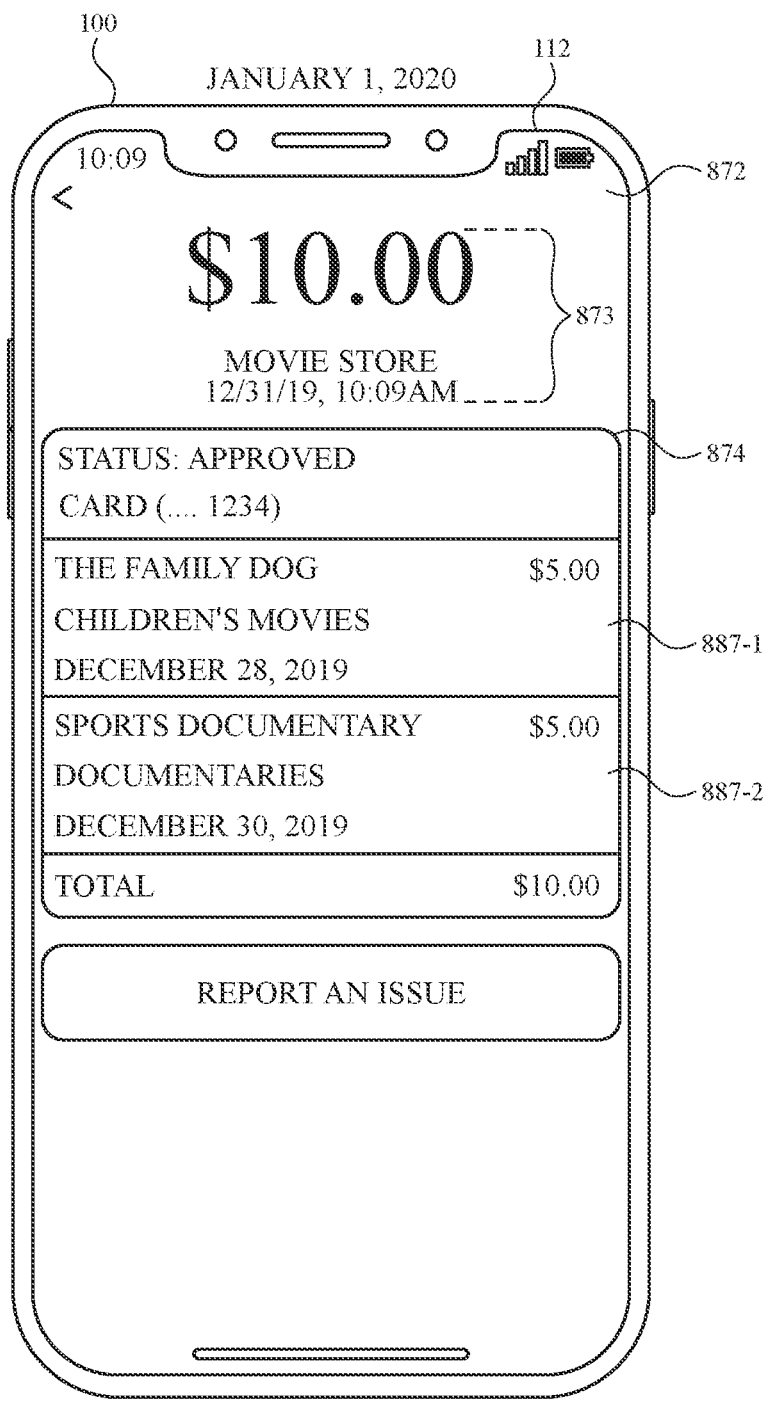

As shown in FIG. 8Y, device 100 detects input 871 on first portion 842A of installment purchase user interface element 842 and, in response, displays transaction details user interface 872 in FIG. 8Z.

As shown in FIG. 8Z, transaction details user interface 872 shows details of the installment transaction made with the merchant indicated in merchant user interface 836. Specifically, transaction details user interface 872 indicates transaction details 873 indicating the amount ($21.30, which is the amount of the first installment), merchant (Electronics Store), and date/time of the transaction (11:55 a.m. on Dec. 31, 2019). Transaction details user interface 872 also shows information user interface element 874 identifying the transaction as an installment transaction (credit card installment), noting a sequence of the installment (1 of 24) and an amount of the installment transaction ($21.30), and indicating whether the transaction is subject to interest. Transaction details user interface 872 further includes option 875 providing an identification of the corresponding installment plan (e.g., similar to first installment plan option 868-1 in FIG. 8X).

In FIG. 8Z, device 100 detects input 876 and, in response, displays, in FIG. 8AA, merchant user interface 836, similar to that shown in FIG. 8Y.

In FIG. 8AA, device 100 detects input 877 on past transfer item 843B and, in response, displays transaction details user interface 872, similar to that shown in FIG. 8Z, but updated to reflect transaction details for past transfer item 843B. For example, in FIG. 8AB, transaction details user interface 872 shows transaction details 873 indicating the transaction amount ($65.77, which is the amount of the tax charged upon purchase of the phone associated with the installment plan), merchant (Electronics Store), and date/time of the transaction (10:09 a.m. on Dec. 25, 2019). Transaction details user interface 872 also shows information user interface element 874 identifying the transaction as being associated with the initial tax for the phone purchase, noting the amount of the transaction ($65.77), and indicating whether the transaction is subject to interest. Transaction details user interface 872 further includes option 875 providing an identification of the corresponding installment plan (e.g., similar to first installment plan option 868-1 in FIG. 8X).

Referring now to FIG. 8AC, device 100 displays, on display 112, merchant user interface 836, as shown on Jan. 17, 2020. Merchant user interface 836 is similar to that shown in FIG. 8AA, except that past transfer item 843D has been added to past transfer item list 843. In the embodiment illustrated in FIG. 8AC, past transfer item 843D corresponds to an adjustment to the trade-in credit applied to the initial purchase of the phone, as discussed above with respect to FIG. 8O. For example, the trade-in device was not received or was in poor condition, so the credit was adjusted via a charge (e.g., a transfer associated with past transfer item 843D) to the transfer account to offset at least a portion of the initial $200 credit that was applied to the purchase of the phone.

In FIG. 8AC, device 100 detects input 878 on past transfer item 843D and, in response, displays transaction details user interface 872 in FIG. 8AD.

As shown in FIG. 8AD, transaction details user interface 872 is similar to that shown in FIG. 8AB, but updated to reflect transaction details for past transfer item 843D. For example, in FIG. 8AD, transaction details user interface 872 shows transaction details 873 indicating the transaction amount ($100, which is the amount of the adjustment to the trade-in credit applied to the initial purchase of the phone associated with the installment plan), merchant (Electronics Store), and date/time of the transaction (10:00 a.m. on Jan. 17, 2020). Transaction details user interface 872 also shows information user interface element 874 identifying the transaction as being associated with an adjustment to the trade-in credit, noting the amount of the transaction ($100), and indicating whether the transaction is subject to interest. Transaction details user interface 872 further includes option 875 providing an identification of the corresponding installment plan (e.g., similar to first installment plan option 868-1 in FIG. 8X). In some embodiments, the transaction associated with past transfer item 843D is added to the transfer balance associated with the transfer account and, therefore, it subject to interest charged to the transfer account. In some embodiments, the transaction associated with past transfer item 843D causes an adjustment of the financed amount associated with the installment plan (e.g., similar to the return of the accident protection plan discussed with respect to FIG. 8P) and, therefore, is not added to the balance of the transfer account and is not subject to interest charged to the transfer account. In some embodiments, information user interface element 874 includes additional information such as, for example, an explanation for why the transaction occurred (e.g., the trade-in value was adjusted due to additional damage to the trade-in device).

Referring now to FIG. 8AE, device 100 displays, via display 112, summary user interface 810. Summary user interface 810 is similar to the embodiments described above, except that transfer items 820-1 and 820-2 have been added to transfer items list 820, and balance summary user interface element 812 has been updated to reflect the additional transfers of $9.99 and $10.00 associated with transfer items 820-1 and 820-2, respectively.

In the embodiment illustrated in FIG. 8AE, transfer item 820-1 corresponds to a purchase of a music album (e.g., "Greatest Hits Album"), which was purchased through "Music App" for $9.99. In some embodiments, "Music App" is an app accessible on device 100 for purchasing and, optionally, playing back music content (e.g., songs). Transfer item 820-2 corresponds to a purchase of two movies, which were purchased through "Movie Store," for $10.00. In some embodiments, "Movie Store" is an app accessible on device 100 for purchasing and, optionally, playing back video content (e.g., movies).

In FIG. 8AE, device 100 detects input 879 on transfer item 820-1 and, in response, displays merchant user interface 836 in FIG. 8AF.

As shown in FIG. 8AF, merchant user interface 836 is similar to the embodiments described above, but updated to show details corresponding to the music purchase associated with transfer item 820-1 selected in FIG. 8AE. For example, purchase user interface element 838 includes first portion 838A including details of the transaction such as, for example, the name of the purchased item (e.g., "Greatest Hits Album"), date of the purchase, and purchase amount.

Purchase user interface element 838 also includes second portion 838B, which shows details of the purchased item. For example, second portion 838B shows image 838B-2 of the album that was purchased with transfer item 820-1. In some embodiments, the image of the album appears substantially identical to the actual purchased album, showing the album with the purchased style, color, size, or any other visible attribute of the item. In some embodiments, second portion 838B can include a representation of the merchant or a representation of a map showing the approximate location at which the item (e.g., the album) was purchased. The map or representation of the merchant can be displayed in lieu of image 838B-2 if, for example, details of the purchased item are not available.

In the embodiment illustrated in FIG. 8AF, third portion 838C' is a selectable option (e.g., an "Open Music App" affordance) to initiate playback of the purchased item. For example, selecting third portion 838C' in FIG. 8AF can launch "Music App" to initiate playback of the purchased album on device 100. In some embodiments, playback of the purchased album can be initiated by selecting image 838B-2.

Merchant user interface 836 also includes listing 839 of prior transfers 839-1, 839-2, and 839-3 associated with "Music App." In the embodiment illustrated in FIG. 8AF, prior transfer 839-1 corresponds to the purchase represented in purchase user interface element 838 and associated with transfer 820-1 (e.g., the purchase of "Greatest Hits Album").

In FIG. 8AF, device 100 detects input 880 on transfer item 839-1 and, in response, displays transaction details user interface 872 in FIG. 8AG, showing details of the transaction associated with prior transfer 839-1 (e.g., transfer 820-1).

Referring now to FIG. 8AH, device 100 displays, via display 112, summary user interface 810, similar to that shown in FIG. 8AE, and detects input 881 on transfer item 820-2. In response to detecting input 881 on transfer item 820-2, device 100 displays merchant user interface 836, as shown in FIG. 8AI.

As shown in FIG. 8AI, merchant user interface 836 is similar to the embodiments described above, but updated to show details corresponding to the movie purchases associated with transfer item 820-2 selected in FIG. 8AH. In the embodiment illustrated in FIG. 8AI, transfer 820-2 corresponds to a single (e.g., one-time) transfer to purchase multiple movies (e.g., multiple movies requested for purchase simultaneously, or multiple movies requested for purchase on different days). Accordingly, second portion 838B of purchase user interface element 838 shows details of the purchased items including, for example, images 883 and 884, each representing a movie purchased with transfer 820-2. Image 883 is a visual representation of a first purchased movie showing, for example, artwork or a screenshot associated with the first movie. Similarly, image 884 is a visual representation of a second purchased movie showing, for example, artwork or a screenshot associated with the second movie. Second portion 838B further includes page dots 882 indicating that second portion 838B is a scrollable region that can be manipulated (e.g., scrolled) to display images 883 and 884, as discussed in greater detail below.

In the user interface illustrated in FIG. 8AI, third portion 838C" is a selectable option (e.g., an "Open in Movie App" affordance) to initiate playback of one of the purchased movies. For example, selecting third portion 838C" in FIG. 8AI launches "Movie App" on device 100 (e.g., replaces user interface 836 with a user interface for the "Movie App" application) to initiate playback of the movie corresponding to image 883 shown centered in second portion 838B. In some embodiments, playback of the purchased movie can be initiated by selecting the respective image 883/884 in second portion 838B.

In FIG. 8AI, image 883 is displayed centered in second portion 838B, device 100 detects input 885 (e.g., a swipe gesture) on second portion 838B and, in response, updates second portion 838B to display image 884 centered in second portion 838B, as shown in FIG. 8AJ.

In FIG. 8AJ, device 100 detects input 886 on first portion 838A and, in response, displays transaction details user interface 872 in FIG. 8AK, showing details of the transaction associated with transfer 820-2.

In the embodiment shown in FIG. 8AK, information user interface element 874 shows two components of the transfer: a first request (indicated by details 887-1) to purchase a first movie ("The Family Dog"), and a second request (indicated by details 887-2) to purchase a second movie ("Sports Documentary"). Details 887-1 indicate that the first movie was requested for purchase (e.g., including being processed and available for viewing) on Dec. 28, 2019. Details 887-2 indicate that the second movie was requested for purchase (e.g., including being processed and available for viewing) on Dec. 30, 2019. Transaction details 873 indicate that the transfer for purchasing both movies was processed as a single transfer (e.g., transfer 820-2) at 10:09 a.m. on Dec. 31, 2019. Thus, the two movies were requested for purchase on different days (e.g., and available for viewing on those respective dates), and a single transfer was processed on a subsequent date to account for the purchase of the two movies. Accordingly, information user interface element 874 shows the itemized receipt for transfer 820-2 having the two movie purchases, wherein the requests for the movie purchases were processed on different dates, and the corresponding transfer for both purchases was processed as a single transaction for both purchases at a subsequent date.

FIG. 9 is a flow diagram illustrating a method for managing a user account using an electronic device in accordance with some embodiments. Method 900 is performed at a device (e.g., 100, 300, 500) with a display device (e.g., 112) and one or more input devices (e.g., the touch screen of display 112). Some operations in method 900 are, optionally, combined, the orders of some operations are, optionally, changed, and some operations are, optionally, omitted.

As described below, method 900 provides an intuitive way for managing a user account. The method reduces the cognitive burden on a user for managing a user account, thereby creating a more efficient human-machine interface. For battery-operated computing devices, enabling a user to manage a user account faster and more efficiently conserves power and increases the time between battery charges.

The electronic device (e.g., 100) displays (902), on the display device (e.g., 112), a first user interface (e.g., 710; 810) (e.g., a dashboard user interface, a dashboard page of a user account showing summarized information corresponding to use of the user account, a main details page of the user account) corresponding to a user account (e.g., a data storage management account) (e.g., a transfer account, a payment account, a virtual card account). The first user interface includes: a first user interface element (e.g., 720A; 720B) (e.g., 820A; 820C; 820D; 820-1; 820-2) (e.g., a first transfer item) that corresponds to a first task (e.g., a request to store first data at a remote storage database) (e.g., a past transfer; one or more past payment transactions) performed using the user account; and a second user interface element (e.g., a different one of 720A; 720B) (e.g., a different one of 820A; 820C; 820D; 820-1; 820-2) (e.g., a second transfer item) that corresponds to a second task (e.g., a second request to store second data, different from the first data, at the remote storage database) (e.g., a second past transfer separate from the first past transfer; one or more past payment transactions separate from the first past transfer) performed using the user account.

In some embodiments, the user account is a computer storage management account.

In some embodiments, the first task performed with the user account is a request (e.g., 720B) to store first data onto available computer storage resources (e.g., an available MB or GB amount of computer resources (e.g., memory)) associated with the computer storage account. In some embodiments, the second task performed with the user account is a request (e.g., 720A) to store second data, different from the first data, onto available computer storage resources associated with the computer storage account.

In some embodiments, the first data corresponds to a document and the first image (e.g., 731) has an appearance of the document.

In some embodiments, the second data corresponds to a photograph and the second image (e.g., 735) has an appearance of the photograph.

While displaying the first user interface (e.g., 720A; 720B) (e.g., 820A; 820C; 820D; 820-1; 820-2), the device (e.g., 100) detects (904) a first user input (e.g., 702; 734) (e.g., 835; 841; 879; 881).

In response to detecting the first user input, the device (e.g., 100) performs (906) one or more of the items in 908 and 910, discussed below.

In accordance with a determination that the first user input (e.g., 702; 734) (e.g., 835; 841; 879; 881) corresponds to a selection of the first user interface element (e.g., 720A; 720B) (e.g., 820A; 820C; 820D; 820-1; 820-2), device (e.g., 100) displays (908) a second user interface (e.g., 725) (e.g., 836) (e.g., while ceasing to display the first user interface) having a first image (e.g., 731; 735) (e.g., 838B-1; 842B-1; 838B-2; 883, 884) corresponding to one or more items (e.g., data, media, goods, and/or services) associated with the first task performed using the user account (e.g., the first image has an appearance that represents content included in the first data requested to be stored in the first request) (e.g., the first image has an appearance that represents at least one item acquired (e.g., purchased) in the first transfer) without displaying a second image (e.g., a different one of 731; 735) (e.g., a different one of 838B-1; 842B-1; 838B-2; 883, 884) (e.g., different from the first image) corresponding to one or more items associated with the second task performed using the user account.

Displaying the second user interface having the first image corresponding to one or more items associated with the first task performed using the user account without displaying the second image associated with the second task performed using the user account provides enhanced feedback by visually confirming to a user the item that is associated with the selected first task, without requiring additional input from the user (for example to search for product details or receipt data) to determine the item associated with the task. Providing improved visual feedback and reducing the number of inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first image represents one or more content items included in the first data. For example, the second user interface may display an image of a document that was requested, in the first request, to be stored at the remote storage database. The image of the document is substantially identical to at least a portion of the document that is being stored at the remote storage database. For example, the image of the document includes the same images, text, and other displayed content that is included in the actual document being stored at the remote storage database. In some embodiments, the first image represents one or more items that were acquired in the first transfer. For example, the second user interface may display an image of an electronic device purchased in the first transfer. The image of the electronic device may have the same style, color, and shape as the actual purchased electronic device. In some embodiments, the second user interface may display images of multiple items that were acquired in the first transfer. In some embodiments, the second user interface is interactive and can switch between displaying images of the items in response to an input (e.g., a user input such as a swipe).

In some embodiments, the one or more items associated with the first request includes a first electronic device (e.g., a smartphone) having a plurality of physical characteristics (e.g., a size, color, shape). In some embodiments, the second user interface further includes information (e.g., 842B) identifying the first electronic device (e.g., a user account name or device name associated with the first electronic device). In some embodiments, the first image (e.g., 842B-1) includes a representation of the first electronic device having one or more of the plurality of physical characteristics of the first electronic device (e.g., the first image is an image of the first electronic device that includes a representation of one or more of the physical characteristics of the first electronic device).

In some embodiments, the second user interface includes a scrollable region (e.g., 838B in FIG. 8AI) displaying the first image (e.g., 883) corresponding to one or more items associated with the first task performed using the user account.

In some embodiments, device (e.g., 100) detects an input (e.g., 885) (e.g., a swipe input) on the scrollable region. In response to detecting the input on the scrollable region, device displays a third image (e.g., 884) corresponding to one or more items associated with the first task performed using the user account (e.g., scrolling the scrollable region to display the third image corresponding to one or more items, different from the first image corresponding to one or more items). Displaying the third image in response to detecting the input on the scrollable region allows a user to quickly and easily access multiple items associated with the first task without requiring the user to provide further inputs to navigate different user interfaces to view/access the different items. This reduces the number of inputs needed to view the items associated with the first task. Reducing the number of inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first image (e.g., 838B-1) corresponding to one or more items associated with the first task performed using the user account is an image of a respective item associated with the first task. In some embodiments, the second image (e.g., 842B-1) corresponding to one or more items associated with the second task performed using the user account is an image of a respective item associated with the second task that is different from the image of the respective item associated with the first task. In some embodiments, the different items associated with the first and second tasks are represented by different images. For example, an item associated with the first task can be sunglasses and an item associated with the second task can be a smartphone. In this example, the first image is a visual representation of the sunglasses and the second image is a visual representation of the smartphone, which has a different appearance than the image of the sunglasses.

Displaying the first image of a respective item associated with the first task and displaying the second image of a respective item associated with the second task that is different from the image of the respective item associated with the first task provides enhanced feedback by visually confirming to a user the item that is associated with the respective first and second tasks, without requiring additional input from the user (for example to search for product details or receipt data) to determine the different items associated with the tasks. Providing improved visual feedback and reducing the number of inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the first user input (e.g., 702; 734) (e.g., 835; 841; 879; 881) corresponds to a selection of the second user interface element (e.g., 720A; 720B) (e.g., 820A; 820C; 820D; 820-1; 820-2), device (e.g., 100) displays (910) the second user interface (e.g., 725) (e.g., 836) having the second image (e.g., 731; 735) (e.g., 838B-1; 842B-1; 838B-2; 883, 884) (e.g., different from the first image) corresponding to one or more items associated with the second task performed using the user account (e.g., the second image has an appearance that represents content included in the second data requested to be stored in the second request) (e.g., the second image has an appearance that represents at least one item acquired (e.g., purchased) in the second transfer) without displaying the first image (e.g., 731; 735) (e.g., 838B-1; 842B-1; 838B-2; 883, 884) corresponding to one or more items associated with the first task performed using the user account.

Displaying the second user interface having the second image corresponding to one or more items associated with the second task performed using the user account without displaying the first image associated with the first task performed using the user account provides enhanced feedback by visually confirming to a user the item that is associated with the selected second task, without requiring additional input from the user (for example to search for product details or receipt data) to determine the item associated with the task. Providing improved visual feedback and reducing the number of inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second image represents one or more content items included in the second data. For example, the second user interface may display an image of a photograph that is requested, via the second request, to be stored in the remote storage database. In some embodiments, the second image represents one or more items that were acquired in the second transfer. For example, the second user interface may display an image of an album cover that corresponds to an album or song purchased in the second transfer. In some embodiments, the second user interface may display images of multiple items that were acquired in the second transfer. For example, the second user interface may display a first image of an album cover that corresponds to a purchased song and a second image of cover art that corresponds to a purchased movie. In some embodiments, the second user interface is interactive and can switch (e.g., in response to an input) between displaying images such as, for example, the image of the album cover and the image of the cover art.

In some embodiments, the user account is a transfer account (e.g., a payment account; a virtual card account; a first-party credit account; a points account). In some embodiments, the first task performed with the user account is a first transfer (e.g., 820D) (e.g., a past transfer; one or more past payment transactions). In some embodiments, the second task performed with the user account is a second transfer (e.g., 820C) different (e.g., separate) from the first transfer.

In some embodiments, the first transfer is an installment transaction (e.g., 820D) in an installment plan (e.g., a transaction (e.g., financial transaction) in a series of transactions that are scheduled to be settled in repeating installments over a number of cycle periods (e.g., monthly) until the installment plan purchase (e.g., debt) is settled in full). In some embodiments, method 900 further includes, while displaying the second user interface (e.g., 836) having the first image (e.g., 842B-1) corresponding to one or more items associated with the first task performed using the user account, detecting a second user input (e.g., 844). In response to detecting the second user input, the device displays an installment plan details user interface (e.g., 845) corresponding to an item (e.g., a phone) associated with the installment transaction (e.g., an item acquired (e.g., purchased in-full or in-part) via the installment transaction/plan).

In some embodiments, the installment plan details user interface (e.g., 845) includes a visual representation (e.g., 846-1) of the item associated with the installment transaction. Displaying the installment plan details user interface with a visual representation of the item associated with the installment transaction provides enhanced feedback by visually confirming to a user the item that is associated with the installment plan, without requiring additional input from the user (for example to search for product details or receipt data) to determine the item associated with the installment plan. Providing improved visual feedback and reducing the number of inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second user interface (e.g., 836) includes a first affordance (e.g., 842C) (e.g., an "installment details" affordance), and the second user input (e.g., 844) corresponds to a selection of the first affordance.

In some embodiments, the installment plan details user interface (e.g., 845) includes a first set of installment progress data (e.g., 847A) (e.g., an amount billed towards the installment plan) and a second set of installment progress data (e.g., 847B) (e.g., an amount remaining to be paid towards the installment plan (e.g., remaining balance)). In some embodiments, method 900 further includes: after displaying the first set of installment progress data having a first value (e.g., 847A has a value of $21.30 in FIG. 8N) (e.g., a first billed amount) and the second set of installment progress data having a second value (e.g., 847B has a value of $489.70 in FIG. 8N) (e.g., a first remaining balance), the device performs one or more of the following items: detecting a third transfer (e.g., 849-11) performed with the user account (e.g., a subsequent installment billed to the transfer account); detecting a request to redisplay the installment plan details user interface (e.g., a subsequent selection of the "installment details" affordance in the second user interface) (e.g., a request to refresh display of the installment plan details user interface); and in response to detecting the request to redisplay the installment plan details user interface, displaying the installment plan details user interface with the first set of installment progress data having a first updated value (e.g., 847A has a value of $185.50 in FIG. 8R) (e.g., the amount billed is updated (e.g., increased) to include the subsequent installment billed to the transfer account) and the second set of installment progress data having a second updated value (e.g., 847B has a value of $213.50 in FIG. 8R) (e.g., the remaining balance is updated (e.g., reduced) to reflect the subsequent installment billed to the transfer account) (e.g., the first updated value and the second updated value are determined based on the amount of the subsequent installment billed to the transfer account).

Redisplaying the installment plan details user interface with the first set of installment progress data having the first updated value and the second set of installment progress data having the second updated value provides the user with a status of the installment plan that is current without requiring further inputs for data entry to indicate updates to the installment plan. Reducing inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the installment plan details user interface includes a visual representation of progress (e.g., 848) (e.g., an installment progress bar) towards completion of the installment plan. Displaying the installment plan details user interface having a visual representation of progress towards completion of the installment plan provides the user with a status of the installment plan that is current without requiring further inputs for data entry to indicate updates to the installment plan. Reducing inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the installment plan details user interface (e.g., 845) includes a second affordance (e.g., 842A; 843A; 843B; 843C; 847D; 849-11; 849-24) (e.g., an item in the installment history) (e.g., an installment progress bar). In some embodiments, the device detects an input (e.g., 859; 861; 871) directed to the second affordance; and in response to detecting the input directed to the second affordance, displaying an installment transaction user interface (e.g., 852) (e.g., an installment receipt user interface) including transaction details (e.g., 854; 855; 856A; 856B) for the installment plan. In some embodiments, the transaction details include one or more of the following items: purchase amount, vendor, purchase date/time, duration of installment, itemization of purchased items (e.g., device, accident protection), identification of purchased device, credit applied to the purchase (e.g., trade-in value), a subtotal of the amount financed, rewards/credit received for the purchase, and totals for the amount financed and rewards/credit.

In some embodiments, the transaction details (e.g., 855) for the installment plan have a first set of values (e.g., as shown in FIG. 8O) associated with the installment plan (e.g., a first state of the installment receipt). In some embodiments, after displaying the installment transaction user interface with the transaction details for the installment plan having the first set of values associated with the installment plan (e.g., 855 in FIG. 8O), the device detects an adjustment to one or more aspects of the installment plan (e.g., an adjustment to a credit applied to the installment plan) (e.g., return/refund of an upfront purchase (e.g., accident protection insurance) included in the installment plan). The device also detects a request to redisplay the installment transaction user interface (e.g., a subsequent selection of the second affordance in the installment plan details user interface) (e.g., a request to refresh display of the installment transaction user interface). In response to detecting the request to redisplay the installment transaction user interface, the device displays the installment transaction user interface (e.g., 852) with the transaction details for the installment plan having an updated set of values associated with the installment plan and based on the adjustment to one or more aspects of the installment plan (e.g., 852 is updated in FIG. 8P) (e.g., a second (updated) state of the installment receipt that is updated to reflect the adjustment to the installment plan).

Displaying the installment transaction user interface with the transaction details for the installment plan having an updated set of values associated with the installment plan and based on the adjustment to one or more aspects of the installment plan provides the user with an electronic transaction receipt that is current without requiring further inputs for data entry to indicate updates to the installment plan. Reducing inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more items associated with the first transfer include a first item (e.g., movie associated with image 883) that was acquired (e.g., purchased or requested for purchase) on a first date and a second item (e.g., movie associated with image 884) that was acquired (e.g., purchased or requested for purchase) on a second date different from the first date. In some embodiments, the first transfer (e.g., 820-2) was performed on a third date different from at least one of the first date and the second date. In some embodiments, while displaying the second user interface (e.g., 836), the device receives a request (e.g., 886) to display transaction details for the one or more items associated with the first transfer. In response to receiving the request to display transaction details for the one or more items associated with the first transfer, the device displays a representation (e.g., 887-1) of the first item that was acquired on the first date and displays a representation (e.g., 887-2) of the second item that was acquired on the second date. In some embodiments, the transaction details for the one or more items associated with the first transfer further include information detailing the date (e.g., the third date) on which the first transfer was performed (e.g., processed).

Displaying a representation of the first item that was acquired on the first date and displaying a representation of the second item that was acquired on the second date, allows a user to view two items that were acquired separately, but charged with a single transaction, without having to navigate between different interfaces to view the different items. This reduces the number of inputs needed to view the items associated with the transaction. Reducing the number of inputs needed to perform an action enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the second user interface (e.g., 836) having the second image corresponding to one or more items associated with the second task performed using the user account without displaying the first image corresponding to one or more items associated with the first task performed using the user account includes one or more of the following items. In accordance with a determination that first criteria are met, the first criteria including a criterion that is met when image detail data (e.g., data that indicates physical characteristics (e.g., a size, color, shape) of the item(s)) is available for the one or more items associated with the second task, the device displays the second image (e.g., 842B-1) having a representation of the image detail data for the one or more items associated with the second task (e.g., the second image represents the physical characteristics that are indicated by the image detail data). In accordance with a determination that the first criteria are not met, the device displays the second image having a representation of a merchant (e.g., an image of the merchant) (e.g., an image of a map with a location corresponding to a location of the merchant) associated with the one or more items associated with the second task.

In some embodiments, the one or more items (e.g., 820-1; 820-2) associated with the first task performed using the user account includes a media item (e.g., a song, photograph, video, movie, etc.). In some embodiments, while displaying the second user interface (e.g., 836), the device detects a selection of a third affordance (e.g., 838C; 838C") (e.g., a selection of the "Open Music App" affordance, selection of an image associated with the media item, or selection of the "View in Movie App" affordance). In response to detecting the selection of the third affordance, the device initiates playback of the media item on the electronic device (e.g., 100) (e.g., playing the media item on the electronic device, for example, directly in the second user interface or in an application designated for playback of the media item (e.g., opening a music application or a video application to playback the media)).

In some embodiments, while displaying the second user interface (e.g., 836), the device detects a selection (e.g., 871) of a fourth affordance (e.g., 842A) (e.g., a selection of an installment identification affordance). In response to detecting the selection of the fourth affordance, the device displays details (e.g., 873; 874) of the first task performed with the user account. In some embodiments, the first task is an installment transaction and the details of the first task include an amount of the installment transaction, the sequence of the installment transaction (e.g., 1 of 24), and information explaining that the installment transaction is excluded from interest accruing on the user account.

In some embodiments, the user account is a transfer account. In some embodiments, while displaying the second user interface (e.g., 863), the device detects a selection (e.g., 866) of a fifth affordance (e.g., 865). In response to detecting the selection of the fifth affordance, the device displays a listing (e.g., 867) of installment plans associated with the transfer account. In some embodiments, the installment plans are associated with different purchased items and optionally include an image that represents one or more items associated with each respective installment plan.

Note that details of the processes described above with respect to method 900 (e.g., FIG. 9) are also applicable in an analogous manner to the methods described below. For example, method 1200 optionally includes one or more of the characteristics of the various methods described above with reference to method 900. For example, the user interfaces discussed in method 1200 can be used to initiate a balance transfer for the user account discussed in method 900. For brevity, these details are not repeated below.

FIGS. 10A-10H illustrate exemplary user interfaces for managing deletion of data from remote data storage associated with a user account (e.g., a computer storage management account), in accordance with some embodiments. Unless stated otherwise, the user account of FIGS. 10A-10H is similar to the user account described above with reference to FIGS. 7A-7D. For the sake of brevity, redundant details are not repeated below. The user interfaces in these figures are used to illustrate the processes described below, including the processes in FIG. 12.

Figure 10A:
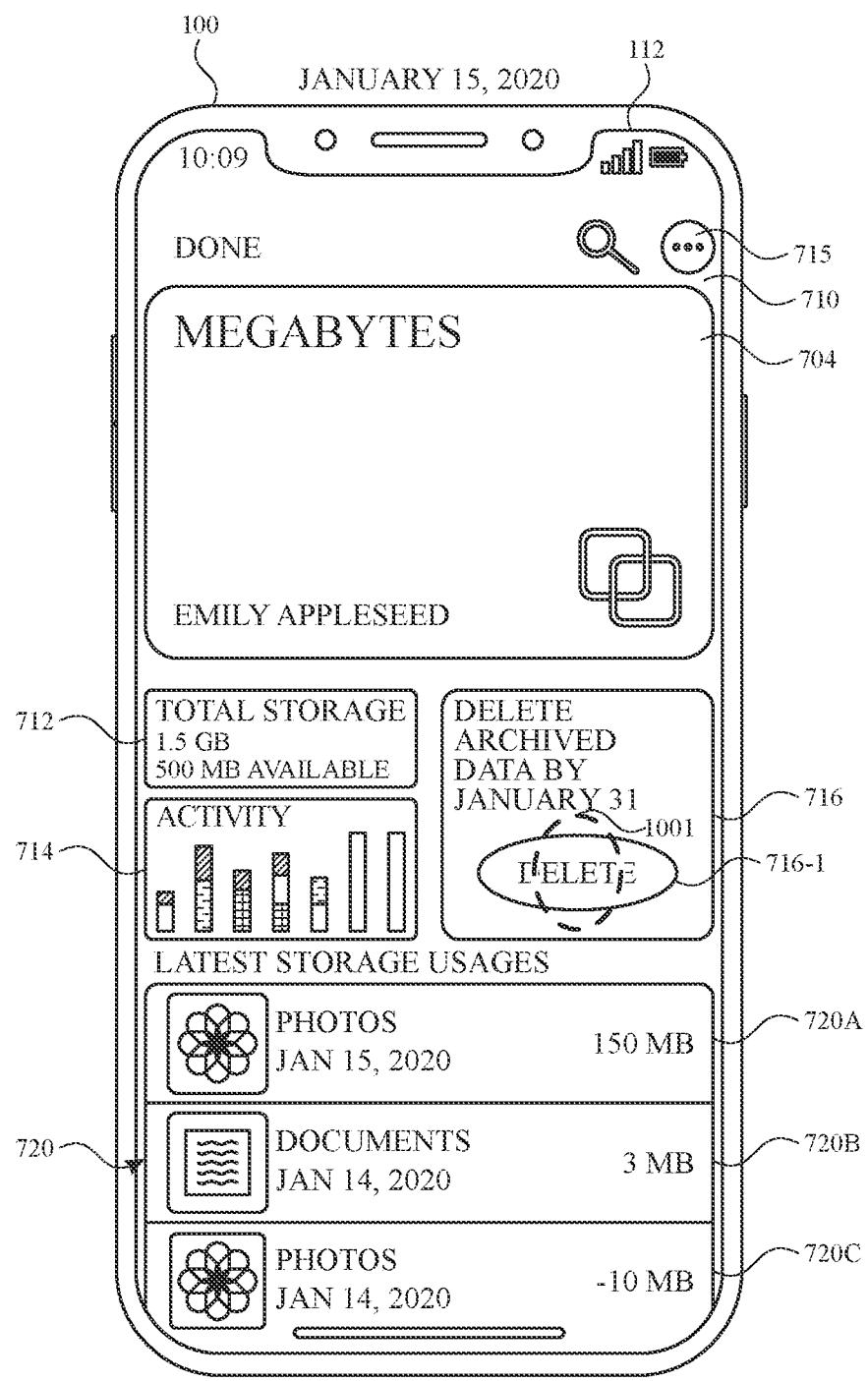
FIGS. 10A-10H illustrate exemplary user interfaces for managing deletion of data from remote data storage associated with a user account, in accordance with some embodiments.
Figure 11A:
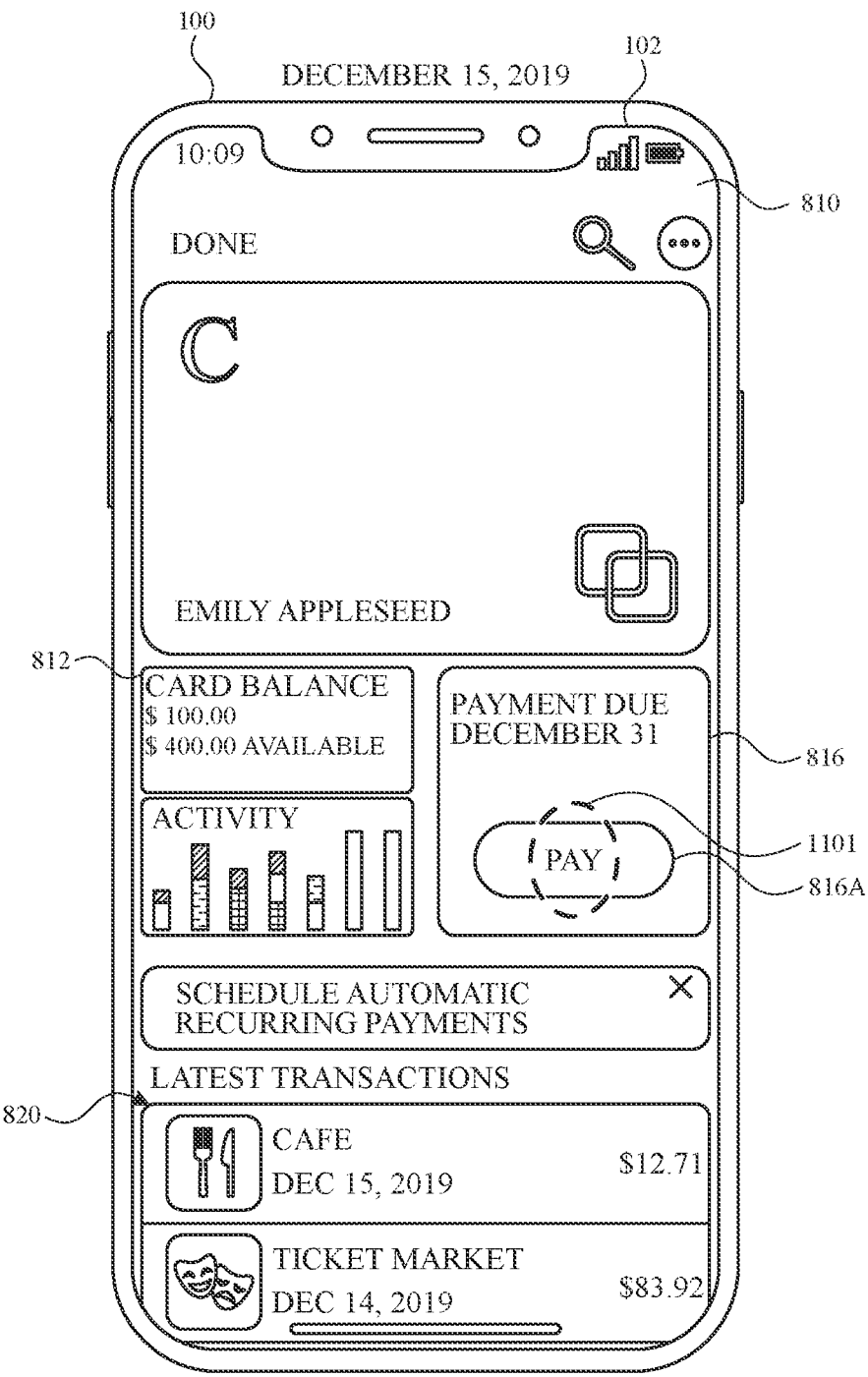
FIGS. 11A-11R illustrate exemplary user interfaces for managing a balance transfer of a user account, in accordance with some embodiments.

FIG. 10A illustrates electronic device 100 with display 112. In FIG. 10A, device 100 displays summary user interface 710, similar to that shown in FIG. 7A and described above, except that, in the embodiment illustrated in FIG. 10A, the user account is not currently managing bulk data (e.g., there is currently no bulk data being stored remotely, or there is no such policy for managing bulk data via the user account). As such, summary user interface 710 (e.g., at usage indicator 712 or stored data list 720) does not include any displayed indication of bulk data and, therefore, summary user interface 710, as displayed in FIG. 10A, is considered to not be associated with bulk data.

Figure 10B:
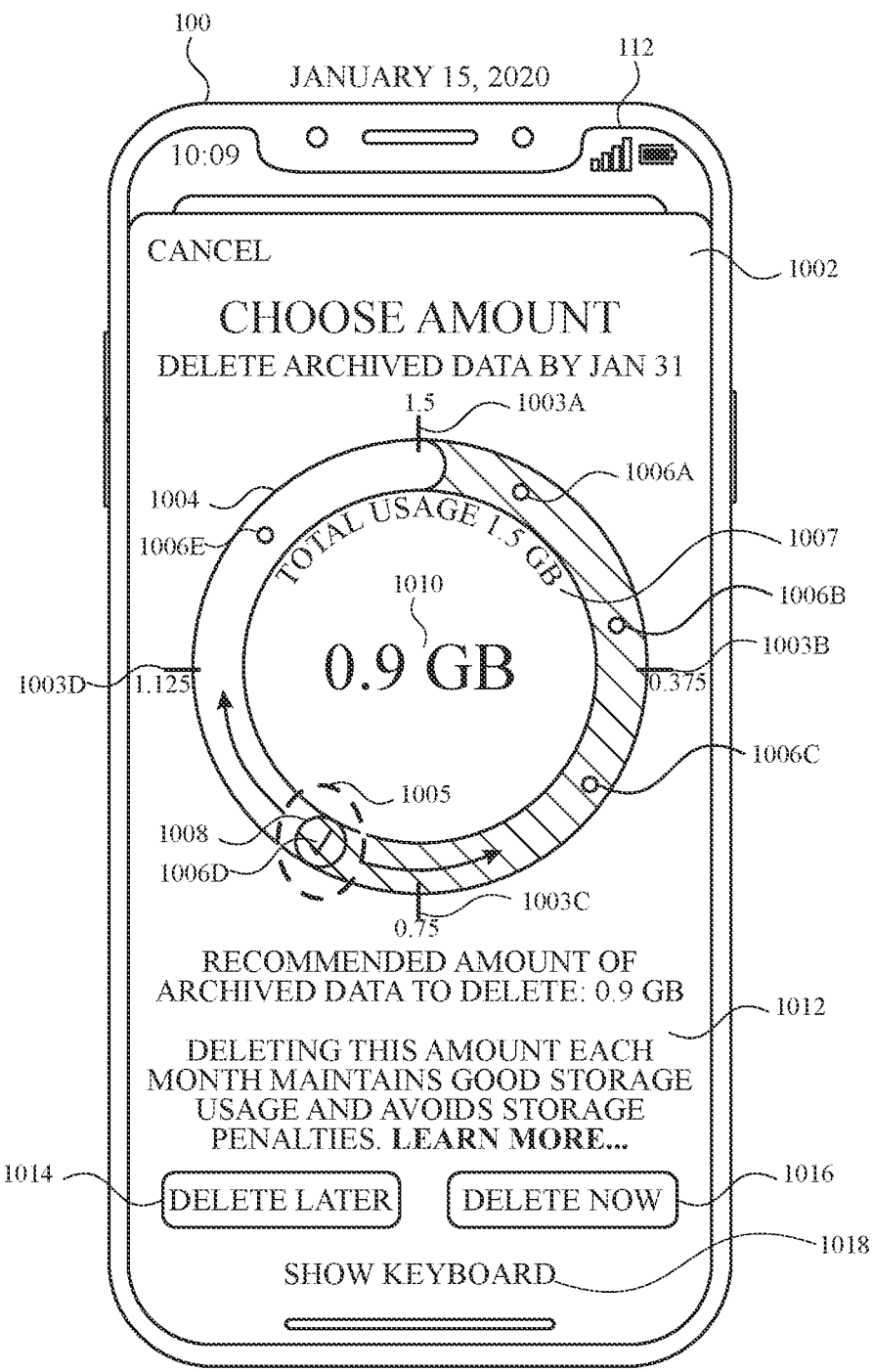

As shown in FIG. 10A, device 100 detects input 1001 on delete user interface object 716-1 and, in response, displays data deletion user interface 1002, as shown in FIG. 10B.

FIG. 10B illustrates device 100 displaying, on display 112, data deletion user interface 1002 (e.g., similar to balance transfer user interface 1102 described below with reference to FIG. 11B). In some embodiments, data deletion user interface 1002 enables a selection of an amount of data (e.g., standard data) to be deleted from data that is stored and/or archived on the computer storage resources associated with the user account (e.g., a computer storage account).

In some embodiments, data deletion user interface 1002 includes a selector user interface element 1004 (e.g., shaped as a closed loop, such as a circle) with a selection indicator 1008 that enables a selection of the amount of data to be deleted by moving selection indicator 1008 along selector user interface element 1004. In some embodiments, device 100 moves selection indicator 1008 along selector user interface element 1004 in response to detecting input 1005 (e.g., a touch-and-drag input) directed to moving (e.g., dragging, sliding) selection indicator 1008 along the predefined path of selector user interface element 1004 (e.g., in a clockwise or counterclockwise direction). In some embodiments, data deletion user interface 1002 includes an indication 1010 showing the amount of data that is currently selected by selection indicator 1008 on selector user interface element 1004. In some embodiments, data deletion user interface 1002 includes usage indication 1007 showing the total amount of data that is currently stored at the computer storage resources associated with the user account (e.g., a computer storage account).

In some embodiments, selector user interface element 1004 includes a minimum selectable value position (e.g., a first terminus point adjacent or near the top region of the closed loop shape of the user interface element) that corresponds to a lowest amount of data (e.g., standard data) that can be selected to be deleted from data that is stored and/or archived on the computer storage resources associated with the user account (e.g., a computer storage account) using the current instance of selector user interface element 1004. In some embodiments, selector user interface element 1004 includes a maximum selectable value position (e.g., a second terminus point at the top region of the closed loop shape of the user interface element) that corresponds to a highest amount of data (e.g., standard data) that can be selected to be deleted from data that is stored and/or archived on computer storage resources associated with the user account (e.g., a computer storage account) using the current instance of selector user interface element 1004.

In some embodiments, selector user interface element 1004 includes a plurality of suggested selectable data amounts that are indicated on the user interface element via suggested amount indicators 1006A-1006E. In some embodiments, suggested amount indicator 1006D corresponds to a data amount corresponding to the full amount of data (e.g., standard data) that should be deleted from the computer storage resources associated with the user account (e.g., a computer storage account) for a respective time period (e.g., a previous month) to fully avoid a use quota reduction penalty on the user account. In some embodiments, suggested amount indicator 1006E corresponds to a data amount corresponding an amount that is greater than the full amount of data (e.g., standard data) that should be deleted from the computer storage resources associated with the user account (e.g., a computer storage account) for the respective time period (e.g., a previous month) but less than an amount representing all of the data (e.g., standard data) that is capable of being deleted using the current instance of selector user interface element 1004.

In some embodiments, suggested amount indicator 1006A corresponds to a suggested selectable data amount to be deleted from the computer storage resources associated with the user account (e.g., a computer storage account) that would enable the avoidance of a basic use quota reduction penalty. In some embodiments, suggested amount indicator 1006B corresponds to a suggested selectable data amount to be deleted from the computer storage resources associated with the user account (e.g., a computer storage account) that would enable the data (e.g., standard data) to be deleted at a reasonable rate over a first period of time (e.g., 2 years, 1.5 years, 1 year). In some embodiments, suggested amount indicator 1006C corresponds to a suggested selectable data amount to be deleted from the computer storage resources associated with the user account (e.g., a computer storage account) that would enable the data (e.g., standard data) to be deleted at a reasonable rate over a second period of time (e.g., 9 months, 6 months, 3 months).

In some embodiments, suggested amount indicators 1006A-1006E can have different positions (e.g., locations) on selector user interface element 1004 that change depending on various factors such as, for example, the amount of data represented by the full range of the predefined path of selector user interface element 1004. Therefore, in the embodiments disclosed herein, figures showing selector user interface element 1004 are shown having fixed markers 1003A-1003D positioned at fixed locations along selector user interface element 1004. Selector user interface element 1004 has a range of values disbursed along its predefined path, and fixed markers 1003A-1003D provide an indication of the numerical values (e.g., GBs of storage) that are associated with the fixed locations along selector user interface element 1004. In other words, fixed markers 1003A-1003D illustrate a sampling of the values disbursed along the predefined path (at the fixed locations) of selector user interface element 1004, and portions of selector user interface element 1004 located between the fixed markers have values that are between the values shown for the fixed markers. In some embodiments, such as that shown in FIG. 10B, the range of values is proportionally distributed along selection user interface element 1004. However, in some embodiments, such as that shown in FIG. 10F, the range of values is not proportionally distributed along selection user interface element 1004. If selection indicator 1008 is moved to one of the fixed locations corresponding to a respective one of the fixed markers, and the device initiates deletion of data (e.g., in response to detecting selection of delete now affordance 1016), an amount of data corresponding to that shown for the respective fixed marker is deleted as described herein.

As the range of values represented by selector user interface element 1004 changes, the values indicated by fixed markers 1003A-1003D change, but the positions of fixed markers 1003A-1003D remain consistent along selector user interface element 1004. Fixed markers 1003A-1003D (and their corresponding numerical values) are not included in the user interface. Rather, they are provided for the benefit of the reader and to better illustrate changes in the values associated with the fixed locations along selector user interface element 1004.

As shown in FIG. 10B, fixed marker 1003A is positioned at the 12 o'clock position along selector user interface element 1004, fixed marker 1003B is positioned at the 3 o'clock position, fixed marker 1003C is positioned at the 6 o'clock position, and fixed marker 1003D is positioned at the 9 o'clock position. In FIG. 10B, fixed marker 1003A corresponds to a numerical value of 1.5, representing a data amount of 1.5 GB associated with the location of fixed marker 1003A on selector user interface element 1004. Similarly, fixed markers 1003B, 1003C, and 1003D correspond to numerical values of 0.375, 0.75, and 1.125, respectively, representing corresponding data amounts associated with the respective locations of fixed markers 1003B, 1003C, and 1003D on selector user interface element 1004. Therefore, if selection indicator 1008 is moved to fixed location 1003A, for example, and the device initiates deletion of data (e.g., in response to detecting selection of delete now affordance 1016), 1.5 GB of data is deleted. Similarly, if selection indicator 1008 is moved to fixed location 1003B, and delete now affordance 1016 is selected, 0.375 GB of data is deleted, and so on.

In some embodiments, data deletion user interface 1002 includes delete later affordance 1014 for scheduling an amount of data (e.g., standard data) to be (e.g., automatically) deleted from the computer storage resources associated with the user account (e.g., a computer storage account) at a future time. In some embodiments, data deletion user interface 1002 includes delete now affordance 1016 for initiating the deletion of the selected amount of data (e.g., selected via selector user interface element 1004 and selection indicator 1008) from the computer storage resources associated with the user account (e.g., a computer storage account). In some embodiments, data deletion user interface 1002 includes keyboard affordance 1018 for causing display of a keyboard or keypad to manually enter an amount (e.g., using numerical values on the keyboard or keypad) of data for deletion from the computer storage resources associated with the user account (e.g., a computer storage account).

In some embodiments (see FIG. 10F, for example), data deletion user interface 1002 includes details indication 1013 providing additional details associated with the deletion process, based on the currently selected data amount.

In some embodiments, data deletion user interface 1002 includes message region 1012 that shows information about different amounts of data that are suggested to be deleted from the computer storage resources associated with the user account (e.g., a computer storage account). In FIG. 10B, message region 1012 includes an indication of a suggested amount that corresponds to the amount that is currently selected via selector user interface element 1004 and selection indicator 1008—the full amount of standard data that should be deleted from the computer storage resources associated with the user account (e.g., a computer storage account) for a respective time period (e.g., a previous month) to fully avoid a use quota reduction penalty on the user account.

Figure 10C:
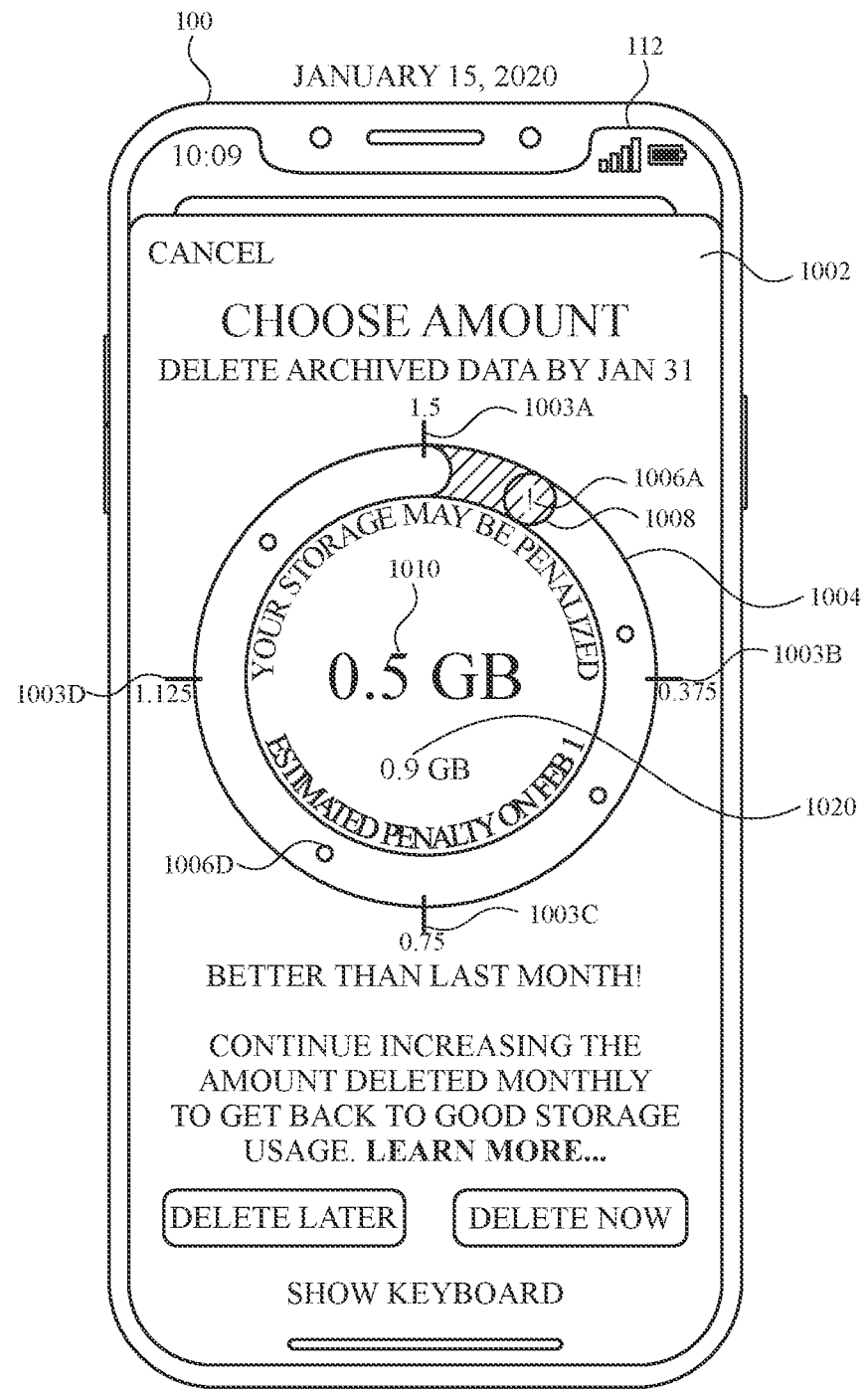

In FIG. 10C, selection indicator 1008 is moved (e.g., via input 1005) on selector user interface element 1004 to a position on the user interface element corresponding to suggested amount indicator 1006A. In some embodiments, because suggested amount indicator 1006A corresponds to a suggested selectable data amount to be deleted from the computer storage resources associated with the user account (e.g., a computer storage account) that would enable the avoidance of a basic use quota reduction penalty, but would still result in a regular use quota reduction penalty (for not having deleted the full amount corresponding to suggested amount indicator 1006D), electronic device 100 displays, in data deletion user interface 1002, penalty indication 1020 showing the amount of the use quota reduction penalty that would result from deleting the currently selected data amount (in this example, 0.5 GB, as indicated by indication 1010).

In some embodiments, in response to detecting that selection indicator 1008 is moved on selector user interface element 1004, electronic device 100 accordingly updates the displayed message in message region 1012 based on the new selected data amount. In this example, in response to detecting that selection indicator 1008 is moved to a location on selector user interface element 1004 corresponding to suggested amount indicator 1006A, electronic device 100 displays, in message region 1012, an indication that the currently selected amount is greater than the data amount that was deleted from the computer storage resources associated with the user account (e.g., a computer storage account) during the previous deletion time period (e.g., the previous month).

Figure 10D:
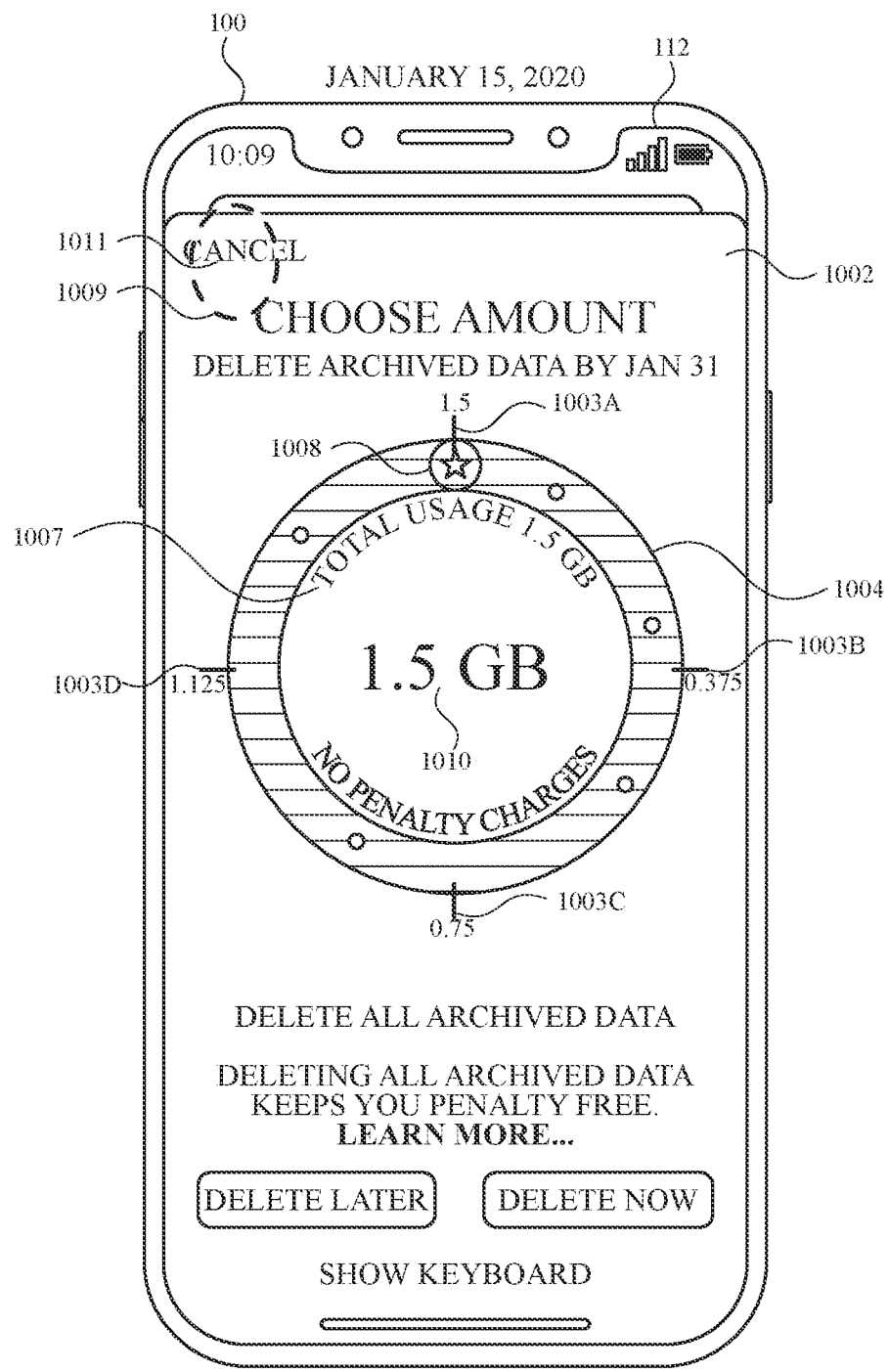

In FIG. 10D, device 100 displays, in data deletion user interface 1002, selector user interface element 1004 with selection indicator 1008 positioned at the second terminus point (e.g., the maximum selectable value position at the top of the ring) of the defined path of selector user interface element 1004. In some embodiments, because selection indicator 1008 is positioned at the top of the ring, selector user interface element 1004 indicates selection of a data amount corresponding to the maximum amount of data (e.g., standard data) that is capable of being deleted using the current instance of selector user interface element 1004. In some embodiments, in response to detecting (or determining) that selection indicator 1008 is at the second terminus point, device 100 displays, in selection indicator 1008, a visual indication (e.g., a symbol, such as a star) indicating that the current location of selection indicator 1008 corresponds to the greatest amount of data capable of being deleted (e.g., the full amount of standard data) from the computer storage resources associated with the user account (e.g., a computer storage account) using the current instance of selector user interface element 1004.

In FIG. 10D, device 100 detects input 1009 on cancel affordance 1011 and, in response, cancels (e.g., aborts) the process for initiating deletion of the data stored at the computer storage resources associated with the user account (e.g., a computer storage account).

Figure 10E:
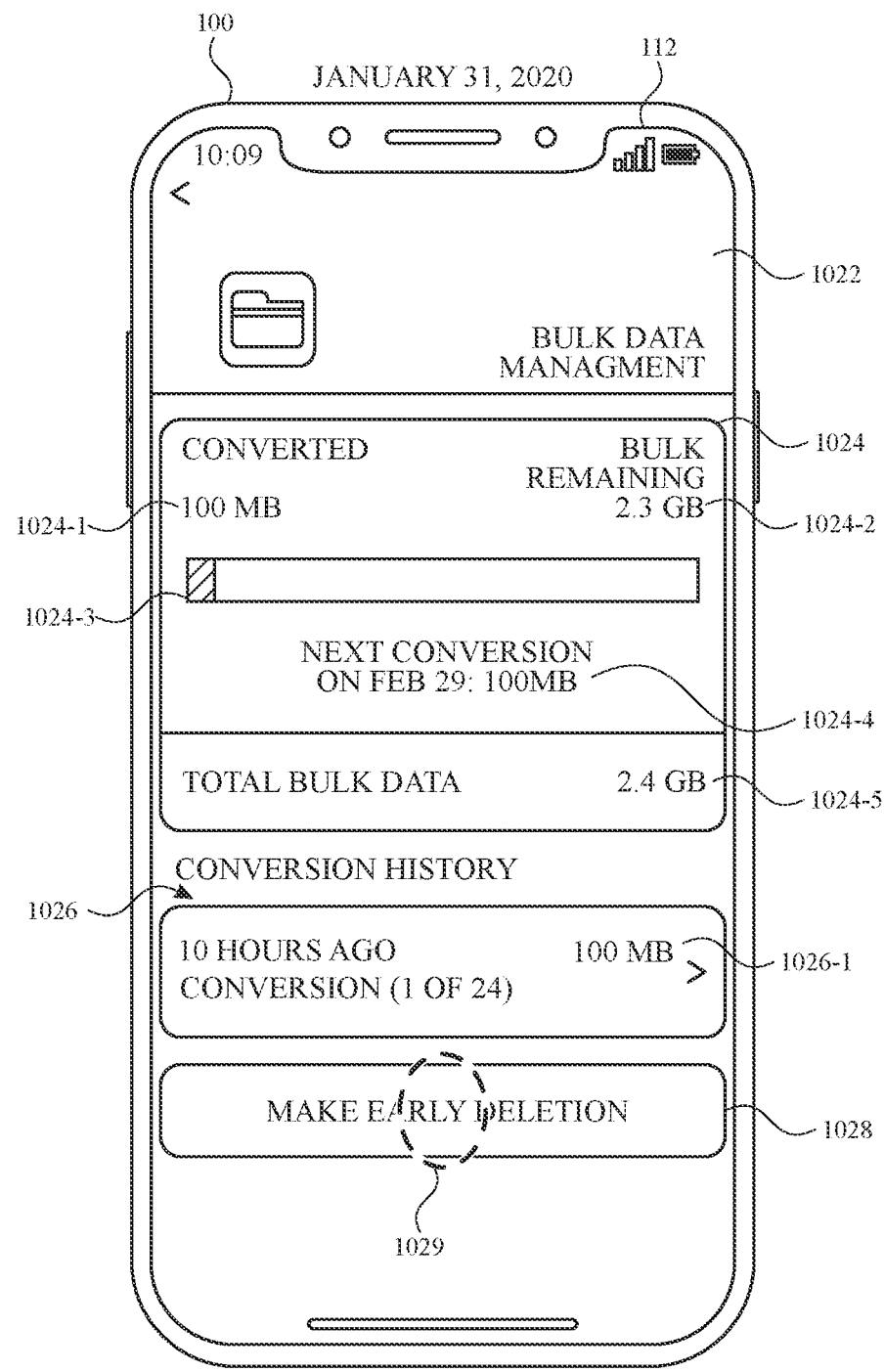

Referring now to FIG. 10E, device 100 displays bulk data management user interface 1022. In this embodiment, the user account is now managing 2.4 GB of bulk data stored at the computer storage resources, in addition to managing the 1.5 GB of standard data discussed above with respect to FIGS. 10A-10D, for a combined total of 3.9 GB of data. Bulk data management user interface 1022 is a user interface for managing various aspects of bulk data that is currently stored (or was previously stored) at the computer storage resources associated with the user account (e.g., a computer storage account) in accordance with the data retention policy for bulk data. For example, bulk data management user interface 1022 includes conversion status user interface element 1024 indicating the current status of bulk data and a portion of the schedule for which bulk data is converted to standard data, where it is available for deletion in accordance with the data retention policy for standard data. In the embodiment illustrated in FIG. 10E, conversion status user interface element 1024 includes converted amount 1024-1, remaining amount 1024-2, progress bar 1024-3, next conversion information 1024-4, and total amount 1024-5.

In some embodiments, converted amount 1024-1 indicates the cumulative amount of bulk data that has been converted to standard data. In some embodiments, remaining amount 1024-2 indicates the remaining amount of bulk data that is scheduled to be converted to standard data in the future (e.g., on a monthly basis). In some embodiments, progress bar 1024-3 provides a visual representation of the ratio of converted amount to remaining amount. In some embodiments, next conversion information 1024-4 indicates the date upon which the next portion of bulk data is scheduled to be converted to standard data, and the amount that is scheduled for conversion. In some embodiments, total amount 1024-5 indicates the original amount of bulk data that was stored at the computer storage resources associated with the user account (e.g., a computer storage account) in accordance with the data retention policy for bulk data. Accordingly, in the embodiment illustrated in FIG. 10E, conversion status user interface element 1024 indicates that 2.4 GB of bulk data was originally stored at the computer storage resources associated with the user account in accordance with the data retention policy for bulk data. Additionally, 100 MB of the bulk data has been converted to standard data, and 2.3 GB of bulk data remains stored at the computer storage resources, with the next conversion of 100 MB scheduled to occur on February 29. Accordingly, the current amount of standard data being managed by the user account is 1.6 GB (the sum of the previous 1.5 GB discussed with respect to FIGS. 10A-10D, plus the 100 MB of converted bulk data).

Bulk data management user interface 1022 also includes conversion history 1026, which provides a ledger of prior conversions of bulk data to standard data. For example, first conversion 1026-1 indicates 100 MB of the bulk data was converted to standard data on Jan. 31, 2020 (e.g., ten hours ago). First conversion 1026-1 also indicates that the conversion was the first in a series of twenty-four conversions of bulk data (e.g., 100 MB) to standard data.

Bulk data management user interface 1022 further includes early deletion affordance 1028, which is selectable to initiate a process for deleting at least a portion of the bulk data ahead of schedule.

Figure 10F:
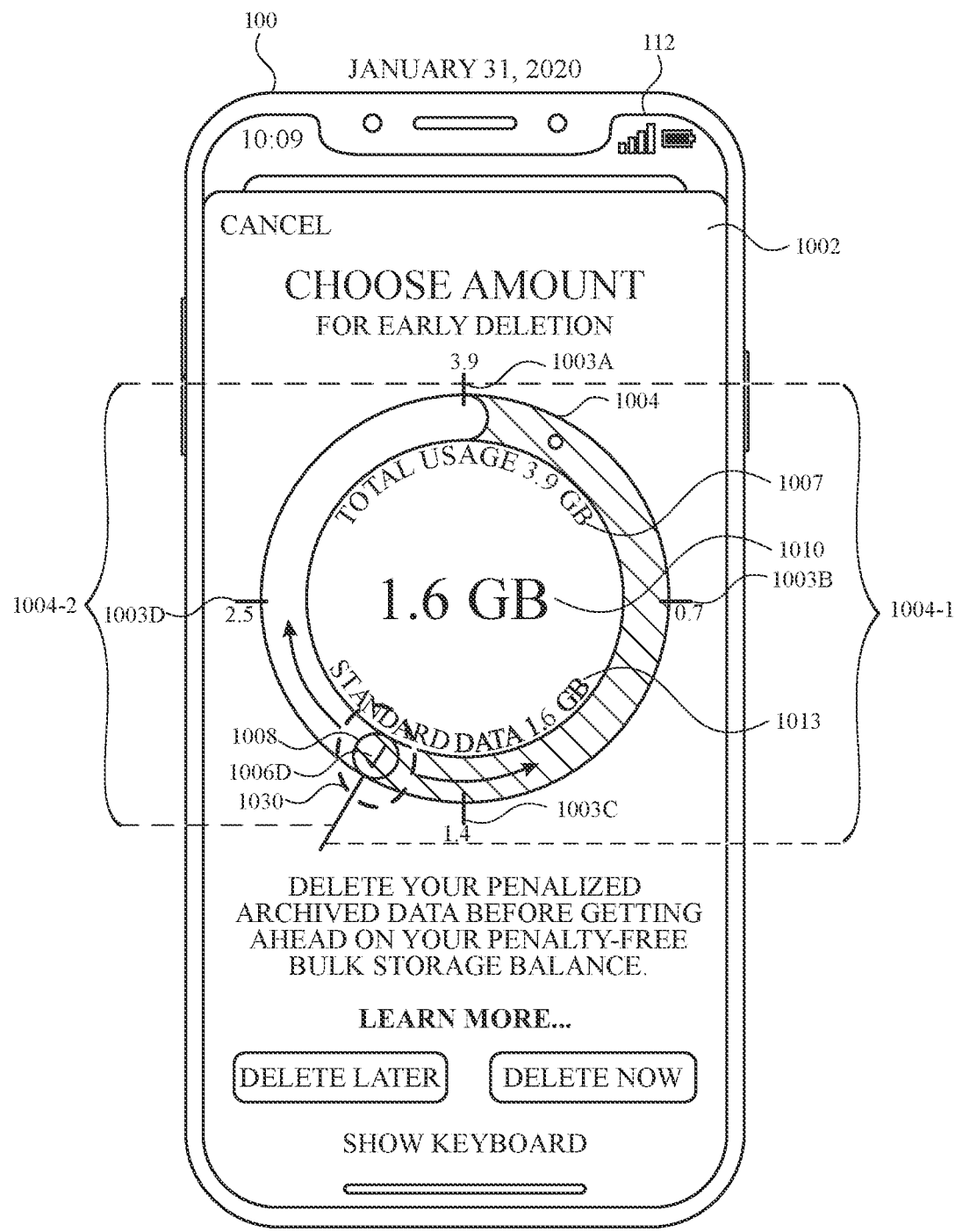

In FIG. 10E, device 100 detects input 1029 on early deletion affordance 1028 and, in response, displays data deletion user interface 1002, as shown in FIG. 10F, where data deletion user interface 1002 is configured to allow the user to select standard data and bulk data for deletion. In some embodiments, the user account is configured such that the user is required to delete all standard data before being allowed to delete bulk data (e.g., to avoid penalties on the standard data), as shown in FIG. 10F.

In the embodiment illustrated in FIG. 10F, the user account is currently managing 1.6 GB of standard data and 2.3 GB of bulk data stored at the computer storage resources, for a combined total of 3.9 GB of data (as indicated by usage indication 1007). When data deletion user interface 1002 is displayed, selection indicator 1008 is positioned at suggested amount indicator 1006D, which is positioned at a value along selector user interface element 1004 corresponding to the balance of standard data (e.g., 1.6 GB), as shown in FIG. 10F. Accordingly, indication 1010 shows that 1.6 GB of data is selected for deletion, and details indication 1013 shows that the 1.6 GB selected for deletion is comprised of 1.6 GB of standard data.

In FIG. 10F, fixed marker 1003A corresponds to a numerical value of 3.9, representing a data amount of 3.9 GB associated with the location of fixed marker 1003A on selector user interface element 1004. Similarly, fixed markers 1003B, 1003C, and 1003D correspond to numerical values of 0.7, 1.4, and 2.5, respectively, representing corresponding data amounts associated with the respective locations of fixed markers 1003B, 1003C, and 1003D on selector user interface element 1004.

In FIG. 10F, selector user interface element 1004 is shown with first portion 1004-1 and second portion 1004-2. In this embodiment, first portion 1004-1 represents a portion of the selector user interface element 1004 that corresponds to the amount of standard data stored at the computer storage resources, and second portion 1004-2 represents a portion of the selector user interface element 1004 that corresponds to the amount of bulk data stored at the computer storage resources. In this embodiment, selection indicator 1008 is positioned at suggested amount indicator 1006D corresponding to the balance of standard data being stored (e.g., 1.6 GB). As a result, first portion 1004-1 is shown shaded (e.g., indicating it is selected for deletion), and second portion 1004-2 is shown unshaded (e.g., indicating it is not selected for deletion).

Figure 10G:
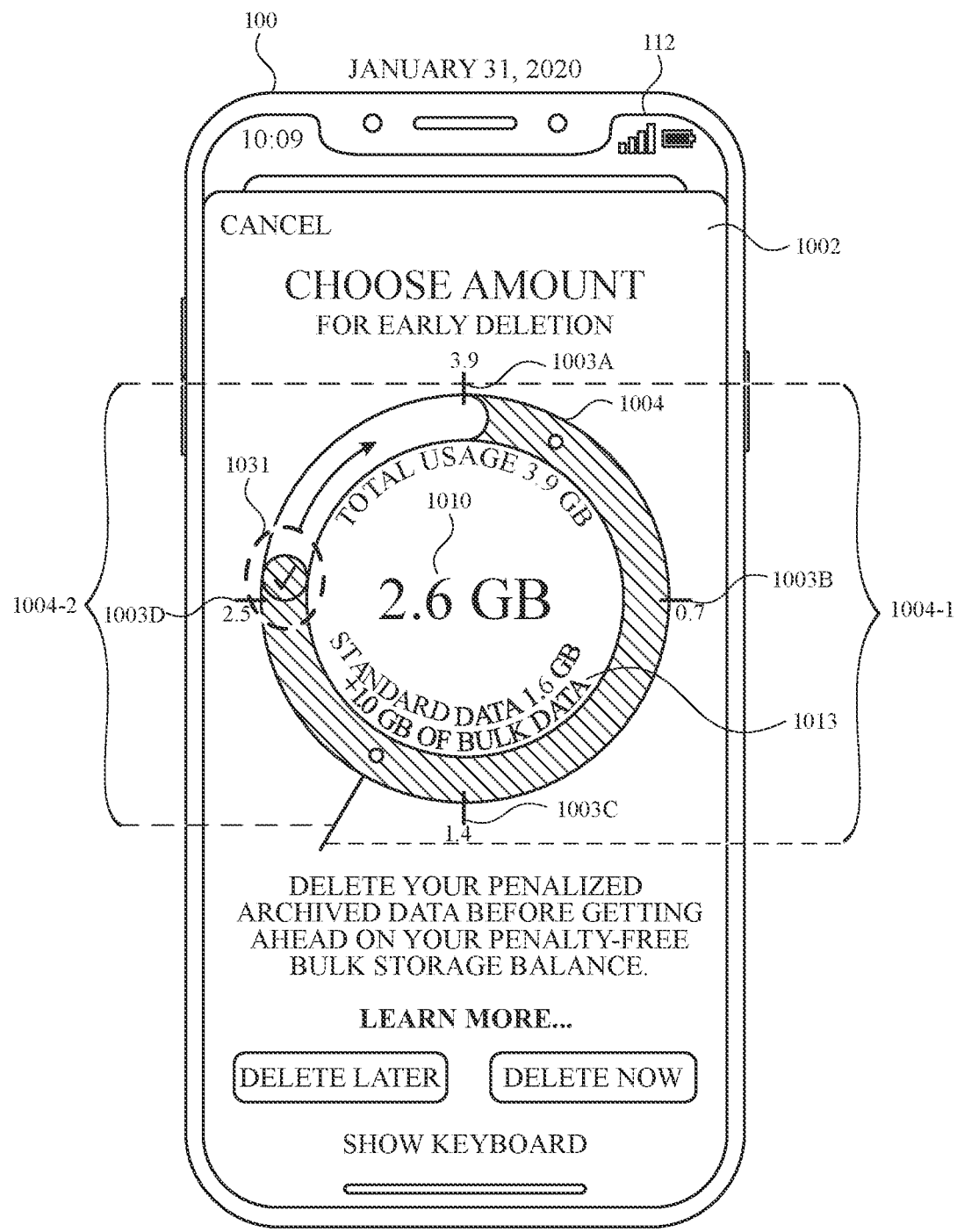

In FIG. 10F, device 100 detects input 1030 on selection indicator 1008 and, in response, moves selection indicator 1008 along selector user interface element 1004 to the position shown in FIG. 10G.

As shown in FIG. 10G, selection indicator 1008 is positioned at a location along selector user interface element 1004 that corresponds to a value of 2.6 GB, as shown by indication 1010. Details indication 1013 shows that the selected 2.6 GB value is comprised of 1.6 GB of standard data and 1.0 GB of bulk data. Accordingly, 1.6 GB of standard data and 1.0 GB of bulk data is currently selected for deletion, for example, as indicated by the shaded region.

Figure 10H:
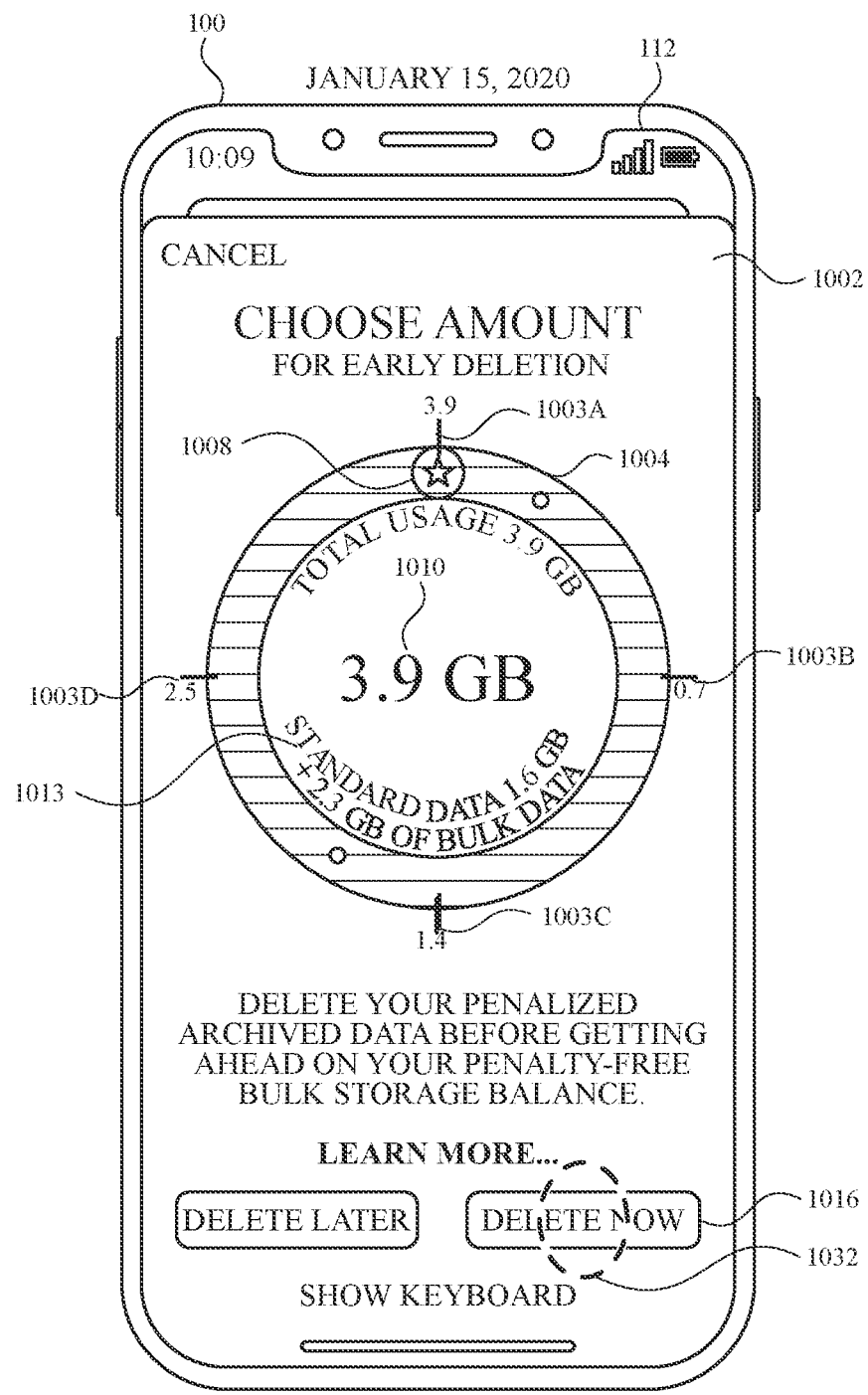

In FIG. 10G, device 100 detects input 1031 on selection indicator 1008 and, in response, moves selection indicator 1008 along selector user interface element 1004 to the position shown in FIG. 10H.

As shown in FIG. 10H, selection indicator 1008 is positioned at the top of selector user interface element 1004, which corresponds to a value of 3.9 GB, as shown by indication 1010. Details indication 1013 shows that the selected 3.9 GB value is comprised of 1.6 GB of standard data and 2.3 GB of bulk data. Accordingly, 1.6 GB of standard data and 2.3 GB of bulk data is currently selected for deletion. Because the entire amount of stored data is selected for deletion, selection indicator 1008 is changed to have a star shape, as shown in FIG. 10H.

In FIG. 10H, device 100 detects input 1032 on delete now affordance 1016 and, in response, initiates deletion of the selected data from the computer storage resources, which is the entirety of the standard data (e.g., 1.6 GB) and the entirety of the bulk data (e.g., 2.3 GB).

FIGS. 11A-11R illustrate exemplary user interfaces for managing a balance transfer of a user account, in accordance with some embodiments. The user account of FIGS. 11A-11R is similar to the user account (e.g., transfer account) described above with reference to FIGS. 8A-8AK. For the sake of brevity, redundant details are not repeated below. The user interfaces in these figures are used to illustrate the processes described below, including the processes in FIG. 12.

FIG. 11A illustrates electronic device 100 with display 112. In FIG. 11A, device 100 displays summary user interface 810, as shown on Dec. 15, 2019. Summary user interface 810 is similar to that shown in FIG. 8D and described above, except that, in the embodiment illustrated in FIG. 11A, the user account (e.g., transfer account) currently does not include an installment balance (e.g., there has been no installment purchase associated with the account, or there is no current outstanding installment balance associated with the user account).

As shown in FIG. 11A, device 100 detects input 1101 on indicator 816A.

Figure 11B:
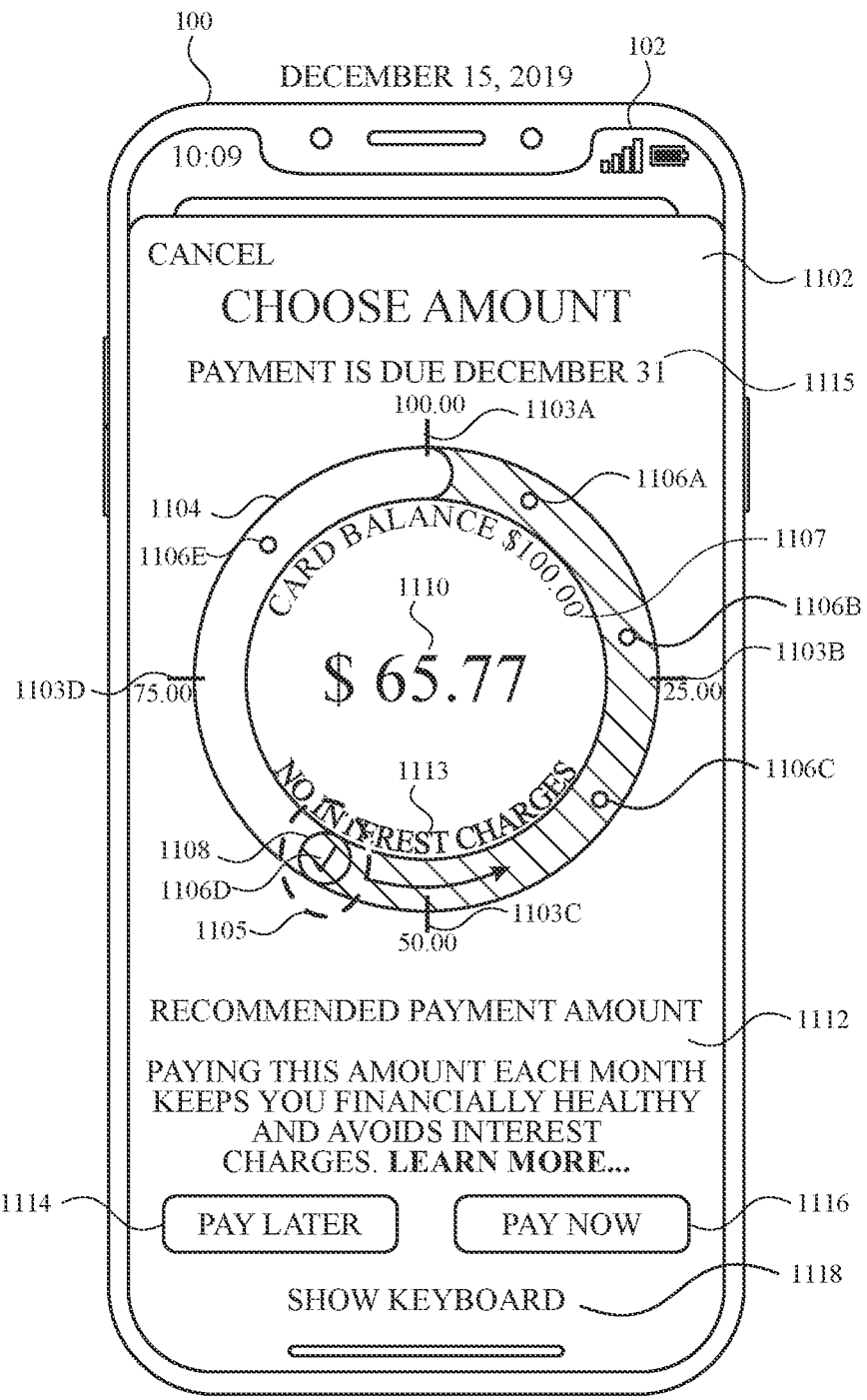

In FIG. 11B, in response to detecting input 1101 on indicator 816A, device 100 displays, on display 112, balance transfer user interface 1102 corresponding to the transfer account (e.g., the first-party credit account; the points account).

In some embodiments, balance transfer user interface 1102 includes an indication 1115 of a due date of a balance transfer (e.g., the previous statement due date, if the statement balance was not fully paid; a current statement due date). In some embodiments, balance transfer user interface 1102 includes a selector user interface element 1104 for using a selection indicator 1108 to select an amount for a balance transfer (e.g., an amount for a balance payment) by moving selection indicator 1108 along a predefined path (e.g., a closed-looped path such as a circle) of selector user interface element 1104. The selected balance transfer amount (e.g., a selected balance payment amount) is based on the location of selection indicator 1108 along the predefined path of selector user interface element 1104. Device 100 detects (or determines) an amount for a balance transfer (e.g., an amount for a balance payment) based on the location of selection indicator 1108 along the predefined path (e.g., a closed-loop path such as a circle) of selector user interface element 1104. In some embodiments, device 100 moves selection indicator 1108 along selector user interface element 1104 in response to detecting input (e.g., a touch-and-drag input such as input 1105, for example) directed to moving (e.g., dragging, sliding) selection indicator 1108 along the predefined path of selector user interface element 1104 (e.g., in a clockwise or counterclockwise direction).

In some embodiments, selector user interface element 1104 includes a minimum selectable value position (e.g., a first terminus point adjacent or near the top region of the closed loop shape of the user interface element (e.g., at or adjacent the 12 o'clock position)) that corresponds to a minimum balance transfer amount that can be selected using the current instance of selector user interface element 1104. That is, in some embodiments, if selection indicator 1108 is at a first terminus point (e.g., a minimum value position) of the predefined path of selector user interface element 1104, the currently selected balance transfer amount corresponds to a minimum balance transfer amount (e.g., the minimum balance payment amount possible or the minimum balance payment amount that would avoid a penalty, such as a late fee).

In some embodiments, selector user interface element 1104 includes a maximum selectable value position (e.g., a second terminus point at the top region of the closed loop shape of the user interface element (at the 12 o'clock position)) that corresponds to a maximum selectable transfer amount that can be selected using the current instance of selector user interface element 1104. That is, in some embodiments, if selection indicator 1108 is at a second terminus point (e.g., a maximum value position) of the predefined path, the currently selected balance transfer amount corresponds to a maximum selectable transfer amount (e.g., the full amount of the outstanding balance).

In some embodiments, points along the defined path between the two terminus points of selector user interface element 1104 correspond to balance transfer amounts that are dispersed along the predefined path between the minimum balance transfer amount to the maximum selectable balance transfer amount. In some embodiments, the portion of the predefined path from the first terminus point (e.g., the minimum value point corresponding to the minimum balance payment amount) to the location of selection indicator 1108 along the predefined path is displayed with a visual characteristic (e.g., a particular color or color hue, such as green), where the type of visual characteristic (e.g., the type of color or color hue) is determined based on the currently selected balance transfer amount (e.g., the selected balance payment amount) and an amount of a penalty (e.g., interest) that may accrue based on the selected balance transfer amount.

In some embodiments, the predefined path of selector user interface element 1104 further includes, along the predefined path, a plurality of proposed amount indicators 1106A-1106E corresponding to proposed balance transfer amounts (e.g., proposed balance payment amounts). In some embodiments, proposed amount indicator 1106A corresponds to the minimum balance transfer amount. In some embodiments, proposed amount indicator 1106A corresponds to an amount that is greater than the minimum balance transfer amount (e.g., and is the same as or greater than a previous balance transfer amount) but is still a relatively small amount. In some embodiments, proposed amount indicator 1106D corresponds to a balance transfer amount (e.g., the full statement amount) that would fully avoid a penalty (e.g., interest) for the respective balance transfer period (e.g., the respective statement period). In some embodiments, proposed amount indicator 1106E corresponds to an amount that is greater than the balance transfer amount that would fully avoid a penalty for the respective balance transfer period (e.g., greater than the full statement amount) but smaller than the maximum balance transfer amount (e.g., less than all of the current balance). In some embodiments, the plurality of proposed amount indicators include one or more additional proposed amount indicators (e.g., proposed amount indicators 1106B, 1106C) corresponding to balance transfer amounts (e.g., balance payment amounts) that are determined based on the full amount of the remaining balance of the transfer account, past balance transfer history (e.g., past balance payment history), and/or an afforded time period (e.g., 3 months, 6 months) to be provided to fully reduce the remaining balance of the transfer account (e.g., to fully pay off the balance of the account).

In some embodiments, suggested amount indicators 1106A-1106E can have different positions (e.g., locations) on selector user interface element 1104 that change depending on various factors such as, for example, the total selectable balance transfer amount represented by the full range of the predefined path of selector user interface element 1104. Therefore, in the embodiments disclosed herein, figures showing selector user interface element 1104 are shown having fixed markers 1103A-1103D (similar to fixed markers 1003A-1003D) positioned at fixed locations along selector user interface element 1104. Selector user interface element 1104 has a range of values disbursed along its predefined path, and fixed markers 1103A-1103D provide an indication of the numerical values (e.g., balance transfer amounts) that are associated with the fixed locations along selector user interface element 1004. In other words, fixed markers 1103A-1103D illustrate a sampling of the values disbursed along the predefined path (at the fixed locations) of selector user interface element 1104, and portions of selector user interface element 1104 located between the fixed markers have values that are between the values shown for the fixed markers. In some embodiments, the range of values is proportionally distributed along selection user interface element 1104. However, in some embodiments, the range of values is not proportionally distributed along selection user interface element 1104. If selection indicator 1108 is moved to one of the fixed locations corresponding to a respective one of the fixed markers, and the device initiates a balance transfer (e.g., in response to detecting selection of transfer now affordance 1116), a balance transfer in an amount corresponding to that shown for the respective fixed marker is initiated as described herein.

In some embodiments, fixed marker 1103A is positioned at the 12 o'clock position along selector user interface element 1104, fixed marker 1103B is positioned at the 3 o'clock position, fixed marker 1103C is positioned at the 6 o'clock position, and fixed marker 1103D is positioned at the 9 o'clock position. In some embodiments, fixed marker 1103A represents the maximum value in the range of values represented by the predefined path of selector user interface element 1104. In some embodiments, the minimum value in the range of values represented by the predefined path of selector user interface element 1104 is zero. In some embodiments, the minimum value in the range of values represented by the predefined path of selector user interface element 1104 is the value associated with the location of proposed amount indicator 1106A. Fixed markers 1103A-1103D provide an indication of the numerical values (e.g., balance transfer amounts) that are associated with the fixed locations along selector user interface element 1104. Accordingly, as the range of values represented by selector user interface element 1104 changes, the values indicated by fixed markers 1103A-1103D change, but the positions of fixed markers 1103A-1103D remain consistent along selector user interface element 1104. Fixed markers 1103A-1103D (and their corresponding numerical values) are not included in the user interface. Rather, they are provided for the benefit of the reader and to better illustrate changes in the values associated with the fixed locations along selector user interface element 1104.

In some embodiments, the portion of the predefined path of selector user interface element 1104 from a beginning terminus position of the defined path (e.g., if the defined path is a closed-loop path, such as a circle, the 12 o'clock position of the defined path) to the current position of selection indicator 1108 is displayed with a visual characteristic (e.g., a particular color), where the type of the visual characteristic that is displayed is dependent upon the location of selection indicator 1108 along the predefined path and the corresponding value of the selected transfers amount when the selection indicator 1108 is at its current location.

For example, if selection indicator 1108 is at a position on the predefined path corresponding to proposed amount indicator 1106A or at a position that corresponds to a value that is less than the value corresponding to the position on the defined path corresponding to proposed amount indicator 1106A (e.g., a position closer to the beginning terminus position of the predefined path), electronic device 100 displays the portion of the predefined path (e.g., and the selection indicator itself) from the beginning terminus position of the predefined path (e.g., if the defined path is a closed-loop path, such as a circle, the 12 o'clock position of the predefined path) to the position of selection indicator 1108 with a first visual characteristic (e.g., a first color, such as red). In some embodiments, the device prevents the user from moving selector indicator 1108 to a position on the predefined path that corresponds to a value that is less than the value of amount indicator 1106A. For another example, if selection indicator 1108 is at a position on the predefined path that corresponds to a value that is less than the value of the position of proposed amount indicator 1106D but more than the value of the position of proposed amount indicator 1106A (e.g., a position on the predefined path that is between proposed amount indicator 1106A and proposed amount indicator 1106D), device 100 displays the portion of the predefined path (e.g., and the selection indicator itself) from the beginning terminus position of the predefined path (e.g., if the predefined path is a closed-loop path, such as a circle, the 12 o'clock position of the defined path) to the position of selection indicator 1108 with a second visual characteristic (e.g., a second color, such as yellow). For another example, if selection indicator 1108 is at a position on the predefined path that corresponds to proposed amount indicator 1106D, device 100 displays the portion of the predefined path (e.g., and the selection indicator itself) from the beginning terminus position of the predefined path (e.g., if the predefined path is a closed-loop path, such as a circle, the 12 o'clock position of the predefined path) to the position of selection indicator 1108 with a third visual characteristic (e.g., a third color, such as green). For another example, if selection indicator 1108 is at a position on the predefined path that corresponds to a value on the predefined path that is more than the value of the position on the predefined path of proposed amount indicator 1106D (e.g., a position farther from the beginning terminus position of the predefined path than proposed amount indicator 1106D), device 100 displays the portion of the predefined path (e.g., and the selection indicator itself) from the beginning terminus position of the predefined path (e.g., if the predefined path is a closed-loop path, such as a circle, the 12 o'clock position of the predefined path) to the position of selection indicator 1108 with a fourth visual characteristic (e.g., a fourth color, such as blue).

As shown in FIG. 11B (and FIGS. 11C and 11D), fixed marker 1003A corresponds to a numerical value of 100.00, representing a potential balance transfer amount of $100.00 associated with the location of fixed marker 1103A on selector user interface element 1104. Similarly, fixed markers 1103B, 1103C, and 1103D correspond to numerical values of 25.00, 50.00, and 75.00, respectively, representing corresponding potential balance transfer amounts associated with the respective locations of fixed markers 1103B, 1103C, and 1103D on selector user interface element 1104. In some embodiments, such as that shown in FIG. 11B, the range of values is proportionally distributed along selection user interface element 1104. However, in some embodiments, such as that shown in FIG. 11N, the range of values is not proportionally distributed along selection user interface element 1104.

In some embodiments, electronic device 100 also displays, in balance transfer user interface 1102, an indication 1107 of the maximum balance transfer amount that is selectable in the current instance of balance transfer user interface 1102. In some embodiments, indication 1107 represents the current total balance of the transfer account (e.g., the first-party credit account; the points account), exclusive of any installment balance (regardless of whether an installment plan is associated with the transfer account). In some embodiments, indication 1107 represents the current total balance of the transfer account, including an installment balance for an installment plan associated with the transfer account.

In some embodiments, electronic device 100 also displays, in balance transfer user interface 1102, an indication 1110 of the currently selected balance transfer amount based on the location of selection indicator 1108 on the predefined path of selector user interface element 1104.

In some embodiments, electronic device 100 also displays, in balance transfer user interface 1102, details indication 1113 providing additional details associated with the balance transfer, based on the currently selected balance transfer amount. For example, in FIG. 11B, details indication 1113 indicates that no interest charges will be assessed for the currently selected balance transfer (e.g., payment) amount.

In some embodiments (see FIG. 11C, for example), electronic device 100 also displays, in balance transfer user interface 1102, an indication 1120 of a penalty (e.g., interest) that may be enforced (e.g., charged) on the transfer account based on the currently selected balance transfer amount.

In some embodiments, electronic device 100 also displays, in balance transfer user interface 1102, an information region 1112 describing an effect or result of making a balance transfer (e.g., a balance payment) based on the currently selected balance transfer amount.

In some embodiments, electronic device 100 also displays, in balance transfer user interface 1102, a transfer later affordance 1114 for scheduling a further balance transfer (e.g., for setting a date and/or time for a future automatic balance payment), a transfer now affordance 1116 for initiating a process for an immediate balance transfer (e.g., for proceeding with an immediate balance payment), and a show keyboard affordance 1118 for causing display of a keypad or keyboard that can be used to manually enter a balance transfer amount (e.g., to manually enter a balance payment amount) without using selector user interface element 1104.

As shown in FIG. 11B, the total balance available for payment is $100 (as indicated by indication 1107). In the embodiment illustrated in FIG. 11B, the $100 balance corresponds to the card balance shown in balance summary user interface element 812 in FIG. 11A, which comprises a balance of the transfer account that does not include any installation transfers. Accordingly, indication 1107 represents a card balance associated with the transfer account that does not include any installment transfers. As such, the card balance is comprised of a statement balance (e.g., an amount of the transfer account that is currently due for payment—in this embodiment, $65.77) and a subsequent transfer balance that corresponds to a balance of transfers that have been applied to the transfer account after the statement balance was generated. In this embodiment, the subsequent transfer balance is $34.23, and the card balance (e.g., $100) represents all outstanding transfers applied to the transfer account, which, again, does not include any installment transfers.

As shown in FIG. 11B, selection indicator 1108 is positioned at proposed amount indicator 1106D, which corresponds to a balance transfer of $65.77 (as indicated by indication 1110). The $65.77 amount corresponds to the statement balance of the transfer account due for the payment by December 31. In some embodiments, in accordance with a determination that selection indicator 1108 is on the position of proposed amount indicator 1106D (e.g., corresponding to the full statement balance; corresponding to a balance transfer amount that would fully avoid a penalty (e.g., interest) for the current balance transfer period), device 100 displays, in selection indicator 1108, a visual indication (e.g., a symbol, such as a checkmark) that the selection indicator is at a position corresponding to a balance transfer amount that would fully avoid a penalty (e.g., interest) for the current balance transfer period. Accordingly, selection indicator 1108 includes a checkmark, as shown in FIG. 11B. Additionally, the portion of selector user interface element 1104 from the first terminus point to selection indicator 1108 has a first hue (e.g., green), indicating that the full statement balance is selected for payment.

Figure 11C:
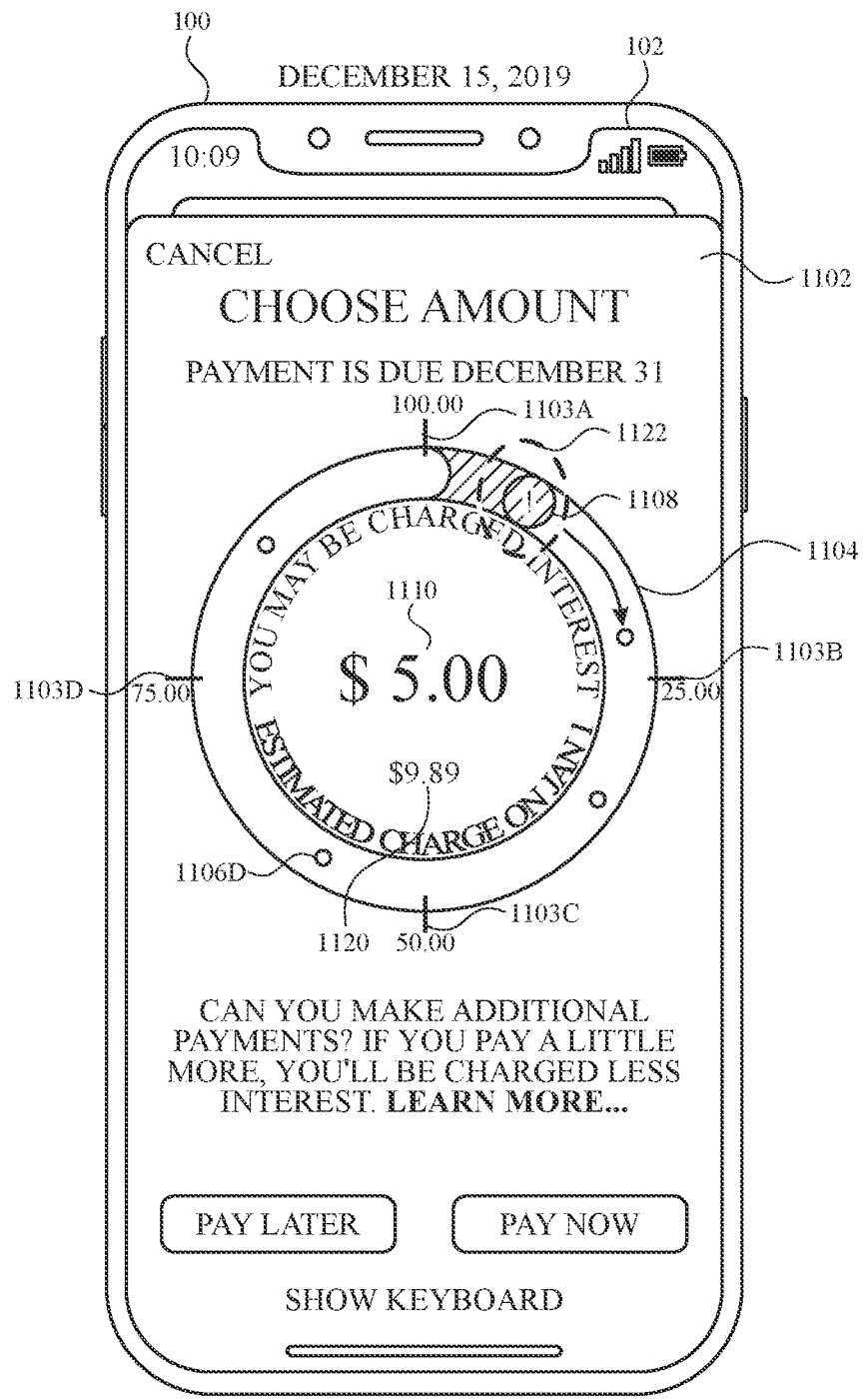

In FIG. 11B, device 100 detects input 1105 (e.g., a touch-and-drag gesture following the predefined path of selector user interface element 1104) on selection indicator 1108 and, in response, moves selection indicator 1108 along the predefined path of selector user interface element 1104 to the position shown in FIG. 11C.

In FIG. 11C, device 100 shows selection indicator 1108 moved (e.g., in response to input 1105) along selector user interface element 1104 to a position on the user interface element corresponding to proposed amount indicator 1106A. Indication 1110 shows that the selected transfer amount (e.g., the minimum selectable transfer balance) is $5.00, and indication 1020 shows a $9.89 penalty (e.g., interest) that may be enforced (e.g., charged) on the transfer account based on the currently selected balance transfer amount associated with proposed amount indicator 1106A. Accordingly, in FIG. 11C, balance transfer user interface 1102 shows that, for a transfer account having no installment transfers and a statement balance of $65.77, the minimum balance transfer amount for the transfer account is $5.00.

Figure 11D:
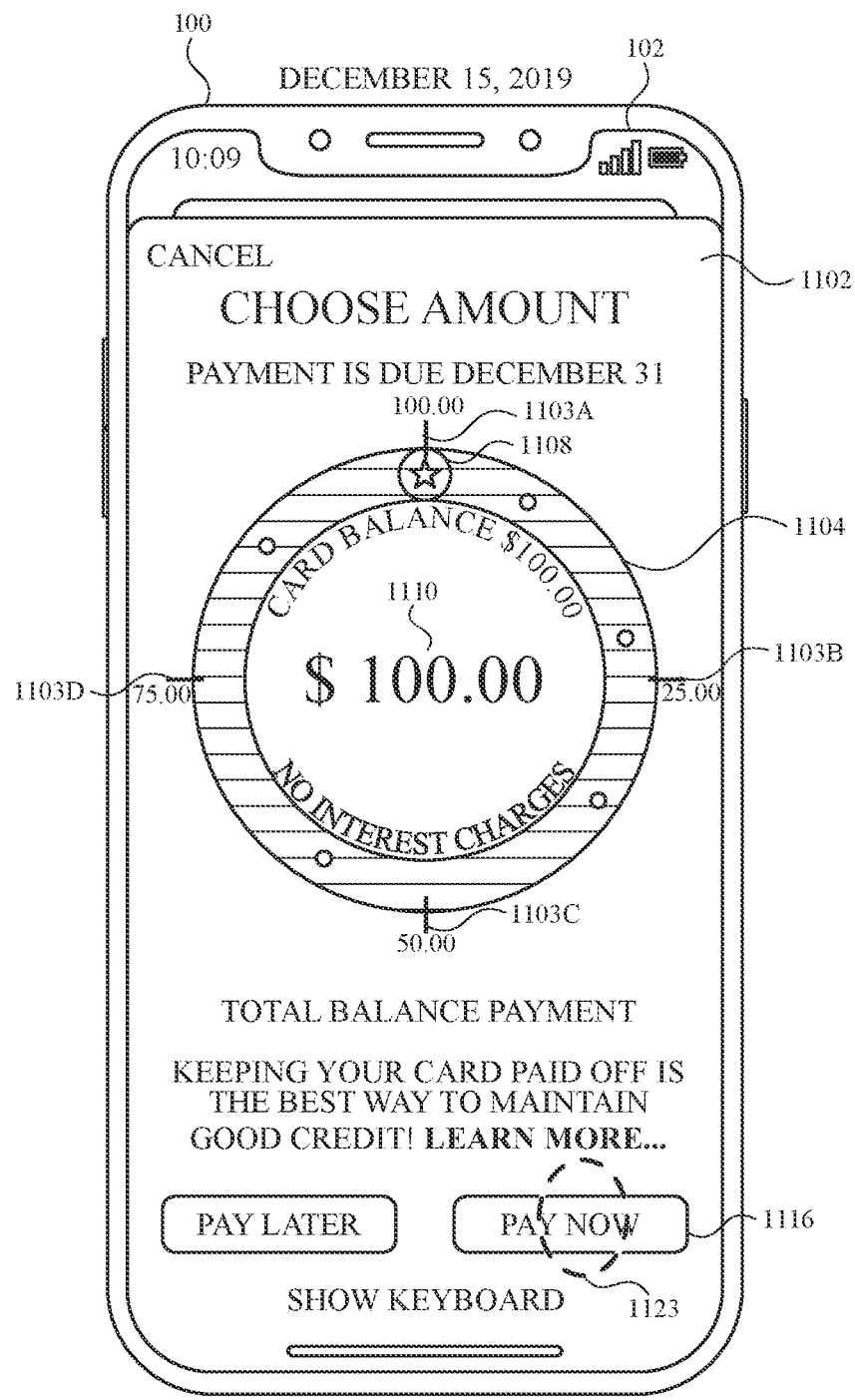

In FIG. 11C, device 100 detects input 1122 (e.g., a touch-and-drag gesture following the predefined path of selector user interface element 1104) on selection indicator 1108 and, in response, moves selection indicator 1108 along the predefined path of selector user interface element 1104 to the position shown in FIG. 11D.

In FIG. 11D, device 100 shows selection indicator 1108 moved (e.g., in response to input 1122) along selector user interface element 1104 to a position on the user interface element corresponding to the second terminus point (e.g., the 12 o'clock position). Indication 1110 shows that the selected transfer amount (e.g., the maximum selectable transfer balance) is $100.00. Thus, balance transfer user interface 1102 shows, in FIG. 11D, the total balance of the transfer account selected for payment. In response to detecting (or determining) that selection indicator 1108 is at the second terminus point, device 100 displays, in selection indicator 1108, a visual indication (e.g., a symbol, such as a star) indicating that the current location of selection indicator 1108 corresponds to a balance transfer (e.g., payment) for the total balance of the transfer account.

In FIG. 11D, device 100 detects input 1123 on transfer now affordance 1116 and, in response, initiates a balance transfer to pay off the selected balance (e.g., the total balance of the transfer account). Details for the balance transfer process (e.g., payment) are discussed in greater detail below with respect to FIGS. 11P-11Q.

Figure 11E:
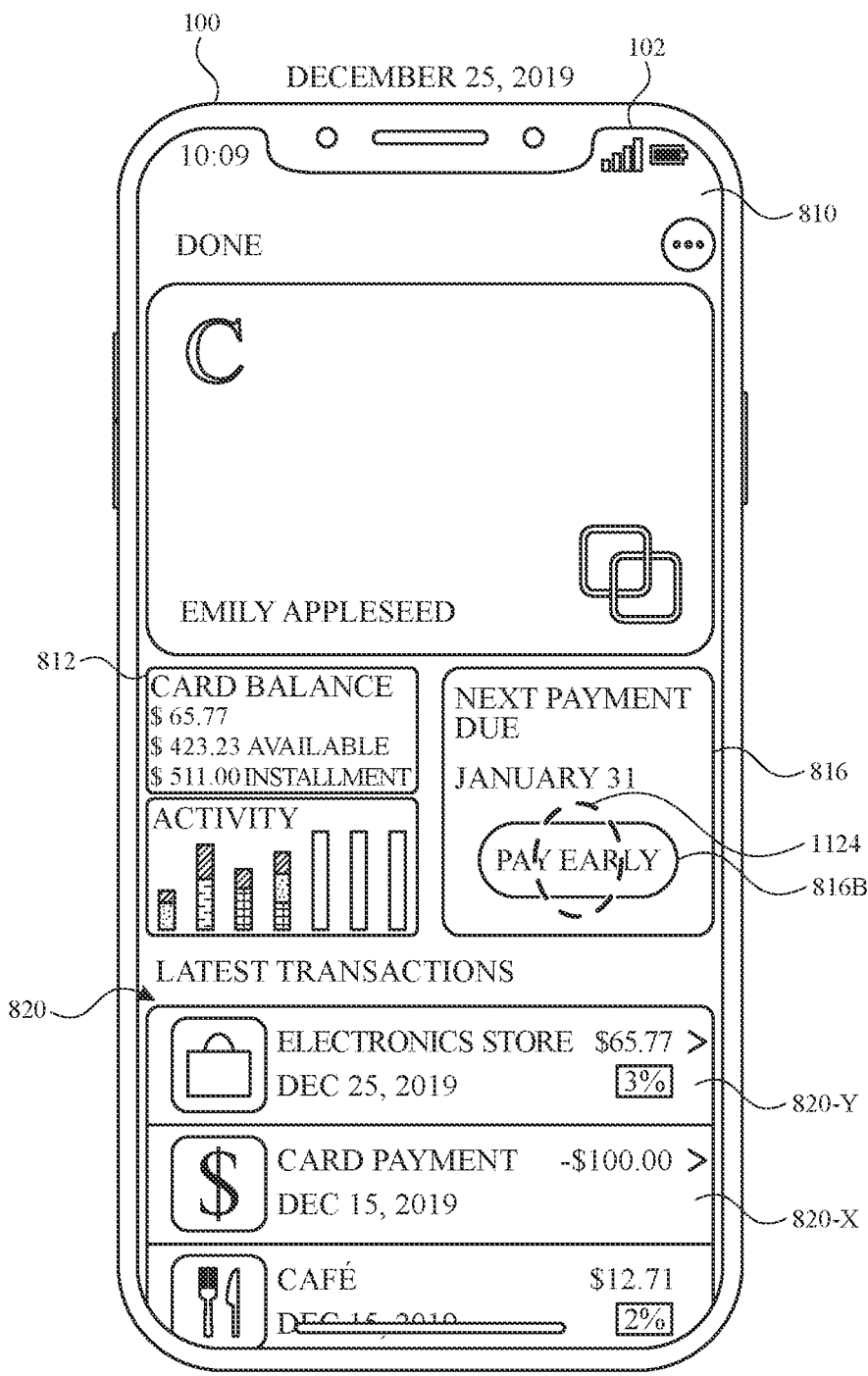

Referring now to FIG. 11E, device 100 displays summary user interface 810 as shown on Dec. 25, 2019. Summary user interface 810 is similar to that shown in FIG. 11A, except that the summary user interface 810 is updated to illustrate new transfers applied to the transfer account. For example, transfer items list 820 shows transfer item 820-X and transfer item 820-Y have been added to the transfer account. Transfer item 820-X corresponds to the balance transfer initiated in response to input 1123 on transfer now affordance 1116. Accordingly, transfer item 820-X shows a credit of $100 (corresponding to the $100 balance transfer) applied to the transfer account on Dec. 15, 2019. Transfer item 820-Y corresponds to an initial purchase of an item associated with an installment plan. Transfer item 820-Y is similar to transfer item 820A. Accordingly, transfer item 820-Y represents an initial transfer (e.g., payment of taxes) associated with the purchase of an item (e.g., a phone) that is being purchased through an installment plan.

In the embodiment illustrated in FIG. 11E, the installment purchase has been initiated (e.g., via transfer item 820-Y), but the first installment has not yet been applied to the transfer account. Balance summary user interface element 812 includes an indication 812-1 of the installment balance associated with the transfer account (e.g., $511), which is the full installment balance (e.g., the total balance of the installment plan (financed amount)) for the phone purchase. The $65.77 balance on transfer account (shown in balance summary user interface element 812) corresponds to the tax purchase associated with transfer item 820-Y, which does not include a portion of the installment plan. Because the total balance of the transfer account was paid on Dec. 15, 2019 (e.g., via transfer item 820-X), and there are no subsequent transfers (other than transfer item 820-Y) applied to the transfer account (as indicted in transfer items list 820), the $65.77 balance from transfer item 820-Y represents the current balance of the transfer account. Because the installment purchase has been initiated, the installment balance (e.g., $511) is associated with the transfer account; however, no installment transfers have been added to the transfer account and, therefore, the current balance (e.g., $65.77) of the transfer account is exclusive of the installment plan.

Figure 11F:
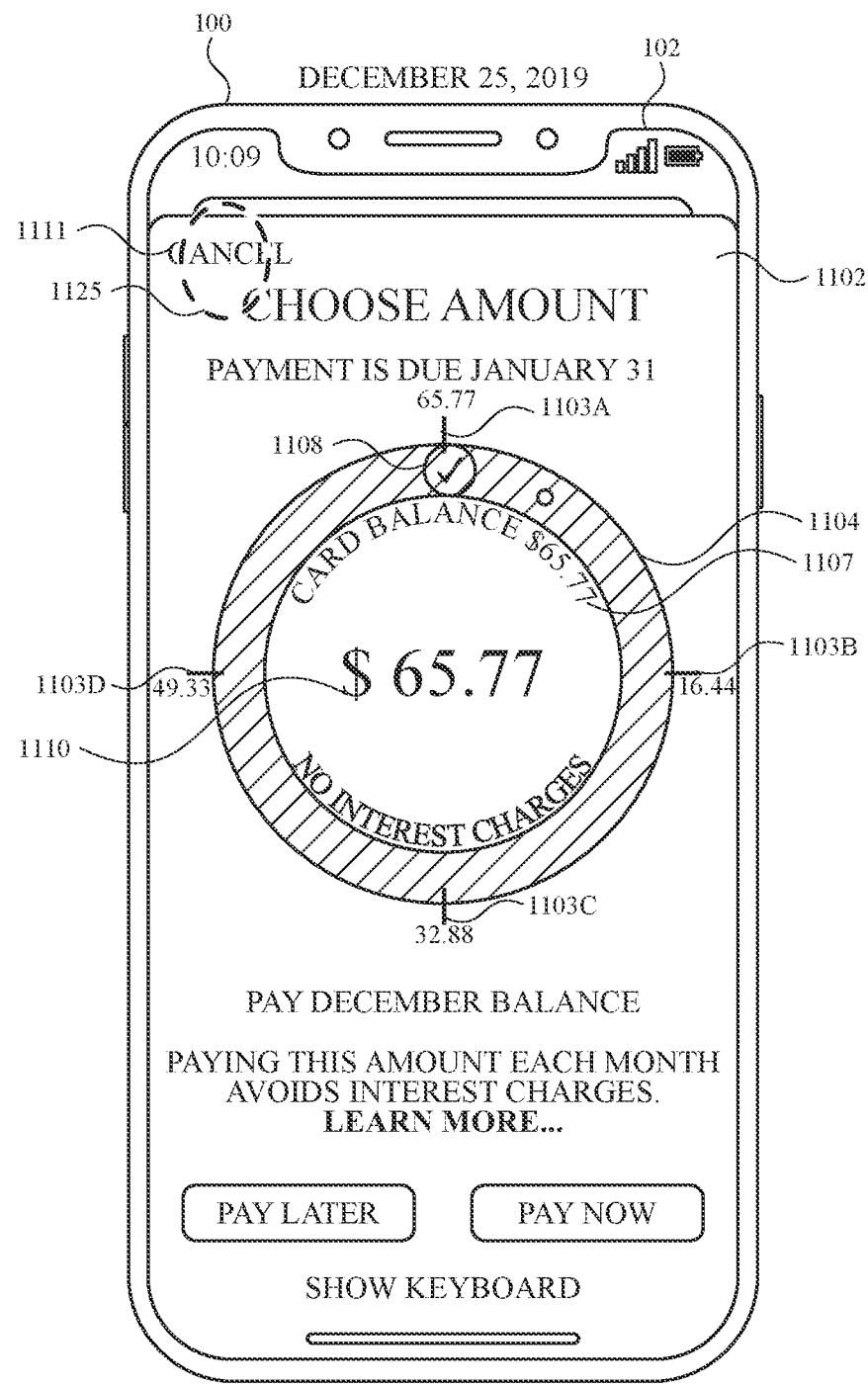

As shown in FIG. 11E, device 100 detects input 1124 on indicator 816B and, in response, displays balance transfer user interface 1102, as shown in FIG. 11F. In some embodiments, indicator 816B causes initiation of a process for paying at least a portion of the transfer account before a statement balance is generated for the transfer account. That is, indicator 816B allows the user to make an early payment to the transfer account balance.

As shown in FIG. 11F, fixed marker 1003A corresponds to a numerical value of 65.77, representing a potential balance transfer amount of $65.77 associated with the location of fixed marker 1103A on selector user interface element 1104. Similarly, fixed markers 1103B, 1103C, and 1103D correspond to numerical values of 49.33, 32.88, and 16.44, respectively, representing corresponding potential balance transfer amounts associated with the respective locations of fixed markers 1103B, 1103C, and 1103D on selector user interface element 1104.

In FIG. 11F, device 100 displays balance transfer user interface 1102 with selection indicator 1108 positioned on selector user interface element 1104 at the second terminus point. As indicated by fixed marker 1103A, the range of values represented for selector user interface element 1104 terminates at 65.77, (e.g., $65.77), which corresponds to the balance of the transfer account (not including any installation transfers). Indication 1110 shows that the selected transfer amount (e.g., the maximum selectable transfer balance) is $65.77. Thus, balance transfer user interface 1102 shows, in FIG. 11F, the total balance of the transfer account selected for payment. In response to detecting (or determining) that selection indicator 1108 is at the second terminus point, device 100 displays, in selection indicator 1108, a visual indication (e.g., a symbol, such as a star) indicating that the current location of selection indicator 1108 corresponds to a balance transfer (e.g., payment) for the total balance of the transfer account.

In FIG. 11F, device 100 detects input 1125 on cancel affordance 1111 and, in response, cancels (e.g., aborts) the process for selecting the balance transfer amount.

Figure 11G:
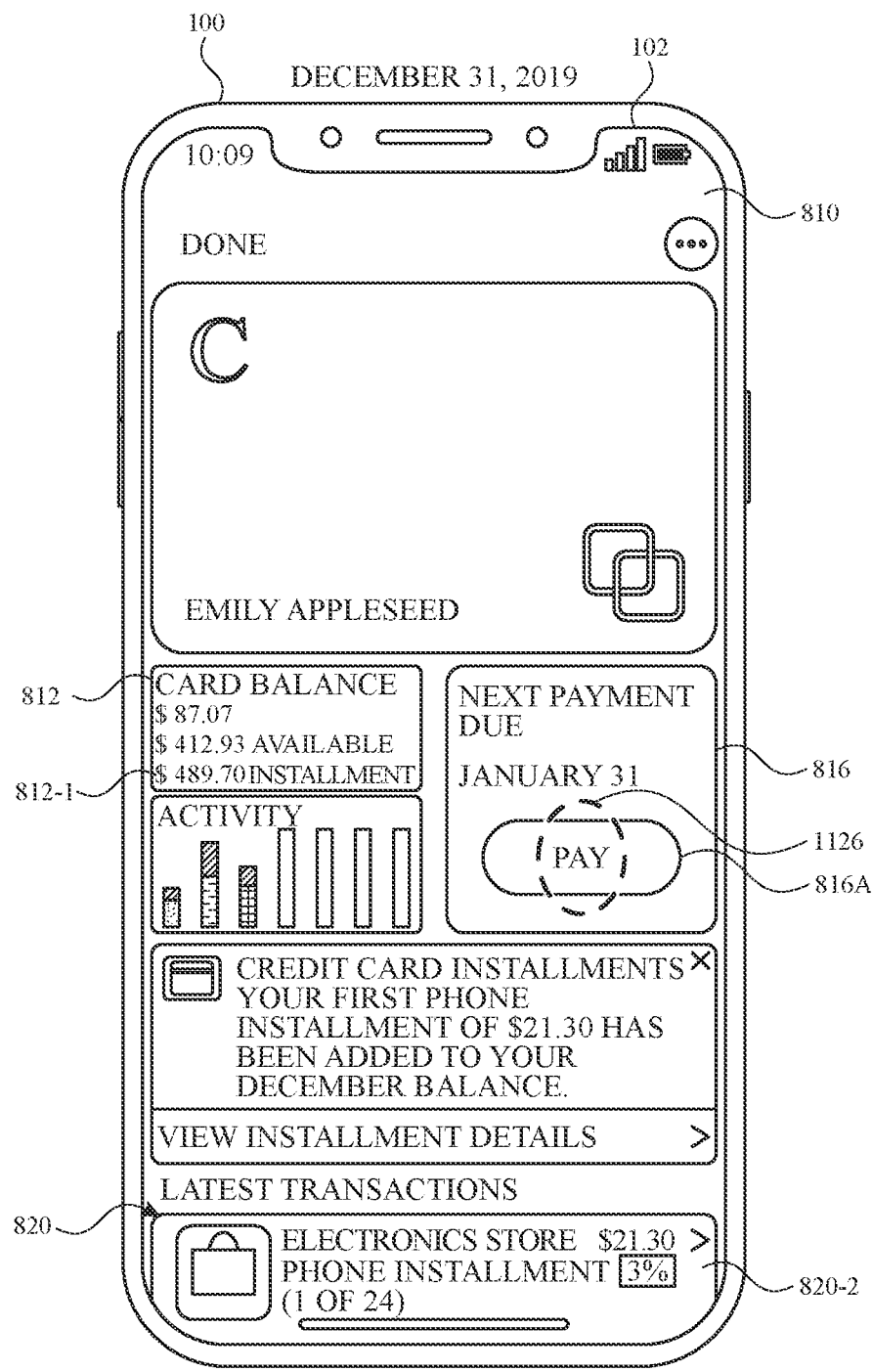

Referring now to FIG. 11G, device 100 displays summary user interface 810 as shown on Dec. 31, 2019, which is when the first installment has been added to the transfer account and the statement balance for the transfer account has been generated. Summary user interface 810 is now updated to reflect the first installment transfer has been applied to the transfer account, as evidenced by transfer item 820-Z (e.g., similar to transfer item 820D), and the corresponding updates to balance summary user interface element 812. Specifically, transfer item 820-Z shows the installment transfer charged to the transfer account in the amount of $21.30. As a result, the current balance of the transfer account is increased by $21.30 to $87.07, and representation 812-1 of the installment balance is decreased by $21.30 to $489.70.

Because an installment transfer is included in the balance of the transfer account, summary user interface 810 is capable of initiating a process for paying at least a portion of the installment plan using, for example, balance transfer user interface element 816. For example, as shown in FIG. 11G, device 100 detects input 1126 on indicator 816A to initiate the process for making a balance transfer.

Figure 11H:
Figure 111:
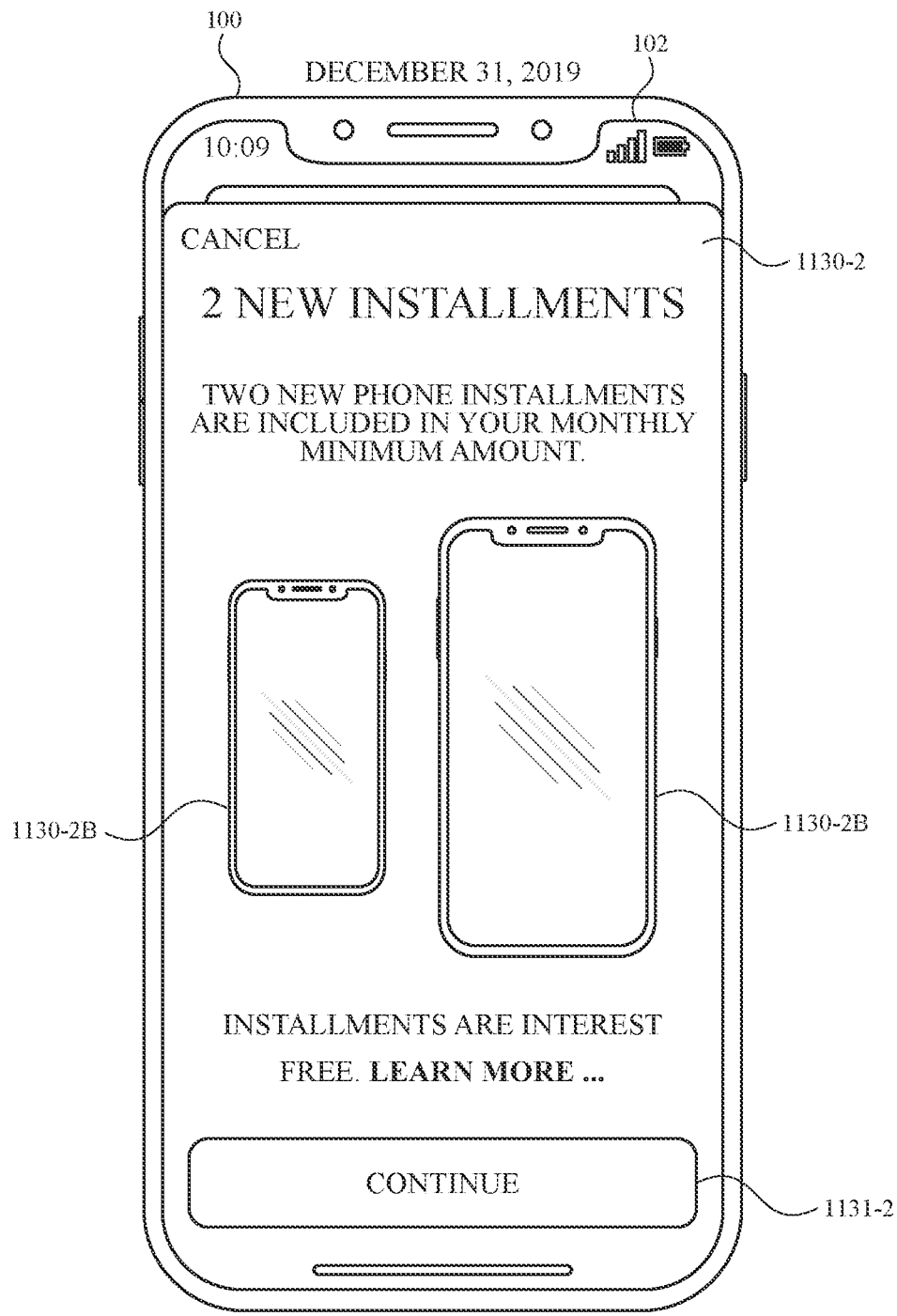

FIGS. 11H and 11I illustrate user interfaces 1130-1 and 1130-2, respectively, that inform a user that a new installment transfer (e.g., the first installment in an installment plan) has been added to the transfer account. In some embodiments, user interface 1130-1 is displayed when the installment transfer corresponds to an installment plan for one item, and user interface 1130-2 is displayed when the installment transfer corresponds to an installment plan for more than one item. In some embodiments, user interface 1130-1 includes representation 1130-1A of the item associated with the installment plan (e.g., having the same appearance as the actual purchased item). In some embodiments, user interface 1130-2 includes representations 1130-2A and 1130-2B of the respective items associated with the installment plan (e.g., having the same appearances as the actual purchased items).

Figure 11J:
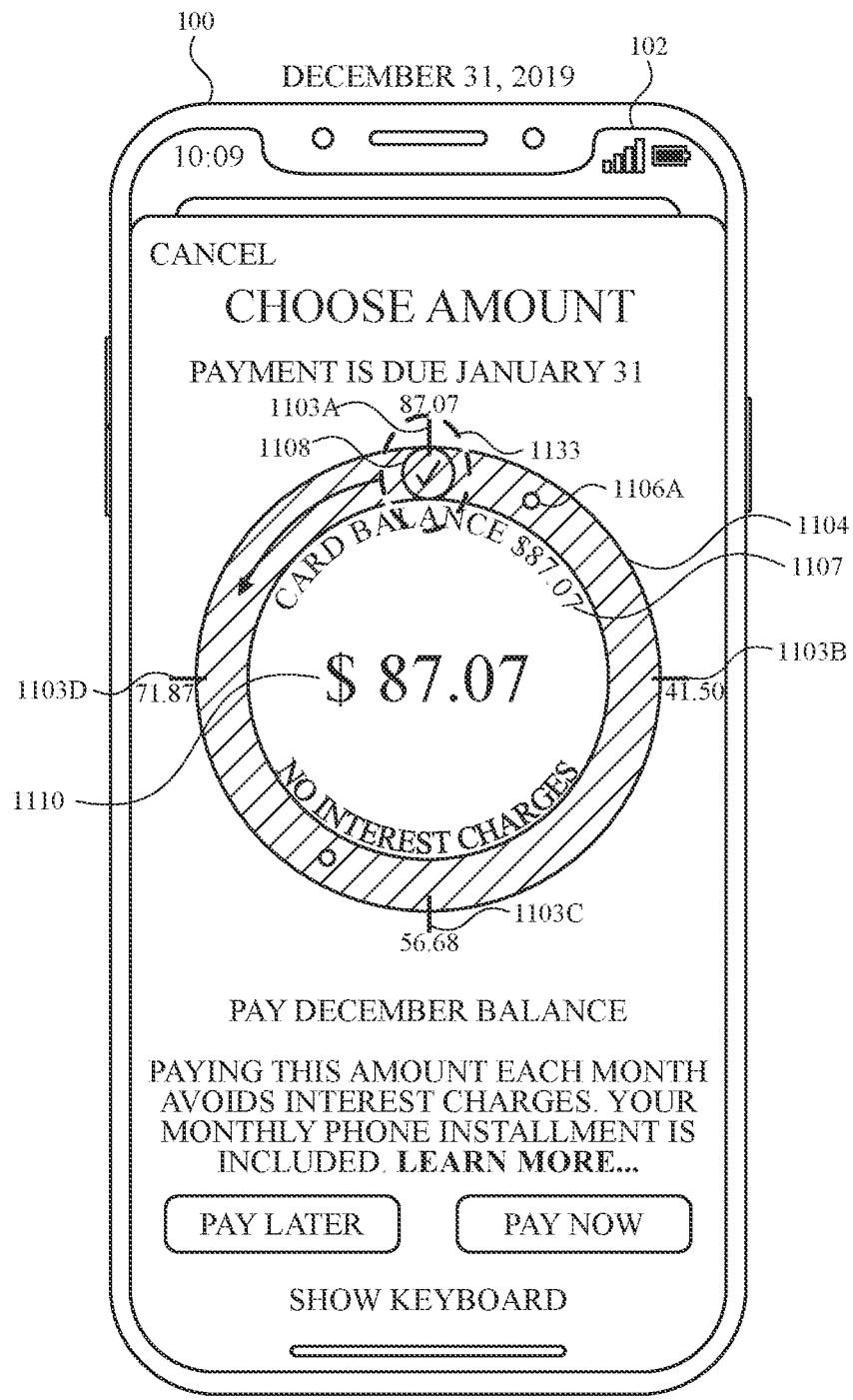

In some embodiments, user interface 1130-1 and user interface 1130-2 also include respective continue affordances 1131-1 and 1131-2. In some embodiments, device 100 displays balance transfer user interface 1102 in response to detecting selection of the respective continue affordance 1131-1 or 1131-2. For example, FIG. 11H shows input 1132 on continue affordance 1131-1, and FIG. 11J shows the resulting display of balance transfer user interface 1102. In some embodiments, respective user interface 1130-1 or user interface 1130-2 is displayed upon selection of indicator 816A after the first installment of the respective installment plan was added to the transfer account, and is not displayed thereafter. Thus, future selections of indicator 816A causes display of balance transfer user interface 1102, without intervening display of user interface 1130-1 or user interface 1130-2.

Figure 11K:
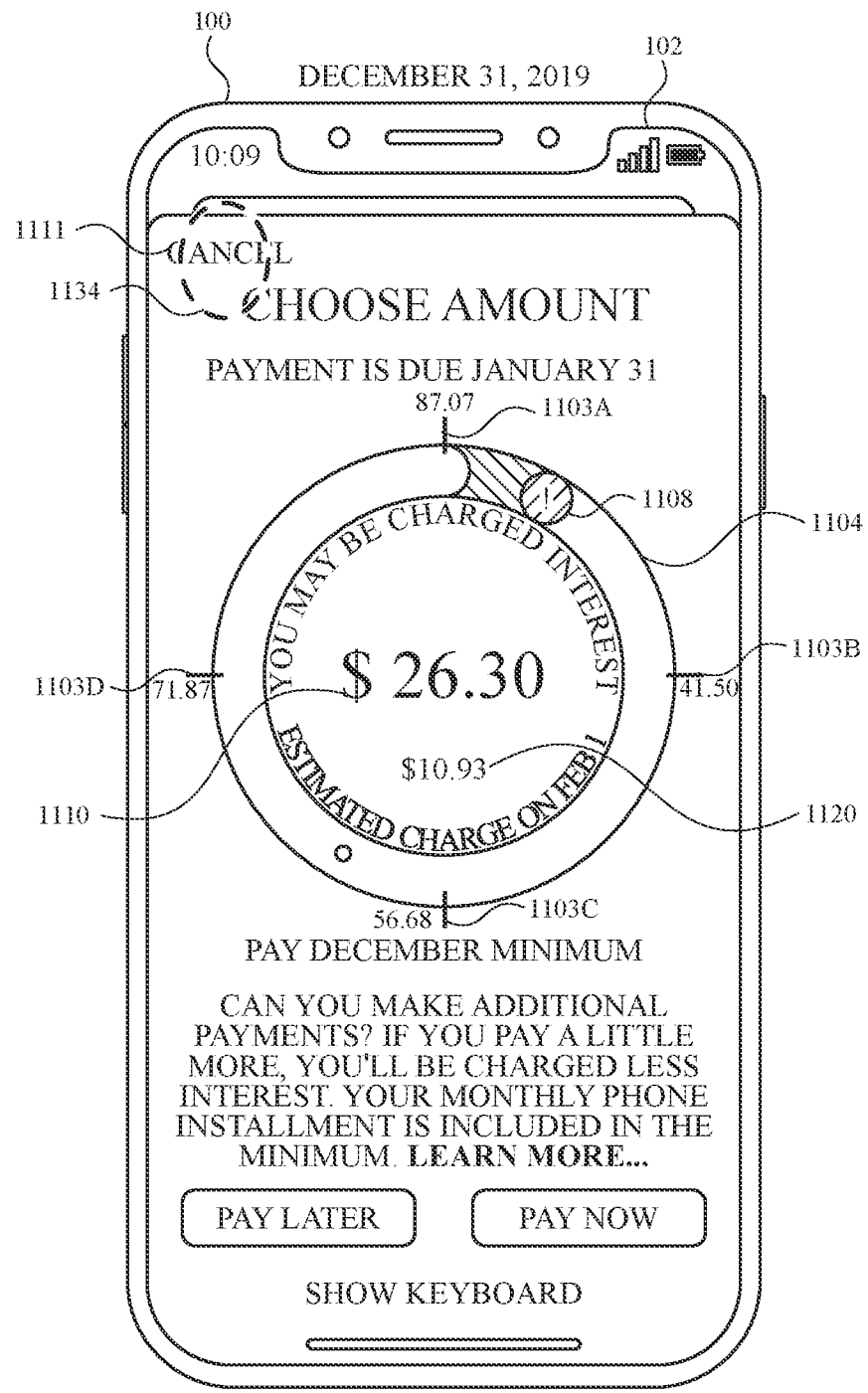

In FIGS. 11J and 11K, fixed marker 1003A corresponds to a numerical value of 87.07, representing a potential balance transfer amount of $87.07 associated with the location of fixed marker 1103A on selector user interface element 1104. Similarly, fixed markers 1103B, 1103C, and 1103D correspond to numerical values of 71.87, 56.68, and 41.50, respectively, representing corresponding potential balance transfer amounts associated with the respective locations of fixed markers 1103B, 1103C, and 1103D on selector user interface element 1104.

Referring now to FIG. 11J, device 100 displays balance transfer user interface 1102. Because there have been no intervening transfers between the generation of the statement and the selection of indicator 816A, the balance on the card is the same as the statement balance (e.g., the outstanding balance that is currently due for the month (December)). Therefore, device 100 displays balance transfer user interface 1102 with selection indicator 1108 positioned on selector user interface element 1104 at the second terminus point. As indicated by fixed marker 1103A, the range of values represented for selector user interface element 1104 terminates at 87.07, (e.g., $87.07), which corresponds to the balance of the transfer account, which includes the $21.30 installment transfer associated with transfer item 820-Z. Indication 1110 shows that the selected transfer amount (e.g., the maximum selectable transfer balance) is $87.07. Thus, balance transfer user interface 1102 shows, in FIG. 11J, the total balance of the transfer account selected for payment and selection indicator 1108 including a visual indication (e.g., a symbol, such as a star) indicating that the current location of selection indicator 1108 corresponds to a balance transfer (e.g., payment) for the total balance of the transfer account.

In FIG. 11J, device 100 detects input 1133 and, in response, displays balance transfer user interface 1102 in FIG. 11K.

As shown in FIG. 11K, device 100 displays balance transfer user interface 1102 with selection indicator 1108 positioned on proposed amount indicator 1106A, which corresponds to the minimum balance transfer amount that can be selected for selector user interface element 1104. In some embodiments, when the installment transfer (e.g., 820-Z) is added to the installment account, it is included in the minimum balance transfer amount for the transfer account. Therefore, when selection indicator 1108 is positioned on proposed amount indicator 1106A, indication 1110 shows the selected balance transfer amount is the sum of the installment transfer and the minimum balance transfer amount for the outstanding portion of the transfer account that is not part of the installment plan. In the embodiment illustrated in FIG. 11K, the minimum balance transfer amount is $26.30, calculated as the installment amount ($21.30) plus the minimum balance transfer amount ($5.00) for the non-installed portion of the transfer account (e.g., the $65.77 balance as shown in FIG. 11E). For reference, the $5.00 minimum balance transfer amount for a $65.77 non-installment balance of the transfer account is illustrated in FIG. 11C and discussed above.

In FIG. 11K, device 100 detects input 1134 on cancel affordance 1111 and, in response, cancels (e.g., aborts) the process for selecting the balance transfer amount.

Figure 11L:
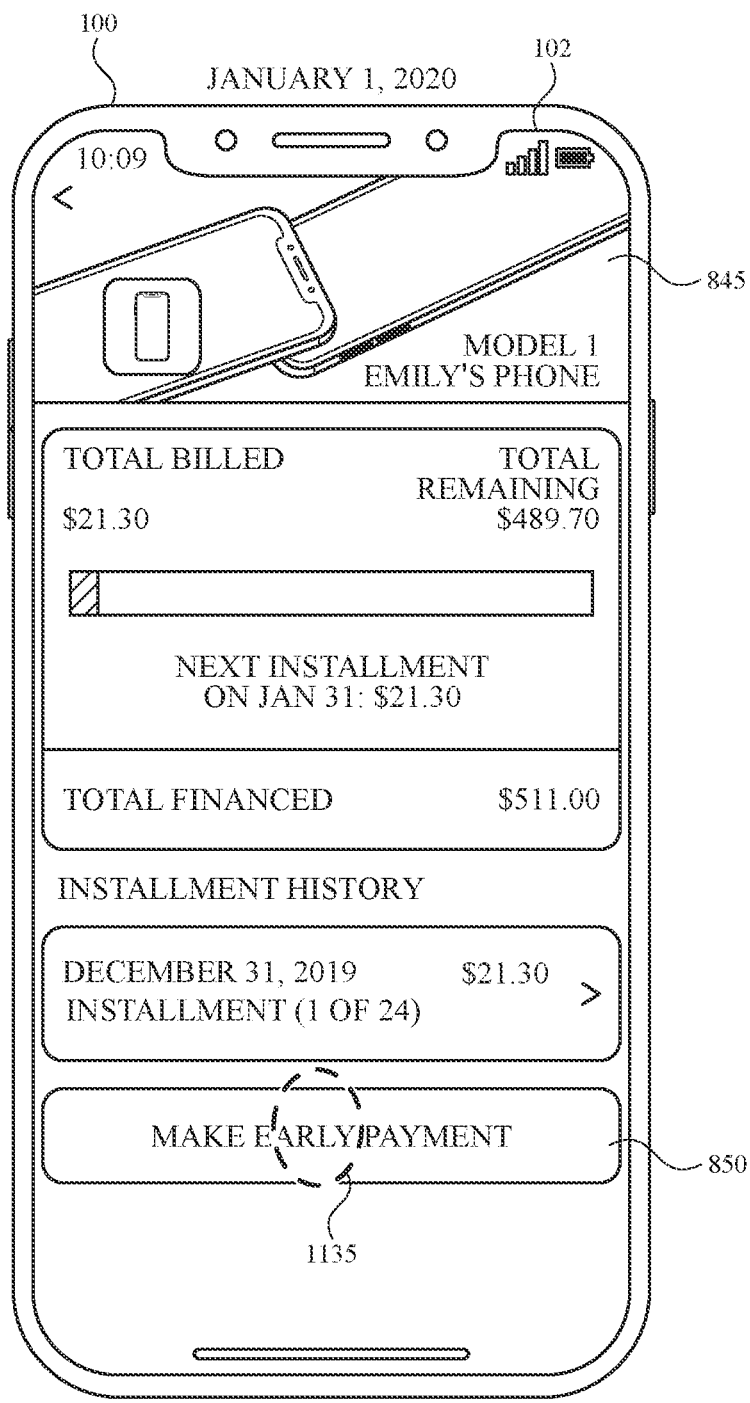

Referring now to FIG. 11L, device 100 displays installment details user interface 845 as shown on Jan. 1, 2020. No additional transactions have been processed for the transfer account from those shown in summary user interface 810 of FIG. 11G. Installment details user interface 845 of FIG. 11L is similar to installment details user interface 845 shown in FIG. 8N.

In FIG. 11L, device 100 detects input 1135 on installment payment user interface element 850 and, in response, initiates a process for making a balance transfer for the installment plan—that is, a process for making an early payment towards the balance of the installment plan. By default, portions of the installment plan are scheduled for payment on a recurring (e.g., monthly basis). However, the process for making an early payment towards the balance of the installment plan allows a user to payoff unbilled amounts of the installment plan (e.g., a balance of the installment plan that is not yet due for payment). In some embodiments, the installment balance (e.g., the portion of the installment plan that has not yet been billed or added to the transfer account balance) does not accrue interest, whereas the balance billed to the transfer account is capable of accruing interest. In some embodiments, device 100 therefore forces the user to pay off the interest-accruing balance of the transfer account, in order to make payments towards the interest-free installment balance. In some embodiments, initiating the process for making an early payment towards the installment balance includes optionally displaying a notification to the user informing them of the requirement to pay off the interest-accruing balance of the transfer account. An example of such a notification is shown in FIG. 11M (e.g., user interface 1136).

Figure 11M:
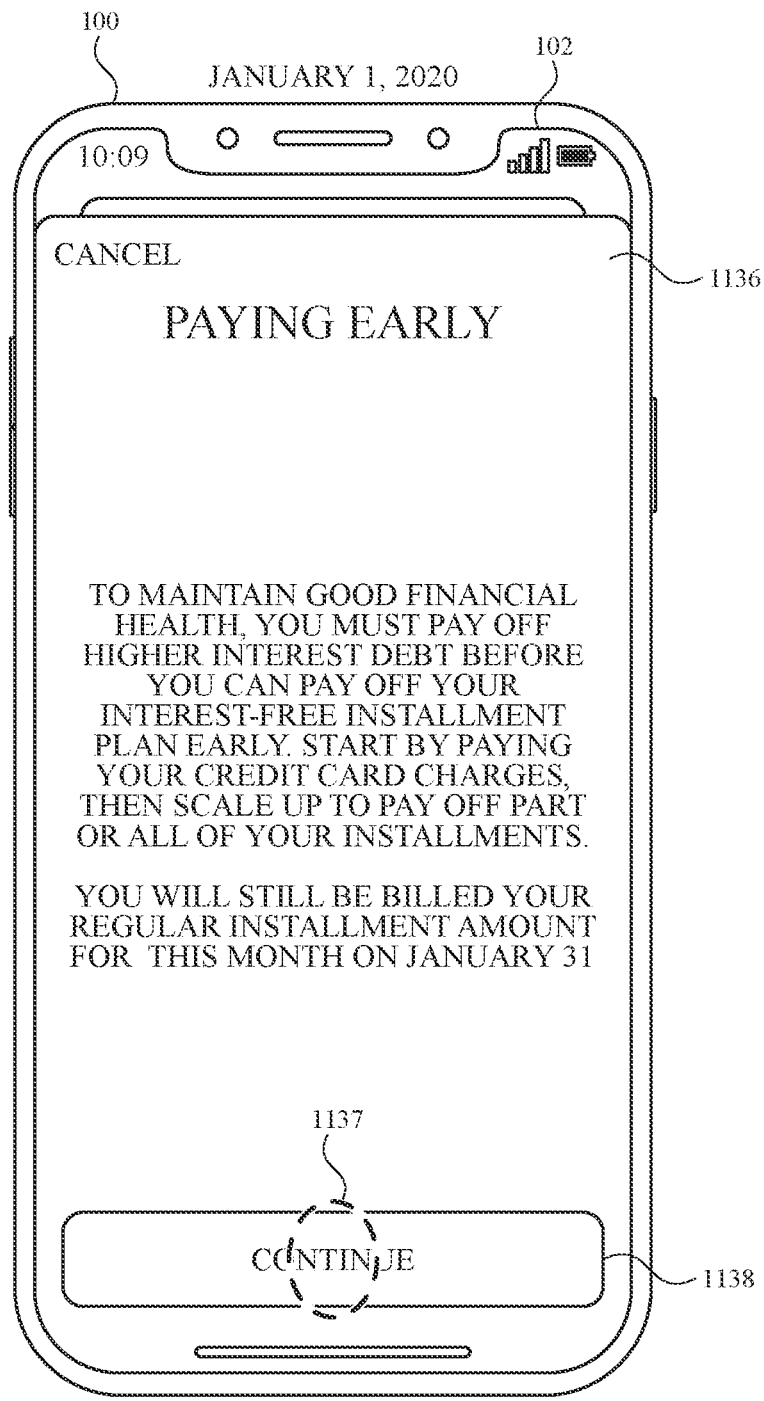
Figure 11N:
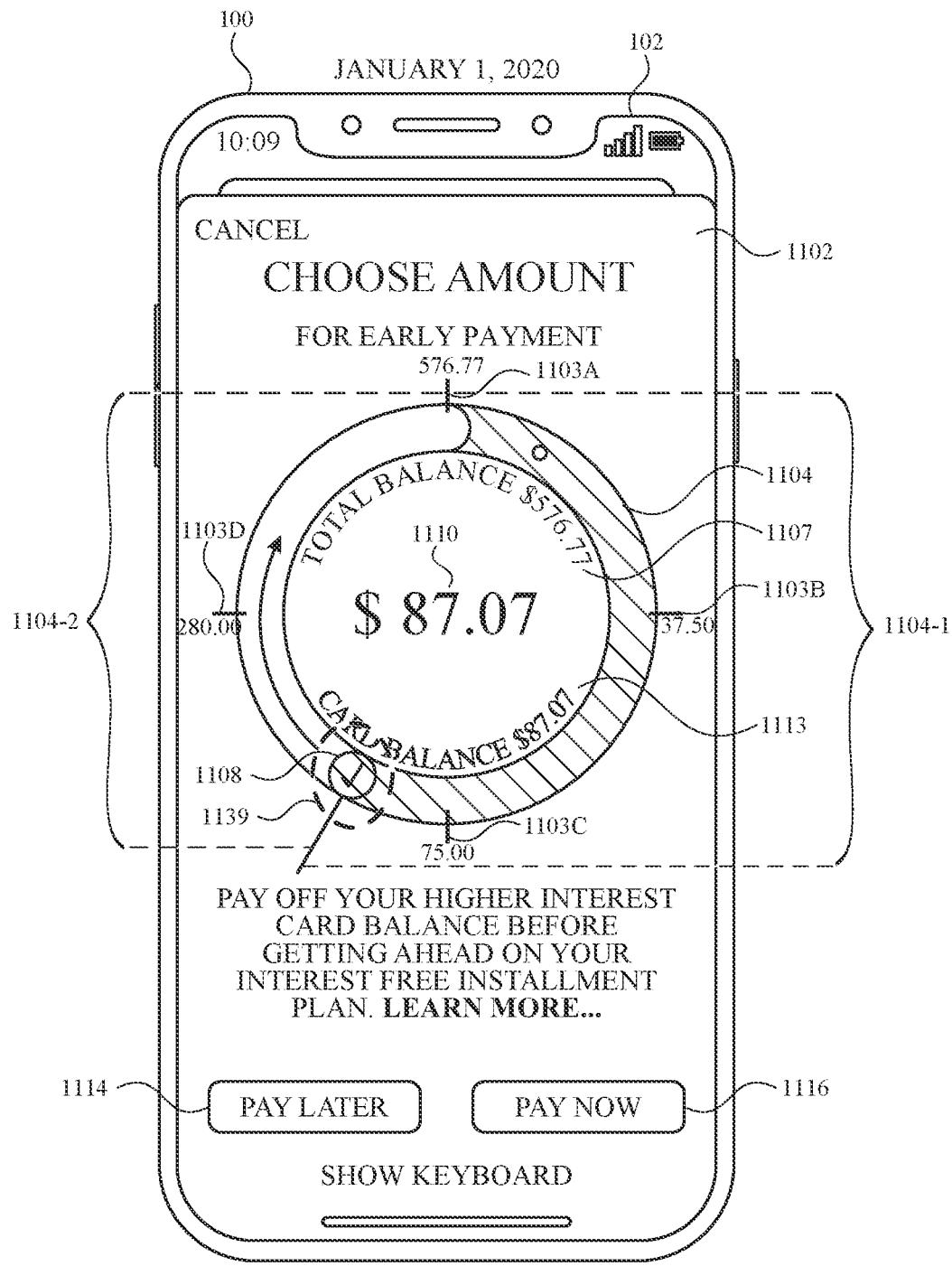

In FIG. 11M, device 100 detects input 1137 on continue affordance 1138 and, in response, displays balance transfer user interface 1102 in FIG. 11N.

Figure 11O:
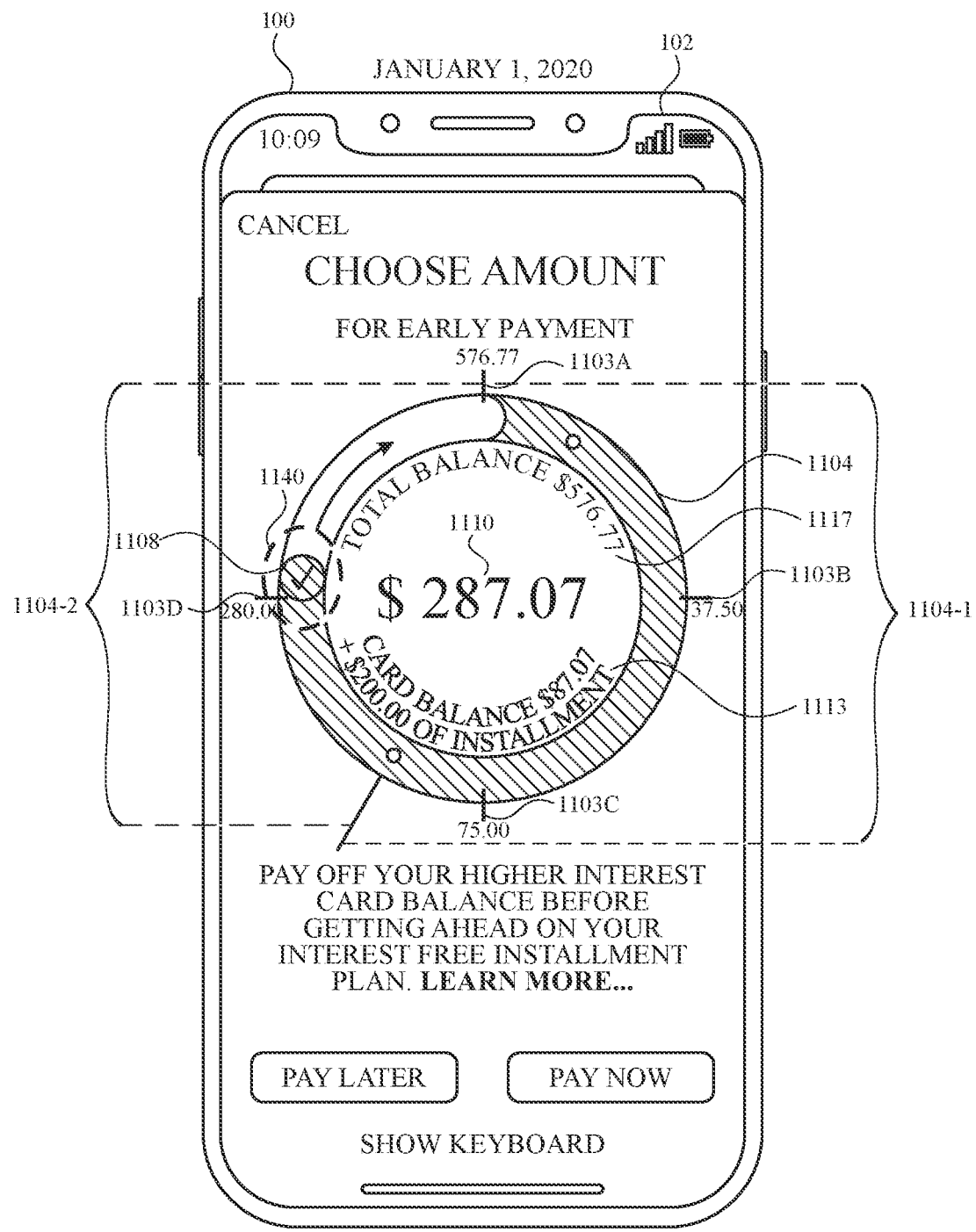
Figure 11P:
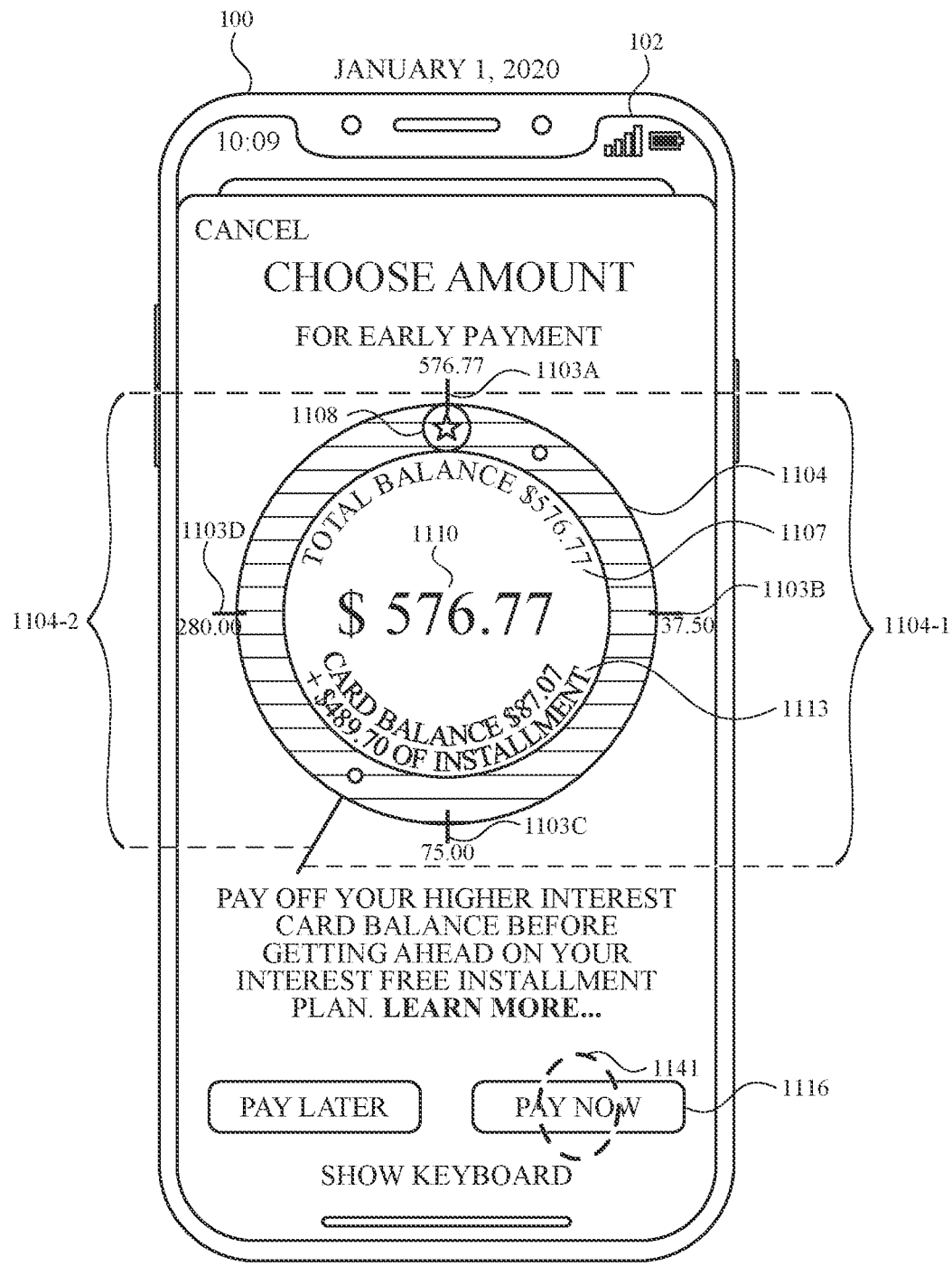

In FIGS. 11N-11P, fixed marker 1003A corresponds to a numerical value of 576.77, representing a potential balance transfer amount of $576.77 associated with the location of fixed marker 1103A on selector user interface element 1104. Similarly, fixed markers 1103B, 1103C, and 1103D correspond to numerical values of 280.00, 75.00, and 37.50, respectively, representing corresponding potential balance transfer amounts associated with the respective locations of fixed markers 1103B, 1103C, and 1103D on selector user interface element 1104.

In the embodiment illustrated in FIG. 11N, the transfer account has a current balance of $87.07 and an outstanding installment balance of $489.70 (e.g., as indicated in FIGS. 11G and 11L), for a total balance of $576.77. Details indication 1113 shows the card balance of $87.07, and indication 1107 shows the total balance of $576.77. When balance transfer user interface 1102 is displayed, device 100 shows selection indicator 1108 positioned at proposed amount indicator 1106D, which is positioned at a value along selector user interface element 1104 corresponding to the card balance of $87.07. Accordingly, indication 1110 shows that the selected transfer amount is $87.07 (e.g., the card balance). Device 100 determines that the selected transfer amount corresponds to the card balance and, therefore, displays selection indicator 1108 having a checkmark, and the portion of the predefined path of selector user interface element 1104 (including selection indicator 1108) having a hue (e.g., green). Accordingly, should the balance transfer be initiated for the selected $87.07 amount (e.g., via selection of transfer later affordance 1114 or transfer now affordance 1116), the entire card balance of $87.07 would be satisfied, and none of the installment balance would be satisfied, leaving a remaining installment balance of $489.70.

In FIG. 11N, selector user interface element 1104 is shown with first portion 1104-1 and second portion 1104-2. In this embodiment, first portion 1104-1 represents a portion of selector user interface element 1104 having a range of values that corresponds to the card balance, and second portion 1104-2 represents a portion of selector user interface element 1104 having a range of values that corresponds to the installment balance. First portion 1104-1 extends from the first terminus point of selector user interface element 1104 (e.g., adjacent the 12 o'clock position) to the location of proposed amount indicator 1106D. Second portion 1104-2 extends from the location of proposed amount indicator 1106D to the second terminus point of selector user interface element 1104 (e.g., the 12 o'clock position).

In FIG. 11N, device 100 detects input 1139 on selection indicator 1108 and, in response, moves selection indicator 1108 along selector user interface element 1104 to the position shown in FIG. 11O.

As shown in FIG. 11O, device 100 displays selection indicator 1108 positioned at a location along selector user interface element 1104 that corresponds to a balance transfer in the amount of $287.07, as shown by indication 1110. Details indication 1113 shows that the selected $287.07 balance includes an $87.07 balance transfer towards the card balance and a $200.00 balance transfer towards the installment balance. Device 100 determines that the selected transfer amount corresponds to an amount greater than the card balance and, therefore, displays selection indicator 1108 having a checkmark, and the portion of the predefined path of selector user interface element 1104 (including selection indicator 1108) having a hue (e.g., green or blue). Accordingly, should the balance transfer be initiated for the selected $287.07 amount (e.g., via selection of transfer later affordance 1114 or transfer now affordance 1116), the entire card balance of $87.07 would be satisfied and $200.00 of the installment balance would be satisfied, leaving a remaining installment balance of $289.70.

In FIG. 11O, device 100 detects input 1140 on selection indicator 1108 and, in response, moves selection indicator 1108 along selector user interface element 1104 to the position shown in FIG. 11P.

As shown in FIG. 11P, device 100 displays balance transfer user interface 1102 with selection indicator 1108 positioned on selector user interface element 1104 at the second terminus point. As indicated by fixed marker 1103A, the range of values represented for selector user interface element 1104 terminates at 576.77, (e.g., $576.77), which corresponds to the total balance including the entire card balance ($87.07) and the entire installment balance (e.g., $489.70). Because selection indicator 1108 is positioned at the second terminus point, the total balance of $576.77 is selected, as shown by indication 1110. Details indication 1113 shows that the selected $576.77 balance includes an $87.07 balance transfer towards the card balance and a $489.70 balance transfer towards the installment balance. Device 100 determines that the selected transfer amount corresponds to the total balance (e.g., card balance and full installation plan balance) and, therefore, displays selection indicator 1108 having a star, and the predefined path of selector user interface element 1104 (including selection indicator 1108) having a hue (e.g., blue). Accordingly, should the balance transfer be initiated for the selected $576.77 amount (e.g., via selection of transfer later affordance 1114 or transfer now affordance 1116), the entire card balance of $87.07 would be satisfied in full and the entire installment balance of $489.70 would be satisfied in full.

In FIG. 11P, while displaying balance transfer user interface 1102 with selection indicator 1108 positioned at the second terminus position (e.g., the ending terminus position) of the defined path of selector user interface element 1104, electronic device 100 detects a user activation (e.g., via input 1141) of transfer now affordance 1116.

Figure 11Q:
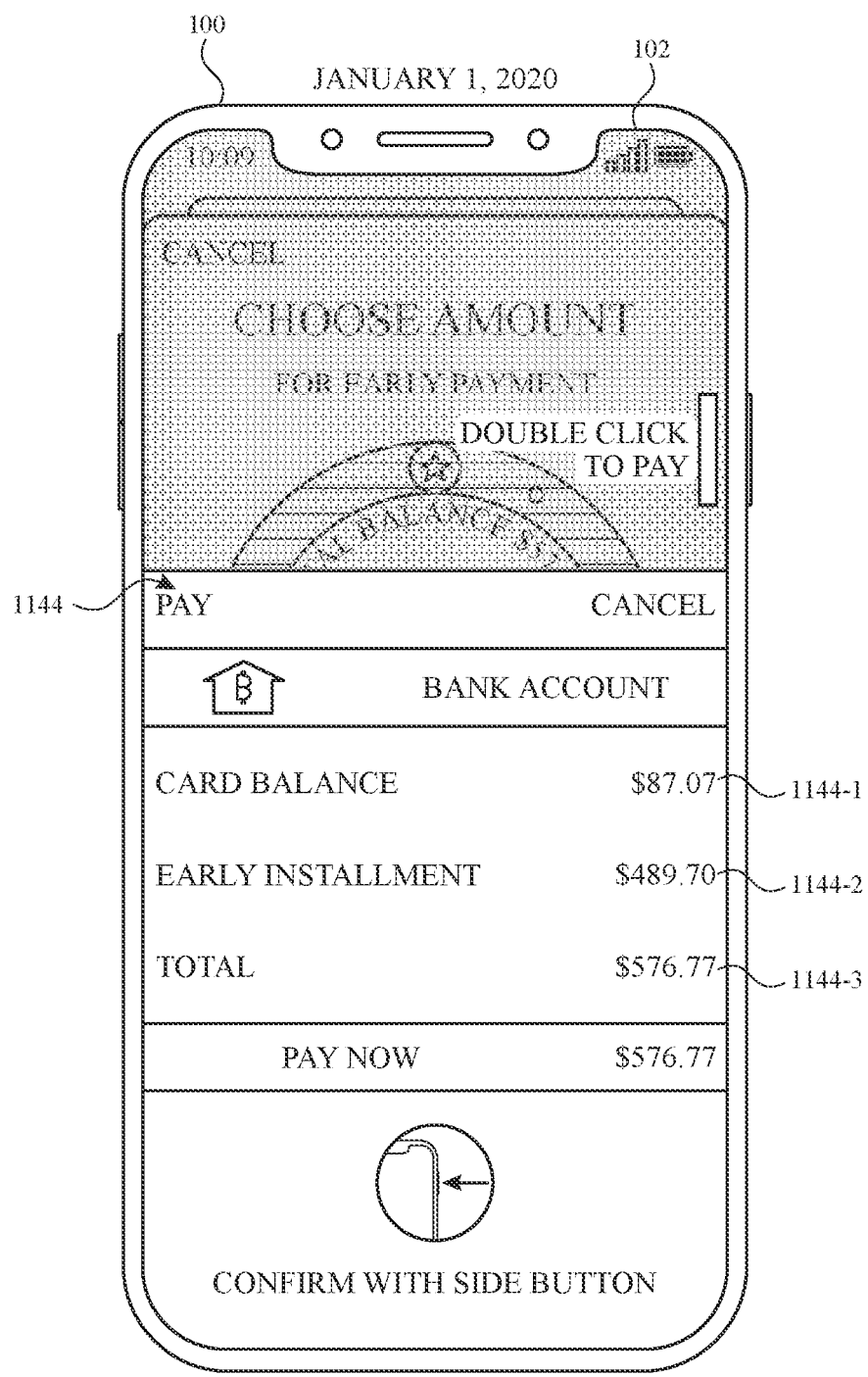
Figure 11R:
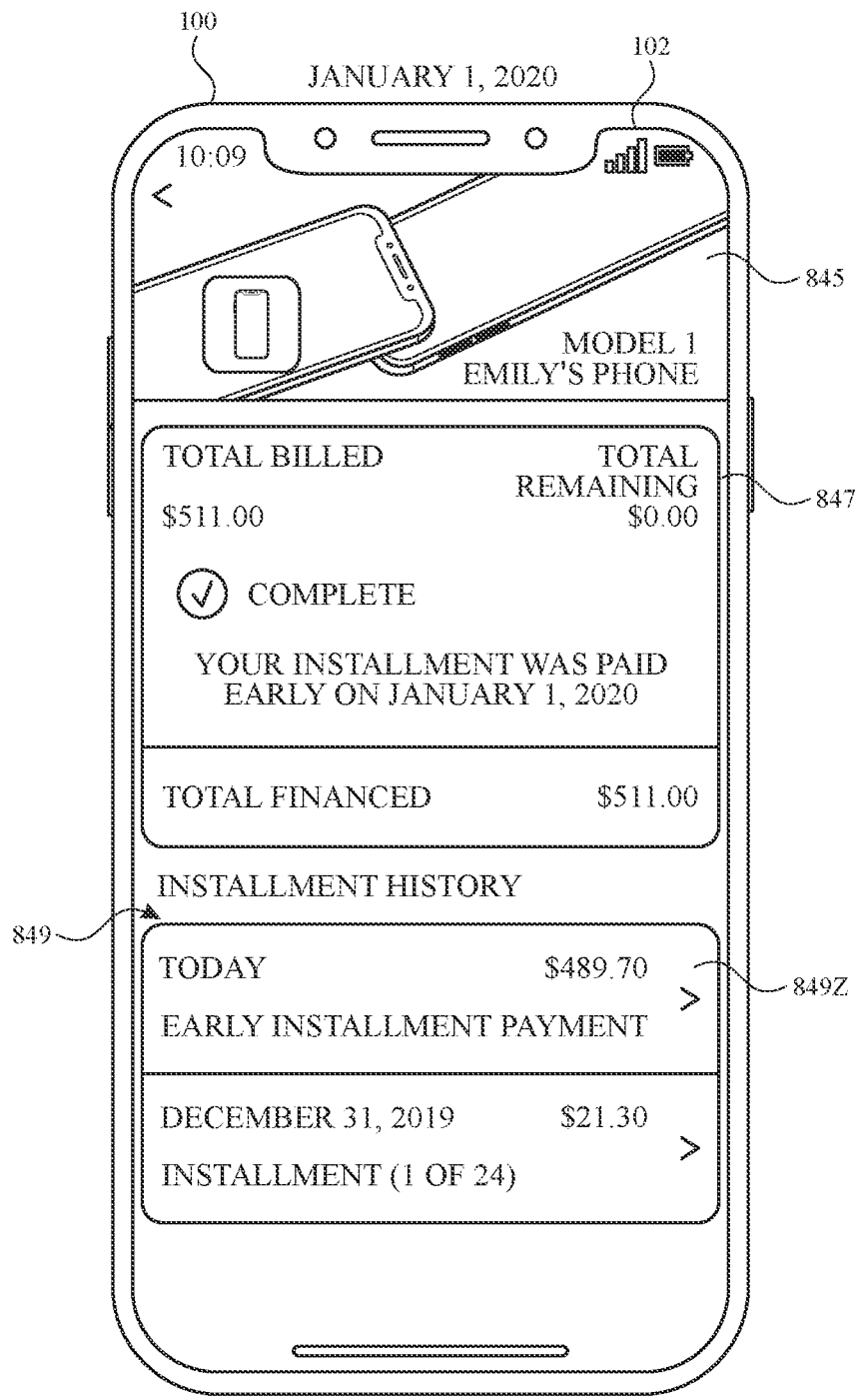

In FIG. 11Q, in response to detecting user activation of transfer now affordance 1116, electronic device 100 displays, on display 112, a transfer sheet user interface 1144 corresponding to the transfer application (e.g., the electronic wallet application). In some embodiments, transfer sheet user interface 1144 is an operating system user interface (e.g., of a first-party, operating system application that is fully controlled by the operating system of the electronic device) that cannot be controlled by a third-party application. In some embodiments transfer sheet user interface 1144 is used to authorize transfers (e.g., payment transactions, points transfers) that are initiated through other applications (e.g., including third-party applications) on the electronic device and/or initiated through a webpage (e.g., displayed in a web browser) displayed on the electronic device. In some embodiments, transfer sheet user interface 1144 is displayed (e.g., slides onto the display from the bottom of the display) over a portion of (but not all of) balance transfer user interface 1102 such that a portion of balance transfer user interface 1102 is still visible on the display.

In some embodiments, transfer sheet user interface 1144 includes an itemization of the balance transfer being prepared including for example, indication 1144-1 of the card balance transfer, indication 1144-2 of the early installment balance transfer, and indication 1144-3 of the total balance transfer.

After confirming and processing the balance transfer (e.g., payment), device 100 displays, in FIG. 11R, installment details user interface 845, similar to that shown in FIG. 8T, but instead showing the details of the balance transfer described above. Specifically, installment progress user interface element 847 is updated to show the completed status of the installment plan, and installment history 849 is updated to include final installment transfer 849Z corresponding to the balance transfer processed above to pay off the entire balance of the installment plan.

FIGS. 12A-12B are a flow diagram illustrating a method for managing a user account using an electronic device in accordance with some embodiments. Method 1200 is performed at a device (e.g., 100, 300, 500) with a display device (e.g., 112) and one or more input devices (e.g., the touch screen of display 112). Some operations in method 1200 are, optionally, combined, the orders of some operations are, optionally, changed, and some operations are, optionally, omitted.

As described below, method 1200 provides an intuitive way for managing a user account. The method reduces the cognitive burden on a user for managing a user account, thereby creating a more efficient human-machine interface. For battery-operated computing devices, enabling a user to manage a user account faster and more efficiently conserves power and increases the time between battery charges.

The device (e.g., 100) receives (1202) a request to display a numerical selection user interface (e.g., 1001; 1029; 1101; 1124; 1126; 1132; 1135; 1137) (e.g., detect selection of a "Delete" affordance) (e.g., detect selection of a "Pay" affordance).

In response to receiving the request to display the numerical selection user interface, the device (e.g., 100) displays (1204) a numerical selection user interface (e.g., 1002; 1102) (e.g., an interactive payment ring user interface) for selecting a value for a respective parameter (e.g., an amount of data for deletion (e.g., from a remote storage database)) (e.g., a payment amount). The numerical selection user interface includes: a predefined path (e.g., 1004; 1104) (e.g., a fixed path) with a respective size and shape (e.g., a ring shape), a value selector (e.g., 1008; 1108), and a selectable user interface object (e.g., 1014; 1016; 1114; 1116) (e.g., a "Delete Now" affordance) (e.g., a "Pay Now" or transfer now affordance) for initiating a process for performing a predefined operation (e.g., adjusting (e.g., reducing/deleting) an amount of data being stored or archived) (e.g., adjusting (e.g., reducing/paying) a balance amount) using a value associated with the value selector (e.g., 1008; 1108) (e.g., a value (data amount) (payment amount) selected using the value selector).

In some embodiments, the numerical selection user interface (e.g., 1102) further includes a representation (e.g., 1110) of the selected value for the respective parameter (e.g., a number indicating the currently selected value (e.g., payment amount) (e.g., amount of data for deletion)) displayed at a central location with respect to the predefined path (e.g., 1104) with the respective size and shape. In some embodiments, the predefined path is a circular ring shape and the representation of the selected value is displayed in the center of the circular ring shape.

In some embodiments, the predefined path (e.g., 1104) with the respective size and shape is a ring shape (e.g., a circular ring). In some embodiments, the predefined path (e.g., 1104) is a closed path (e.g., the path commences and terminates at approximately the same location). In some embodiments, the predefined path has a same size and shape in each user interface (e.g., 1002 or 1102).

Displaying the numerical selection user interface includes: in accordance with a determination that the request to display the numerical selection user interface (e.g., 1001; 1029; 1101; 1124; 1126; 1132; 1135; 1137) meets first criteria, the first criteria including a criterion that is met when the request to display the numerical selection user interface occurs while displaying a first user interface associated with the respective parameter (e.g., 1022 in FIG. 10E; 810 in FIG. 11G; 1130-1; 1130-2; 845 in FIG. 11L; 1136) (e.g., a user interface (e.g., a data storage management user interface) for managing data stored remotely, including data of a first type (e.g., standard data), and data of a second type (e.g., bulk data)) (e.g., an installment plan user interface), the device (e.g., 100) displays (1206) the predefined path (e.g., 1004; 1104) with the respective size and shape. A first point on the predefined path (e.g., 1006D in FIG. 10F; 1106D in FIG. 11N) (e.g., 1003C in FIG. 10F; 1103C in FIG. 11N) corresponds to a first numerical value (e.g., 1.6; 87.07) (e.g., 1.4; 75) (e.g., a value corresponding to a balance of the data of the first type stored at the remote storage database plus a portion of data of the second type that is currently scheduled for deletion) (e.g., a value corresponding to a card balance) and a second point on the predefined path (e.g., 1003A in FIG. 10F; 1103A in FIG. 11N) corresponds to a second numerical value (e.g., 3.9; 576.77) (e.g., a value corresponding to the total amount of data stored at the remote storage database (e.g., a balance of all data of the first type plus the balance of all data of the second type)) (e.g., a value corresponding to the total balance (e.g., card balance plus installment balance)).

In some embodiments, data of the first type (e.g., standard data) is associated with a data retention policy in which a user-selectable amount of standard data (e.g., including a minimum amount of data such as, for example, 5% of the balance of stored data of the first type) is due for deletion on a recurring (e.g., monthly) basis (e.g., the user is presented with the option to select the amount of data of the first type (standard data) to be deleted each month, but is required to delete at least a minimum amount of the standard data. In some embodiments, data of the second type (e.g., bulk data) is associated with a data retention policy in which the bulk data (e.g., a large amount of related data (e.g., a large photo album)) is scheduled to be deleted in-part on a recurring basis (e.g., monthly) until the data of the second type is deleted in-full. As the bulk data becomes due for deletion, the portion of bulk data for deletion is converted to standard data (e.g., added to the balance of standard data), where it is available for deletion in accordance with the data retention policy for standard data.

In some embodiments, the installment plan user interface is an interface for managing a user account (e.g., a transfer account) that is associated with an installment plan. In some embodiments, the installment plan includes a series of transactions (e.g., financial transactions) (e.g., transfers) that are scheduled to be settled in repeating installments over a number of cycle periods (e.g., monthly) until the installment plan purchase (e.g., debt) is settled in full. In some embodiments, the card balance is a cumulative balance of all unsettled transactions associated with the user account (e.g., transfer account), excluding future installment transactions that are not yet due for settlement (e.g., payment), and optionally including fees or interest accrued on the user account. In some embodiments, the card balance includes a prior month balance of transactions plus subsequent transactions processed to-date. In some embodiments, the card balance also includes an installment transaction (e.g., the installment transaction can be at least a portion of the prior month balance). In some embodiments, the card balance includes an installment transaction if the request to display the numerical selection interface occurs after the installment transaction has been added (e.g., charged/processed) to the user account. In some embodiments, the total balance is a cumulative balance of all unsettled transactions associated with the user account, including the unsettled balance of the installment plan (the installment balance) and, optionally, including fees or interest accrued on the user account. In some embodiments, the installment balance is used to refer to the unsettled balance of the installment plan, excluding the portion of the installment plan that is included in the card balance. In some embodiments, the installment balance is used to refer to the unsettled balance of the installment plan, including the portion of the installment plan that is included in the card balance.

Displaying the numerical selection user interface includes: in accordance with a determination that the request to display the numerical selection user interface (e.g., 1001; 1029; 1101; 1124; 1126; 1132; 1135; 1137) meets second criteria, the second criteria including a criterion that is met when the request to display the numerical selection user interface occurs while displaying a second user interface associated with the respective parameter (e.g., 710 in FIG. 10A; 810 in FIG. 11A) (e.g., a user interface for deleting data stored remotely, including data of the first type, but not including data of the second type) (e.g., an account balance payment user interface) (e.g., a user interface that is not associated with an installment plan) that is different from the first user interface (e.g., 1022 in FIG. 10E; 810 in FIG. 11G; 1130-1; 1130-2; 845 in FIG. 11L; 1136), the device (e.g., 100) displays (1208) the predefined path (e.g., 1004; 1104) with the respective size and shape, wherein the first point on the predefined path (e.g., 1006D in FIG. 10B; 1106D in FIG. 11B) (e.g., 1003C in FIG. 10B; 1103C in FIG. 11B) corresponds to a third numerical value (e.g., 0.9; 65.77) (e.g., 0.75; 50.00) (e.g., an amount of data of the first type (excluding any data of the second type) that is currently due for deletion) (e.g., a previous month balance that does not include an installment transaction) that is different from the first numerical value (e.g., 1.6; 87.07) (e.g., 1.4; 75), and the second point on the predefined path (e.g., 1003A in FIG. 10B; 1103A in FIG. 11B) corresponds to a fourth numerical value (e.g., 1.5; 100.00) (e.g., a total balance of data of the first type (excluding any data of the second type), including data of the first type that is currently due for deletion and data of the first type that is not currently due for deletion) (e.g., a card balance that does not include an installment balance (e.g., previous month balance (without an installment transaction) plus subsequent transaction balance)) that is different from the second numerical value (e.g., 3.9; 576.77). In some embodiments, the account balance payment user interface is an interface for managing a user account (e.g., a transfer account) that is associated with transactions (e.g., financial transactions) that do not correspond to an installment plan (e.g., the transactions do not include any installment transactions).

While displaying the numerical selection user interface (e.g., 1002; 1102), device (e.g., 100) detects (1210) an input (e.g., 1032; 1141) corresponding to activation of the selectable user interface object (e.g., 1016; 1116).

In response to detecting the input (e.g., 1032; 1141) corresponding to activation of the selectable user interface object (e.g., 1016; 1116), device (e.g., 100) performs (1212) one or more of the following items.

In accordance with a determination that the value selector (e.g., 1008; 1108) is at the first point (e.g., 1006D in FIG. 10F; 1106D in FIG. 11N) (e.g., 1003C in FIG. 10F; 1103C in FIG. 11N) on the predefined path (e.g., 1004; 1104) and the request to display the numerical selection user interface met the first criteria, device (e.g., 100) initiates (1214) a process for performing the predefined operation using the first numerical value (e.g., 1.6; 87.07) (e.g., 1.4; 75) (e.g., initiating deletion, from the remote storage database, of the balance of the data of the first type plus the portion of data of the second type that is currently scheduled for deletion) (e.g., initiating payment of the card balance).

In accordance with a determination that the value selector (e.g., 1008; 1108) is at the second point (e.g., 1003A in FIG. 10F; 1103A in FIG. 11N) on the predefined path (e.g., 1004; 1104) and the request to display the numerical selection user interface met the first criteria, device (e.g., 100) initiates (1216) a process for performing the predefined operation using the second numerical value (e.g., 3.9; 576.77) (e.g., initiating deletion of all data of the first type and all data of the second type from the remote storage database) (e.g., initiating payment of the total balance).

In accordance with a determination that the value selector (e.g., 1008; 1108) is at the first point (e.g., 1006D in FIG. 10F; 1106D in FIG. 11N) (e.g., 1003C in FIG. 10F; 1103C in FIG. 11N) on the predefined path (e.g., 1004; 1104) and the request to display the numerical selection user interface met the second criteria, device (e.g., 100) initiates (1218) a process for performing the predefined operation using the third numerical value (e.g., 0.9; 65.77) (e.g., 0.75; 50.00) (e.g., initiating deletion, from the remote storage database, of the amount of data of the first type (excluding any data of the second type) that is currently scheduled for deletion) (e.g., initiating payment of the previous month balance that does not include an installment transaction).

In accordance with a determination that the value selector (e.g., 1008; 1108) is at the second point (e.g., 1003A in FIG. 10F; 1103A in FIG. 11N) on the predefined path (e.g., 1004; 1104) and the request to display the numerical selection user interface met the second criteria, device (e.g., 100) initiates (1220) a process for performing the predefined operation using the fourth numerical value (e.g., 1.5; 100.00) (e.g., initiating deletion of the total balance of data of the first type (excluding any data of the second type), including data of the first type that is currently scheduled for deletion and data of the first type that is not currently scheduled for deletion) (e.g., initiating payment of the card balance that does not include an installment balance).

In some embodiments, the first user interface associated with the respective parameter is a user interface (e.g., 1022) for managing remote data storage for a first set of data that includes data of a first type and data of a second type. In some embodiments, the second user interface associated with the respective parameter is a user interface (e.g., 710 in FIG. 10A) for managing remote data storage for a second set of data that includes data of the first type and excludes data of the second type.

In some embodiments, the data of the first type includes data that is associated with a first data retention policy in which the data of the first type is selectable for deletion based on a first set of parameters (e.g., at least a portion of the data of the first type becomes due for deletion on a recurring basis (e.g., monthly, weekly), and a user can select an amount (including a minimum amount) of the data of the first type to be deleted). In some embodiments, the data of the second type includes data that is associated with a second data retention policy in which the data of the second type is scheduled for deletion based on a second set of parameters different from the first set of parameters (e.g., the data of the second type is scheduled to be deleted in-part on a recurring basis (e.g., monthly, weekly) until the data of the second type is deleted in-full).

In some embodiments, the predefined path (e.g., 1004) of the numerical selection user interface (e.g., 1002) corresponds to a range of numerical values associated with an amount of data. In some embodiments, in accordance with a determination that the request to display the numerical selection user interface meets the first criteria, the predefined path represents a first range of numerical values (e.g., 0 to 3.9) that corresponds to the first set of data. In some embodiments, in accordance with a determination that the request to display the numerical selection user interface meets the second criteria, the predefined path represents a second range of numerical values (e.g., 0 to 1.5) that corresponds to the second set of data.

In some embodiments, the predefined path (e.g., 1004) of the numerical selection user interface (e.g., 1002) corresponds to a range of numerical values associated with an amount of data to be requested to be deleted from available computer storage resources (e.g., an available MB or GB amount of computer resources (e.g., memory)) associated with a computer storage account. In some embodiments, the first numerical value, second numerical value, third numerical value, and fourth numerical value each correspond to an amount of data requested to be deleted from the available computer storage resources associated with the computer storage account.

In some embodiments, the predefined path (e.g., 1104) of the numerical selection user interface (e.g., 1102) corresponds to a range of numerical values associated with a payment amount for reducing a balance of a transfer account (e.g., a payment account; a virtual card account; a first-party credit account; a points account). In some embodiments, the first numerical value, second numerical value, third numerical value, and fourth numerical value each correspond to a payment amount for reducing the balance of the transfer account. In some embodiments, the predefined operation is an adjustment (e.g., payment; reduction) of the balance of the transfer account.

In some embodiments, the first user interface associated with the respective parameter is a user interface for managing one or more aspects of an installment plan (e.g., managing payment of the installment plan) associated with the transfer account (e.g., 810 in FIG. 11G; 845 in FIG. 11L). In some embodiments, the second user interface associated with the respective parameter is a user interface that is not associated with an installment plan for the transfer account (e.g., 810 in FIG. 11A) (e.g., an account balance payment user interface that is not associated with any installment transactions or installment plans). In some embodiments, the first user interface is a user interface for managing the transfer account. In some embodiments, the second user interface is a user interface for managing one or more transactions (e.g., non-installment transactions; transactions that are only settled in-full), and none of the transactions include an installment transaction. In some embodiments, the second user interface is a user interface for managing the transfer account when the transfer account is not associated with an installment plan or any installment transactions.

In some embodiments, in accordance with a determination that the request to display the numerical selection user interface meets the first criteria, the predefined path (e.g., 1104) represents a first range of numerical values (e.g., 0 to 576.77, as shown in FIG. 11N) that corresponds to payment amounts for the balance of the transfer account, wherein the balance of the transfer account includes a first balance (e.g., $87.07) (e.g., a card balance) that includes non-installed transfers (e.g., transfers that are not installment transfers) and an installment balance (e.g., $489.70) (e.g., an unsettled portion of the installment plan, excluding the portion of the installment plan that is included in the card balance) of the transfer account that includes installment transfers associated with an installment plan (e.g., the balance of the transfer account includes the card balance (including a prior month balance of transactions plus subsequent transactions processed to-date and, in some instances, the current month's installment) and the remaining installment balance). In some embodiments, the first balance includes one or more installment transfers (installment transactions) that have been added to the card balance for the payment cycle.

In some embodiments, in accordance with a determination that the request to display the numerical selection user interface meets the second criteria, the predefined path (e.g., 1104) represents a second range of numerical values (e.g., 0 to 100 as shown in FIG. 11B) that corresponds to payment amounts for the balance of the transfer account, wherein the balance of the transfer account includes a second balance (e.g., $65.77) that does not include any installment transactions associated with an installment plan (e.g., the second balance includes the card balance (including a prior month balance of transactions plus subsequent transactions processed to-date) (not including a current month's installment)) (e.g., the second balance does not include a balance for any installment transactions).

Displaying, when the request meets the first criteria, the predefined path having a first range of numerical values that corresponds to payment amounts for the balance of the transfer account, including a balance of non-installed transfers and an installment balance, provides the user with a single user interface for paying two different types of balances without requiring the user to provide additional input to switch between two different payment user interfaces. This also eliminates the need for the device to display additional controls for selecting between two different user interfaces for paying the two different balance types. These features enhance the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first balance (e.g., $87.07) (e.g., card balance) further includes an installment transfer (e.g., $21.30) (e.g., an installment transaction) that previously was included in the installment balance. In some embodiments, an installment plan includes a series of installment transactions and an installment transaction is subtracted from the installment balance and added to the card balance on a repeating cycle (e.g., monthly) until the installment balance is eliminated.

In some embodiments, the first point on the predefined path (e.g., 1106D in FIG. 11N; 1103 in FIG. 11J) corresponds to a maximum payment amount for the first balance (e.g., $87.07). In some embodiments, the process for performing the predefined operation using the first numerical value includes applying, to the balance of the transfer account, the maximum payment amount for the first balance (e.g., $87.07), without applying a payment amount for the installment balance (e.g., the balance of the transfer account is adjusted such that the card balance is eliminated, and the installment balance (e.g., installment transactions that are not yet due for payment) remains unchanged (e.g., unpaid)). In some embodiments, a visual effect is applied to the numerical selection user interface to indicate the card balance has been paid off. For example, the path of the numerical selection user interface can change color and the value selector can change shape and color.

Displaying the numerical selection user interface having a point on the predefined path that corresponds to a maximum payment amount for the first balance provides the user with a payment user interface that allows the user to choose between making a payment to only the first balance or making a payment to both balances, without having to display additional controls for switching between different user interfaces to accommodate the option to choose payment allocations. These features enhance the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the numerical selection user interface (e.g., 1102) includes: in accordance with a determination that the request to display the numerical selection user interface meets the first criteria, displaying the numerical selection user interface in which the second point on the predefined path (e.g., 1103A in FIG. 11N) corresponds to a maximum payment amount (e.g., $576.77) for the balance of the transfer account, including the first balance (e.g., $87.07) and the installment balance (e.g., $489.70). In some embodiments, the process for performing the predefined operation using the second numerical value includes applying, to the balance of the transfer account, the maximum payment amount (e.g., $576.77) for the balance of the transfer account (e.g., including a maximum amount for the first balance and the installment balance) (e.g., the balance of the transfer account is adjusted such that the total balance of the transfer account is eliminated, including the card balance and the installment balance). In some embodiments, a visual effect is applied to the numerical selection user interface to indicate the total balance has been paid off. For example, the path of the numerical selection user interface can change color and the value selector can change shape and color.

Displaying the numerical selection user interface having a second point on the predefined path that corresponds to a maximum payment amount for the balance of the transfer account (including the first balance and the installment balance) provides the user with a payment user interface that allows the user to choose between making a payment to only the first balance or making a payment to both balances, without having to display additional controls for switching between different user interfaces to accommodate the option to choose payment allocations. These features enhance the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the numerical selection user interface includes: in accordance with a determination that the request to display the numerical selection user interface meets the first criteria, displaying a visual representation (e.g., 1113 in FIG. 11P) of the first balance and a visual representation (e.g., 1113 in FIG. 11P) of the installment balance in the numerical selection user interface. In some embodiments, the visual representation of the first balance (e.g., card balance) and the visual representation of the installment plan balance are displayed in the payment ring user interface.

Displaying a visual representation of the first balance and a visual representation of the installment balance in the numerical selection user interface allows the user to view both balance types without having to display additional controls for switching between different balance type user interfaces. Eliminating the need to display additional controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the request to display the numerical selection user interface meets the first criteria, the predefined path (e.g., 1104) includes a first portion (e.g., 1104-2) having a range of values corresponding to payment amounts for the installment balance of the transfer account. In some embodiments, the predefined path includes a second portion (e.g., 1104-1) having a range of values corresponding to payment amounts for the card balance of the transfer account. In some embodiments, the first portion of the numerical selection user interface is a portion of the numerical selection user interface that is positioned between the first point on the predefined path and the second point on the predefined path.

In some embodiments, while displaying the numerical selection user interface (e.g., 1102) and prior to detecting the input (e.g., 1032; 1141) corresponding to activation of the selectable user interface object (e.g., 1016; 1116), the device (e.g., 100) detects a series of one or more inputs (e.g., 1139; 1140) directed to the numerical selection user interface (e.g., 1102). In response to detecting the series of one or more inputs (e.g., 1139; 1140) directed to the numerical selection user interface (e.g., 1102), the device adjusts a position of the value selector (e.g., 1108) within the predefined path (e.g., 1104) of the numerical selection user interface (e.g., 1102). In some embodiments, the series of one or more inputs directed to the numerical selection user interface include an input to select the value selector (e.g., a tap-and-hold gesture), and subsequent movement of the input (e.g., a drag gesture) to move the position of the value selector within the payment ring user interface. In such embodiments, the position of the value selector is adjusted within the predefined path of the numerical selection user interface based on a magnitude and direction of the series of one or more inputs directed to the numerical selection user interface. In some embodiments, the series of one or more inputs directed to the numerical selection user interface include a user input (e.g., a tap gesture) at a location within the predefined path, and the position of the value selector is moved to the location within the predefined path corresponding to the user input.

Note that details of the processes described above with respect to method 1200 (e.g., FIGS. 12A-12B) are also applicable in an analogous manner to the methods described above. For example, method 900 optionally includes one or more of the characteristics of the various methods described above with reference to method 1200. For example, the user interfaces described with respect to method 900 can be used to initiate a balance transfer as discussed with respect to method 1200. For brevity, these details are not repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources provide usage information about and provide easier management of an account. The present disclosure contemplates that in some instances, this gathered data may include personal information data that uniquely identifies or can be used to contact or locate a specific person. Such personal information data can include financial data, demographic data, location-based data, telephone numbers, email addresses, user IDs, home addresses, data or records relating to a user's health or level of fitness (e.g., vital signs measurements, medication information, exercise information), date of birth, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, when providing proposed transfer amounts for a balance transfer, the present technology can be configured to allow users to select to "opt in" or "opt out" of participation in the collection of personal information data that may be used to determine the recommended amounts. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, recommended or suggested balance transfer amounts can be provided to users by inferring preferences based on non-personal information data or a bare minimum amount of personal information, such as the basic information required to activate an account that can be used to authorize transfers, such as payment transactions.

What is claimed is:

1. An electronic device, comprising:
   a display device;
   one or more input devices;
   one or more processors; and
   memory storing one or more programs configured to be executed by the one or more processors, the one or more programs including instructions for:
   receiving a request to display a numerical selection user interface; and
   in response to receiving the request to display the numerical selection user interface, displaying a numerical selection user interface for selecting a value for a respective parameter, wherein the numerical selection user interface includes:
  a predefined path with a respective size and shape, wherein the predefined path of the numerical selection user interface corresponds to a range of numerical values associated with a payment amount for reducing a balance of a transfer account,
  a value selector, and
  a selectable user interface object for initiating a process for performing a predefined operation using a value associated with the value selector;
wherein displaying the numerical selection user interface includes:
  in accordance with a determination that the request to display the numerical selection user interface meets first criteria, the first criteria including a criterion that is met when the request to display the numerical selection user interface occurs while displaying a first user interface associated with the respective parameter, displaying the predefined path with the respective size and shape, wherein a first point on the predefined path corresponds to a first numerical value and a second point on the predefined path corresponds to a second numerical value, and wherein the predefined path represents a first range of numerical values that corresponds to payment amounts for the balance of the transfer account, wherein the balance of the transfer account includes a first balance that includes non-installed transfers and an installment balance of the transfer account that includes installment transfers associated with an installment plan; and
  in accordance with a determination that the request to display the numerical selection user interface meets second criteria, the second criteria including a criterion that is met when the request to display the numerical selection user interface occurs while displaying a second user interface associated with the respective parameter that is different from the first user interface, displaying the predefined path with the respective size and shape, wherein the first point on the predefined path corresponds to a third numerical value that is different from the first numerical value and the second point on the predefined path corresponds to a fourth numerical value that is different from the second numerical value, and wherein the predefined path represents a second range of numerical values that corresponds to payment amounts for the balance of the transfer account, wherein the balance of the transfer account includes a second balance that does not include any installment transactions associated with an installment plan;
while displaying the numerical selection user interface, detecting an input corresponding to activation of the selectable user interface object; and
in response to detecting the input corresponding to activation of the selectable user interface object:
  in accordance with a determination that the value selector is at the first point on the predefined path and the request to display the numerical selection user interface met the first criteria, initiating a process for performing the predefined operation using the first numerical value;
  in accordance with a determination that the value selector is at the second point on the predefined path and the request to display the numerical selection user interface met the first criteria, initiating a process for performing the predefined operation using the second numerical value;
  in accordance with a determination that the value selector is at the first point on the predefined path and the request to display the numerical selection user interface met the second criteria, initiating a process for performing the predefined operation using the third numerical value; and
  in accordance with a determination that the value selector is at the second point on the predefined path and the request to display the numerical selection user interface met the second criteria, initiating a process for performing the predefined operation using the fourth numerical value.

2. The electronic device of claim 1, wherein the predefined operation is an adjustment of the balance of the transfer account.

3. The electronic device of claim 1, wherein:
the first user interface associated with the respective parameter is a user interface for managing one or more aspects of the installment plan associated with the transfer account; and
the second user interface associated with the respective parameter is a user interface that is not associated with the installment plan for the transfer account.

4. The electronic device of claim 1, wherein the first balance further includes an installment transfer that previously was included in the installment balance.

5. The electronic device of claim 1, wherein:
the first point on the predefined path corresponds to a maximum payment amount for the first balance; and
the process for performing the predefined operation using the first numerical value includes applying, to the balance of the transfer account, the maximum payment amount for the first balance, without applying a payment amount for the installment balance.

6. The electronic device of claim 1, wherein displaying the numerical selection user interface includes:
in accordance with a determination that the request to display the numerical selection user interface meets the first criteria, displaying the numerical selection user interface in which the second point on the predefined path corresponds to a maximum payment amount for the balance of the transfer account, including the first balance and the installment balance; and
the process for performing the predefined operation using the second numerical value includes applying, to the balance of the transfer account, the maximum payment amount for the balance of the transfer account.

7. The electronic device of claim 1, wherein displaying the numerical selection user interface includes:
in accordance with a determination that the request to display the numerical selection user interface meets the first criteria, displaying a visual representation of the first balance and a visual representation of the installment balance in the numerical selection user interface.

8. The electronic device of claim 1, wherein:
in accordance with a determination that the request to display the numerical selection user interface meets the first criteria, the predefined path includes a first portion having a range of values corresponding to payment amounts for the installment balance of the transfer account.

9. The electronic device of claim 1, the one or more programs further including instructions for:
while displaying the numerical selection user interface and prior to detecting the input corresponding to activation of the selectable user interface object:
  detecting a series of one or more inputs directed to the numerical selection user interface; and in response to detecting the series of one or more inputs directed to the numerical selection user interface, adjusting a position of the value selector within the predefined path of the numerical selection user interface.

10. The electronic device of claim 1, wherein the numerical selection user interface further includes a representation of the selected value for the respective parameter displayed at a central location with respect to the predefined path with the respective size and shape.

11. The electronic device of claim 1, wherein the predefined path with the respective size and shape is a ring shape.

12. The electronic device of claim 1, wherein the predefined path is a closed path.

13. A non-transitory computer-readable storage medium storing one or more programs configured to be executed by one or more processors of an electronic device with a display device and one or more input devices, the one or more programs including instructions for:
  receiving a request to display a numerical selection user interface; and
  in response to receiving the request to display the numerical selection user interface, displaying a numerical selection user interface for selecting a value for a respective parameter, wherein the numerical selection user interface includes:
    a predefined path with a respective size and shape, wherein the predefined path of the numerical selection user interface corresponds to a range of numerical values associated with a payment amount for reducing a balance of a transfer account,
    a value selector, and
    a selectable user interface object for initiating a process for performing a predefined operation using a value associated with the value selector;
  wherein displaying the numerical selection user interface includes:
    in accordance with a determination that the request to display the numerical selection user interface meets first criteria, the first criteria including a criterion that is met when the request to display the numerical selection user interface occurs while displaying a first user interface associated with the respective parameter, displaying the predefined path with the respective size and shape, wherein a first point on the predefined path corresponds to a first numerical value and a second point on the predefined path corresponds to a second numerical value, and wherein the predefined path represents a first range of numerical values that corresponds to payment amounts for the balance of the transfer account, wherein the balance of the transfer account includes a first balance that includes non-installed transfers and an installment balance of the transfer account that includes installment transfers associated with an installment plan; and
    in accordance with a determination that the request to display the numerical selection user interface meets second criteria, the second criteria including a criterion that is met when the request to display the numerical selection user interface occurs while displaying a second user interface associated with the respective parameter that is different from the first user interface, displaying the predefined path with the respective size and shape, wherein the first point on the predefined path corresponds to a third numerical value that is different from the first numerical value and the second point on the predefined path corresponds to a fourth numerical value that is different from the second numerical value, and wherein the predefined path represents a second range of numerical values that corresponds to payment amounts for the balance of the transfer account, wherein the balance of the transfer account includes a second balance that does not include any installment transactions associated with an installment plan;
  while displaying the numerical selection user interface, detecting an input corresponding to activation of the selectable user interface object; and
  in response to detecting the input corresponding to activation of the selectable user interface object:
    in accordance with a determination that the value selector is at the first point on the predefined path and the request to display the numerical selection user interface met the first criteria, initiating a process for performing the predefined operation using the first numerical value;
    in accordance with a determination that the value selector is at the second point on the predefined path and the request to display the numerical selection user interface met the first criteria, initiating a process for performing the predefined operation using the second numerical value;
    in accordance with a determination that the value selector is at the first point on the predefined path and the request to display the numerical selection user interface met the second criteria, initiating a process for performing the predefined operation using the third numerical value; and
    in accordance with a determination that the value selector is at the second point on the predefined path and the request to display the numerical selection user interface met the second criteria, initiating a process for performing the predefined operation using the fourth numerical value.

14. The non-transitory computer-readable storage medium of claim 13, wherein the predefined operation is an adjustment of the balance of the transfer account.

15. The non-transitory computer-readable storage medium of claim 13, wherein:
  the first user interface associated with the respective parameter is a user interface for managing one or more aspects of the installment plan associated with the transfer account; and
  the second user interface associated with the respective parameter is a user interface that is not associated with the installment plan for the transfer account.

16. The non-transitory computer-readable storage medium of claim 13, wherein the first balance further includes an installment transfer that previously was included in the installment balance.

17. The non-transitory computer-readable storage medium of claim 13, wherein:
  the first point on the predefined path corresponds to a maximum payment amount for the first balance; and
  the process for performing the predefined operation using the first numerical value includes applying, to the balance of the transfer account, the maximum payment amount for the first balance, without applying a payment amount for the installment balance.

18. The non-transitory computer-readable storage medium of claim 13, wherein displaying the numerical selection user interface includes:
  in accordance with a determination that the request to display the numerical selection user interface meets the first criteria, displaying the numerical selection user interface in which the second point on the predefined path corresponds to a maximum payment amount for the balance of the transfer account, including the first balance and the installment balance; and the process for performing the predefined operation using the second numerical value includes applying, to the balance of the transfer account, the maximum payment amount for the balance of the transfer account.

19. The non-transitory computer-readable storage medium of claim 13, wherein displaying the numerical selection user interface includes:
in accordance with a determination that the request to display the numerical selection user interface meets the first criteria, displaying a visual representation of the first balance and a visual representation of the installment balance in the numerical selection user interface.

20. The non-transitory computer-readable storage medium of claim 13, wherein:
in accordance with a determination that the request to display the numerical selection user interface meets the first criteria, the predefined path includes a first portion having a range of values corresponding to payment amounts for the installment balance of the transfer account.

21. The non-transitory computer-readable storage medium of claim 13, the one or more programs further including instructions for:
while displaying the numerical selection user interface and prior to detecting the input corresponding to activation of the selectable user interface object:
detecting a series of one or more inputs directed to the numerical selection user interface; and
in response to detecting the series of one or more inputs directed to the numerical selection user interface, adjusting a position of the value selector within the predefined path of the numerical selection user interface.

22. The non-transitory computer-readable storage medium of claim 13, wherein the numerical selection user interface further includes a representation of the selected value for the respective parameter displayed at a central location with respect to the predefined path with the respective size and shape.

23. The non-transitory computer-readable storage medium of claim 13, wherein the predefined path with the respective size and shape is a ring shape.

24. The non-transitory computer-readable storage medium of claim 13, wherein the predefined path is a closed path.

25. A method, comprising:
at an electronic device with a display device and one or more input devices:
receiving a request to display a numerical selection user interface; and
in response to receiving the request to display the numerical selection user interface, displaying a numerical selection user interface for selecting a value for a respective parameter, wherein the numerical selection user interface includes:
a predefined path with a respective size and shape, wherein the predefined path of the numerical selection user interface corresponds to a range of numerical values associated with a payment amount for reducing a balance of a transfer account,
a value selector, and
a selectable user interface object for initiating a process for performing a predefined operation using a value associated with the value selector;

wherein displaying the numerical selection user interface includes:
in accordance with a determination that the request to display the numerical selection user interface meets first criteria, the first criteria including a criterion that is met when the request to display the numerical selection user interface occurs while displaying a first user interface associated with the respective parameter, displaying the predefined path with the respective size and shape, wherein a first point on the predefined path corresponds to a first numerical value and a second point on the predefined path corresponds to a second numerical value, and wherein the predefined path represents a first range of numerical values that corresponds to payment amounts for the balance of the transfer account, wherein the balance of the transfer account includes a first balance that includes non-installed transfers and an installment balance of the transfer account that includes installment transfers associated with an installment plan; and
in accordance with a determination that the request to display the numerical selection user interface meets second criteria, the second criteria including a criterion that is met when the request to display the numerical selection user interface occurs while displaying a second user interface associated with the respective parameter that is different from the first user interface, displaying the predefined path with the respective size and shape, wherein the first point on the predefined path corresponds to a third numerical value that is different from the first numerical value and the second point on the predefined path corresponds to a fourth numerical value that is different from the second numerical value, and wherein the predefined path represents a second range of numerical values that corresponds to payment amounts for the balance of the transfer account, wherein the balance of the transfer account includes a second balance that does not include any installment transactions associated with an installment plan;
while displaying the numerical selection user interface, detecting an input corresponding to activation of the selectable user interface object; and
in response to detecting the input corresponding to activation of the selectable user interface object:
in accordance with a determination that the value selector is at the first point on the predefined path and the request to display the numerical selection user interface met the first criteria, initiating a process for performing the predefined operation using the first numerical value;
in accordance with a determination that the value selector is at the second point on the predefined path and the request to display the numerical selection user interface met the first criteria, initiating a process for performing the predefined operation using the second numerical value;
in accordance with a determination that the value selector is at the first point on the predefined path and the request to display the numerical selection user interface met the second criteria, initiating a process for performing the predefined operation using the third numerical value; and
in accordance with a determination that the value selector is at the second point on the predefined path and the request to display the numerical selection user interface met the second criteria, initiating a process for performing the predefined operation using the fourth numerical value.

26. The method of claim 25, wherein the predefined operation is an adjustment of the balance of the transfer account.

27. The method of claim 25, wherein:
the first user interface associated with the respective parameter is a user interface for managing one or more aspects of the installment plan associated with the transfer account; and
the second user interface associated with the respective parameter is a user interface that is not associated with the installment plan for the transfer account.

28. The method of claim 25, wherein the first balance further includes an installment transfer that previously was included in the installment balance.

29. The method of claim 25, wherein:
the first point on the predefined path corresponds to a maximum payment amount for the first balance; and
the process for performing the predefined operation using the first numerical value includes applying, to the balance of the transfer account, the maximum payment amount for the first balance, without applying a payment amount for the installment balance.

30. The method of claim 25, wherein displaying the numerical selection user interface includes:
in accordance with a determination that the request to display the numerical selection user interface meets the first criteria, displaying the numerical selection user interface in which the second point on the predefined path corresponds to a maximum payment amount for the balance of the transfer account, including the first balance and the installment balance; and
the process for performing the predefined operation using the second numerical value includes applying, to the balance of the transfer account, the maximum payment amount for the balance of the transfer account.

31. The method of claim 25, wherein displaying the numerical selection user interface includes:
in accordance with a determination that the request to display the numerical selection user interface meets the first criteria, displaying a visual representation of the first balance and a visual representation of the installment balance in the numerical selection user interface.

32. The method of claim 25, wherein:
in accordance with a determination that the request to display the numerical selection user interface meets the first criteria, the predefined path includes a first portion having a range of values corresponding to payment amounts for the installment balance of the transfer account.

33. The method of claim 25, further comprising:
while displaying the numerical selection user interface and prior to detecting the input corresponding to activation of the selectable user interface object:
detecting a series of one or more inputs directed to the numerical selection user interface; and
in response to detecting the series of one or more inputs directed to the numerical selection user interface, adjusting a position of the value selector within the predefined path of the numerical selection user interface.

34. The method of claim 25, wherein the numerical selection user interface further includes a representation of the selected value for the respective parameter displayed at a central location with respect to the predefined path with the respective size and shape.

35. The method of claim 25, wherein the predefined path with the respective size and shape is a ring shape.

36. The method of claim 25, wherein the predefined path is a closed path.

* * * * *